(12) United States Patent
Kimura et al.

(10) Patent No.: US 7,872,959 B2
(45) Date of Patent: Jan. 18, 2011

(54) OBJECTIVE LENS, OPTICAL ELEMENT, OPTICAL PICK-UP APPARATUS AND OPTICAL INFORMATION RECORDING AND/OR REPRODUCING APPARATUS EQUIPPED THEREWITH

(75) Inventors: Tohru Kimura, Hachioji (JP); Katsuya Sakamoto, Hachioji (JP); Yuichi Atarashi, Hachioji (JP)

(73) Assignee: Konica Corporation, Tokyo (JP)

( * ) Notice: Subject to any disclaimer, the term of this patent is extended or adjusted under 35 U.S.C. 154(b) by 223 days.

(21) Appl. No.: 12/326,456

(22) Filed: Dec. 2, 2008

(65) Prior Publication Data

US 2009/0080321 A1    Mar. 26, 2009

Related U.S. Application Data

(60) Continuation of application No. 12/052,359, filed on Mar. 20, 2008, now Pat. No. 7,483,358, which is a continuation of application No. 11/679,204, filed on Feb. 27, 2007, now Pat. No. 7,382,709, which is a division of application No. 10/266,114, filed on Oct. 8, 2002, now Pat. No. 7,206,276.

(30) Foreign Application Priority Data

| Oct. 12, 2001 | (JP) | ............... 2001-315105 |
| Dec. 28, 2001 | (JP) | ............... 2001-400716 |
| Jun. 20, 2002 | (JP) | ............... 2002-180575 |

(51) Int. Cl.
G11B 7/00    (2006.01)

(52) U.S. Cl. ............... 369/112.23; 369/112.26; 369/121

(58) Field of Classification Search ............... None
See application file for complete search history.

(56) References Cited

U.S. PATENT DOCUMENTS 6,650,612 B1    11/2003    Matsuzaki et al.

(Continued)

FOREIGN PATENT DOCUMENTS

JP    2001-043559    2/2001

(Continued)

OTHER PUBLICATIONS

European Search Report dated May 16, 2008, issued in counterpart European Application No. 02257091.5-1232.

*Primary Examiner*—Paul Huber
(74) *Attorney, Agent, or Firm*—Finnegan, Henderson, Farabow, Garrett & Dunner, L.L.P.

(57) ABSTRACT

A hybrid objective lens has a refractive lens and a diffractive optical element constructed by plural coaxial ring-shaped zones on at least one optical surface thereof. When n1, n2 and n3 each is a diffraction order of a diffracted ray having a maximum light amount among diffracted rays of each of first, second and third light flux having wavelength $\lambda 1$, $\lambda 2$ and $\lambda 3$ when respective light flux comes to be incident into the diffractive structure respectively, the following formulas are satisfied:

$|n1|>|n2|$, and $|n1|>|n3|$, and the hybrid objective lens converges a n1-th, n2-th and n3-th order diffracted ray of the first, second and third light flux onto an information recording plane of each of the first, second ant third optical information recording medium respectively so as to form an appropriate wavefront within respective prescribed necessary image side numerical apertures.

13 Claims, 76 Drawing Sheets

U.S. PATENT DOCUMENTS

| | | |
|---|---|---|
| 6,873,588 B1 | 3/2005 | Mizuno et al. |
| 6,950,384 B2 | 9/2005 | Arai et al. |
| 7,206,276 B2 | 4/2007 | Kimura et al. |
| 7,382,709 B2 | 6/2008 | Kimura et al. |
| 2008/0181085 A1 | 7/2008 | Kimura et al. |

FOREIGN PATENT DOCUMENTS

| | | |
|---|---|---|
| JP | 2001-209966 | 8/2001 |
| JP | 2001-249273 | 9/2001 |
| JP | 2001-315105 | 10/2001 |
| JP | 2001-400716 | 12/2001 |
| JP | 2002-180575 | 6/2002 |

SPHERICAL ABERRATION
CHROMATIC ABERRATION

SPHERICAL ABERRATION

SPHERICAL ABERRATION

SPHERICAL ABERRATION
CHROMATIC ABERRATION

SPHERICAL ABERRATION

SPHERICAL ABERRATION

SPHERICAL ABERRATION
CHROMATIC ABERRATION

SPHERICAL ABERRATION

SPHERICAL ABERRATION

SPHERICAL ABERRATION
CHROMATIC ABERRATION

SPHERICAL ABERRATION

SPHERICAL ABERRATION

SPHERICAL ABERRATION
CHROMATIC ABERRATION

SPHERICAL ABERRATION

SPHERICAL ABERRATION

SPHERICAL ABERRATION

SPHERICAL ABERRATION

SPHERICAL ABERRATION

SPHERICAL ABERRATION

OBJECTIVE LENS, OPTICAL ELEMENT, OPTICAL PICK-UP APPARATUS AND OPTICAL INFORMATION RECORDING AND/OR REPRODUCING APPARATUS EQUIPPED THEREWITH

This is a continuation of application Ser. No. 12/052,359, filed Mar. 20, 2008, now U.S. Pat. No. 7,483,358 which is a continuation of application Ser. No. 11/679,204, filed Feb. 27, 2007, now U.S. Pat. No. 7,382,709, which is a divisional of application Ser. No. 10/266,114, filed Oct. 8, 2002, now U.S. Pat. No. 7,206,276, which claims the benefit of Japanese Application Nos. 315105/2001, filed Oct. 12, 2001, 400716/2001, filed Dec. 28, 2001, and 180575/2002, filed Jun. 20, 2002, all of which are incorporated herein by reference in their entireties, including any figures or tables.

BACKGROUND OF THE INVENTION

The present invention relates to an optical pick-up apparatus by which at least one of the recording and reproducing of the information can be conducted for 3 kinds of the optical information recording media whose standards (recording density) are different, objective lens which can be used for the optical pick-up apparatus, substrate thickness difference correcting means, chromatic aberration correcting means, substrate thickness error correcting means, aperture regulating/changing means, optical element and a recording•reproducing apparatus using this optical pick-up apparatus.

Conventionally, the optical disk is, as well known in CD (Compact Disk) or DVD (Digital Versatile Disc), widely used for the storage of the digital data such as the accumulation of the music information and image information, or storage of the computer data. In such a situation, recently, together with the arrival of an information-oriented society, the increase of capacity of these optical disks is intensely required.

In the optical disk, to increase the storage capacity per a unit area (recording density), it can be realized by reducing the spot diameter obtained from the optical pick-up optical system. Because the minimum diameter of the spot, as well known, is proportional to $\lambda$/NA (where, $\lambda$ is a wavelength of the light source, and NA is a numerical aperture of the optical system), in order to reduce the spot diameter, to reduce the wavelength of the light source used in the optical pick-up apparatus, and to increase the numerical aperture of the objective lens arranged opposite to the optical information recording medium in the optical system, are effective.

In them, relating to the reduction of the wavelength of the light source, it can be said that the study of the blue violet semiconductor laser generating the light of the wavelength of about 400 nm, or SHG blue violet laser is advanced, and the practical use of them is in a short time. When this short wavelength light source is used, even when the objective lens of NA 0.65 which is the same as DVD is used, onto the 12 cm diameter optical disk which is the same as the DVD, the recording of the information of about 15 GB can be conducted.

Further, relating to the increase of the numerical aperture of the objective lens, the study of the objective lens to realize the high numerical aperture of NA 0.85 by combining two lenses is advanced. When the above short wavelength light source and the high numerical aperture objective lens of NA 0.85 are used by combining them, onto the 12 cm diameter optical disk, the recording of the information of about 25 GB can be conducted, thereby, the more increase of the density can be attained.

In such a background, the study and development of the optical pick-up system to record and reproduce the high density next generation optical disk (hereinafter, in the present specification, called "high density DVD") is advanced, and in the optical pick-up system, it is required that 3 kinds of optical disks whose standards (recording density) are different, such as the high density DVD, DVD and CD, are compatibly recorded and reproduced.

As a means to attain the compatibility, it can be considered that the objective lenses corresponding to the standard of respective optical disks are mechanically switched, or the optical pick-up apparatus corresponding to the standard of respective optical disks are mounted, however, in this case, the switching mechanism of the objective lens or a plurality of optical pick-up apparatus are necessary, resulting in the increase of the size of the optical pick-up system, the increase of the number of parts, and the increase of the production cost. Accordingly, in the optical pick-up system for the high density DVD in which the compatibility of the DVD and CD is required, for the purpose of reduction of the size of the optical pick-up system, reduction of the number of parts, and reduction of the cost, it can be said that the most preferable one is to conduct the recording and reproducing onto the 3 kinds of optical disks whose standards are different, by using the common objective lens.

Problems in the case where the optical pick-up system by which the recording and reproducing are conducted by using the common objective lens onto the 3 kinds of optical disks whose standards are different, is realized, will be described below.

(1) To Secure the Distance (Working Distance) of the Objective Lens to CD when the CD is Recorded and Reproduced.

This is a problem which is conspicuous when the NA of the objective lens is more increased than that of the DVD (NA 0.6 to 0.65). In the high density DVD, when the NA of the objective lens is increased, because, when the protective substrate (called also transparent substrate or protective layer) thickness is remained 0.6 mm which is the same as the DVD, the coma generated by the skew (inclination or warpage) of the optical disk is increased, it is necessary that the protective substrate thickness is more reduced than 0.6 mm, and the margin to the skew of the optical disk is secured. As the high NA objective lens for such a high density DVD, the objective lens composed of 2 lenses is written in Tokkaihei No. 10-123410.

On the other hand, because the working distance of the objective lens of 2-group composition is shorter than that of the conventional objective lens of 1 group composition, it is very difficult to secure the sufficient working distance when the CD is recorded and reproduced. Because the NA of the CD is NA 0.45 to 0.5, which is smaller than that of the high density DVD or DVD, the tolerance to the production error of the protective substrate thickness is not so severe, therefore, the fluctuation by the individual difference of the protective substrate thickness is large. Accordingly, in order to prevent the breakage of the data by the collision of the CD and objective lens, it is necessary to sufficiently secure the working distance when the CD is recorded and reproduced, and from this point of view, in the optical pick-up system by which recording and reproducing are conducted by using the common objective lens onto 3 kinds of optical disks whose standards are different, it can be said that the objective lens of 2-group composition is undesirable.

(2) Spherical Aberration Generated Due to the Difference of the Protective Substrate Thickness In the CD (protective substrate thickness 1.2 mm) and DVD (protective substrate thickness 0.6 mm), there is a difference of 0.6 mm in the protective substrate thickness. Accordingly, in the optical pick-up system by which recording and reproducing are conducted by using the common objective lens onto 3 kinds of optical disks whose standards are different, it is necessary to provide a means to correct, at least, the spherical aberration due to the difference of the protective substrate thickness of the CD and DVD. Further, when the protective substrate thickness of the high density DVD is more reduced than 0.6 mm by the increase of the NA of the objective lens, it is necessary to provide a means to correct the spherical aberration by the difference of the protective substrate thickness of 3 kinds of the optical disks whose protective substrate thickness are different from each other.

(3) Spherical Aberration Generated Due to the Difference of the Wavelength

As described above, in the high density DVD, to attain the increase of the density, the blue violet light source of wavelength of about 400 nm is used. However, in the conventional refraction type objective lens, because, by the dispersion of the lens material, the spherical aberration is changed, it is difficult that the light flux from the light source having the different wavelength is converged in almost no-aberration onto the information recording surfaces of respective optical disks. Therefore, in order to attain the compatibility of the high density DVD (wavelength 400 nm), DVD (wavelength 650 nm), and CD (wavelength 780 nm), any means is necessary to correct the spherical aberration due to the difference of the wavelength.

However, in the optical pick-up apparatus, by the reduction of the wavelength of the light source and the increase of the NA of the objective lens, the problems which will be described below, are actualized.

The first problem is a chromatic aberration generated in the objective lens when the blue violet semiconductor laser generating the short wavelength of about 400 nm is used as the light source.

In the optical pick-up apparatus, the laser light emitted from the semiconductor laser is generally a single wavelength (single mode), and therefore, it is considered that the chromatic aberration of the objective lens has no problem, however, actually, the mode hopping in which the central wavelength is changed instantaneously by several nms due to the temperature change or output change, is produced. Because the mode hopping is a wavelength change caused instantaneously in such a manner that the focusing mechanism of the objective lens can not follow it, when the chromatic aberration of the objective lens is not corrected, the de-focus component corresponding to the movement amount of the image formation position is added, thereby the light converging performance of the objective lens is deteriorated.

The dispersion of general lens material used in the objective lens, in 600 nm to 800 nm which are wavelength region of the infrared semiconductor laser or the red semiconductor laser, is not so large, therefore, in the CD or DVD, the deterioration of the light converging performance by the mode hopping is not problem.

On the one hand, in the vicinity of 400 nm which is the wavelength region of the blue violet semiconductor laser, because the dispersion of the lens material is very large, even when the wavelength change is mere several nms, the image formation position of the objective lens is largely shifted. Therefore, in the high density DVD, when the blue violet semiconductor laser is used as the light source, the light converging performance of the objective lens is largely changed when the light source occurs mode hopping, thereby, there is a possibility that the stable recording or reproducing can not be conducted.

The second problem is a problem of the spherical aberration generated by various error factors when NA of the objective lens is increased.

In the optical pick-up apparatus, the spherical aberration generated due to the production error of the protective substrate thickness of the optical disk is proportional to the fourth power of the NA of the objective lens. In order to suppress this spherical aberration within the allowance, it is necessary that the tolerance to the production error of the protective substrate thickness of the optical disk is made several μm, however, in this case, the yield of the production of the optical disk is lowered, and there is a possibility that the mass production can not be attained. Accordingly, in the high density DVD, when the NA of the objective lens is increased, it is necessary to provide a means to correct the spherical aberration generated due to the production error of the protective substrate thickness of the optical disk.

Further, in the optical pick-up apparatus, as the objective lens, many plastic lenses are used because they are advantageous for the mass production. However, in the temperature change of the refractive index, it is well known that the plastic lens is about 2 figures larger than that of the glass lens.

When the environmental temperature of the objective lens formed of the plastic material rises and the refractive index of the objective lens is changed, in the objective lens, the spherical aberration is deteriorated. The deterioration amount of the spherical aberration due to the refractive index change is proportional to forth power of the NA of the objective lens, therefore, in the high density DVD for which the high NA objective lens is used, when the plastic lens is used for the objective lens, because the usable temperature region is too narrow, it is necessary to provide a means to correct the spherical aberration generated due to the refractive index change.

SUMMARY OF THE INVENTION

Accordingly, the present invention solves the above each problem and the object of the present invention is to provide an optical pick-up apparatus by which the mutual compatibility of three kinds of optical disks of the high density DVD, DVD, and CD is attained by using the common objective lens, and the optical pick-up apparatus in which the working distance of the CD is sufficiently secured.

Further, the object of the present invention is to provide the optical pick-up apparatus by which the mutual compatibility of three kinds of optical disks of the high density DVD, DVD, and CD is attained by using the objective lens common to the diffraction optical element, and the optical pick-up apparatus in which the utilization efficiency of a sufficient light amount can be obtained in the using wavelength region of respective optical disks.

Further, the object of the present invention is to provide the optical pick-up apparatus by which the mutual compatibility of three kinds of optical disks of the high density DVD, DVD, and CD is attained by using the common objective lens, and the optical pick-up apparatus by which the chromatic aberration due to the bad monochromaticity of the light source, the spherical aberration generated in the plastic lens due to environmental change such as the temperature change or humidity change, and the spherical aberration due to the production error of the protective substrate thickness, which are a problem when the high density DVD is recorded and/or reproduced, are finely corrected, and the stable recording and/or reproducing of the high density DVD can be conducted.

Further, the object of the present invention is to provide an objective lens, substrate thickness difference correcting means, chromatic correcting means, substrate thickness error correcting means, aperture regulating/changing means, diffractive optical element, and optical element. Further, the object is to provide a recording•reproducing apparatus by which the recording and/or reproducing of the information can be conducted by using the above optical pick-up apparatus onto three kinds of different optical information recording media.

The structure of the present invention to attain the above object will be explained hereinafter.

Further, the objective lens according to the present invention is an objective lens by which the reproducing and/or recording of the information is conducted onto the first optical information recording medium having the first protective substrate thickness (t1) by using the light flux from the first light source of the wavelength $\lambda 1$, the reproducing and/or recording of the information is conducted onto the second optical information recording medium having the second protective substrate thickness (t2≧t1) by using the light flux from the second light source of the wavelength $\lambda 2$ ($\lambda 1 < \lambda 2$), the reproducing and/or recording of the information is conducted onto the third optical information recording medium having the third protective substrate thickness (t3≧t2) by using the light flux from the third light source of the wavelength $\lambda 3$ ($\lambda 2 < \lambda 3$), and the objective lens has the diffractive structure formed of a plurality of concentric circular ring-shaped zones on at least one optical surface, and the objective lens is characterized in that: when the diffraction order of the diffracted ray having the maximum diffracted light amount in the diffracted ray of the first light flux generated when the first light flux of the wavelength $\lambda 1$ from the first light source is incident on the diffractive structure is n1, the diffraction order of the diffracted ray having the maximum diffracted light amount in the diffracted ray of the second light flux generated when the second light flux of the wavelength $\lambda 2$ from the second light source is incident on the diffractive structure, is n2, and the diffraction order of the diffracted ray having the maximum diffracted light amount in the diffracted ray of the third light flux generated when the third light flux of the wavelength $\lambda 3$ from the third light source is incident on the diffractive structure, is n3; and when the predetermined image side numerical aperture of the objective lens necessary for conducting the reproducing and/or recording onto the first optical information recording medium by the light flux of the wavelength $\lambda 1$, is NA1, the predetermined image side numerical aperture of the objective lens necessary for conducting the reproducing and/or recording onto the second optical information recording medium by the light flux of the wavelength $\lambda 2$, is NA2, and the predetermined image side numerical aperture of the objective lens necessary for conducting the reproducing and/or recording onto the third optical information recording medium by the light flux of the wavelength $\lambda 3$, is NA3, $|n1|>|n2|$, and $|n1|>|n3|$ are satisfied; and the objective lens can converge the n1-order diffracted ray of the first light flux onto the information recording surface of the first optical information recording medium for conducting the reproducing and/or recording of the information onto the first optical information recording medium, in the numerical aperture NA1, so that a fine wave front is formed; the n2-order diffracted ray of the second light flux onto the information recording surface of the second optical information recording medium for conducting the reproducing and/or recording of the information onto the second optical information recording medium, in the numerical aperture NA2, so that a fine wave front is formed; and the n3-order diffracted ray of the third light flux onto the information recording surface of the third optical information recording medium for conducting the reproducing and/or recording of the information onto the third optical information recording medium, in the numerical aperture NA3, so that a fine wave front is formed.

According to this objective lens, because the diffractive structure is determined in such a manner that the diffraction order of the light flux used for the recording and reproducing of the first optical information recording medium to the thirds optical information recording medium satisfies the above expressions, for each light flux used for the recording and reproducing of the first optical information recording medium to the thirds optical information recording medium, respectively, the high diffraction efficiency can be obtained. Further, by the action of this diffractive structure, when the light flux from respective light sources with the different wavelength is incident on the objective lens, because the spherical aberration generated due to the difference of the at least 2 different protective substrate thickness in the first substrate thickness to the third substrate thickness is corrected, for all of the first optical information recording medium to the third optical information recording medium, the recording or reproducing of the information can be finely conducted. Further, by the action of the diffractive structure, when the light flux from the respective light sources with the different wavelength is incident on the objective lens, because the spherical aberration changed due to the dispersion of the lens material is corrected, for all of the first optical information recording medium to the third optical information recording medium, the recording or reproducing of the information can be finely conducted.

It is preferable that the diffractive structure is optimized by the wavelength $\lambda B$ and the diffraction order n1, and satisfies the following expressions.

$380 \text{ nm} < \lambda 1 < 420 \text{ nm}$ $630 \text{ nm} < \lambda 2 < 670 \text{ nm}$ $760 \text{ nm} < \lambda 3 < 800 \text{ nm}$ $340 \text{ nm} < \lambda B < 440 \text{ nm}$ $|n1|=2$ $|n2|=1$ $|n3|=1$ Further, it is preferable to satisfy the following expression.

$350 \text{ nm} < \lambda B < 420 \text{ nm}$

It is preferable that the diffractive structure is optimized by the wavelength $\lambda B$ and the diffraction order n1, and satisfies the following expressions.

$380 \text{ nm} < \lambda 1 < 420 \text{ nm}$ $630 \text{ nm} < \lambda 2 < 670 \text{ nm}$ $760 \text{ nm} < \lambda 3 < 800 \text{ nm}$ $400 \text{ nm} < \lambda B < 430 \text{ nm}$ $|n1|=6$

|n2|=4

|n3|=4

In this case, it is preferable to satisfy the following expression.

405 nm<λB<425 nm

Further, it is preferable that the diffractive structure has the positive power.

Further, when each position of the plurality of the ring-shaped zones of the diffractive structure optimized by the wavelength λB and the diffraction order n1 is expressed by the light path difference function defined by $\Phi_b = n1 \cdot (b_2 \cdot h^2 + b_4 \cdot h^4 + b_6 \cdot h^6 + \ldots)$ (herein, h is the height (mm) from the optical axis, and $b_2, b_4, b_6, \ldots$ are respectively the second order, fourth order, 6-th order, . . . , light path difference function coefficient (called also diffractive surface coefficient)), it is preferable that the power ($mm^{-1}$) of only the diffractive structure defined by $PD = \Sigma(-2 \cdot n1 \cdot b_2)$ satisfies the following expression.

$0.5 \times 10^{-2} < PD < 5.0 \times 10^{-2}$

Further, it is preferable that the objective lens is structured by one lens group. Thereby, the working distance for particularly the third optical information recording medium in the optical pick-up apparatus, can be sufficiently secured. In this case, when the focal distance in the wavelength λ1 of the objective lens is f1 (mm), central thickness is d (mm), the diameter of the light flux of the wavelength λ1 incident on the objective lens is Φ1 (mm), and the working distance of the objective lens when the reproducing and/or recording of the information is conducted onto the third optical information recording medium, is fB3 (mm), it is more preferable that the following expressions are satisfied for sufficiently securing the working distance.

$0.7 < d/f1 < 1.5$ $2.8 < \Phi1 < 5.8$ $fB3 > 0.2$

Further, when the magnification of the objective lens when reproducing and/or recording of the information is conducted onto the third optical information recording medium is m3, it is preferable to satisfy the following expression.

m3<0

In this case, it is preferable to satisfy the following expression.

$-0.25 < m3 < -0.05$

Further, when the magnification of the objective lens when reproducing and/or recording of the information is conducted onto the third optical information recording medium is m2, it is preferable to satisfy the following expression.

m2<0

In this case, it is preferable to satisfy the following expression.

$-0.20 < m2 < -0.02$

Further, it is preferable that the image side numerical aperture NA1, and NA2 of the objective lens satisfy the NA1>NA2, and the light flux of the wavelength λ2 passed a region corresponding to a region from the image side numerical aperture NA2 to the NA1 of the objective lens reaches on the information recording surface of the second optical information recording medium, and the light flux of the wavelength λ2 is, in the image side numerical aperture NA1, on the information recording surface of the second optical information recording medium, in a situation that the wave front aberration is not smaller than 0.07 λ2.

In this case, it is preferable that the light flux of the wavelength λ2 is, in the image side numerical aperture NA1, on the information recording surface of the second optical information recording medium, in a situation that the wave front aberration is not smaller than 0.20 λ2.

It is preferable that the image side numerical apertures NA1, NA2 and NA3 of the objective lens satisfy NA1>NA2>NA3, and the light flux of the wavelength λ3 passed a region corresponding to a region from the image side numerical aperture NA3 to the NA1 of the objective lens reaches on the information recording surface of the third optical information recording medium, and the light flux of the wavelength λ3 is, in the image side numerical aperture NA1, on the information recording surface of the third optical information recording medium, in a situation that the wave front aberration is not smaller than 0.07 λ2.

Further, it is preferable that the light flux of the wavelength λ3 is, in the image side numerical aperture NA1, on the information recording surface of the third optical information recording medium, in a situation that the wave front aberration is not smaller than 0.20 λ3.

Further, it is preferable that the objective lens satisfies NA1>NA2, and has the aperture regulating means which shuts off the light flux of the wavelength λ2 incident on a region corresponding to a region from the image side numerical aperture NA2 to the NA1 of the objective lens, and which can conduct so that the light flux of the wavelength λ2 incident on a region corresponding to a region from the image side numerical aperture NA2 to the NA1 of the objective lens, does not reach on the information recording surface of the second optical information recording medium.

Further, it is preferable that the aperture regulating means has the wavelength selectivity which transmits the light flux of the wavelength λ1 incident on a region corresponding to a region from the image side numerical aperture NA2 to the NA1 of the objective lens, and which shuts off the light flux of the wavelength λ2 incident on a region corresponding to a region from the image side numerical aperture NA2 to the NA1 of the objective lens.

Further, it is preferable that the objective lens satisfies NA1>NA2>NA3, and has the aperture regulating means which shuts off the light flux of the wavelength λ3 incident on a region corresponding to a region from the image side numerical aperture NA3 to the NA1 of the objective lens, and which can conduct so that the light flux of the wavelength λ3 incident on a region corresponding to a region from the image side numerical aperture NA3 to the NA1 of the objective lens, does not reach on the information recording surface of the third optical information recording medium.

Further, it is preferable that the aperture regulating means has the wavelength selectivity which transmits the light flux of the wavelength λ1 incident on a region corresponding to a region from the image side numerical aperture NA3 to the NA1 of the objective lens, and which shuts off the light flux of the wavelength λ3 incident on a region corresponding to a region from the image side numerical aperture NA3 to the NA1 of the objective lens.

Further, it is preferable that the aperture regulating means is a wavelength selective filter formed on the optical surface of the objective lens.

Further, it is preferable that the objective lens is formed of plastic material, or formed of glass material.

Further, it is preferable to satisfy the following expressions.

$$380 \text{ nm} < \lambda_1 < 420 \text{ nm}$$

$$630 \text{ nm} < \lambda_2 < 670 \text{ nm}$$

$$760 \text{ nm} < \lambda_3 < 800 \text{ nm}$$

$$0.0 \text{ mm} \leq t_1 < 0.3 \text{ mm}$$

$$0.5 \text{ mm} < t_2 < 0.7 \text{ mm}$$

$$1.0 \text{ mm} < t_3 < 1.3 \text{ mm}$$

$$0.99 > NA_1 \geq 0.70$$

$$0.70 > NA_2 \geq 0.55$$

$$0.55 > NA_3 \geq 0.40$$

Further, yet another optical pick-up apparatus according to the present invention is characterized in that: it is an optical pick-up apparatus by which the reproducing and/or recording of the information is conducted onto the first optical information recording medium having the first protective substrate thickness (t1) by using the light flux from the first light source of the wavelength λ1; the reproducing and/or recording of the information is conducted onto the second optical information recording medium having the second protective substrate thickness (t2>t1) by using the light flux from the second light source of the wavelength λ2 (λ1<λ2); and the reproducing and/or recording of the information is conducted onto the third optical information recording medium having the third protective substrate thickness (t3>t2) by using the light flux from the third light source of the wavelength λ3 (λ2<λ3); and it is provided with the objective lens. Thereby, the recording and/or reproducing of the information can be conducted for 3 kinds of different optical information recording media by the utilizing efficiency of the sufficient light amount. Further, the recording•reproducing apparatus according to the present invention can be structured in such a manner that this optical pick-up apparatus is mounted, and the sound and/or image is recorded, and/or the sound and/or image can be reproduced.

Further, another objective lens according to the present invention is an objective lens for the optical pick-up apparatus by which the reproducing and/or recording of the information is conducted onto the first optical information recording medium having the first protective substrate thickness (t1) by using the light flux from the first light source of the wavelength λ1, the reproducing and/or recording of the information is conducted onto the second optical information recording medium having the second protective substrate thickness (t2≧t1) by using the light flux from the second light source of the wavelength λ2 (λ1<λ2), and the reproducing and/or recording of the information is conducted onto the third optical information recording medium having the third protective substrate thickness (t3≧t2) by using the light flux from the third light source of the wavelength λ3 (λ2<λ3), and the objective lens is a hybrid objective lens structured by a refractive type lens, and a diffractive optical element having the diffractive structure formed of a plurality of concentric circular ring-shaped zones arranged on the light flux incident surface side of the refractive type lens, and the objective lens is characterized in that: when the diffraction order of the diffracted ray having the maximum diffracted light amount in the diffracted ray of the first light flux generated when the first light flux of the wavelength λ1 from the first light source is incident on the diffractive structure is n1; the diffraction order of the diffracted ray having the maximum diffracted light amount in the diffracted ray of the second light flux generated when the second light flux of the wavelength λ2 from the second light source is incident on the diffractive structure, is n2; and the diffraction order of the diffracted ray having the maximum diffracted light amount in the diffracted ray of the third light flux generated when the third light flux of the wavelength λ3 from the third light source is incident on the diffractive structure, is n3; and when the predetermined image side numerical aperture of the objective lens necessary for conducting the reproducing and/or recording onto the first optical information recording medium by the light flux of the wavelength λ1, is NA1; the predetermined image side numerical aperture of the objective lens necessary for conducting the reproducing and/or recording onto the second optical information recording medium by the light flux of the wavelength λ2, is NA2; and the predetermined image side numerical aperture of the objective lens necessary for conducting the reproducing and/or recording onto the third optical information recording medium by the light flux of the wavelength λ3, is NA3;

$$|n1| > |n2|, \text{ and}$$

$$|n1| > |n3|$$

are satisfied; and the objective lens can converge the n1-order diffracted ray of the first light flux onto the information recording surface of the first optical information recording medium for conducting the reproducing and/or recording of the information onto the first optical information recording medium, in the numerical aperture NA1, so that a fine wave front is formed; the n2-order diffracted ray of the second light flux onto the information recording surface of the second optical information recording medium for conducting the reproducing and/or recording of the information onto the information recording surface of the second optical information recording medium, in the numerical aperture NA2, so that a fine wave front is formed; and the n3-order diffracted ray of the third light flux onto the information recording surface of the third optical information recording medium for conducting the reproducing and/or recording of the information onto the third optical information recording medium, in the numerical aperture NA3, so that a fine wave front is formed.

According to this objective lens, because the diffractive structure of the diffractive optical element is determined in such a manner that the diffraction order of the light flux used for the recording and reproducing of the first optical information recording medium to the thirds optical information recording medium satisfies the above expressions, for each light flux used for the recording and reproducing of the first optical information recording medium to the thirds optical information recording medium, respectively, the high diffraction efficiency can be obtained. Further, by the action of this diffractive structure, in the first protective substrate thickness to the third protective substrate thickness, because the spherical aberration generated by the difference of at least 2 different protective substrate thickness is corrected, for all of the first optical information recording medium to the third optical information recording medium, the recording or reproducing of the information can be finely conducted. Further, by the action of the diffractive structure, when the light flux from respective light sources with the different wavelength is incident on the objective lens, because the spherical aberration generated due to the difference of the at least 2 different protective substrate thickness in the first substrate thickness to the third substrate thickness is corrected, for all of the first optical information recording medium to the third optical information recording medium, the recording or reproducing of the information can be finely conducted. Further, by the action of the diffractive structure, when the light flux from the respective light sources with the different wavelength is incident on the objective lens, because the spherical aberration changed due to the dispersion of the lens material is corrected, for all of the first optical information recording medium to the third optical information recording medium, the recording or reproducing of the information can be finely conducted.

Further, the diffractive optical element according to the present invention is a diffractive optical element used for the hybrid objective lens, and the diffractive structure is characterized in that: it has the spherical aberration characteristic in which, when the wavelength of the incident light is changed to the extending direction, the spherical aberration changes to under-correction direction.

It is preferable that the diffractive structure is optimized by the wavelength $\lambda B$ and the diffraction order n1, and satisfies the following expressions.

$$380 \text{ nm} < \lambda 1 < 420 \text{ nm}$$

$$630 \text{ nm} < \lambda 2 < 670 \text{ nm}$$

$$760 \text{ nm} < \lambda 3 < 800 \text{ nm}$$

$$340 \text{ nm} < \lambda B < 440 \text{ nm}$$

$$|n1|=2$$

$$|n|=1$$

$$|n3|=1$$

Further, it is preferable to satisfy the following expression.

$$350 \text{ nm} < \lambda B < 420 \text{ nm}$$

It is preferable that the diffractive structure is optimized by the wavelength $\lambda B$ and the diffraction order n1, and satisfies the following expressions.

$$380 \text{ nm} < \lambda 1 < 420 \text{ nm}$$

$$630 \text{ nm} < \lambda 2 < 670 \text{ nm}$$

$$760 \text{ nm} < \lambda 3 < 800 \text{ nm}$$

$$400 \text{ nm} < \lambda B < 430 \text{ nm}$$

$$|n1|=6$$

$$|n2|=4$$

$$|n3|=3$$

In this case, it is preferable to satisfy the following expression.

$$405 \text{ nm} < \lambda B < 425 \text{ nm}$$

Further, it is preferable that the diffractive structure has the positive power.

Further, when each position of the plurality of the ring-shaped zones of the diffractive structure optimized by the wavelength $\lambda B$ and the diffraction order n1 is expressed by the light path difference function defined by $\Phi_b = n1 \cdot (b_2 \cdot h^2 + b_4 \cdot h^4 + b_6 \cdot h^6 + \ldots)$ (herein, h is the height (mm) from the optical axis, and $b_2, b_4, b_6, \ldots$ are respectively the second order, fourth order, 6-th order, light path difference function coefficient (called also diffractive surface coefficient)), it is preferable that the power (mm$^{-1}$) of only the diffractive structure defined by $PD=\Sigma(-2 \cdot n1 \cdot b_2)$ satisfies the following expression.

$$0.5 \times 10^{-2} < PD < 5.0 \times 10^{-2}$$

Further, it is preferable that the diffractive structure is formed on the plane. Alternatively, it is preferable that the diffractive structure is formed on the aspherical surface.

Further, it is preferable that the diffractive optical element is formed of the plastic material.

In the hybrid objective lens, it is preferable that the diffractive optical element is integrated with the refractive type lens, and it tracking-driven. In this case, the diffractive optical element and the refractive type lens have respectively the integrally molded flange portion, and it is preferable that, when respective flange portions are engaged with together, the diffractive optical element and the refractive type lens are integrated with together.

Further, it is preferable that the image side numerical apertures NA1 and NA2 of the objective lens satisfy NA1>NA2, and the light flux of the wavelength $\lambda 2$ passed a region corresponding to a region from the image side numerical aperture NA2 to the NA1 of the objective lens reaches on the information recording surface of the second optical information recording medium, and the light flux of the wavelength $\lambda 2$ is, in the image side numerical aperture NA1, on the information recording surface of the second optical information recording medium, in a situation that the wave front aberration is not smaller than 0.07 $\lambda 2$.

Further, it is preferable that the light flux of the wavelength $\lambda 2$ is, in the image side numerical aperture NA1, on the information recording surface of the second optical information recording medium, in a situation that the wave front aberration is not smaller than 0.20 $\lambda 2$.

Further, it is preferable that the image side numerical apertures NA1, NA2 and NA3 of the objective lens satisfy

NA1>NA2>NA3, and the light flux of the wavelength $\lambda 3$ passed a region corresponding to a region from the image side numerical aperture NA3 to the NA1 of the objective lens reaches on the information recording surface of the third optical information recording medium, and the light flux of the wavelength $\lambda 3$ is, in the image side numerical aperture NA1, on the information recording surface of the third optical information recording medium, in a situation that the wave front aberration is not smaller than 0.07 $\lambda 3$.

Further, it is preferable that the light flux of the wavelength $\lambda 3$ is, in the image side numerical aperture NA1, on the information recording surface of the third optical information recording medium, in a situation that the wave front aberration is not smaller than 0.20 $\lambda 3$.

Further, it is preferable that the objective lens satisfies

NA1>NA2, and has the aperture regulating means which shuts off the light flux of the wavelength $\lambda 2$ incident on a region of the diffractive optical element corresponding to a region from the image side numerical aperture NA2 to the NA1 of the objective lens, and which can conduct so that the light flux of the wavelength $\lambda 2$ incident on a region of the diffractive optical element corresponding to a region from the image side numerical aperture NA2 to the NA1 of the objective lens, does not reach on the information recording surface of the second optical information recording medium.

In this case, it is preferable that the aperture regulating means has the wavelength selectivity which transmits the light flux of the wavelength λ1 incident on a region of the diffractive optical element corresponding to a region from the image side numerical aperture NA2 to the NA1 of the objective lens, and which shuts off the light flux of the wavelength λ2 incident on a region of the diffractive optical element corresponding to a region from the image side numerical aperture NA2 to the NA1 of the objective lens.

Further, it is preferable that the objective lens satisfies

NA1>NA2>NA3, and has the aperture regulating means which shuts off the light flux of the wavelength λ3 incident on a region of the diffractive optical element corresponding to a region from the image side numerical aperture NA3 to the NA1 of the objective lens, and which can conduct so that the light flux of the wavelength λ3 incident on a region of the diffractive optical element corresponding to a region from the image side numerical aperture NA3 to the NA1 of the objective lens, does not reach on the information recording surface of the third optical information recording medium.

In this case, it is preferable that the aperture regulating means has the wavelength selectivity which transmits the light flux of the wavelength λ1 incident on a region of the diffractive optical element corresponding to a region from the image side numerical aperture NA3 to the NA1 of the objective lens, and which shuts off the light flux of the wavelength λ3 incident on a region of the diffractive optical element corresponding to a region from the image side numerical aperture NA3 to the NA1 of the objective lens.

Further, it is preferable that the aperture regulating means is a wavelength selective filter formed on the optical surface of the diffractive optical element.

Further, it is preferable that the refractive type lens is formed of plastic material, or formed of glass material.

Further, it is preferable that the refractive type lens is composed of one lens group.

Further, when the focal distance in the wavelength λ1 of the objective lens total system in which the refractive type lens and the diffractive optical element are combined, is f1 (mm), central thickness of the refractive type lens is d (mm), the diameter of the light flux of the wavelength λ1 incident on the objective lens is Φ1 (mm), and the working distance of the objective lens when the reproducing and/or recording of the information is conducted onto the third optical information recording medium, is fB3 (mm), it is preferable that the following expressions are satisfied.

0.7<d/f1<1.5

2.8<Φ1<5.8 fB3>0.2

Further, when the magnification of the objective lens when reproducing and/or recording of the information is conducted onto the third optical information recording medium is m3, it is preferable to satisfy the following expression.

m3<0

Further, it is preferable to satisfy the following expression.

−0.25<m3<−0.05

Further, when the magnification of the objective lens when reproducing and/or recording of the information is conducted onto the second optical information recording medium is m2, it is preferable to satisfy the following expression.

m2<0

In this case, it is preferable to satisfy the following expression.

−0.20<m2<−0.02

Further, in the objective lens, it is preferable to satisfy the following expressions.

380 nm<λ1<420 nm 630 nm<λ2<670 nm 760 nm<λ3<800 nm 0.0 mm≦t1<0.3 mm 0.5 mm<t2<0.7 mm 1.0 mm<t3<1.3 mm 0.99>NA1≧0.70

0.70>NA2≧0.55

0.55>NA3≧0.40

Further, yet another optical pick-up apparatus according to the present invention is characterized in that: it is an optical pick-up apparatus by which the reproducing and/or recording of the information is conducted onto the first optical information recording medium having the first protective substrate thickness (t1) by using the light flux from the first light source of the wavelength λ1; the reproducing and/or recording of the information is conducted onto the second optical information recording medium having the second protective substrate thickness (t2>t1) by using the light flux from the second light source of the wavelength λ2 (λ1<λ2); and the reproducing and/or recording of the information is conducted onto the third optical information recording medium having the third protective substrate thickness (t3>t2) by using the light flux from the third light source of the wavelength λ3 (λ2<λ3); and it is provided with the objective lens. Thereby, the recording and/or reproducing of the information can be conducted onto 3 kinds of different optical information recording media by the utilizing efficiency of the sufficient light amount. Further, the recording•reproducing apparatus according to the present invention can be structured in such a manner that this optical pick-up apparatus is mounted, and the sound and/or image is recorded, and/or the sound and/or image can be reproduced.

Further, yet another objective lens according to the present invention is an objective lens for the optical pick-up apparatus by which the reproducing and/or recording of the information is conducted onto the first optical information recording medium having the first protective substrate thickness (t1) by using the light flux from the first light source of the wavelength λ1, the reproducing and/or recording of the information is conducted onto the second optical information recording medium having the second protective substrate thickness (t2>t1) by using the light flux from the second light source of the wavelength λ2 (λ1<λ2), and the reproducing and/or recording of the information is conducted onto the third optical information recording medium having the third protective substrate thickness (t3≧t2) by using the light flux from the third light source of the wavelength λ3 (λ2<λ3), and the optical pick-up apparatus has the substrate thickness difference correcting means for correcting the spherical aberration changed due to the difference of the first protective substrate thickness and the third protective substrate thickness, and the objective lens is characterized in that: when the predetermined image side numerical aperture of the objective lens necessary for conducting the reproducing and/or recording onto the first optical information recording medium by the light flux of the wavelength λ1, is NA1, and the magnification of the objective lens when the reproducing and/or recording of the information is conducted onto the first optical information recording medium, is m1, the objective lens is optimized in the combination of the wavelength λ1, first protective substrate thickness t1, image side numerical aperture NA1, and the magnification m1, so that the spherical aberration is in a situation of the minimum.

According to this objective lens, the spherical aberration for the light flux whose wavelength is shortest, which is used for the first optical information recording medium, is minimum, and the objective lens applicable when the recording or reproducing of the information is conducted onto 3 kinds of different optical information recording media, can be provided.

It is preferable that the objective lens is a refractive type lens, and further, the objective lens is composed of one lens group.

In this case, when the focal distance in the wavelength λ1 of the objective lens is f1 (mm), central thickness is d (mm), the diameter of the light flux of the wavelength λ1 incident on the objective lens is Φ1 (mm), and the working distance of the objective lens when the reproducing and/or recording of the information is conducted onto the third optical information recording medium, is fB3 (mm), it is preferable that the following expressions are satisfied.

$0.7 < d/f1 < 1.5$ $2.8 < \Phi1 < 5.8$ $fB3 > 0.2$

Further, it is preferable that the objective lens satisfies $NA1 > NA2$, and has the aperture regulating means which shuts off the light flux of the wavelength λ2 incident on a region corresponding to a region from the image side numerical aperture NA2 to the NA1 of the objective lens, and which can conduct so that the light flux of the wavelength λ2 incident on a region corresponding to a region from the image side numerical aperture NA2 to the NA1 of the objective lens, does not reach on the information recording surface of the second optical information recording medium.

Further, it is preferable that the aperture regulating means has the wavelength selectivity which transmits the light flux of the wavelength λ1 incident on a region corresponding to a region from the image side numerical aperture NA2 to the NA1 of the objective lens, and which shuts off the light flux of the wavelength λ2 incident on a region corresponding to a region from the image side numerical aperture NA2 to the NA1 of the objective lens.

Further, it is preferable that the image side numerical apertures NA1, NA2 and NA3 of the objective lens satisfy $NA1 > NA2 > NA3$, and have the aperture regulating means which shuts off the light flux of the wavelength λ3 incident on a region corresponding to a region from the image side numerical aperture NA3 to the NA1 of the objective lens, and which can conduct so that the light flux of the wavelength λ3 incident on a region corresponding to a region from the image side numerical aperture NA3 to the NA1 of the objective lens, does not reach on the information recording surface of the third optical information recording medium.

Further, it is preferable that the aperture regulating means has the wavelength selectivity which transmits the light flux of the wavelength λ1 incident on a region corresponding to a region from the image side numerical aperture NA3 to the NA1 of the objective lens, and which shuts off the light flux of the wavelength λ3 incident on a region corresponding to a region from the image side numerical aperture NA3 to the NA1 of the objective lens.

Further, it is preferable that the aperture regulating means is the wavelength selective filter formed on the optical surface of the objective lens.

It is preferable that the objective lens is formed of the plastic material, or formed of the glass material.

Further, in the objective lens, it is preferable to satisfy the following expressions.

$380 \text{ nm} < \lambda1 < 420 \text{ nm}$ $630 \text{ nm} < \lambda2 < 670 \text{ nm}$ $760 \text{ nm} < \lambda3 < 800 \text{ nm}$ $0.0 \text{ mm} \leq t1 < 0.3 \text{ mm}$ $0.5 \text{ mm} < t2 < 0.7 \text{ mm}$ $1.0 \text{ mm} < t3 < 1.3 \text{ mm}$ $0.99 > NA1 \geq 0.70$ $0.70 > NA2 \geq 0.55$ $0.55 > NA3 \geq 0.40$ Further, yet another optical pick-up apparatus according to the present invention is characterized in that: it is an optical pick-up apparatus by which the reproducing and/or recording of the information is conducted onto the first optical information recording medium having the first protective substrate thickness (t1) by using the light flux from the first light source of the wavelength λ1; the reproducing and/or recording of the information is conducted onto the second optical information recording medium having the second protective substrate thickness (t2>t1) by using the light flux from the second light source of the wavelength λ2 (λ1<λ2); and the reproducing and/or recording of the information is conducted onto the third optical information recording medium having the third protective substrate thickness (t3>t2) by using the light flux from the third light source of the wavelength λ3 (λ2<λ3); and it is provided with the objective lens. Thereby, the recording and/or reproducing of the information can be stably conducted particularly onto the first optical information recording medium. Further, the recording•reproducing apparatus according to the present invention can be structured in such a manner that this optical pick-up apparatus is mounted, the sound and/or image is recorded, and/or the sound and/or image can be reproduced.

Further, the optical element according to the present invention is characterized in that: the reproducing and/or recording of the information is conducted onto the first optical information recording medium having the first protective substrate thickness (t1) by using the first light flux from the first light source of the wavelength λ1; the reproducing and/or recording of the information is conducted onto the second optical information recording medium having the second protective substrate thickness (t2>t1) by using the second light flux from the second light source of the wavelength λ2 (λ1<λ2); and the reproducing and/or recording of the information is conducted onto the third optical information recording medium having the third protective substrate thickness (t3≧t2) by using the third light flux from the third light source of the wavelength λ3 (λ2<λ3); and it is the optical element for the optical pick-up apparatus for which the common objective lens is used for the reproducing and/or recording of the information onto the first optical information recording medium to the third optical information recording medium; and in the case where the entrance pupil surface of the optical element is divided into 3 ring-shaped light flux regions of the first light flux region, second light flux region, and third light flux region, in the order from the vicinity of the optical axis to the outside, when the region of the optical element through which the light flux incident on each light flux region passes is defined as, respectively, the first optical region, second optical region and third optical region in the order from the vicinity of the optical axis to the outside, the first to the third light flux incident on the first optical region are converged onto each information recording surface of the first to the third optical information recording media so that the fine wave front is formed; and the first and the second light flux incident on the second optical region are converged onto each information recording surface of the first and the second optical information recording media so that the fine wave front is formed; however, the third light flux incident on the second optical region does not form the fine wave front on the information recording surface of the third optical information recording medium; and the first light flux incident on the third optical region is converged onto the information recording surface of the first optical information recording medium so that the fine wave front is formed; however, the second and the third light flux incident on the third optical region do not respectively form the fine wave front on each information recording surface of the second and the third optical information recording media.

According to this optical element, the optical element applicable for the optical pick-up apparatus by which the recording and/or reproducing of the information is conducted onto 3 kinds of different optical information recording media having 3 optical regions, can be provided.

Further, another optical element according to the present invention is characterized in that: the reproducing and/or recording of the information is conducted onto the first optical information recording medium having the first protective substrate thickness (t1) by using the first light flux from the first light source of the wavelength λ1; the reproducing and/or recording of the information is conducted onto the second optical information recording medium having the second protective substrate thickness (t2≧t1) by using the second light flux from the second light source of the wavelength λ2 (λ1<λ2); and the reproducing and/or recording of the information is conducted onto the third optical information recording medium having the third protective substrate thickness (t3≧t2) by using the third light flux from the third light source of the wavelength λ3 (λ2<λ3); and it is the optical element for the optical pick-up apparatus for which the common objective lens is used for the reproducing and/or recording of the information onto the first optical information recording medium to the third optical information recording medium; and in the case where the entrance pupil surface of the optical element is divided into 3 ring-shaped light flux regions of the first light flux region, second light flux region, and third light flux region, in the order from the vicinity of the optical axis to the outside, when the region of the optical element through which the light flux incident on each light flux region passes is defined as, respectively, the first optical region, second optical region and third optical region in the order from the vicinity of the optical axis to the outside, the first to the third light flux incident on the first optical region are converged onto each information recording surface of the first to the third optical information recording media so that the fine wave front is formed; and the first and the second light flux incident on the second optical region are converged onto each information recording surface of the first and the second optical information recording media so that the fine wave front is formed; however, the third light flux incident on the second optical region is shut off, and does not reach the information recording surface of the third optical information recording medium, and the first light flux incident on the third optical region is converged onto the information recording surface of the first optical information recording medium so that the fine wave front is formed; however, the second light flux incident on the third optical region does not form the fine wave front on the information recording surface of the second optical information recording medium, and the third light flux incident on the third optical region is shut off, and does not reach the information recording surface of the third optical information recording medium.

According to this optical element, the optical element applicable for the optical pick-up apparatus by which the recording and/or reproducing of the information is conducted onto 3 kinds of different optical information recording media having 3 optical regions, can be provided.

It is preferable that the above optical element is used for the optical pick-up apparatus having a light flux shut-off means which can conduct so that the third light flux incident on the second and the third optical regions is shut off, and it does not reach the information recording surface of the third optical information recording medium.

It is preferable that, in this case, the light flux shut-off means is the wavelength selection filter formed on the optical surface of the optical element.

Further, yet another optical element according to the present invention is characterized in that: the reproducing and/or recording of the information is conducted onto the first optical information recording medium having the first protective substrate thickness (t1) by using the first light flux from the first light source of the wavelength λ1; the reproducing and/or recording of the information is conducted onto the second optical information recording medium having the second protective substrate thickness (t2≧t1) by using the second light flux from the second light source of the wavelength λ2 (λ1<λ2); and the reproducing and/or recording of the information is conducted onto the third optical information recording medium having the third protective substrate thickness (t3≧t2) by using the third light flux from the third light source of the wavelength λ3 (λ2<λ3); and it is the optical element for the optical pick-up apparatus for which the common objective lens is used for the reproducing and/or recording of the information onto the first optical information recording medium to the third optical information recording medium; and in the case where the entrance pupil surface of the optical element is divided into 3 ring-shaped zone light flux regions of the first light flux region, second light flux region, and third light flux region, in the order from the vicinity of the optical axis to the outside, when the region of the optical element through which the light flux incident on each light flux region passes is defined as, respectively, the first optical region, second optical region and third optical region in the order from the vicinity of the optical axis to the outside, the first to the third light flux incident on the first optical region are converged onto each information recording surface of the first to the third optical information recording media so that the fine wave front is formed; and the first and the second light flux incident on the second optical region are converged onto each information recording surface of the first and the second optical information recording media so that the fine wave front is formed; however, the third light flux incident on the second optical region is shut off, and does not reach the information recording surface of the third optical information recording medium, and the first light flux incident on the third optical region is converged onto the information recording surface of the first optical information recording medium so that the fine wave front is formed; however, both of the second and the third light flux incident on the third optical region are shut off together, and respectively, do not reach the information recording surface of the second and the third optical information recording media.

According to this optical element, the optical element applicable for the optical pick-up apparatus by which the recording and/or reproducing of the information is conducted onto the 3 kinds of different optical information recording media having 3 optical regions, can be provided.

It is preferable that the above optical element is used for the optical pick-up apparatus having the light flux shut-off means which can conduct so that the third light flux incident on the second and the third optical regions is shut off, and does not reach the information recording surface of the third optical information recording medium, and the second light flux incident on the third optical region is shut off, and does not reach the information recording surface of the second optical information recording medium.

In this case, it is preferable that the light flux shut-off means is a wavelength selection filter formed on the optical surface of the optical element.

Further, it is preferable that the optical element is the objective lens.

Further, it is preferable that the optical element is arranged on the light flux incident surface side of the objective lens.

Further, it is preferable that the optical element is integrated with the objective lens and tracking-driven.

Further, when a predetermined image side numerical aperture of the objective lens when the reproducing and/or recording of the information is conducted onto the first optical information recording medium by using the first light flux, is NA1, a predetermined image side numerical aperture of the objective lens when the reproducing and/or recording of the information is conducted onto the second optical information recording medium by using the second light flux, is NA2 (NA2<NA1), and a predetermined image side numerical aperture of the objective lens when the reproducing and/or recording of the information is conducted onto the third optical information recording medium by using the third light flux, is NA3, it is preferable that the following expressions are satisfied.

$$NA2 = N2 \cdot SIN\ \theta2$$

$$NA3 = N3 \cdot SIN\ \theta3$$

Where,

SIN $\theta2$: sine of the absolute value of the outgoing angle $\theta2$ (deg) measured on the basis of the optical axis, from the final surface of the objective lens, of the light ray passed the proximate periphery of the second optical region in the second light flux, SIN $\theta3$: sine of the absolute value of the outgoing angle $\theta3$ (deg) measured on the basis of the optical axis, from the final surface of the objective lens, of the light ray passed the proximate periphery of the first optical region in the third light flux, N2: the refractive index in the wavelength $\lambda2$ of the image side space of the objective lens, and N3: the refractive index in the wavelength $\lambda3$ of the image side space of the objective lens.

In this case, it is preferable that, in at least one optical region in the first to the third optical regions, the diffractive structure composed of a plurality of concentric circular ring-shaped zones is formed.

Further, when the diffraction order of the diffracted ray having the maximum diffracted light amount, in the diffracted ray of the first light flux generated when the first light flux is incident on the diffractive structure formed in the first optical region is ni1, and the diffraction order of the diffracted ray having the maximum diffracted light amount, in the diffracted ray of the second light flux generated when the second light flux is incident on the diffractive structure formed in the i-th optical region, is ni2, it is preferable to satisfy the following expression.

$$|ni1| > |ni2|\ \text{(where, i is 1, 2 or 3)}$$

In this case, when the diffraction order of the diffracted ray having the maximum diffracted light amount, in the diffracted ray of the first light flux generated when the first light flux is incident on the diffractive structure formed in the first optical region is ni1, and the diffraction order of the diffracted ray having the maximum diffracted light amount, in the diffracted ray of the second light flux generated when the third light flux is incident on the diffractive structure formed in the i-th optical region, is ni3, it is preferable to satisfy the following expression.

$$|ni1| > |ni3|\ \text{(where, i is 1, 2 or 3)}$$

Further, in the second and the third optical regions, the diffractive structure is formed, respectively, of the plurality of concentric circular ring-shaped zones is structured, and when the diffraction order of the diffracted ray having the maximum diffracted light amount, in the diffracted ray of the first light flux generated when the first light flux is incident on the diffractive structure formed in the second optical region is n21, and the diffraction order of the diffracted ray having the maximum diffracted light amount, in the diffracted ray of the first light flux generated when the first light flux is incident on the diffractive structure formed in the third optical region, is n31, it is preferable to satisfy the following expression.

$$|n31| > |n21|$$

In this case, it is preferable that the diffractive structure formed in the second optical region is optimized by the diffraction order n21 and the wavelength $\lambda B2$, and the diffractive structure formed in the third optical region is optimized by the diffraction order n31 and the wavelength $\lambda B3$, and the following expression is satisfied.

$$\lambda B2 \neq \lambda B3$$

Further, it is preferable that the above diffractive optical element satisfies the following expressions.

$$380\ nm < \lambda1 < 420\ nm$$

$$630\ nm < \lambda2 < 670\ nm$$

$$760\ nm < \lambda3 < 800\ nm$$

Further, yet another optical pick-up apparatus according to the present invention is characterized in that: it is an optical pick-up apparatus by which the reproducing and/or recording of the information is conducted onto the first optical information recording medium having the first protective substrate thickness (t1) by using the first light flux from the first light source of the wavelength λ1; the reproducing and/or recording of the information is conducted onto the second optical information recording medium having the second protective substrate thickness (t2>t1) by using the second light flux from the second light source of the wavelength λ2 (λ1<λ2); and the reproducing and/or recording of the information is conducted onto the third optical information recording medium having the third protective substrate thickness (t3>t2) by using the third light flux from the third light source of the wavelength λ3 (λ2<λ3); and the common objective lens is used for the reproducing and/or recording of the information onto the first optical information recording medium to the third optical information recording medium, and it is provided with any one of above optical elements. Further, the recording•reproducing apparatus according to the present invention can be structured in such a manner that this optical pick-up apparatus is mounted, the sound and/or image is recorded, and/or the sound and/or image can be reproduced.

The optical pick-up apparatus according to the present invention is the optical pick-up apparatus by which the reproducing and/or recording of the information is conducted onto the first information recording medium having the first protective substrate thickness (t1) by using the light flux from the first light source of the wavelength λ1, the reproducing and/or recording of the information is conducted onto the second information recording medium having the second protective substrate thickness (t2≧t1) by using the light flux from the second light source of the wavelength λ2 (λ1<λ2), and the reproducing and/or recording of the information is conducted onto the third information recording medium having the third protective substrate thickness (t3≧t2) by using the light flux from the third light source of the wavelength λ3 (λ2<λ3), and the optical pick-up apparatus uses the common objective lens for the reproducing and/or recording of the information onto the first information recording medium to the third information recording medium, and the optical pick-up apparatus has the substrate thickness difference correcting means for correcting the spherical aberration changed due to the difference of the first protective substrate thickness to the third protective substrate thickness, which is arranged in the optical path on which all of each light flux from the first light source to the third light source pass, and the substrate thickness difference correcting means is a diffractive optical element having the diffractive structure formed of a plurality of concentric circular ring-shaped zones, and when the diffraction order of the diffracted ray having the maximum diffracted light amount in the diffracted ray of the first light flux generated when the first light flux of the wavelength λ1 from the first light source is incident on the diffractive structure, is n1, the diffraction order of the diffracted ray having the maximum diffracted light amount in the diffracted ray of the second light flux generated when the second light flux of the wavelength λ2 from the second light source is incident on the diffractive structure, is n2, and the diffraction order of the diffracted ray having the maximum diffracted light amount in the diffracted ray of the third light flux generated when the third light flux of the wavelength λ3 from the third light source is incident on the diffractive structure, is n3, $|n1|>|n2|$, and $|n1|>|n3|$ are satisfied, and when the predetermined image side numerical aperture of the objective lens necessary for conducting the reproducing and/or recording onto the first optical information recording medium by the light flux of wavelength λ1, is NA1, the predetermined image side numerical aperture of the objective lens necessary for conducting the reproducing and/or recording onto the second optical information recording medium by the light flux of wavelength λ2, is NA2, and the predetermined image side numerical aperture of the objective lens necessary for conducting the reproducing and/or recording onto the third optical information recording medium by the light flux of wavelength λ3, is NA3, it is characterized in that: the objective lens can converge the n1-order diffracted ray of the first light flux onto the information recording surface of the first optical information recording medium for conducting the reproducing and/or recording of the information onto the first optical information recording medium in the numerical aperture NA1, so that a fine wave front is formed, the objective lens can converge the n2-order diffracted ray of the second light flux onto the information recording surface of the second optical information recording medium for conducting the reproducing and/or recording of the information onto the second optical information recording medium in the numerical aperture NA2, so that a fine wave front is formed, and the objective lens can converge the n3-order diffracted ray of the third light flux onto the information recording surface of the third optical information recording medium for conducting the reproducing and/or recording of the information onto the third optical information recording medium in the numerical aperture NA3, so that a fine wave front is formed.

According to this optical pick-up apparatus, because, by the diffractive optical element as the substrate thickness difference correcting means arranged on the common optical path through which all of the flux from the first light source to the third light source pass, in the first protective substrate thickness to the third protective substrate thickness, the spherical aberration generated by the difference between at least 2 different protective substrate thickness is corrected, the recording or reproducing of the information can be finely conducted for all from the first optical information recording medium to the third optical information recording medium.

In this connection, in the optical pick-up apparatus compatible for the 3 kinds of optical disks which have different standards, 3 light sources with the different wavelength are mounted. Its reason is as follows. At first, because the reflection factor of the intermediate layer between the information recording layers of 2 layer disk in the short wavelength region, is low, by the short wavelength laser light source for the high density DVD, 2 layer disk of the DVD can not be read. At second, in the CD-R or CD-RW, because the reproducing of the information is conducted by using the reflection characteristic of the information recording surface, by the short wavelength laser light source for the high density DVD, the CD-R or CD-RW in the CDs can not be read. Accordingly, in the optical pick-up system compatible for the 3 kinds of optical disks which have different standards, it is necessary that 3 light sources with the different wavelength such as the blue violet laser which generates the laser light of near 400 nm, red laser which generates the laser light of near 650 nm, and infrared laser which generates the laser light of near 780 nm, are mounted.

Accordingly, in the optical pick-up apparatus according to the present invention, the diffractive structure of the diffractive optical element as the substrate thickness difference correcting means is determined in such a manner that the diffraction order of the light flux used for the recording and reproducing of the first optical information recording medium to the thirds optical information recording medium satisfies the above expressions. Thereby, for each light flux used for the recording and reproducing of the first optical information recording medium to the thirds optical information recording medium, respectively, the high diffraction efficiency can be obtained. Further, by the diffraction action of the diffractive optical element as the substrate thickness difference correcting means, when the light flux from respective light sources with the different wavelength is incident on the objective lens, because the spherical aberration changed due to the dispersion of the lens material is corrected, for all of the first optical information recording medium to the third optical information recording medium, the recording or reproducing of the information can be finely conducted.

It is preferable that the diffractive structure is optimized by the wavelength λB, and the diffraction order n1, and satisfies the following expression.

300 nm<λB<500 nm

Further, it is preferable that the diffractive structure is optimized by the wavelength λB, and the diffraction order n1, and satisfies the following expressions.

380 nm<λ1<420 nm 630 nm<λ2<670 nm 760 nm<λ3<800 nm 340 nm<λB<440 nm

|n1|=2

|n2|=1

|n3|=1

Further, it is preferable to satisfy the following expression.

350 nm<λB<420 nm

Further, it is preferable that the diffractive structure is optimized by the wavelength λB, and the diffraction order n1, and satisfies the following expressions.

380 nm<λ1<420 nm 630 nm<λ2<670 nm 760 nm<λ3<800 nm 400 nm<λB<430 nm

|n1|=6

|n2|=4

|n3|=3

Further, it is preferable to satisfy the following expression.

405 nm<λB<425 nm

Further, it is preferable that the diffractive structure has the positive power.

Further, when each position of the plurality of ring-shaped zones of the diffractive structure optimized by the wavelength λB and the diffraction order n1, is expressed by the optical path difference function defined by $\Phi_b = n1 \cdot (b_2 \cdot h^2 + b_4 \cdot h^4 + b_6 \cdot h^6 + \ldots)$, (herein, h is the height from the optical axis (mm), $b_2, b_4, b_6, \ldots$, are respectively, 2nd-order, 4th-order, 6th-order optical path difference function coefficients (called also diffraction surface coefficient), it is preferable that the power ($mm^{-1}$) of only diffractive structure defined by $PD = \Sigma (-2 \cdot n1 \cdot b_2)$ satisfies the following expression.

$0.5 \times 10^{-2} < PD < 5.0 \times 10^{-2}$

Further, it is preferable that the objective lens is a refraction type objective lens, and the diffractive optical element is arranged on the light flux incident side of the refraction type objective lens.

Further, it is preferable that the diffractive structure is formed on the plane. Alternatively, it is preferable that the diffractive structure is formed on the aspherical surface.

Further, it is preferable that the diffractive optical element is integrated with the refraction type objective lens and is tracking-driven.

Further, it is preferable that the diffractive optical element is formed integrally with the objective lens, and the diffractive structure is formed on at least one optical surface including the optical surface of the light flux incident side of the objective lens.

Further, it is preferable that the image side numerical apertures NA1 to NA3 satisfy NA1>NA2>NA3, and the optical pick-up apparatus has the aperture regulating means for NA1, NA2 and NA3, which is arranged in the common optical path through which all of each light flux from the first light source to the third light source pass. It is preferable that the aperture regulating means is integrated with the objective lens and tracking-driven.

Further, it is preferable that the aperture regulating means is the same diffractive optical element as the substrate thickness difference correcting means, and the light flux of the wavelength λ2 passed the region of the aperture regulating means corresponding to a region from the image side numerical aperture NA2 to NA1 of the objective lens reaches on the information recording surface of the second optical information recording medium, and the light flux of the wavelength λ2 is, in the image side numerical aperture NA1, on the information recording surface of the second optical information recording medium, in a situation that the wave front aberration is not smaller than 0.07 λ2.

Further, it is preferable that the light flux of the wavelength λ2 is, in the image side numerical aperture NA1, on the information recording surface of the second optical information recording medium, in a situation that the wave front aberration is not smaller than 0.20 λ2.

Further, it is preferable that the light flux of the wavelength λ3 passed the region of the aperture regulating means corresponding to a region from the image side numerical aperture NA3 to NA1 of the objective lens reaches on the information recording surface of the third optical information recording medium, and the light flux of the wavelength λ3 is, in the image side numerical aperture NA1, on the information recording surface of the third optical information recording medium, in a situation that the wave front aberration is not smaller than 0.07 λ3.

Further, it is preferable that the light flux of the wavelength λ3 is, in the image side numerical aperture NA1, on the information recording surface of the third optical information recording medium, in a situation that the wave front aberration is not smaller than 0.20 λ3.

Further, it is preferable that the aperture regulating means shuts off the light flux of the wavelength λ2 incident on the region of the aperture regulating means corresponding to a region from the image side numerical aperture NA2 to NA1 of the objective lens, and it can conduct so that the light flux of the wavelength λ2 incident on the region of the aperture regulating means corresponding to a region from the image side numerical aperture NA2 to NA1 of the objective lens, does not reach on the information recording surface of the second optical information recording medium.

Further, it is preferable that the aperture regulating means has the wavelength selectivity which transmits the light flux of the wavelength λ1 incident on the region of the aperture regulating means corresponding to a region from the image side numerical aperture NA2 to NA1 of the objective lens, and which shuts off the light flux of the wavelength λ2 incident on the region of the aperture regulating means corresponding to a region from the image side numerical aperture NA2 to NA1 of the objective lens.

Further, it is preferable that the aperture regulating means can conduct so that it shuts off the light flux of the wavelength λ3 incident on the region of the aperture regulating means corresponding to a region from the image side numerical aperture NA3 to NA1 of the objective lens, and the light flux of the wavelength λ3 incident on the region of the aperture regulating means corresponding to a region from the image side numerical aperture NA3 to NA1 of the objective lens, does not reach on the information recording surface of the third optical information recording medium.

Further, it is preferable that the aperture regulating means has the wavelength selectivity which transmits the light flux of the wavelength λ1 incident on the region of the aperture regulating means corresponding to a region from the image side numerical aperture NA3 to NA1 of the objective lens, and which shuts off the light flux of the wavelength λ3 incident on the region of the aperture regulating means corresponding to a region from the image side numerical aperture NA3 to NA1 of the objective lens.

Further, the aperture regulating means can be structured in the wavelength selecting filter formed on the optical surface of the objective lens.

Further, yet another optical pick-up apparatus is an optical pick-up apparatus by which the reproducing and/or recording of the information is conducted onto the first optical information recording medium having the first protective substrate thickness (t1) by using the light flux from the first light source of the wavelength λ1, the reproducing and/or recording of the information is conducted onto the second optical information recording medium having the second protective substrate thickness (t2≧t1) by using the light flux from the second light source of the wavelength λ2 (λ1<λ2), the reproducing and/or recording of the information is conducted onto the third optical information recording medium having the third protective substrate thickness (t3≧t2) by using the light flux from the third light source of the wavelength λ3 (λ2<λ3), and the optical pick-up apparatus uses the common objective lens, for the reproducing and/or recording of the information onto the first optical information recording medium to the third optical information recording medium, and it is characterized in that: the optical pick-up apparatus has the substrate thickness difference correcting means for correcting the spherical aberration changed due to the difference of the first protective substrate thickness to the third protective substrate thickness arranged in the optical path through which each light flux from the second light source and the third light source passes and the light flux from the first light source does not pass; and the substrate thickness difference correcting means is a diffractive optical element having the diffractive structure formed of a plurality of concentric circular ring-shaped zones; and when the diffraction order of the diffracted ray having the maximum diffracted light amount in the diffracted ray of the second light flux generated when the second light flux of the wavelength λ2 from the second light source is incident on the diffractive structure is n2, and the diffraction order of the diffracted ray having the maximum diffracted light amount in the diffracted ray of the third light flux generated when the third light flux of the wavelength λ3 from the third light source is incident on the diffractive structure is n3, |n2|=|n3| is satisfied; and when the predetermined image side numerical aperture of the objective lens necessary for conducting the reproducing and/or recording onto the first optical information recording medium by the light flux of the wavelength λ1, is NA1, the predetermined image side numerical aperture of the objective lens necessary for conducting the reproducing and/or recording onto the second optical information recording medium by the light flux of the wavelength λ2, is NA2, and the predetermined image side numerical aperture of the objective lens necessary for conducting the reproducing and/or recording onto the third optical information recording medium by the light flux of the wavelength λ3, is NA3, the objective lens can converge the first light flux onto the information recording surface of the first optical information recording medium for conducting the reproducing and/or recording of the information onto the first optical information recording medium, in the numerical aperture NA1, so that a fine wave front is formed; the n2-order diffracted ray of the second light flux onto the information recording surface of the second optical information recording medium for conducting the reproducing and/or recording of the information onto the second optical information recording medium, in the numerical aperture NA2, so that a fine wave front is formed; and the n3-order diffracted ray of the third light flux onto the information recording surface of the third optical information recording medium for conducting the reproducing and/or recording of the information onto the third optical information recording medium, in the numerical aperture NA3, so that a fine wave front is formed.

According to this optical pick-up apparatus, by the diffractive optical element as the substrate thickness difference correcting means arranged in the optical path through which both of each light flux from the second light source and the third light source pass and the light flux from the first light source does not pass, because the spherical aberration generated due to the difference of at least 2 different protective substrate thickness in the first protective substrate thickness to the third protective substrate thickness is corrected, for all of the first optical information recording medium to the third optical information recording medium, the recording or reproducing of the information can be finely conducted. Further, by the diffractive action of the diffractive optical element as the substrate thickness difference correcting means, when the light flux from respective light sources having the different wavelength is incident on the objective lens, because the spherical aberration changed due to the dispersion of the lens material is corrected, for all of the first optical information recording medium to the third optical information recording medium, the recording or reproducing of the information can be finely conducted.

It is preferable that the diffractive structure is optimized by the wavelength λB, and the diffraction order n2, and satisfy the following expressions.

$$630 \text{ nm} < \lambda 2 < 670 \text{ nm}$$

$$760 \text{ nm} < \lambda 3 < 800 \text{ nm}$$

$$\lambda 2 < \lambda B < \lambda 3$$

Further, it is preferable that, when the magnification of the objective lens when the reproducing and/or recording of the information is conducted onto the first information recording medium, is m1, the objective lens is a refractive type lens which is optimized so that the aberration becomes minimum, in the combination of the wavelength λ1, the first protective substrate thickness t1, the image side numerical aperture NA1, and the magnification m1.

Further, it is preferable that the image side numerical apertures NA1 to NA3 satisfy

NA1>NA2>NA3, and the optical pick-up apparatus has the aperture regulating means for NA1, NA2 and NA3, which is arranged in the common optical path through which all of each flux light from the first light source to the third light source pass. Further, it is preferable that the aperture regulating means is integrated with the objective lens, and is tracking-driven.

Further, it is preferable that the aperture regulating means which can shut off the light flux of the wavelength λ2 incident on the region of the aperture regulating means, corresponding to a region from the image side numerical aperture NA2 to NA1 of the objective lens, and which can conducts so that the light flux of the wavelength λ2 incident on the region of the aperture regulating means, corresponding to a region from the image side numerical aperture NA2 to NA1 of the objective lens, does not reach on the information recording surface of the second optical information recording medium.

Further, it is preferable that the aperture regulating means has the wavelength selectivity which transmits the light flux of the wavelength λ1 incident on the region of the aperture regulating means, corresponding to a region from the image side numerical aperture NA2 to NA1 of the objective lens, and which shuts off the light flux of the wavelength λ2 incident on the region of the aperture regulating means, corresponding to a region from the image side numerical aperture NA2 to NA1 of the objective lens.

Further, it is preferable that the aperture regulating means shuts off the light flux of the wavelength λ2 incident on the region of the aperture regulating means, corresponding to a region from the image side numerical aperture NA2 to NA1 of the objective lens, and it can conduct so that the light flux of the wavelength λ3 incident on the region of the aperture regulating means, corresponding to a region from the image side numerical aperture NA3 to NA1 of the objective lens, does not reach on the information recording surface of the third optical information recording medium.

Further, it is preferable that the aperture regulating means has the wavelength selectivity which transmits the light flux of the wavelength λ1 incident on the region of the aperture regulating means, corresponding to a region from the image side numerical aperture NA3 to NA1 of the objective lens, and which shuts off the light flux of the wavelength λ3 incident on the region of the aperture regulating means, corresponding to a region from the image side numerical aperture NA3 to NA1 of the objective lens.

Further, the aperture regulating means can be structured in the wavelength selective filter formed on the optical surface of the objective lens.

Further, yet another optical pick-up apparatus is an optical pick-up apparatus by which the reproducing and/or recording of the information is conducted onto the first optical information recording medium having the first protective substrate thickness (t1) by using the light flux from the first light source of the wavelength λ1, the reproducing and/or recording of the information is conducted onto the second optical information recording medium having the second protective substrate thickness (t2>t1) by using the light flux from the second light source of the wavelength λ2 (λ1<λ2), the reproducing and/or recording of the information is conducted onto the third optical information recording medium having the third protective substrate thickness (t3>t2) by using the light flux from the third light source of the wavelength λ3 (λ2<λ3), and the optical pick-up apparatus uses the common objective lens, for the reproducing and/or recording of the information onto the first optical information recording medium to the third optical information recording medium, and it is characterized in that: the optical pick-up apparatus has the first substrate thickness difference correcting means for correcting the spherical aberration changed due to the difference between the first protective substrate thickness and the second protective substrate thickness arranged in the optical path through which only the light flux from the second light source passes, and the light flux from the first light source passes and the third light source does not pass; and the second substrate thickness difference correcting means for correcting the spherical aberration changed due to the difference between the first protective substrate thickness and the third protective substrate thickness arranged in the optical path through which only the light flux from the third light source passes, and the light flux from the first light source and the second light source does not pass; and the first substrate thickness difference correcting means is a diffractive optical element having the diffractive structure formed of a plurality of concentric circular ring-shaped zones; and when the diffraction order of the diffracted ray having the maximum diffracted light amount in the diffracted ray of the second light flux generated when the second light flux of the wavelength λ2 from the second light source is incident on the diffractive structure of the first diffractive optical element is n2, the diffractive structure of the first diffractive optical element is optimized by the wavelength λB2 almost equal to the wavelength λ2, and the diffraction order n2; and the second substrate thickness difference correcting means is the second diffractive optical element having the diffractive structure formed of a plurality of concentric circular ring-shaped zones; and when the diffraction order of the diffracted ray having the maximum diffracted light amount in the diffracted ray of the third light flux generated when the third light flux of the wavelength λ3 from the third light source is incident on the diffractive structure of the second diffractive optical element is n3, the diffractive structure of the second diffractive optical element is optimized by the wavelength λB3 almost equal to the wavelength λ3, and the diffraction order n3; and when the predetermined image side numerical aperture of the objective lens necessary for conducting the reproducing and/or recording onto the first optical information recording medium by the light flux of the wavelength λ1, is NA1, the predetermined image side numerical aperture of the objective lens necessary for conducting the reproducing and/or recording onto the second optical information recording medium by the light flux of the wavelength λ2, is NA2, and the predetermined image side numerical aperture of the objective lens necessary for conducting the reproducing and/or recording onto the third optical information recording medium by the light flux of the wavelength λ3, is NA3, the objective lens can converge the first light flux onto the information recording surface of the first optical information recording medium for conducting the reproducing and/or recording of the information onto the first optical information recording medium, in the numerical aperture NA1, so that a fine wave front is formed; the n2-order diffracted ray of the second light flux onto the information recording surface of the second optical information recording medium for conducting the reproducing and/or recording of the information onto the second optical information recording medium, in the numerical aperture NA2, so that a fine wave front is formed; and the n3-order diffracted ray of the third light flux onto the information recording surface of the third optical information recording medium for conducting the reproducing and/or recording of the information onto the third optical information recording medium, in the numerical aperture NA3, so that a fine wave front is formed.

According to this optical pick-up apparatus, when the first substrate thickness correcting means is arranged in the optical path through which only the light flux from the second light source passes, and the second substrate thickness difference correcting means is arranged in the optical path through which only the light flux from the third light source passes, the optimum substrate thickness correcting means can be realized, thereby the spherical aberration due to the difference of the protective substrate thickness which is a problem when the recording or reproducing of the information is conducted onto the 3 kinds of different optical information recording media, can be appropriately corrected.

It is preferable that, when the magnification of the objective lens when the reproducing and/or recording of the information is conducted onto the first information recording medium, is m1, the objective lens is a refractive type lens which is optimized so that the aberration becomes minimum, in the combination of the wavelength $\lambda 1$, the first protective substrate thickness t1, the image side numerical aperture NA1, and the magnification m1.

Further, it is preferable that the image side numerical apertures NA1 to NA3 satisfy $$NA1>NA2>NA3,$$

and the optical pick-up apparatus has the aperture regulating means for NA1, NA2 and NA3, which is arranged in the common optical path through which all of each light flux from the first light source to the third light source pass. It is preferable that the aperture regulating means is integrated with the objective lens and is tracking-driven.

Further, it is preferable that the aperture regulating means shuts off the light flux of the wavelength $\lambda 2$ incident on the region of the aperture regulating means corresponding to a region from the image side numerical aperture NA2 to NA1 of the objective lens, and it can conduct so that the light flux of the wavelength $\lambda 2$ incident on the region of the aperture regulating means corresponding to a region from the image side numerical aperture NA2 to NA1 of the objective lens, does not reach on the information recording surface of the second optical information recording medium.

Further, it is preferable that the aperture regulating means has the wavelength selectivity which transmits the light flux of the wavelength $\lambda 1$ incident on the region of the aperture regulating means corresponding to a region from the image side numerical aperture NA2 to NA1 of the objective lens, and which shuts off the light flux of the wavelength $\lambda 2$ incident on the region of the aperture regulating means corresponding to a region from the image side numerical aperture NA2 to NA1 of the objective lens.

Further, it is preferable that the aperture regulating means can conduct so that it shuts off the light flux of the wavelength $\lambda 3$ incident on the region of the aperture regulating means corresponding to a region from the image side numerical aperture NA3 to NA1 of the objective lens, and the light flux of the wavelength $\lambda 3$ incident on the region of the aperture regulating means corresponding to a region from the image side numerical aperture NA3 to NA1 of the objective lens, does not reach on the information recording surface of the third optical information recording medium.

Further, it is preferable that the aperture regulating means has the wavelength selectivity which transmits the light flux of the wavelength $\lambda 1$ incident on the region of the aperture regulating means corresponding to a region from the image side numerical aperture NA3 to NA1 of the objective lens, and which shuts off the light flux of the wavelength $\lambda 3$ incident on the region of the aperture regulating means corresponding to a region from the image side numerical aperture NA3 to NA1 of the objective lens.

Further, the aperture regulating means can be structured in the wavelength selecting filter formed on the optical surface of the objective lens.

In the above each optical pick-up apparatus, it is preferable that the objective lens is structured by one lens group. Thereby, the working distance for particularly the third optical information recording medium in the optical pick-up apparatus, can be sufficiently secured. In this case, when the focal distance in the wavelength $\lambda 1$ of the objective lens is f1 (mm), central thickness is d (mm), the diameter of the light flux of the wavelength $\lambda 1$ incident on the objective lens is $\Phi 1$ (mm), and the working distance of the objective lens when the reproducing and/or recording of the information is conducted onto the third optical information recording medium, is fB3 (mm), it is more preferable that the following expressions are satisfied for sufficiently securing the working distance.

$$0.7<d/f1<1.5$$

$$2.8<\Phi 1<5.8$$

$$fB3>0.2$$

Further, when the magnification of the objective lens when reproducing and/or recording of the information is conducted onto the third optical information recording medium is m3, it is preferable to satisfy the following expression.

$$m3<0$$

In this case, it is preferable to satisfy the following expression.

$$-0.25<m3<-0.05$$

Further, when the magnification of the objective lens when reproducing and/or recording of the information is conducted onto the second optical information recording medium is m2, it is preferable to satisfy the following expression.

$$m2<0$$

In this case, it is preferable to satisfy the following expression.

$$-0.20<m2<-0.02$$

Further, in the above each optical pick-up apparatus, it is preferable that the objective lens is formed of plastic material, or formed of glass material.

Further, it is preferable to satisfy the following expressions.

$$380 \text{ nm}<\lambda 1<420 \text{ nm}$$

$$630 \text{ nm}<\lambda 2<670 \text{ nm}$$

$$760 \text{ nm}<\lambda 3<800 \text{ nm}$$

$$0.0 \text{ mm}\leqq t1<0.3 \text{ mm}$$

$$0.5 \text{ mm}<t2<0.7 \text{ mm}$$

$$1.0 \text{ mm}<t3<1.3 \text{ mm}$$

$$0.99>NA1\geqq 0.70$$

$$0.70>NA2\geqq 0.55$$

$$0.55>NA3\geqq 0.40$$

Further, it is preferable to have the substrate thickness difference correcting means for correcting the spherical aberration changed due to the minute error of the first protective substrate thickness, arranged in the optical path through which at least the light flux from the first light source whose NA1 is not smaller than 0.8, passes.

Further, it is preferable that the first optical information recording medium has the structure having a plurality of information recording layers on the same light flux incident surface side, and when the light flux from the first light source is converged onto the information recording surface of each information recording layer of the first optical information recording medium, the spherical aberration generated due to the difference of the protective substrate thickness from the light flux incident surface of the first optical information recording medium to respective information recording surfaces is corrected by the substrate thickness error correcting means arranged in the optical path through which the light flux at least from the first light source passes.

Further, it is preferable that, the substrate thickness error correcting means is provided with at least one shiftable optical element which can change the inclination angle of the marginal ray of the light flux from the first light source incident on the objective lens, when being shifted in the optical axis direction, and a drive means for shifting the shiftable optical element in the axial direction.

Further, it is preferable that the substrate thickness error correcting means has at least one refractive index distribution variable material layer, and is provided with, by applying the electric field or magnetic field, a refractive index distribution variable element which changes the refractive index distribution of the refractive index distribution variable material layer, and an applying means for applying the electric field or magnetic field.

Further, it is preferable to have the chromatic aberration correcting means for correcting the chromatic aberration generated due to the minute wavelength change from the first light source, arranged in the optical path through which the light flux of at least the first light source whose wavelength $\lambda 1$ is not longer than 550 nm, passes.

Further, the chromatic aberration correcting means is the diffractive optical element having at least one diffractive surface on which the diffractive structure formed of a plurality of concentric circular ring-shaped zones is formed, and when the light path difference added to the transparent wave surface by the diffractive structure of the diffractive surface is expressed by the light path difference function defined by $\Phi_{bi} = z_i \cdot (b_{2i} \cdot h_i^2 + b_{4i} \cdot h_i^4 + b_{6i} \cdot h_i^6 + \ldots)$ (herein, $z_i$ is the diffraction order of the diffracted ray having the maximum diffracted light amount in the diffracted ray of the light flux of the wavelength $\lambda 1$, generated when the light flux of wavelength $\lambda 1$ is incident on the diffractive structure of the i diffractive surface, $h_i$ is the height (mm) from the optical axis, and $b_{2i}$, $b_{4i}$, $b_{6i}$, ... are respectively the second order, fourth order, 6-th order, ..., light path difference function coefficient (called also diffractive surface coefficient)), it is preferable that the power (mm$^{-1}$) of only the diffractive structure defined by $PD = \Sigma (-2 \cdot n_i \cdot b_{2i})$ satisfies the following expression.

$$0.5 \times 10^{-2} < PD < 5.0 \times 10^{-2}$$

In this case, it is preferable that the chromatic aberration correcting means is integrally formed with the objective lens, and the diffractive structure of the chromatic aberration correcting means is formed on at least one optical surface including the optical surface of the light flux incident side of the objective lens.

Further, it is preferable that the chromatic aberration correcting means is structured by the positive lens group whose Abbe's number is relatively large and the negative lens group whose Abbe's number is relatively small, and when the Abbe's number vdP of the positive lens group and the Abbe's number vdN of the negative lens group satisfy the following expressions.

$$vdP > 55$$

$$vdN < 35$$

Further, it is preferable that, when the wavelength of the first light source is changed by +1 nm, the changed amount $\Delta fB_{OBJ+CA}$ of the paraxial focal position of the optical system in which the objective lens and the chromatic aberration correcting means are combined, satisfies the following expression.

$$|\Delta fB_{OBJ+CA} \cdot NA1^2| < 0.15 \text{ (μm)}$$

Further, it is preferable that at least 2 light sources of the first light source to the third light source are formed into a unit.

The recording reproducing apparatus according to the present invention can be structured so that above each optical pick-up apparatus is mounted, and the sound and/or image is recorded, and/or, the sound and/or image can be reproduced.

In order to attain the above object, an optical pick-up apparatus of the present invention is an optical pick-up apparatus in which the reproducing and/or recording of the information onto the first optical information recording medium having the first protective substrate thickness (t1) is conducted by using the light flux from the first light source of the wavelength $\lambda 1$, the reproducing and/or recording of the information onto the second optical information recording medium having the second protective substrate thickness (t2>t1) is conducted by using the light flux from the second light source of the wavelength $\lambda 2$ ($\lambda 1 < \lambda 2$), and the reproducing and/or recording of the information onto the third optical information recording medium having the third protective substrate thickness (t3>t2) is conducted by using the light flux from the third light source of the wavelength $\lambda 3$ ($\lambda 2 < \lambda 3$), the optical pick-up apparatus is characterized in that: for the reproducing and/or recording of the information onto the first optical information recording medium to the third optical information recording medium, the common objective lens composed of one lens group is used; and it has a substrate thickness difference correcting means for correcting the spherical aberration changed due to the difference of the first protective substrate thickness to the third protective substrate thickness.

According to this optical pick-up apparatus, the spherical aberration due to the difference of the protective substrate thickness which is a problem when the recording or reproducing of the information is conducted on 3 kinds of different optical information recording media, can be corrected, and because the common objective lens of single lens is used, the recording and/or reproducing of the information can be conducted by the same optical pick-up apparatus on 3 kinds of different optical information recording media. Further, because the objective lens is a single lens, particularly, the working distance when the recording and/or reproducing of the information is conducted on the third optical information recording medium, can be secured enough.

Referring to FIG. 34 to FIG. 41, an optical system of the optical pick-up apparatus of the present invention will be described below. In this connection, FIG. 34 to FIG. 41 are views conceptually showing each optical pick-up apparatus, and in FIG. 34 to FIG. 41, in order to conceptually show the position of each element constituting the optical system of the optical pick-up apparatus, each element is shown being separated, however, actually, there is a case where the same element has functions of two or more elements.

In the optical system of the optical pick-up apparatus of the present invention, as in the FIG. 34 to FIG. 37, the substrate thickness difference correcting means is arranged on the common optical path through which each light flux from the first light source to third light source passes.

That is, the optical pick-up apparatus in FIG. 34 has: a substrate thickness difference correcting means 7 for correcting the spherical aberration due to the difference between at least 2 protective substrate thickness in the first to third protective substrate thickness; the substrate thickness error correcting means 6 for correcting the spherical aberration due to the thickness error of the first protective substrate thickness which at least the first optical information recording medium has; and the chromatic aberration correcting means 5 for correcting the chromatic aberration due to a minute wavelength change of at least the first light source, and each light flux from the first light source 1, second light source 2 and third light source 3 is incident on the optical information recording medium 10 through a common optical system, and the reproducing and/or recording of the information onto the first optical information recording medium to the third optical information recording medium is conducted by using the common objective lens 8. The diverging light flux from each light source is made a parallel light flux by a collimator 4.

Further, in the optical pick-up apparatus in FIG. 35, on a common optical a path through which each light flux from the first light source 1 to third light source 3 passes, the substrate thickness difference correcting means 7 and the substrate thickness error correcting means 6 are arranged, and on the light path through which only the light flux from the first light source 1 passes, the chromatic correcting means 5 for correcting the chromatic aberration due to minute wavelength change of the first light source 1 is arranged, and the reproducing and/or recording of the information onto the first optical information recording medium to third optical information recording medium is conducted by using the common objective lens 8. The light flux from the first light source 1, and the light flux from the second light source 2 and the third light source 3 which is made parallel by the collimator 9a pass through the common optical path by the optical path composite means 9, and it is the same also in the following views.

Further, in the pick-up apparatus of FIG. 36, the chromatic aberration correcting means 5 and the substrate thickness difference correcting means 7 are arranged on the common optical path through which each light flux from the first light source 1 to the third light source 3 passes, and on the optical path through which only the light flux from the first light source 1 passes, the substrate thickness error correcting means 6 for correcting the spherical aberration due to the thickness error of the first protective substrate thickness is arranged, and the reproducing and/or recording of the information onto the first optical information recording medium to the third optical information recording medium is conducted by using the common objective lens 8.

Further, in the optical pick-up apparatus of FIG. 37, the substrate thickness difference correcting means 7 is arranged on the common optical path through which each light flux from the first light source 1 to the third light source 3 passes, and the chromatic aberration correcting means 5 for correcting the chromatic aberration due to the minute wavelength change of the first light source, and the substrate thickness error correcting means 6 for correcting the spherical aberration due to the thickness error of the first protective substrate thickness are arranged on the optical path through which only the light flux from the first light source 1 passes, and the reproducing and/or recording of the information onto the first optical information recording medium to the third optical information recording medium is conducted by using the common objective lens.

Further, in the optical system of the optical pick-up apparatus according to the present invention, as shown in FIG. 38 to FIG. 40, the substrate thickness difference correcting means is arranged on the optical path through which both of each light flux from the second light source and the third light source pass, and the light flux from the first light source does not pass.

That is, in the optical pick-up apparatus in FIG. 38, the chromatic aberration correcting means 5 is arranged on the common optical path through which each light flux from the first light source 1 to the third light source 3 passes, and the substrate thickness difference correcting means 7 for correcting the spherical aberration due to the difference of at least 2 protective substrate thickness in the first protective substrate thickness to the third protective substrate thickness is arranged on the optical path through which only each light flux from the second light source and the third light source passes, and the substrate thickness error correcting means 6 for correcting the spherical aberration due to the thickness error of the first protective substrate thickness is arranged on the optical path through which only the light flux from the first light source passes, and the reproducing and/or recording of the information onto the first optical information recording medium to the third optical information recording medium is conducted by using the common objective lens 8.

Further, in the optical pick-up apparatus in FIG. 39, the substrate thickness error correcting means 6 is arranged on the common optical path through which each light flux from the first light source 1 to the third light source 3 passes, and the substrate thickness difference correcting means 7 for correcting the spherical aberration due to the difference of at least 2 protective substrate thickness in the first protective substrate thickness to the third protective substrate thickness is arranged on the common optical path through which only each light flux from the second light source 2 and the third light source 3 passes, and the chromatic aberration correcting means 5 for correcting the chromatic aberration due to the minute wavelength change of the first light source is arranged on the optical path through which the only the light flux from the first light source 1 passes, and the reproducing and/or recording of the information onto the first optical information recording medium to the third optical information recording medium is conducted by using the common objective lens 8.

Further, in the optical pick-up apparatus in FIG. 40, the substrate thickness difference correcting means 7 for correcting the spherical aberration due to the difference of at least 2 protective substrate thickness in the first protective substrate thickness to the third protective substrate thickness is arranged on the common optical path through which only each light flux from the second light source 2 and the third light source 3 passes, and the chromatic aberration correcting means 5 for correcting the chromatic aberration due to the minute wavelength change of the first light source, and the substrate thickness error correcting means 6 for correcting the spherical aberration due to the thickness error of the first protective substrate thickness are arranged on the optical path through which the only the light flux from the first light source 1 passes, and the reproducing and/or recording of the information onto the first optical information recording medium to the third optical information recording medium is conducted by using the common objective lens 8.

Further, in the optical system of the optical pick-up apparatus according to the present invention, as shown in FIG. 41, the substrate thickness difference correcting means 7a for correcting the spherical aberration due to the difference between the first protective substrate thickness and the second protective substrate thickness is arranged on the optical path through which only the light flux from the second light passes, and further, the substrate thickness difference correcting means 7b for correcting the spherical aberration due to the difference between the first protective substrate thickness and the third protective substrate thickness is arranged on the optical path through which only the light flux from the third light source passes.

That is, in the optical pick-up apparatus in FIG. 41, the chromatic aberration correcting means 5 and the substrate thickness error correcting means 6 are arranged on the optical path through which the only the light flux from the first light source passes, and the substrate thickness difference correcting means 7a for correcting the spherical aberration due to the difference between the first protective substrate thickness and the second protective substrate thickness is arranged on the optical path through which only the light flux from the second light passes, and the substrate thickness difference correcting means 7b for correcting the spherical aberration due to the difference between the first protective substrate thickness and the third protective substrate thickness is arranged on the optical path through which only the light flux from the third light source passes. The optical path of the light flux from the first light source which is made parallel light flux by a collimator 4, and the optical path of the light flux from the second light source which is made parallel light flux by a collimator 9a are combined by an optical path composite means 9c, and further, the optical path of the light flux from the third light source which is made parallel light flux by the collimator 9b, is combined with the optical path of the light flux from the first light source and the second light source by the optical path composite means 9. The recording and/or reproducing of the information onto the first optical information recording medium to the third optical information recording medium is conducted by using the common objective lens 8.

In this connection, in the optical pick-up apparatus in FIG. 34 to FIG. 41, the structure in which the divergent light flux from each light source is converted into the parallel light flux by using the collimator 4, collimator 9a or collimator 9b is applied, however, there is also a case where such the collimator is not included in the optical system of the optical pick-up apparatus according to the present invention. Further, in the optical pick-up apparatus in FIG. 34 to FIG. 40, for the simplification of the drawings, although the second light source and the third light source are expressed by the same code, in the actual optical pick-up apparatus, there is also a case where the second light source and the third light source are separate light sources.

In the above optical pick-up apparatus, when the predetermined image side numerical apertures of the objective lens necessary for conducting the reproducing and/or recording of the information onto the first optical information recording medium to the third optical information recording medium are respectively NA 1, NA 2, NA 3, it is preferable that the wavelength $\lambda 1$ of the first light source, wavelength $\lambda 2$ of the second light source, wavelength $\lambda 3$ of the third light source, the first protective substrate thickness t1, second protective substrate thickness t2, third protective substrate thickness t3, and the predetermined image side numerical apertures NA 1, NA 2, and NA 3 of the objective lens, satisfy the following relational expressions.

$350\ nm < \lambda 1 < 550\ nm$ $600\ nm < \lambda 2 < 700\ nm$ $700\ nm < \lambda 3 < 850\ nm$ $0.0\ mm \leq t < 0.3\ mm$ $0.5\ mm < t2 < 0.7\ mm$ $1.0\ mm < t3 < 1.3\ mm$ $0.99 > NA1 \geq 0.80$ $0.80 > NA2 \geq 0.55$ $0.55 > NA3 \geq 0.40$ Further, when the focal distance in the wavelength $\lambda 1$ of the objective lens is f1 (mm), central thickness is d (mm), diameter of the light flux of the wavelength $\lambda 1$ incident on the objective lens is $\Phi 1$ (mm), and the working distance of the objective lens when the reproducing and/or recording of the information is conducted onto the third optical information recording medium is fB3 (mm), it is preferable to satisfy the following relational expressions.

$0.7 < d/f1 < 1.5$ $2.8 < \Phi 1 < 5.8$ $fB3 > 0.2$

Further, in the case where the reproducing and/or recording of the information is conducted onto the third optical information recording medium, when the magnification of the objective lens is m3, it is preferable to satisfy the following relational expression.

$-1 < m3 < 0$

Further, in the case where the reproducing and/or recording of the information is conducted onto the second optical information recording medium, when the magnification of the objective lens is m2, it is preferable to satisfy the following relational expression.

$-1 < m2 < 0$

As described above, in the 3 kinds of optical information recording media whose protective substrate thickness is different, in the case where the reproducing and/or recording of the information is conducted onto the second optical information recording medium and/or the third optical information recording medium whose protective substrate thickness is large, when the objective lens is the finite specification on which the divergent light flux is incident, the working distance can be sufficiently secured.

The objective lens is formed of the plastic material or glass material.

The substrate thickness difference correcting means 7 has at least one diffractive surface in which the diffractive structure formed of a plurality of concentric circular ring-shaped zones is formed, and it is preferable that the diffraction structure has the spherical aberration characteristic in which the spherical aberration is changed in the under correction direction, when the wavelength of the incident light flux is changed in the longitudinal direction.

Further, the diffractive structure is formed on at least one optical surface of the objective lens.

Further, it is preferable that, the substrate thickness difference correcting means 7 is provided with at least one shiftable optical element which can change the inclination angle of the marginal ray incident on the objective lens, when being shifted in the optical axis direction, and a drive means for shifting the shiftable optical element in the axial direction.

Further, it is preferable that the substrate thickness difference correcting means 7 has at least one refractive index distribution variable material layer, and is provided with, by applying the electric field or magnetic field, a refractive index distribution variable element which changes the refractive index distribution of the refractive index distribution variable material layer, and an applying means for applying the electric field or magnetic field.

Further, in the case where the magnification of the objective lens when the reproducing and/or recording is conducted onto the first optical information recording medium is m1, the magnification of the objective lens when the reproducing and/or recording is conducted onto the second optical information recording medium is m2, and the magnification of the objective lens when the reproducing and/or recording is conducted onto the first optical information recording medium is m3, when the values of at least 2 magnification in m1, m2 and m3 are different, it is preferable that the spherical aberration due to the difference of the first protective substrate to the third protective substrate is corrected.

In the optical pick-up apparatus, it is preferable that the predetermined image side numerical aperture NA of the objective lens necessary for conducting the reproducing and/or recording onto the first optical information recording medium is not smaller than 0.8, and in the first protective substrate thickness to the third protective substrate thickness, it is preferable that it has the substrate thickness error correcting means 6 for correcting the spherical aberration which changes due to the error of at least one protective substrate thickness including the first protective substrate thickness, on the optical path through which at least the light flux from the first light source passes. Thereby, particularly, the stable recording and/or reproducing can be conducted onto the first optical information recording medium for high density recording.

Further, it is preferable that the first optical information recording medium has the structure which has a plurality of information recording layers on the same light flux incident surface side, and when the light flux from the first light source is converged onto the information recording surface of respective information recording layers of the first optical information recording medium, the spherical aberration which changes due to the difference of the protective substrate thickness from the light flux incident surface to respective information recording surfaces is corrected by the substrate thickness error correcting means 6.

Further, it is preferable that the substrate thickness error correcting means 6 is arranged on the common optical path through which all of each light flux from the first light source to the third light source pass.

Further, it is preferable that the substrate thickness error correcting means 6 is arranged on the optical path through which both of each flux from the first light source and the second light source pass, and the light flux from the third light source does not pass.

Further, it is preferable that the substrate thickness error correcting means 6 is arranged on the optical path through which only the light flux from the first light source passes, and the light flux from the second light source and the third light source does not pass.

Further, it is preferable that the substrate thickness error correcting means 6 is provided with at least one shiftable optical element which can change the inclination angle of the marginal ray, and a drive means for shifting the shiftable optical element in the axial direction. Thereby, particularly, the spherical aberration due to the thickness error of the first protective substrate thickness which the first optical information recording medium has, can be corrected, and the change of the spherical aberration due to by the production error of the optical element constituting the optical system such as the objective lens, particularly, due to the change of the wavelength by the production error of the first light source, and the shape change of the optical element constituting the optical system such as the objective lens by the temperature change or humidity change, or the refractive index change, can be corrected. Therefore, for the first optical information recording medium for the high density recording, the stable recording and/or reproducing can be conducted.

Further, it is preferable that the substrate thickness error correcting means 6 is a coupling lens for changing the divergent angle of the diverging light flux at least from the first light source, and at least one of the optical elements constituting the coupling lens is the shiftable optical element. Alternatively, it is preferable that the substrate thickness error correcting means 6 is structured by at least one positive lens group and at least one negative lens group, and is a beam expander which can emit the incident light flux which is almost parallel light flux, as the almost parallel light flux, and/or a beam shrinker, and at least one lens group in the positive lens group and the negative lens group is the shiftable optical element.

Further, it is preferable that the substrate thickness error correcting means 6 has at least one refractive index distribution variable material layer, and a refractive index distribution variable element by which the refractive index distribution of the refractive index distribution variable material layer is changed when the electric field or magnetic field or heat is applied, and an application means for applying the electric field or magnetic field or heat, are provided. Thereby, particularly, the spherical aberration due to the thickness error of the first protective substrate thickness which the first optical information recording medium has, can be corrected, and the change of the spherical aberration due to the production error of the optical element constituting the optical system such as the objective lens, particularly, due to the change of the wavelength by the production error of the first light source, and the shape change of the optical element constituting the optical system such as the objective lens by the temperature change or humidity change, or the refractive index change, can be corrected. Therefore, particularly, for the first optical information recording medium for the high density recording, the stable recording and/or reproducing can be conducted.

Further, it is preferable that the substrate thickness error correcting means 6 is provided with a liquid crystal layer nipped between transparent electrodes which are opposite to each other, and the power source, and at least one transparent electrode in the transparent electrodes is divided into a plurality of the voltage application portions, and when the predetermined voltage is applied on at least one voltage application portion in the plurality of the voltage application portions by the power source, the refractive index distribution of the liquid crystal layer can be changed.

In the optical pick-up apparatus, it is preferable that the wavelength λ1 of the first light source is not longer than 550 nm, and it has the chromatic aberration correcting means 5 for correcting the chromatic aberration of the objective lens due to the minute wavelength change of at least one light source including the first light source in the first light source to the third light source, on the light path through which the light flux at least from the first light source passes. Therefore, particularly, for the first optical information recording medium for the high density recording, the stable recording and/or reproducing can be conducted.

It is preferable that the chromatic aberration correcting means 5 is arranged on the optical path through which all of each light flux from the first light source to the third light source pass.

It is preferable that the chromatic aberration correcting means 5 is arranged on the optical path through which both of the light flux from the first light source and the second light source pass, and the light flux from the third light source does not pass.

Further, it is preferable that the chromatic aberration correcting means 5 has the structure in which 2 optical elements having the diffractive surface in which the diffractive structure formed of a plurality of concentric ring-shaped zones is structured, are arranged being approached in such a manner that the diffractive surfaces are opposite to each other, and the materials of the two optical elements have a predetermined refractive index difference in the wavelength region in the vicinity of the wavelength $\lambda 1$, and the refractive index difference in the wavelength region in the vicinity of the wavelength $\lambda 2$ and in the wavelength region in the vicinity of the wavelength $\lambda 3$, of the materials of 2 optical elements is about zero. Thereby, because only the light in the vicinity of the wavelength of the first light source is diffracted by the refractive index difference between the optical elements, the chromatic aberration of the objective lens 8 due to the wavelength change of the first light source can be corrected.

Further, the chromatic aberration correcting means 5 has the diffractive structure formed of a plurality of concentric circular ring-shaped zones, and when, in the diffracted ray of the first light flux generated when the first light flux of wavelength $\lambda 1$ from the first light source is incident on the diffractive structure, the diffraction order of the diffracted ray having the maximum diffracted light amount is n1, and in the diffracted ray of the second light flux generated when the second light flux of wavelength $\lambda 2$ from the second light source is incident on the diffractive structure, the diffraction order of the diffracted ray having the maximum diffracted light amount is n2, and in the diffracted ray of the third light flux generated when the third light flux of wavelength $\lambda 3$ from the third light source is incident on the diffractive structure, the diffraction order of the diffracted ray having the maximum diffracted light amount is n3, it is preferable that it satisfies $$|n1|>|n2|, \text{ and/or}$$

$$|n1|>|n2|\geq|n3|.$$

In this case, it is preferable that the diffractive structure is formed at least on one optical surface of the objective lens.

Further, it is preferable that the chromatic aberration correcting means is arranged on the light path through which only the light flux from the first light source passes, and the light flux from the second light source and the third light source does not pass.

Further, the chromatic aberration correcting means 5 has at least one diffractive surface on which the diffractive structure formed of a plurality of concentric circular ring-shaped zones is formed, and when the light pass difference added to the transparent wave front by the diffractive structure of the i diffractive surface is expressed by the light path difference function defined by $\Phi_{bi}=ni\cdot(b_{2i}\cdot hi^2+b_{4i}\cdot hi^4+b_{6i}\cdot hi^6+ \ldots)$ (herein, ni is the diffraction order of the diffracted ray having the maximum diffracted light amount in the diffracted ray of the light flux of the wavelength $\lambda 1$ generated when the light flux of wavelength $\lambda 1$ is incident on the diffractive structure of the i diffractive surface, hi is the height (mm) from the optical axis, and $b_{2i}$, $b_{4i}$, $b_{6i}$, . . . are respectively the second order, fourth order, 6-th order, . . . , light path difference function coefficient (called also diffractive surface coefficient)), it is preferable that the power (mm$^{-1}$) of only the diffractive structure defined by $PD=\Sigma(-2\cdot ni\cdot b_{2i})$ satisfies the following expression.

$$1.50\times10^{-2}<PD<15.0\times10^{-2}$$

More than the lower limit of the above expression, the axial chromatic aberration of the wave front light-converged onto the information recording surface of the optical information recording medium is not too under-correction, further, lower than the upper limit, the axial chromatic aberration of the wave front light-converged onto the information recording surface of the optical information recording medium is not too over-correction.

Further, the chromatic aberration correcting means 5 is structured by the positive lens group whose Abbe's number is relatively large and the negative lens group whose Abbe's number is relatively small, and when the Abbe's number vdP of the positive lens group and the Abbe's number vdN of the negative lens group satisfy the following expression, the chromatic aberration can be appropriately corrected.

$$vdP>55$$

$$vdN<35$$

Further, it is preferable that, when the wavelength of the first light source is changed by +1 nm, the changed amount $\Delta fB_{OBJ+CA}$ of the paraxial focal position of the optical system in which the objective lens and the chromatic aberration correcting means are combined, satisfies the following expression.

$$|\Delta fB_{OBJ+CA}\cdot NA1^2|<0.15 \text{ (}\mu m\text{)}$$

In this connection, in the present specification, a phrase " the spherical aberration is (finely) corrected by the substrate thickness error correcting means 6, and/or the substrate thickness difference correcting means 7" means that " within the predetermined each image side numerical aperture of the objective lens necessary in the case where the light flux passed the optical system structured by, at least, the substrate thickness error correcting means 6 and/or the substrate thickness difference correcting means 7 and the objective lens, conducts the reproducing and/or recording of the information onto each optical information recording medium, when $\lambda$ is the wavelength of the light source, the spherical is corrected so that the light is converged under the condition the wave front aberration is not larger than 0.07 $\lambda$rms (more preferably, not larger than 0.05 $\lambda$rms) on the information recording surface of each information recording medium.

In the above optical pick-up apparatus, when the predetermined image side numerical apertures of the objective lens necessary for conducting the reproducing and/or recording of the information onto the first optical information recording medium to the third optical information recording medium are respectively NA1, NA2 and NA3, it satisfies the NA1>NA2>NA3, and when an aperture regulating/changing means for the NA1, NA2 and NA3 is provided, the changing of the apertures and/or the regulating of the apertures can be conducted corresponding to the predetermined image side numerical apertures of respective objective lenses, when the recording and/or reproducing of the information is conducted onto the first optical information recording medium to the third optical information recording medium by the common objective lens.

Thereby, when the reproducing and/or recording of the information is conducted onto the first optical information recording medium to the third optical information recording medium, because the size of the light-converging spot on each information recording medium is not too small more than necessary, the coma generated in the disk cue cab be reduced, and a sufficient disk cue margin can be obtained. Further, because the unnecessary light not contributing to the light-converging which passes the region more than necessary numerical apertures, can be prevented from being detected by the light detector, the fine focusing characteristic or tracking characteristic can be obtained.

The aperture regulating/changing means has at least one diffractive surface on which the diffractive structure formed of a plurality of concentric circular ring-shaped zones is formed, and when the reproducing and/or recording of the information is conducted onto the second optical information recording medium, the light flux of the wavelength λ2 which passes the region of the aperture regulating/changing means corresponding to a region from the image side numerical aperture NA2 to NA1 of the objective lens is made a flare component, and/or when the reproducing and/or recording of the information is conducted onto the third optical information recording medium, the light flux of the wavelength λ3 which passes the region of the aperture regulating/changing means corresponding to a region from the image side numerical aperture NA3 to NA1 of the objective lens is made a flare component, thereby, when the reproducing and/or recording of the information is conducted onto the second optical information recording medium, even when the light flux of the wavelength λ2 from the second light source is made to pass in the opened condition to the diaphragm determined by NA1, because the light flux which passes the region of the aperture regulating means corresponding to a region from NA2 to NA1 does not contribute to the light-converging onto the information recording surface of the second optical information recording medium, it functions as the aperture regulating means. In the same manner also when the reproducing and/or recording of the information is conducted onto the third optical information recording medium, even when the light flux of the wavelength λ3 from the third light source is made to pass in the opened condition to the diaphragm determined by NA1, because the light flux which passes the region of the aperture regulating means corresponding to a region from NA3 to NA1 does not contribute to the light-converging onto the information recording surface of the third optical information recording medium, it functions as the aperture regulating means. As described above, because, by a simple structure, the aperture changing can be automatically conducted, it is not necessary that the special aperture changing means is provided, and it is advantageous in the cost.

Further, it is preferable that, in the optical system in which the aperture regulating/changing means and the objective lens are jointed, the wave front aberration in the combination of the image side numerical aperture NA1, the second protective substrate thickness t2, and the wavelength λ2 of the second light source, is not smaller than 0.07 λ2 rms, and/or the wave front aberration in the combination of the image side numerical aperture NA1, the third protective substrate thickness t3, and the wavelength λ3 of the third light source, is not smaller than 0.07 λ3 rms.

Further, the aperture regulating/changing means, when the reproducing and/or recording of the information is conducted onto the second optical information recording medium, transmits the light flux of the wavelength λ2 incident on the region of the aperture regulating/changing means corresponding to the image side numerical aperture NA2 of the objective lens, and shuts off the light flux of the wavelength λ2 incident on the region of the aperture regulating/changing means corresponding to the image side numerical aperture NA2 to NA1 of the objective lens, and/or when the reproducing and/or recording of the information is conducted onto the third optical information recording medium, it may also be structured so as to have the wavelength selectivity which transmits the light flux of the wavelength λ3 incident on the region of the aperture regulating/changing means corresponding to the image side numerical aperture NA3 of the objective lens, and shuts off the light flux of the wavelength λ3 incident on the region of the aperture regulating/changing means corresponding to the image side numerical aperture NA3 to NA1 of the objective lens, and when the reproducing and/or recording of the information is conducted onto the second optical information recording medium and the third optical information recording medium, because the light flux passes the region more than the necessary numerical apertures, is automatically shut off, it is not necessary that the special changing means is provided, and it is advantageous in the cost.

Further, it is preferable that the aperture regulating/changing means has the wavelength selectivity in which, when the reproducing and/or recording of the information is conducted onto the second optical information recording medium, the aperture regulating/changing means transmits not smaller than 80% of the intensity of the light flux of the wavelength λ2 incident on the region of the aperture regulating/changing means corresponding to within the image side numerical aperture NA2 of the objective lens, and reflects not smaller than 80% of the intensity of the light flux of the wavelength λ2 incident on the region of the aperture regulating/changing means corresponding to a region from the image side numerical aperture NA2 to NA1 of the objective lens, and/or when the reproducing and/or recording of the information is conducted onto the third optical information recording medium, the aperture regulating/changing means transmits not smaller than 80% of the intensity of the light flux of the wavelength λ3 incident on the region of the aperture regulating/changing means corresponding to within the image side numerical aperture NA3 of the objective lens, and reflects not smaller than 80% of the intensity of the light flux of the wavelength λ3 incident on the region of the aperture regulating/changing means corresponding to a region from the image side numerical aperture NA3 to NA1 of the objective lens.

Further, it is preferable that the aperture regulating/changing means is formed on at least one optical surface of the objective lens, and the aperture regulating/changing means can be easily structured.

Further, the aperture regulating/changing means has the liquid crystal layer nipped between the transparent electrodes which are opposite to each other, and ¼ wavelength plate, and at least one of the transparent electrodes is divided into a region corresponding to a region from the image side numerical aperture NA2 to NA1 of the objective lens, and a region corresponding to within the image side numerical aperture NA2 of the objective lens, and the voltage is applied onto the transparent electrode, and when the orientation condition of the liquid crystal molecule of the liquid crystal layer is changed to the ring-shaped zone-like, the polarizing surface of the light flux which transmits the region of the transparent electrode corresponding to a region from the image side numerical aperture NA2 to NA1 of the objective lens, and the polarizing surface of the light flux which transmits the region of the transparent electrode corresponding to within the image side numerical aperture NA2 of the objective lens, can be respectively independently rotated, and/or it may also be structured in such a manner that at least one of the transparent electrodes is divided into a region corresponding to a region from the image side numerical aperture NA3 to NA1 of the objective lens, and a region corresponding to within the image side numerical aperture NA3 of the objective lens, and the voltage is applied onto the transparent electrode, and when the orientation condition of the liquid crystal molecule of the liquid crystal layer is changed to the ring-shaped zone-like, the polarizing surface of the light flux which transmits the region of the transparent electrode corresponding to a region from the image side numerical aperture NA3 to NA1 of the objective lens, and the polarizing surface of the light flux which transmits the region of the transparent electrode corresponding to within the image side numerical aperture NA3 of the objective lens, can be respectively independently rotated.

Further, it is preferable that the aperture regulating/changing means has the diaphragms corresponding to the image side numerical aperture NA1 and NA2 of the objective lens, and when the reproducing and/or recording of the information is conducted onto the first optical information recording medium or the second optical information recording medium, it is structured such that respective diaphragms are mechanically switched, and/or it has the diaphragms corresponding to the image side numerical aperture NA1 and NA3 of the objective lens, when the reproducing and/or recording of the information is conducted onto the first optical information recording medium or the third optical information recording medium, it is structured such that respective diaphragms are mechanically switched.

Further, it is preferable that the aperture regulating/changing means is arranged on the common optical path through which all of each light flux from the first light source to the third light source pass, and in this case, the aperture regulating/changing means is integrated with the objective lens and it conducts the tracking. Thereby, a fine tracking characteristic can be obtained.

In the above optical pick-up apparatus, it is preferable that the objective lens is aberration-corrected so that the spherical aberration is minimum, in the combination of the image side numerical aperture NA1, the first protective substrate thickness t1 and the wavelength λ1 of the first light source, and when the reproducing and/or recording of the information is conducted onto the second optical information recording medium, the spherical aberration changed due to the difference of the thickness between the second protective substrate thickness and the first protective surface thickness is corrected by the substrate thickness difference correcting means, and when the reproducing and/or recording of the information is conducted onto the third optical information recording medium, the spherical aberration changed due to the difference of the thickness between the third protective substrate thickness and the first protective surface thickness is corrected by the substrate thickness difference correcting means. Thereby, the spherical aberration due to the difference of each protective substrate thickness to the first protective substrate thickness t1 when the reproducing and/or recording of the information is conducted onto the second or third optical information recording medium by the objective lens, can be appropriately corrected.

Further, it is preferable that at least 2 light sources of the first light source to the third light source are made into a unit, and by being integrated in this way, the number of parts can be reduced, and the optical pick-up apparatus can be compactly structured, and it can contributes to the cast reduction.

Further, it is preferable that at least 2 of the substrate thickness difference correcting means, substrate thickness error correcting means, chromatic aberration correcting means, and aperture regulation/changing means are integrated. When being integrated in this manner, the number of parts can be reduced, and the optical pick-up apparatus can be compactly structured, and it can contributes to the cast reduction.

Further, the objective lens, substrate thickness difference correcting means, chromatic aberration correcting means, substrate thickness difference correcting means, chromatic aberration correcting means, substrate thickness error correcting means, and aperture regulation/changing means according to the present invention are preferable for being applied to the optical system of the optical pick-up apparatus.

Further, it can be structured in such a manner that the recording·reproducing apparatus according to the present invention mounts any one of the optical pick-up apparatus, and can record the sound and/or image, and/or reproduce the sound and/or image. For example, the above each optical pick-up apparatus according to the present invention can be mounted in the compatible player or drive, or AV device in which these are assembled, personal computer, or recording apparatus and/or reproducing apparatus of the sound and/or image of the other information terminal equipment, for the next generation first information recording medium which has higher density, the second optical information recording medium such as DVD, DVD-ROM, DVD-RAM, DVD-R, DVD-RW, or DVD-RWD, and the third optical information recording medium such as CD, CD-R, CD-RW, CD-Video, or CD-ROM.

BRIEF DESCRIPTION OF THE PREFERRED EMBODIMENT

FIGS. 5(a) to 5(c) each is a spherical aberration diagram.

FIGS. 6(a) to 6(c) each is a spherical aberration diagram.

FIGS. 7(a) to 7(c) each is a spherical aberration diagram.

FIGS. 8(a) to 8(c) each is a spherical aberration diagram.

Figure 8:
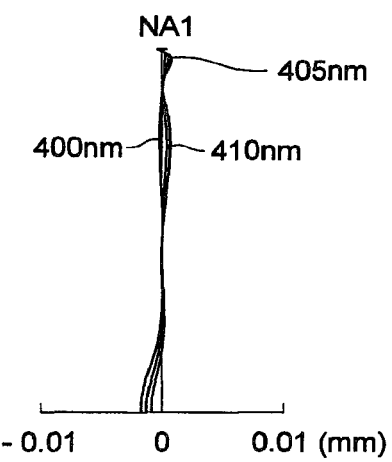
Figure 8:
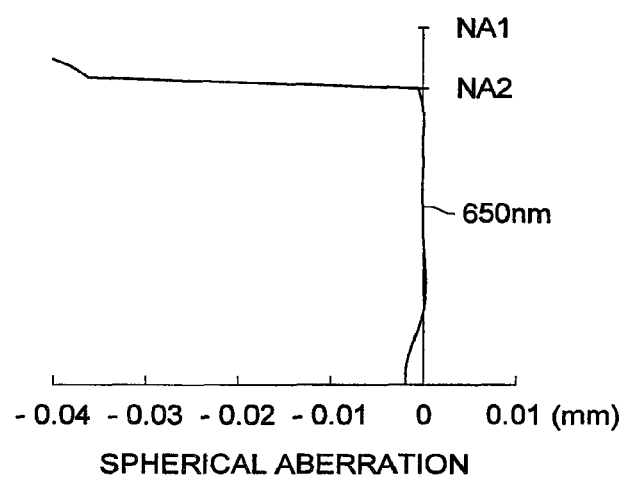
Figure 8:
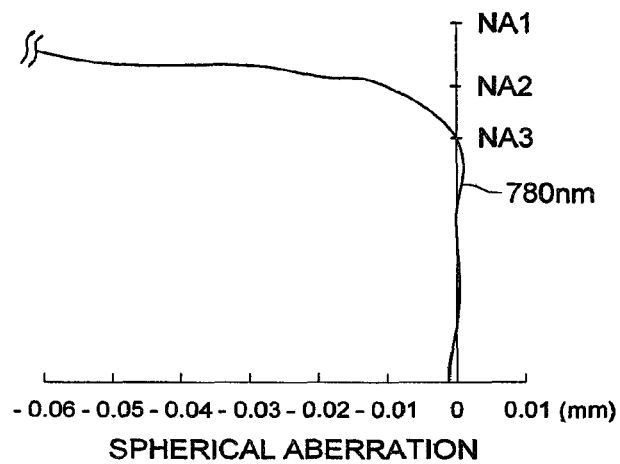
Figure 8:
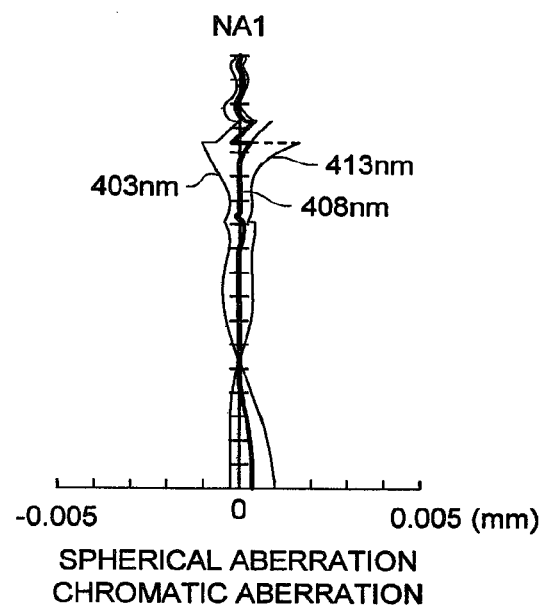
Figure 8:
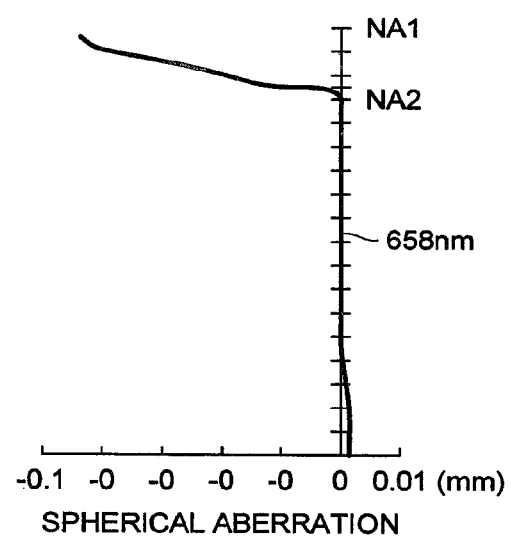
Figure 8:
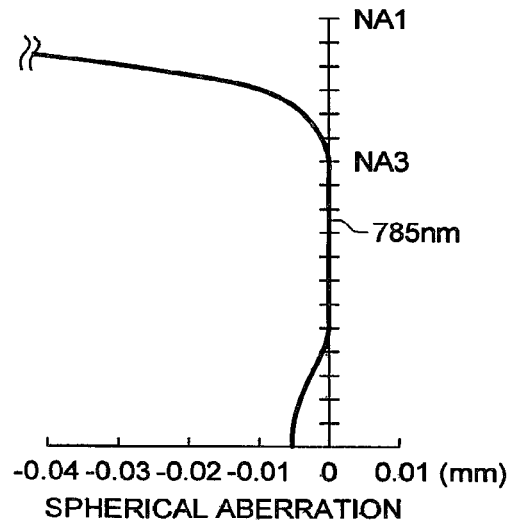

FIGS. 8'(a) to 8'(c) each is a spherical aberration diagram.

Figure 9:
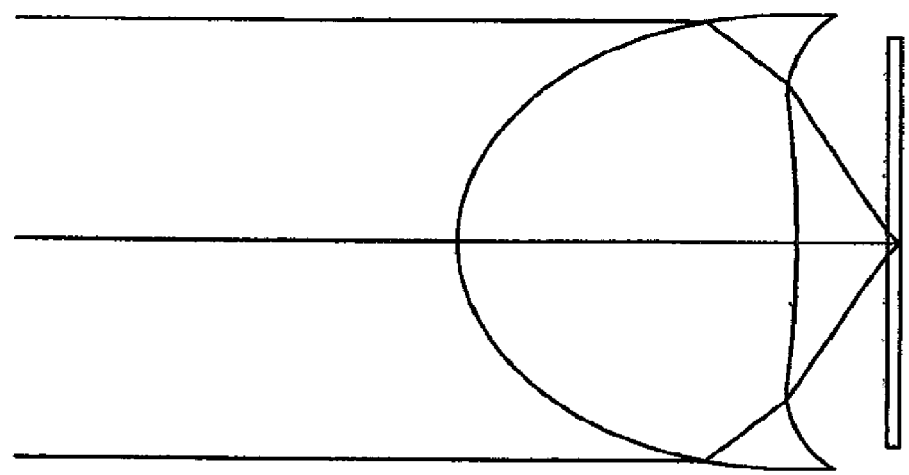

FIG. 9 is an optical path view at λ1=405 nm of the objective lens in Example 5.

Figure 10:
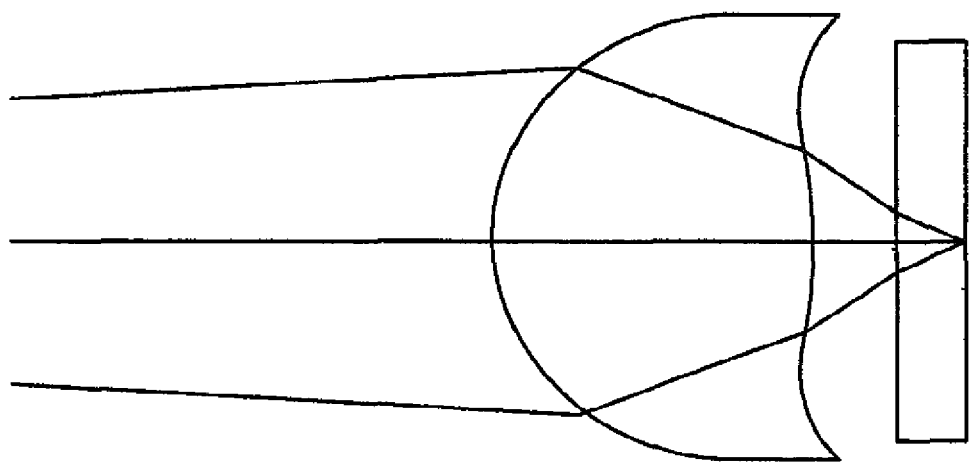

FIG. 10 is an optical path view at λ2=650 nm of the objective lens in Example 5.

Figure 11:
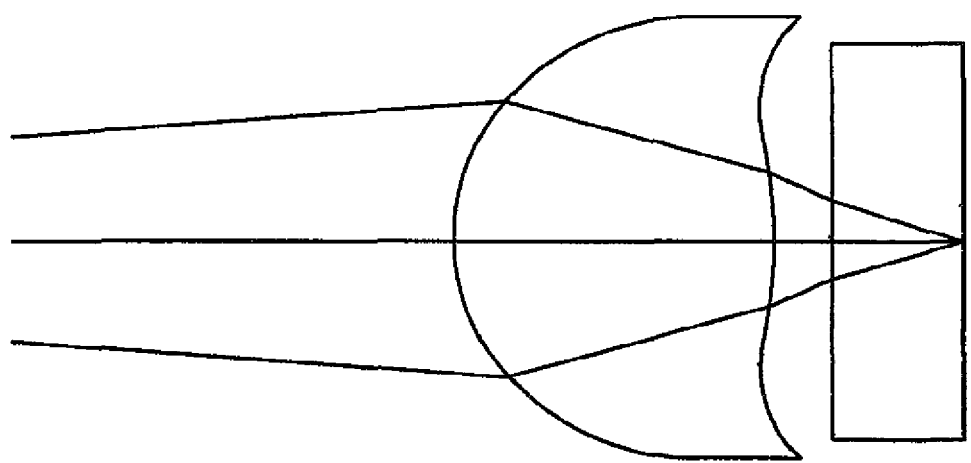

FIG. 11 is an optical path view at λ3=780 nm of the objective lens in Example 5.

Figure 12:
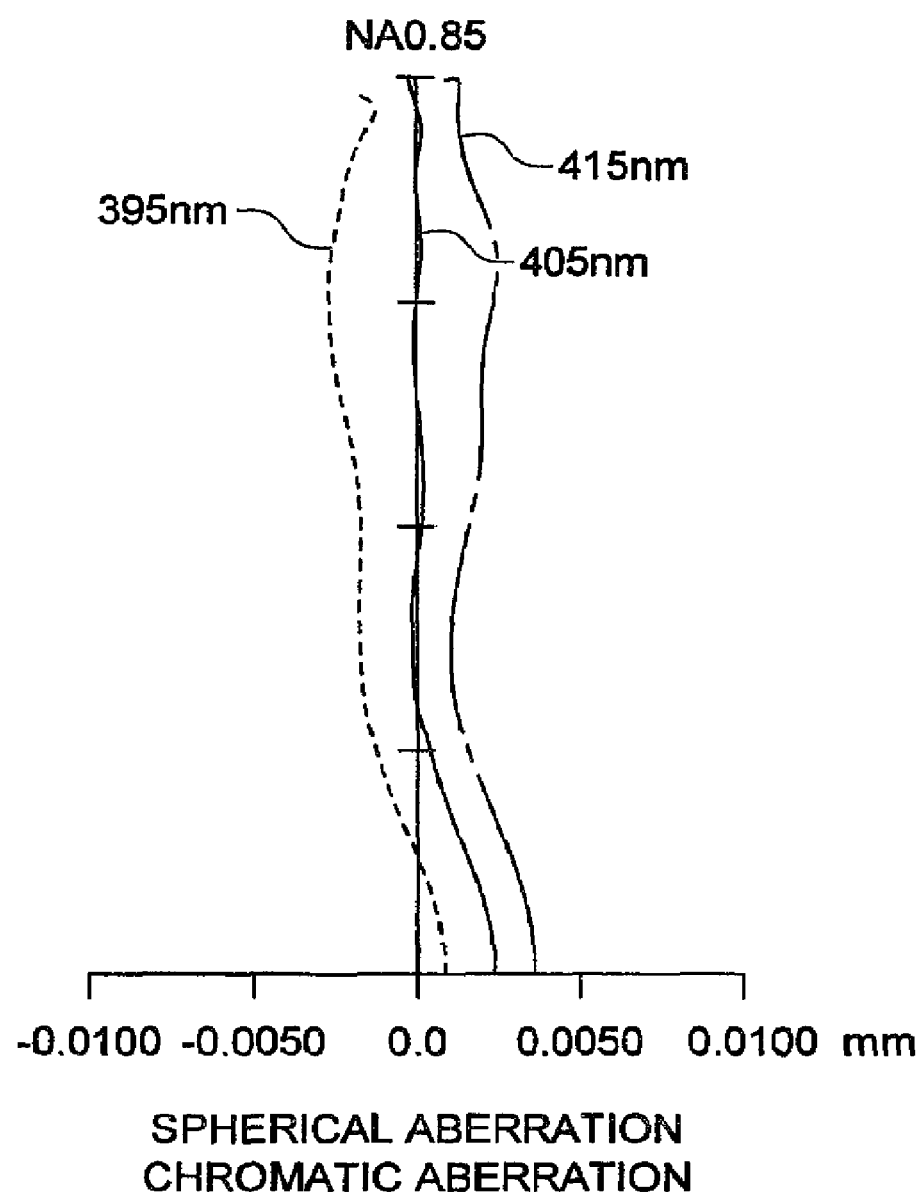

FIG. 12 is a spherical aberration view up to a numerical aperture 0.85 for λ1=405 nm of the objective lens in Example 5.

Figure 13:
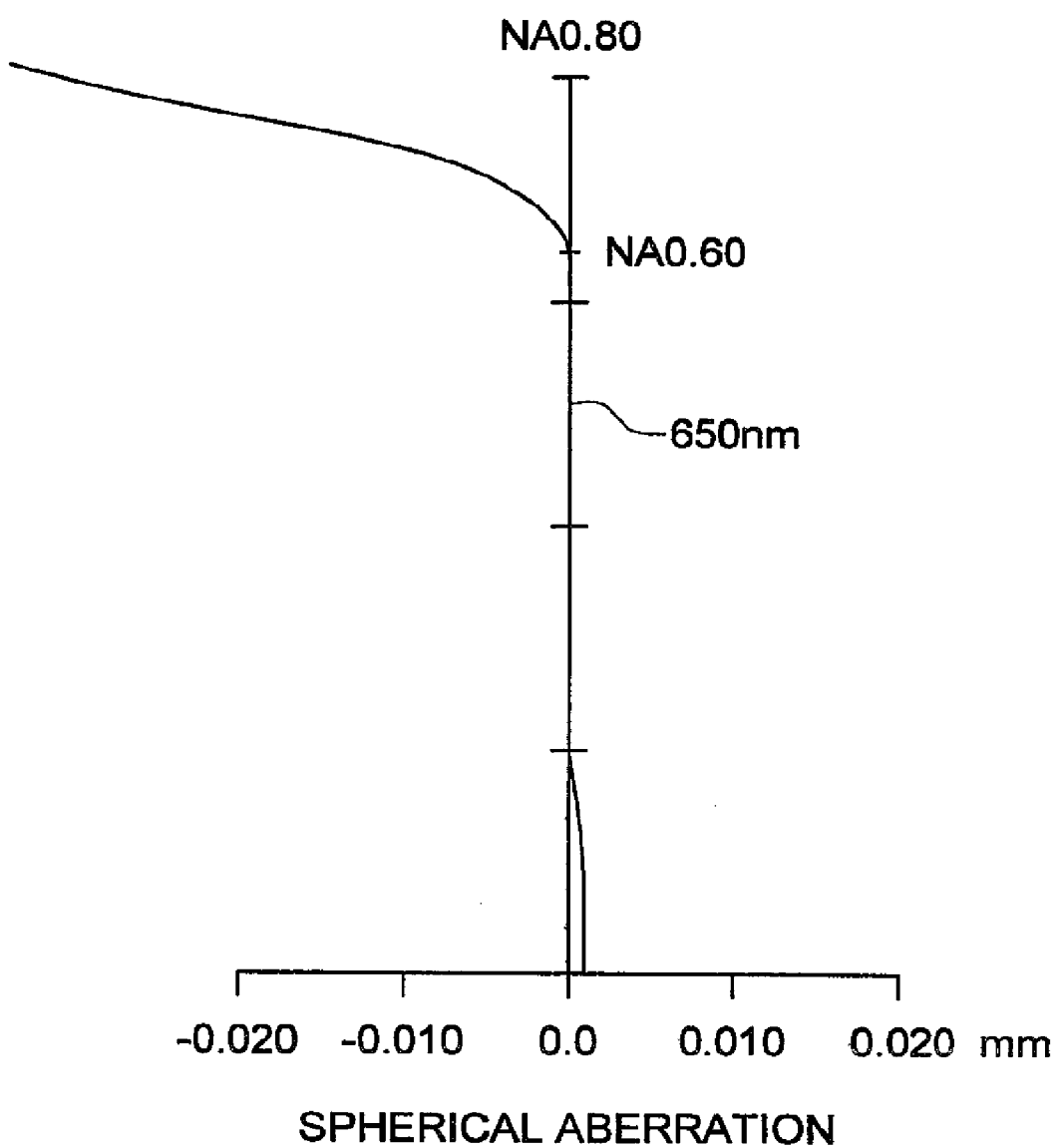

FIG. 13 is a spherical aberration view when the light of λ2=650 nm of the light flux diameter equal to the diaphragm diameter determined by a combination of λ1=405 nm and NA1 0.85 of the objective lens in Example 5 is incident on it.

Figure 14:
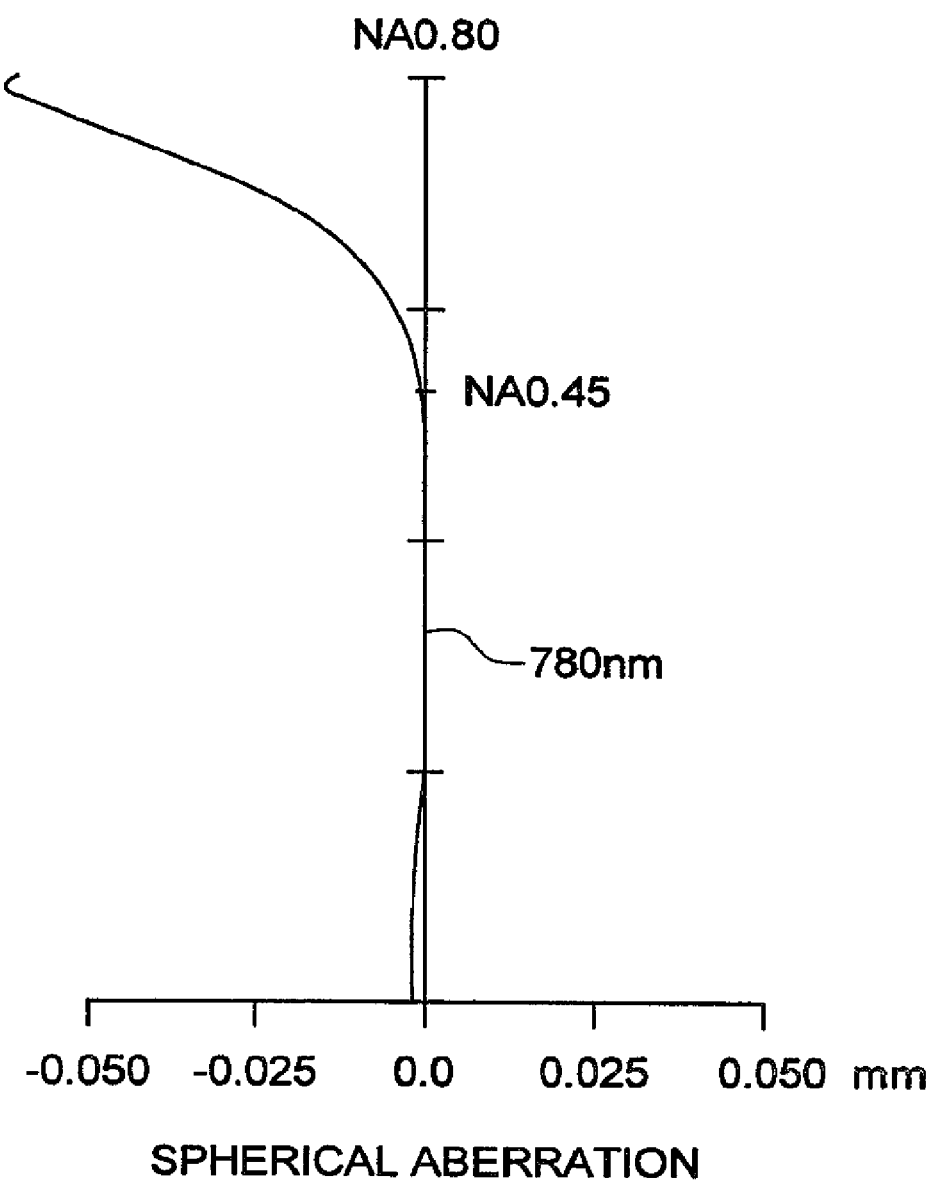

FIG. 14 is a spherical aberration view when the light of λ3=780 nm of the light flux diameter equal to the diaphragm diameter determined by a combination of λ1=405 nm and NA2 0.85 of the objective lens in Example 5 is incident on it.

Figure 15:
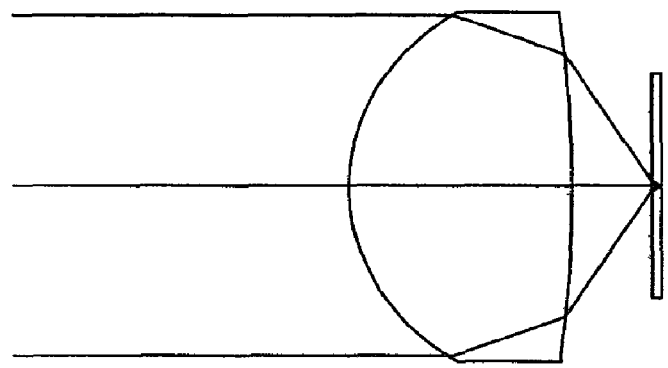

FIG. 15 is an optical path view at λ1=405 nm of the objective lens in Example 6.

Figure 16:
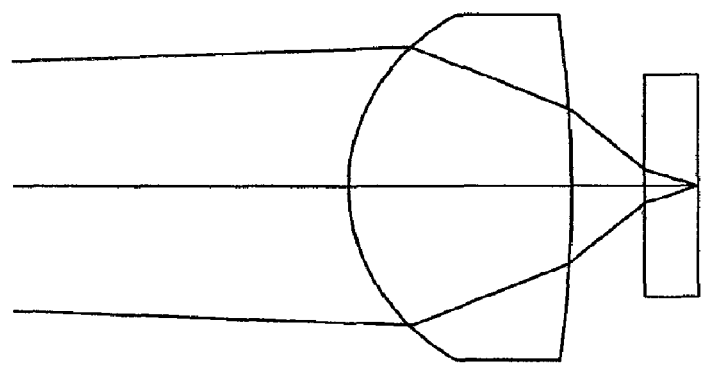

FIG. 16 is an optical path view at λ2=650 nm of the objective lens in Example 6.

Figure 17:
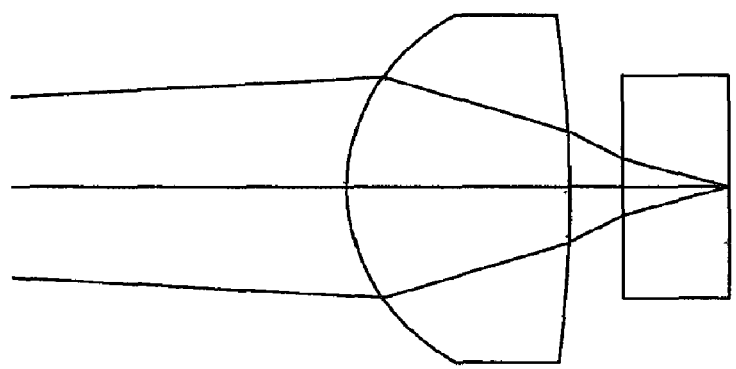

FIG. 17 is an optical path view at λ3=780 nm of the objective lens in Example 6.

Figure 18:
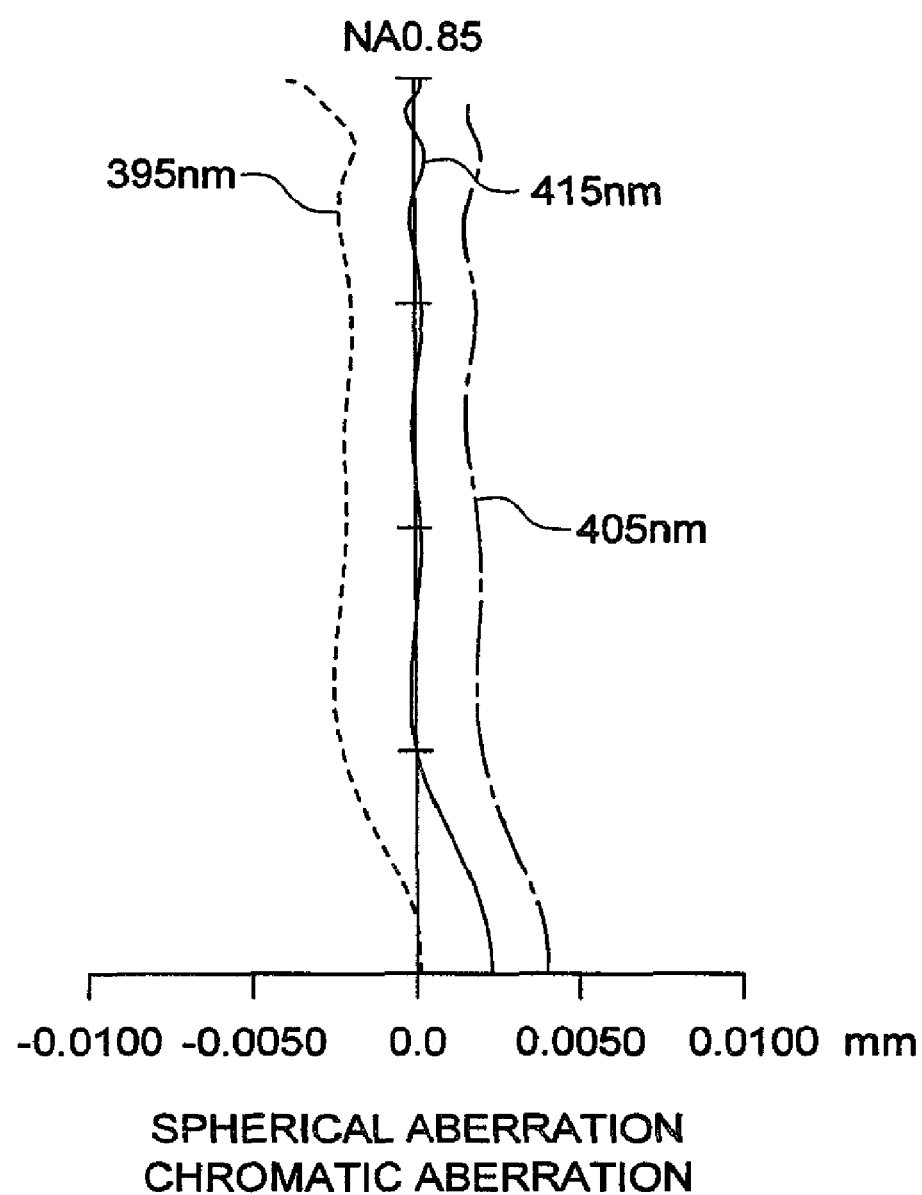

FIG. 18 is a spherical aberration view up to a numerical aperture 0.85 for λ1=405 nm of the objective lens in Example 6.

Figure 19:
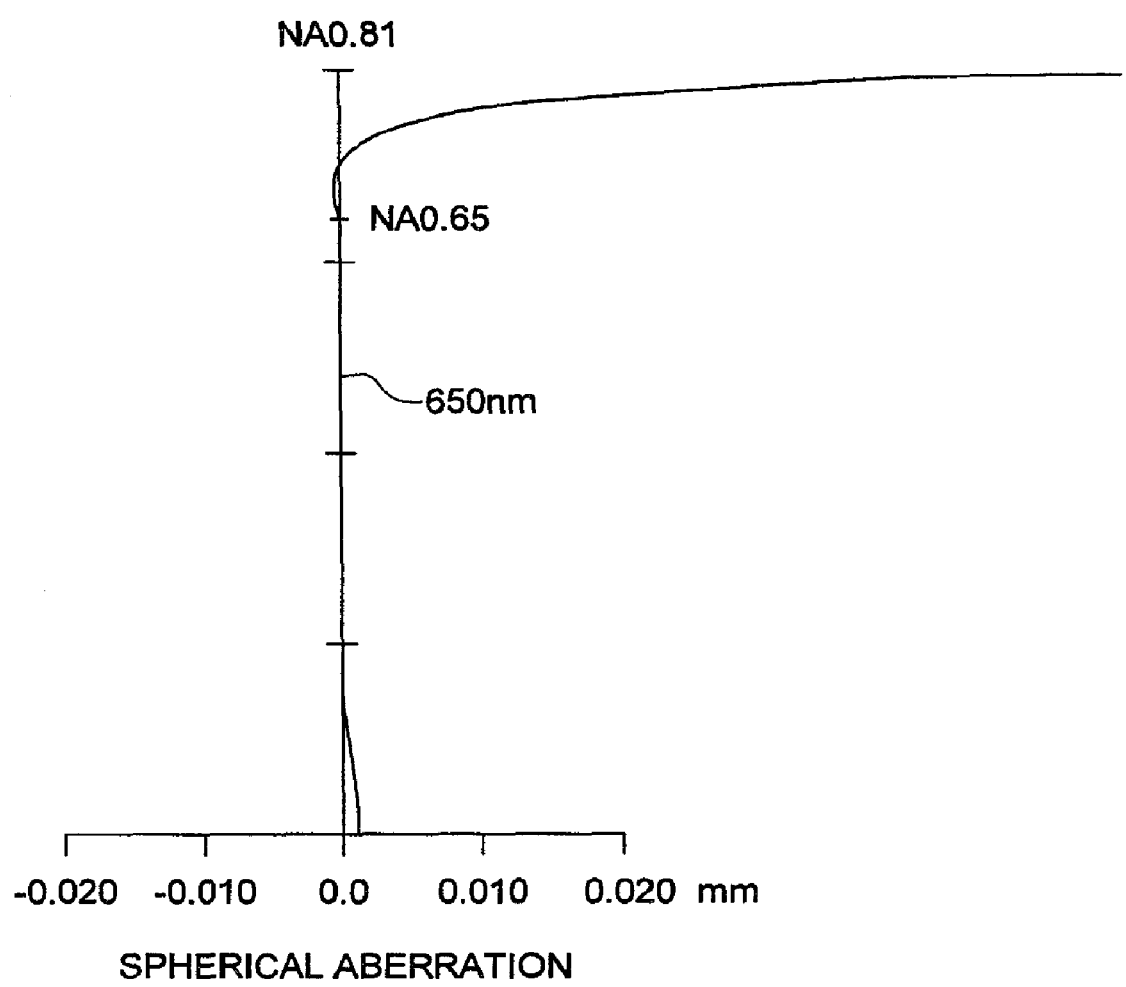

FIG. 19 is a spherical aberration view when the light of λ2=650 nm of the light flux diameter equal to the diaphragm diameter determined by a combination of λ1=405 nm and NA1 0.85 of the objective lens in Example 6 is incident on it.

Figure 20:
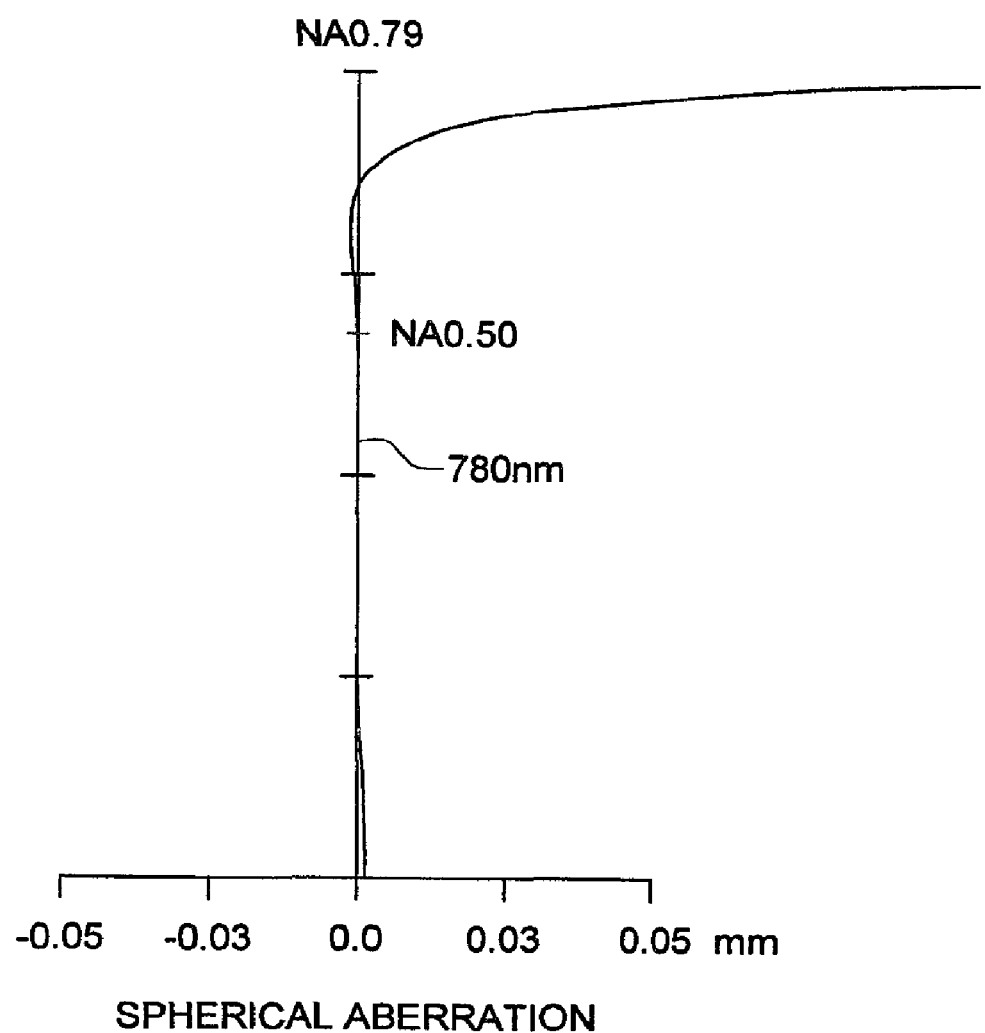

FIG. 20 is a spherical aberration view when the light of λ3=780 nm of the light flux diameter equal to the diaphragm diameter determined by a combination of λ1=405 nm and NA2 0.85 of the objective lens in Example 6 is incident on it.

Figure 21:
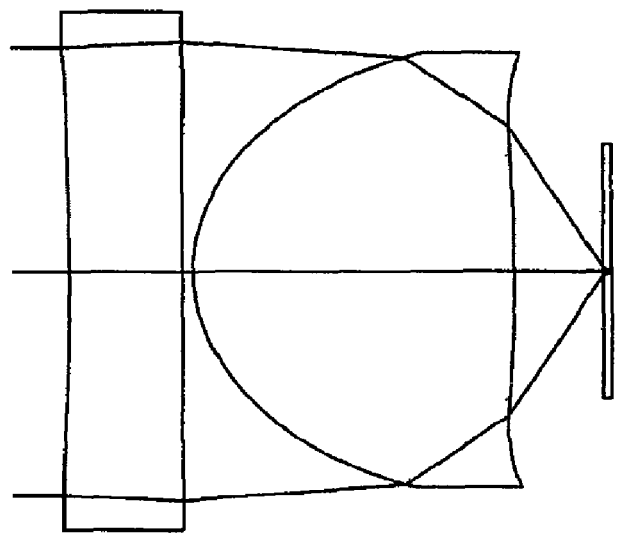

FIG. 21 is an optical path view at λ1=405 nm of the objective lens in Example 7.

Figure 22:
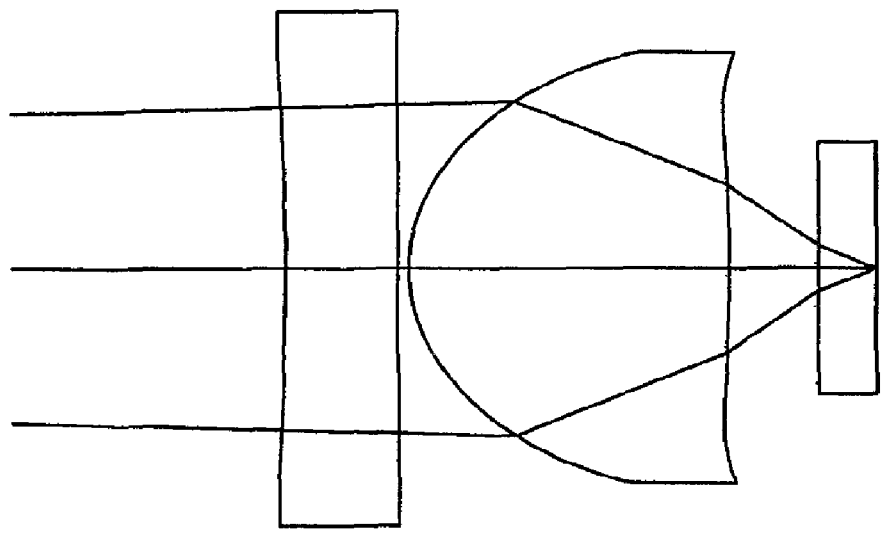

FIG. 22 is an optical path view at λ2=650 nm of the objective lens in Example 7.

Figure 23:
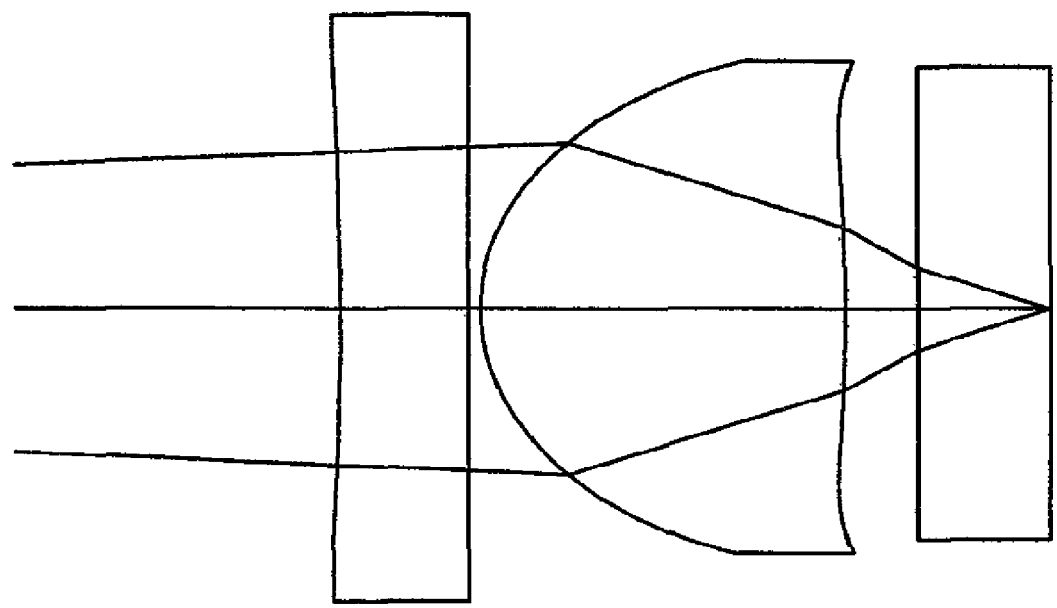

FIG. 23 is an optical path view at λ3=780 nm of the objective lens in Example 7.

Figure 24:
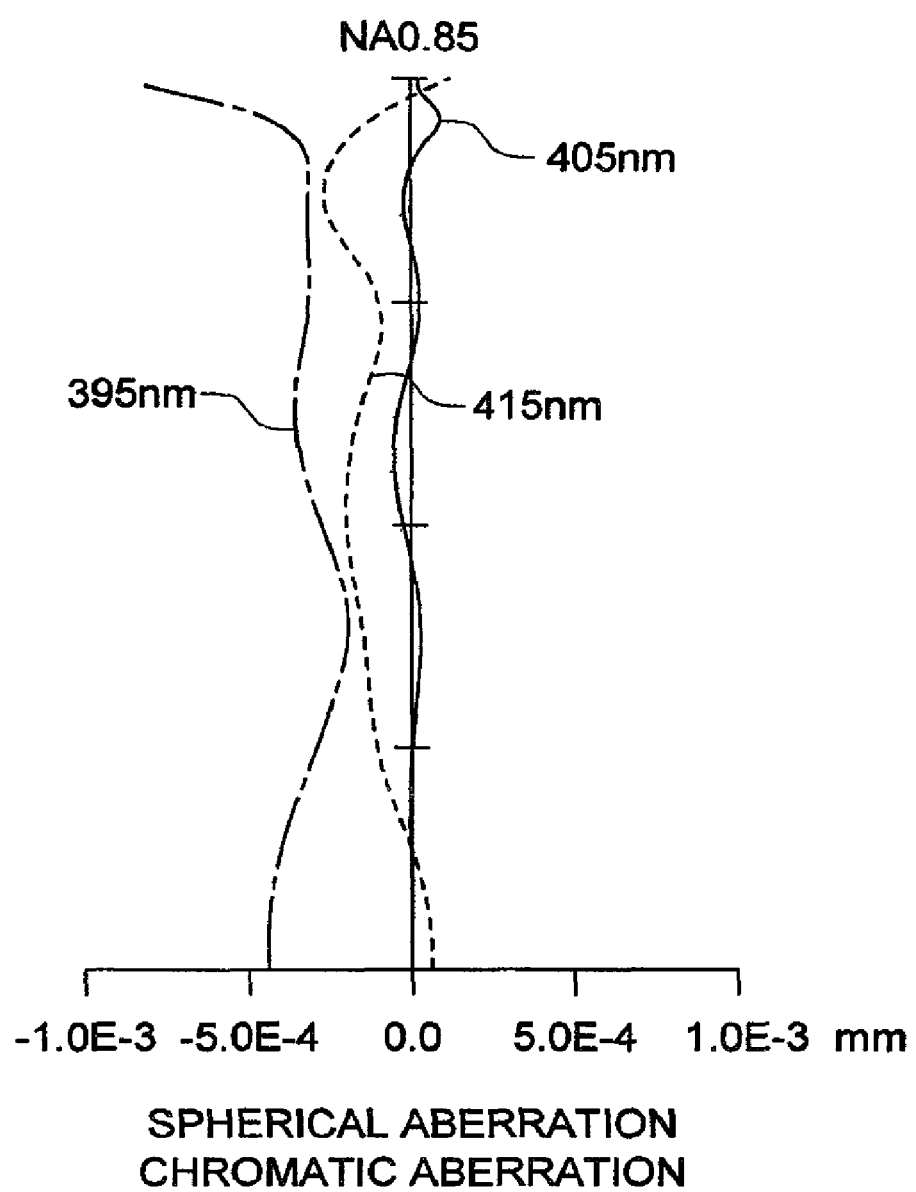

FIG. 24 is a spherical aberration view up to a numerical aperture 0.85 for λ1=405 nm of the objective lens in Example 7.

Figure 25:
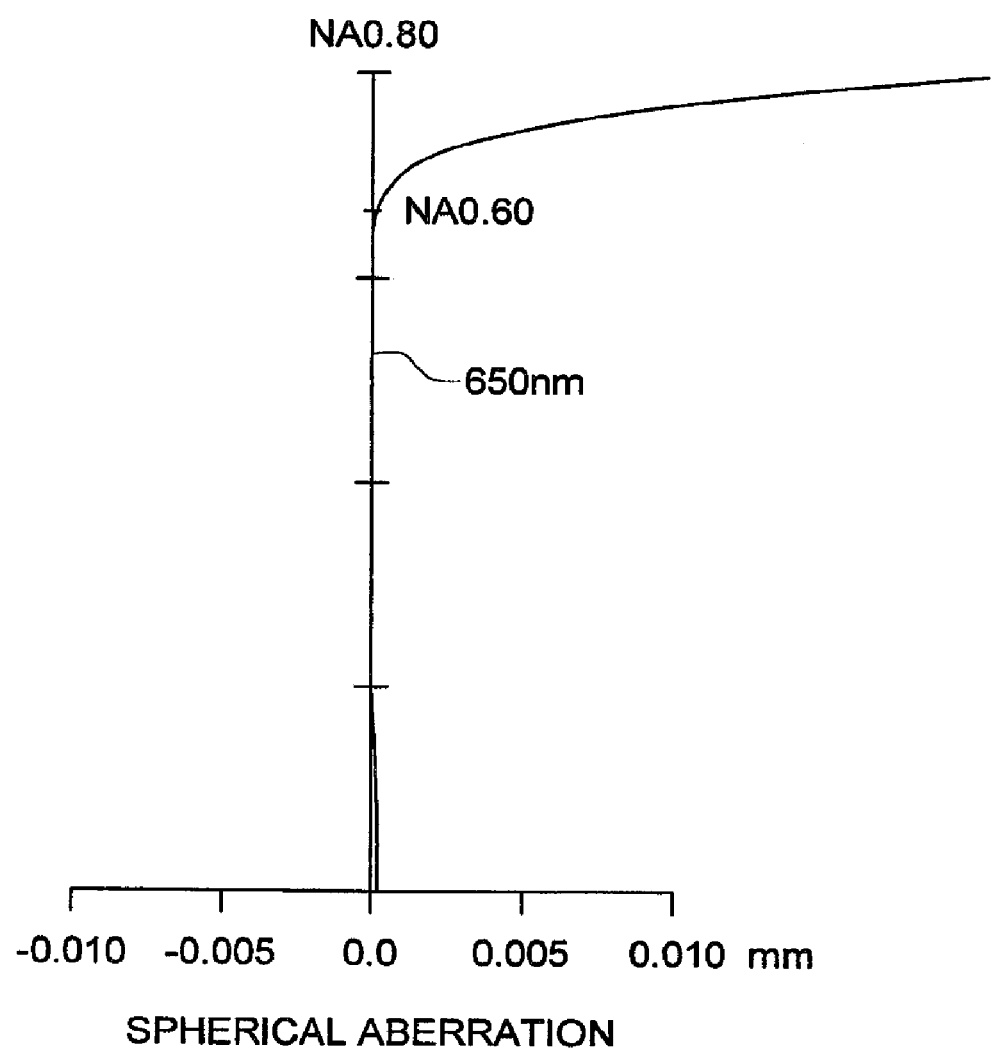

FIG. 25 is a spherical aberration view when the light of λ2=650 nm of the light flux diameter equal to the diaphragm diameter determined by a combination of λ1=405 nm and NA1 0.85 of the objective lens in Example 7 is incident on it.

Figure 26:
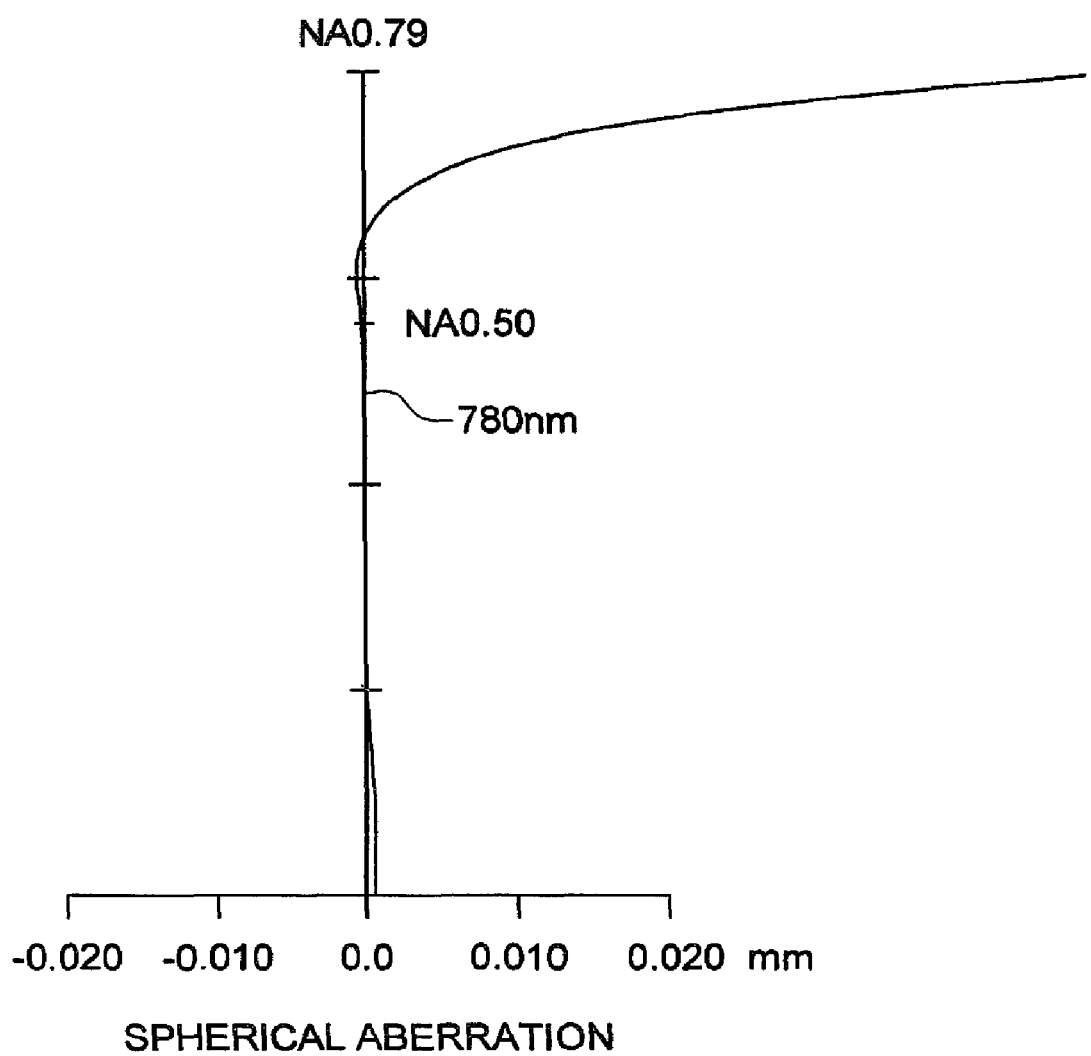

FIG. 26 is a spherical aberration view when the light of λ3=780 nm of the light flux diameter equal to the diaphragm diameter determined by a combination of λ1=405 nm and NA1 0.85 of the objective lens in Example 7 is incident on it.

Figure 27:
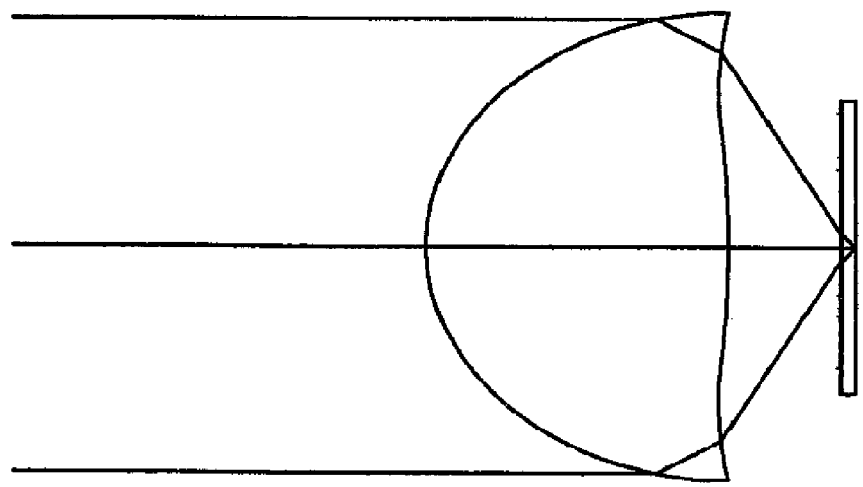

FIG. 27 is an optical path view at λ1=405 nm of the objective lens in Example 8.

Figure 28:
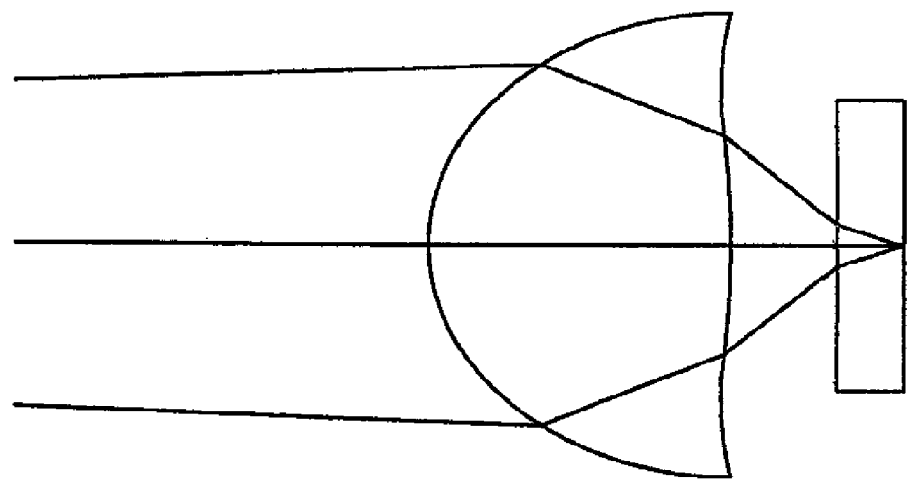

FIG. 28 is an optical path view at λ2=655 nm of the objective lens in Example 8.

Figure 29:
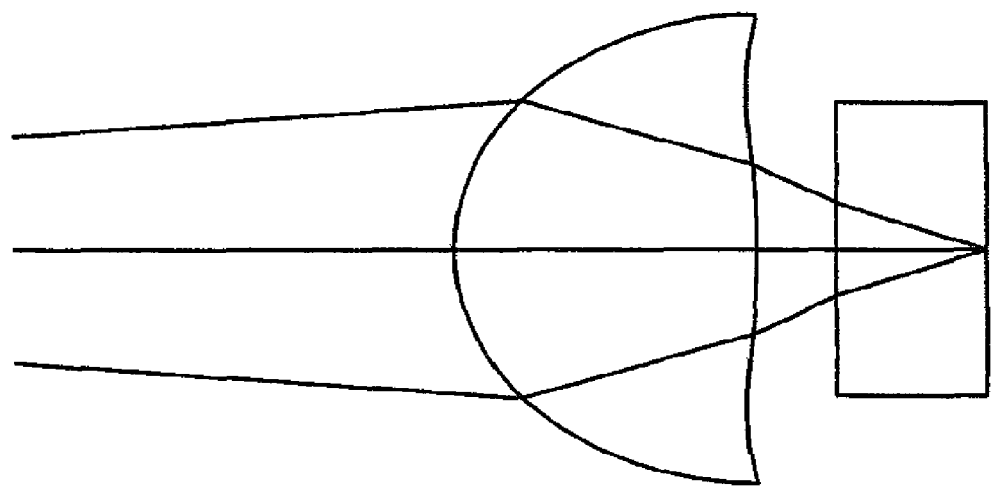

FIG. 29 is an optical path view at λ3=785 nm of the objective lens in Example 8.

Figure 30:
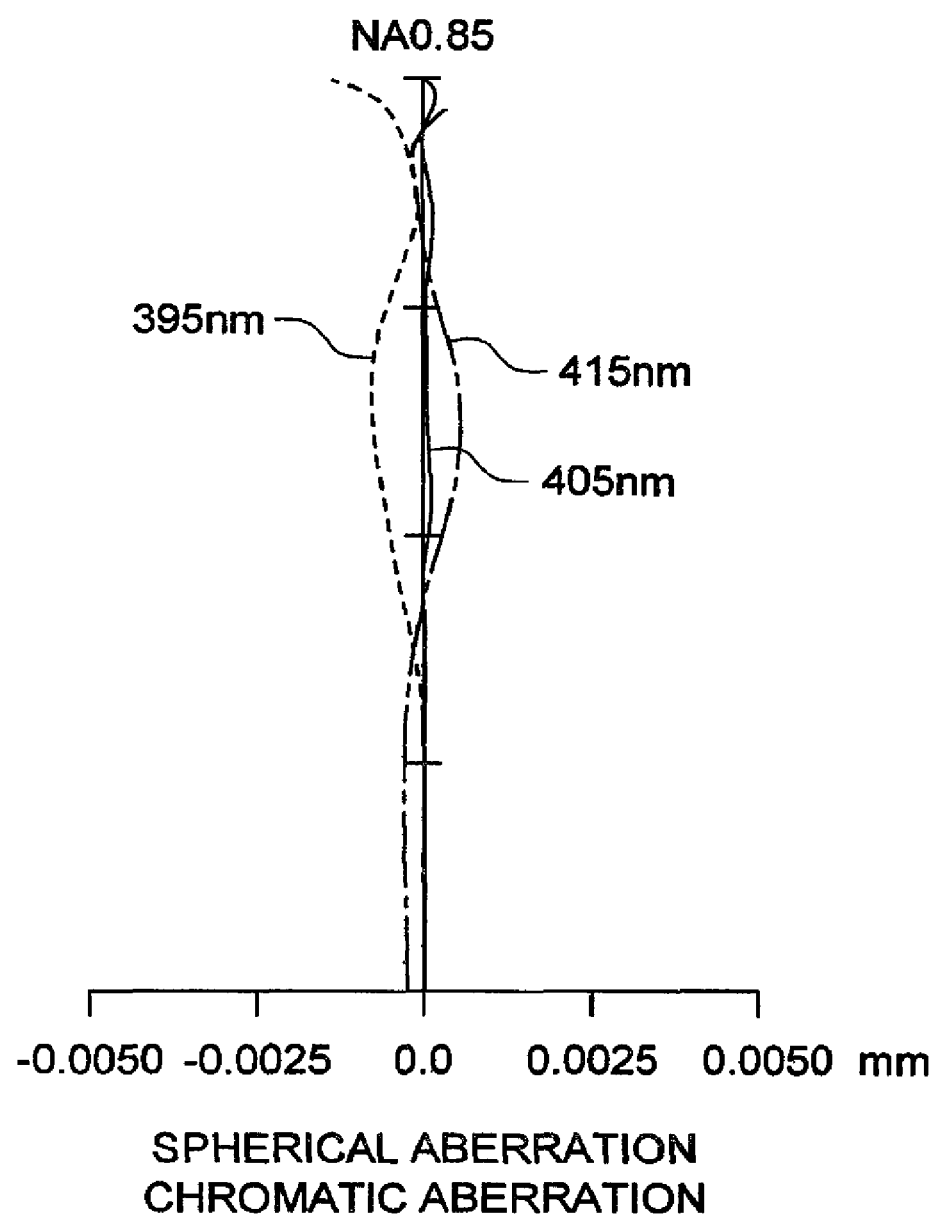

FIG. 30 is a spherical aberration view up to a numerical aperture 0.85 for λ1=405 nm of the objective lens in Example 8.

Figure 31:
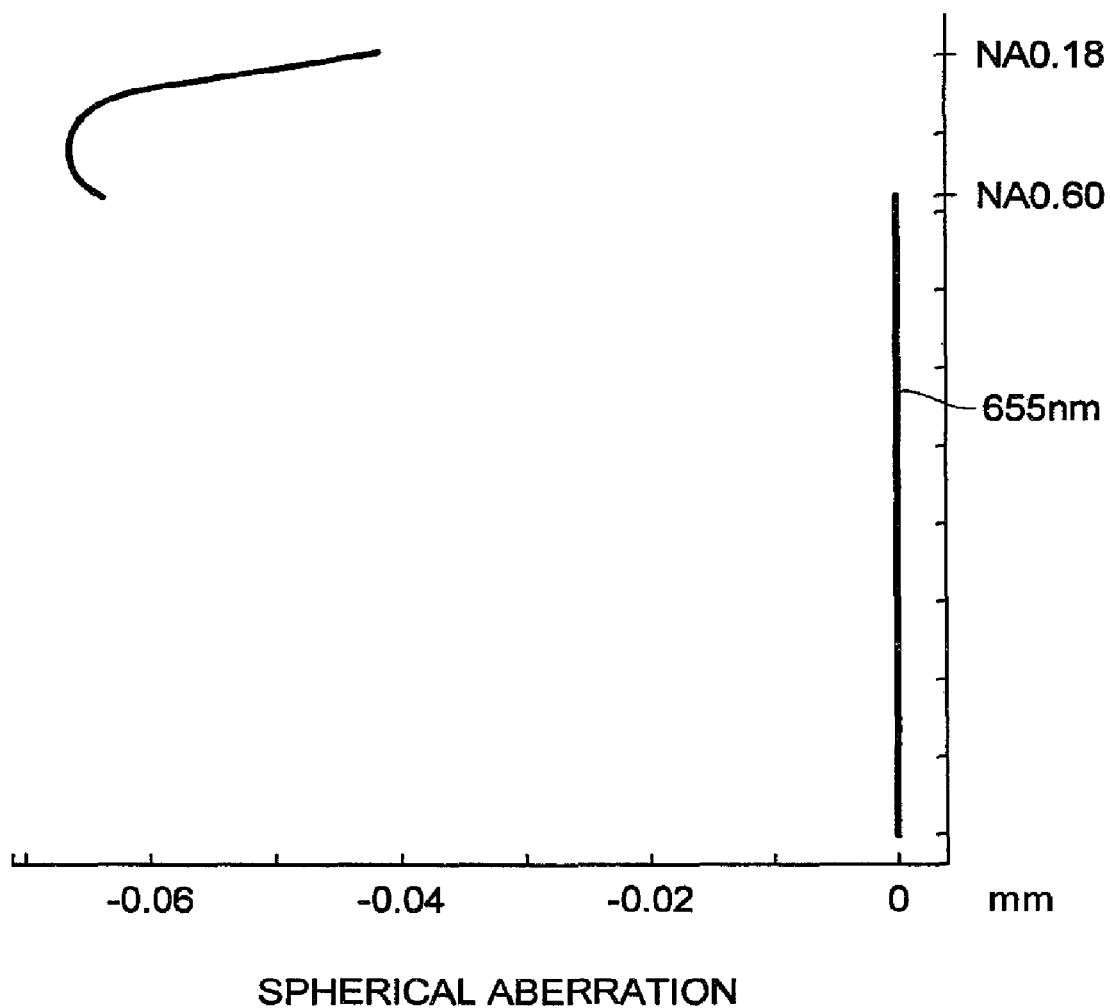

FIG. 31 is a spherical aberration view when the light of λ2=655 nm of the light flux diameter equal to the diaphragm diameter determined by a combination of λ1=405 nm and NA1 0.85 of the objective lens in Example 8 is incident on it.

Figure 32:
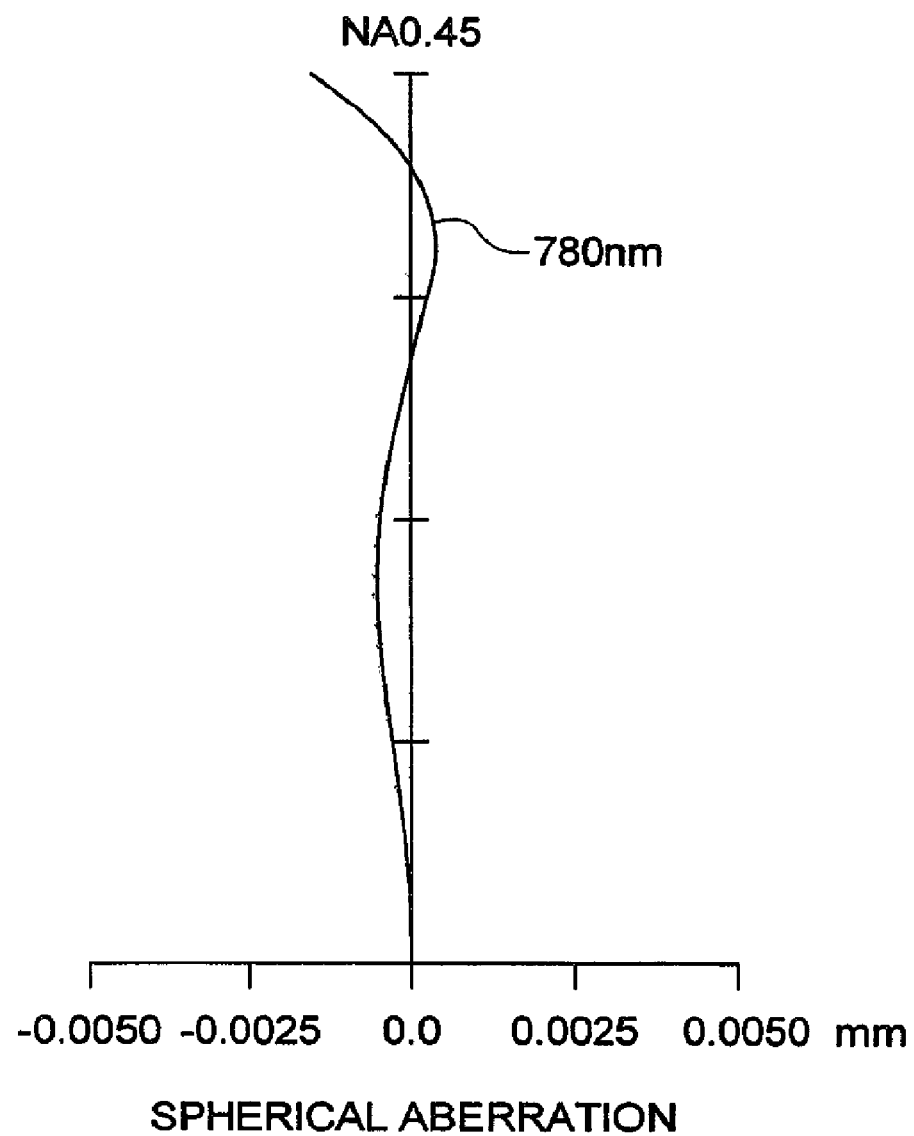

FIG. 32 is a spherical aberration view up to a numerical aperture 0.45 for λ3=785 nm of the objective lens in Example 8.

Figure 33:
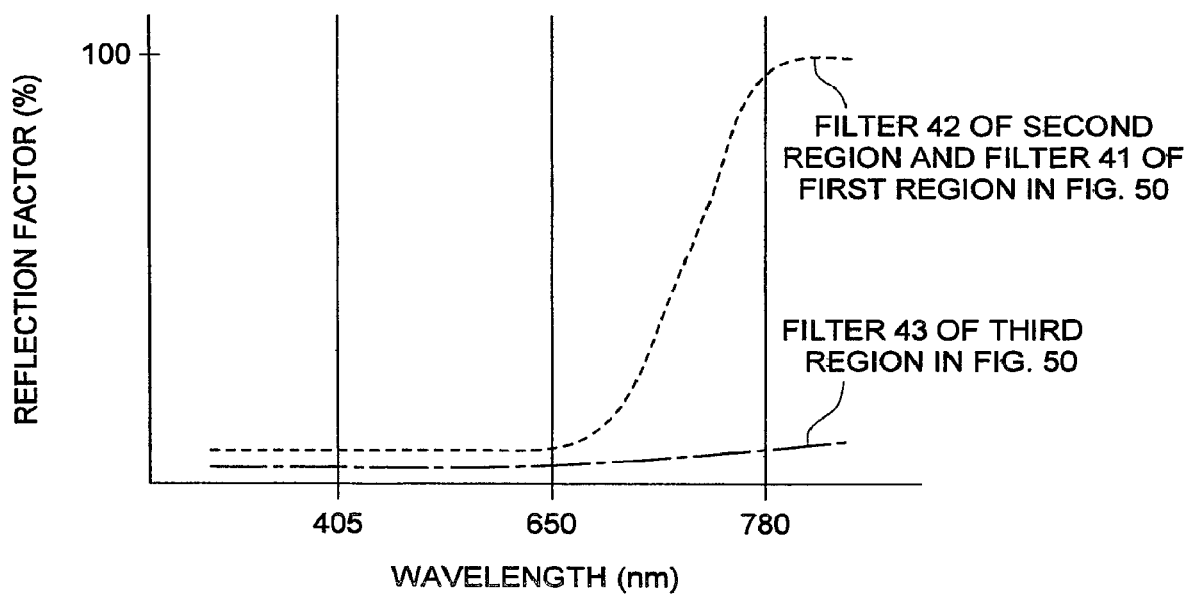
Figure 50:
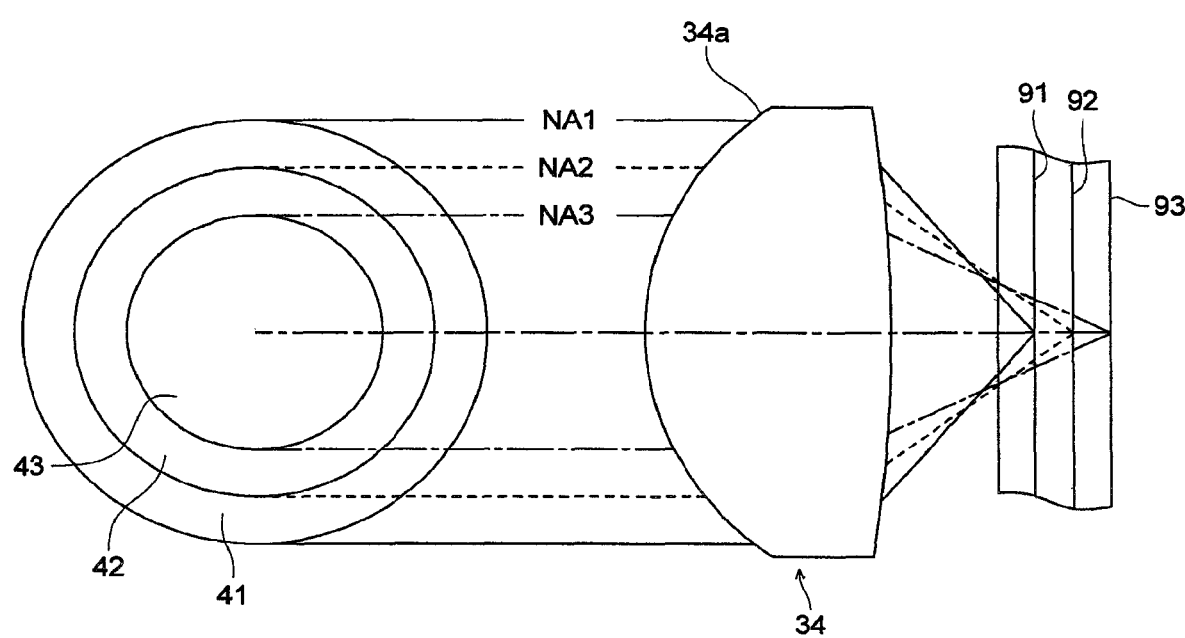

FIG. 33 is a view expressing the reflection factor and the wavelength dependency of the ring-shaped zone-like filter formed on the objective lens shown in FIG. 50.

Figure 34:
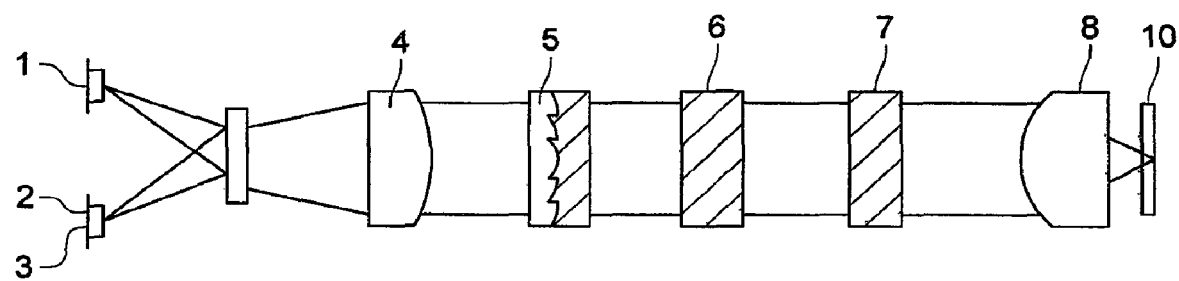

FIG. 34 is a view conceptually showing an optical pick-up apparatus according to the present invention.

Figure 35:
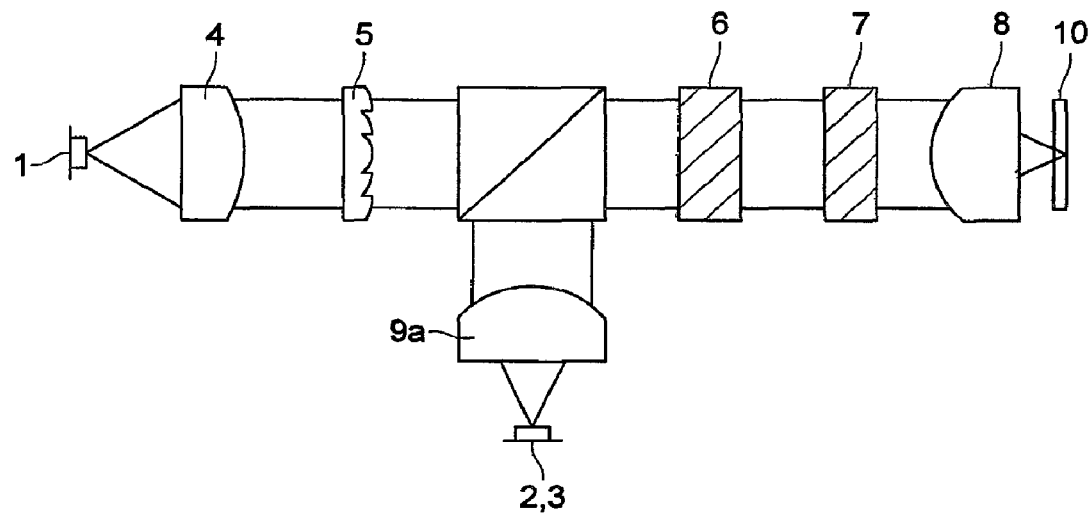

FIG. 35 is a view conceptually showing another optical pick-up apparatus according to the present invention.

Figure 36:
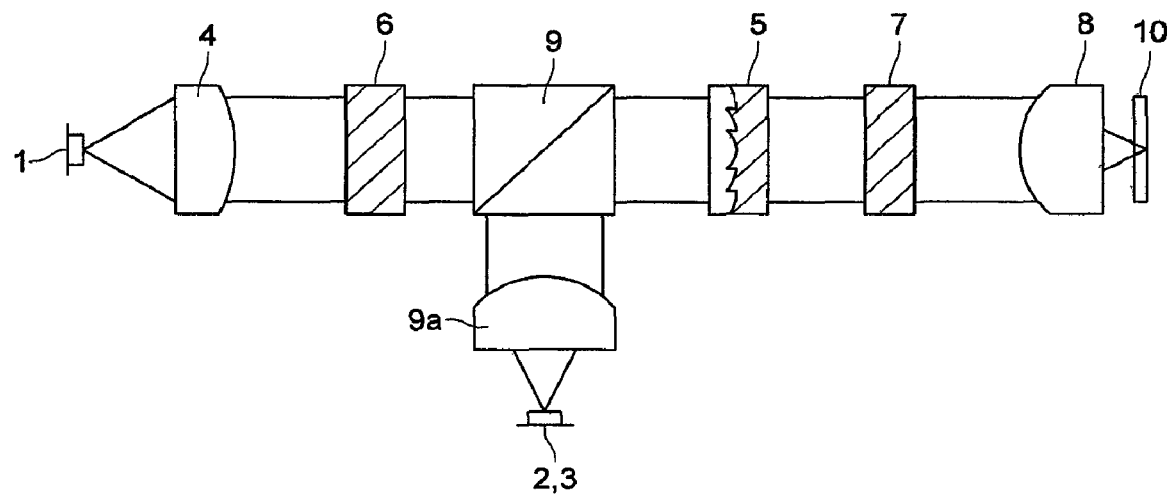

FIG. 36 is a view conceptually showing yet another optical pick-up apparatus according to the present invention.

Figure 37:
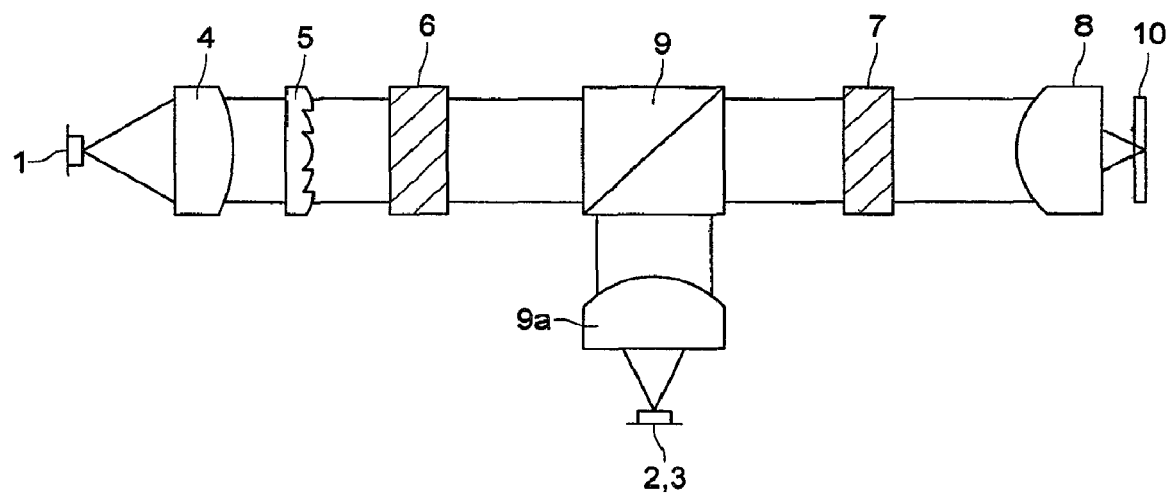

FIG. 37 is a view conceptually showing yet another optical pick-up apparatus according to the present invention.

Figure 38:
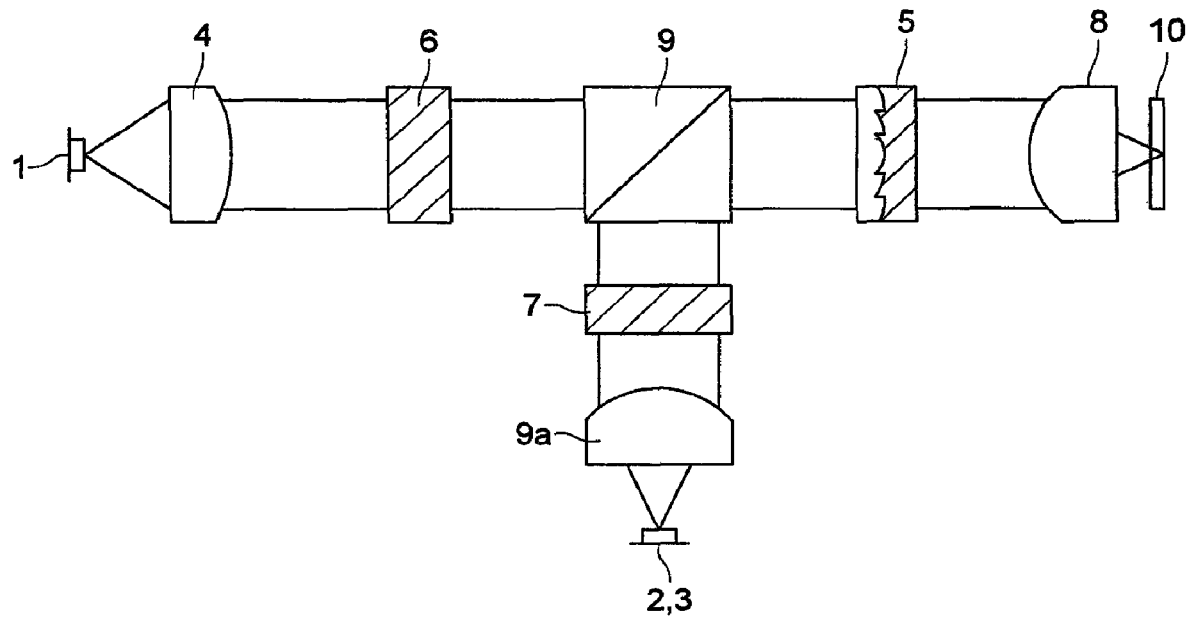

FIG. 38 is a view conceptually showing yet another optical pick-up apparatus according to the present invention.

Figure 39:
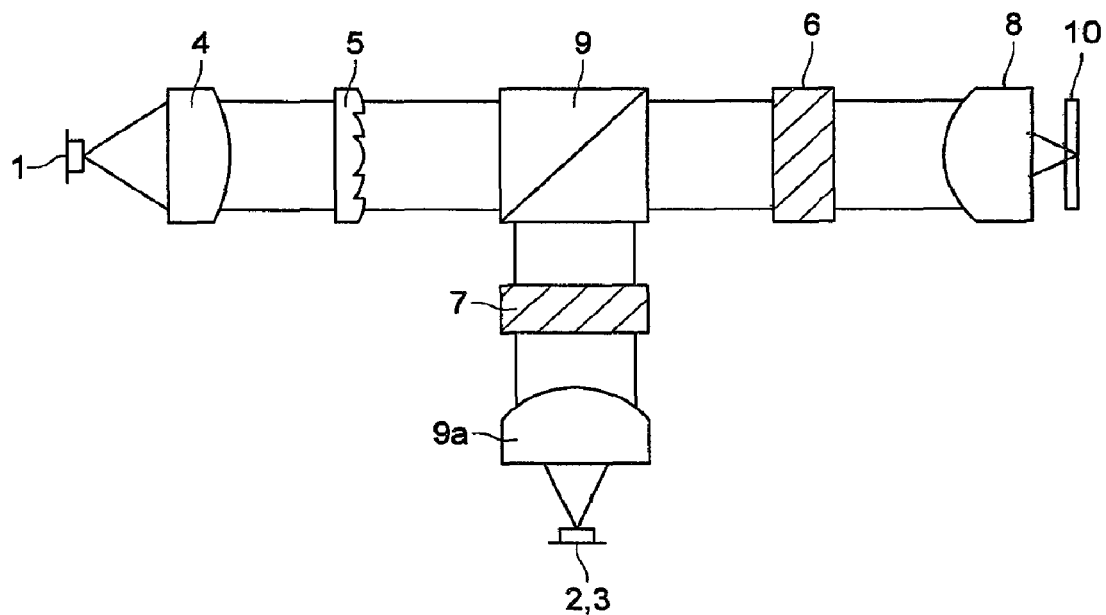

FIG. 39 is a view conceptually showing yet another optical pick-up apparatus according to the present invention.

Figure 40:
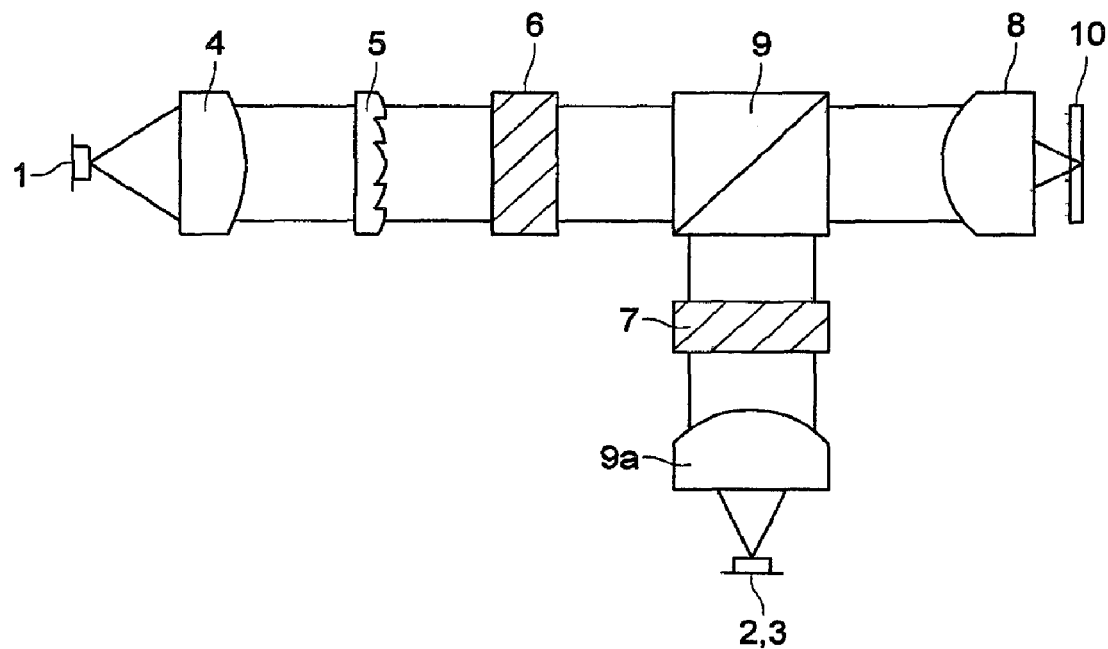

FIG. 40 is a view conceptually showing yet another optical pick-up apparatus according to the present invention.

Figure 41:
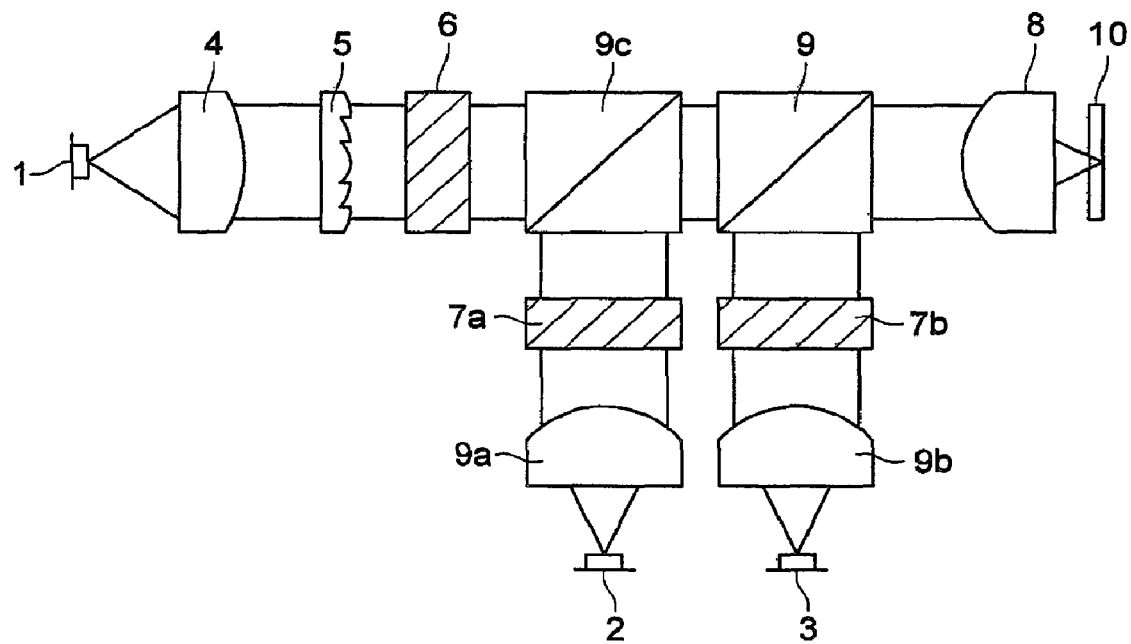

FIG. 41 is a view conceptually showing yet another optical pick-up apparatus according to the present invention.

Figure 42:
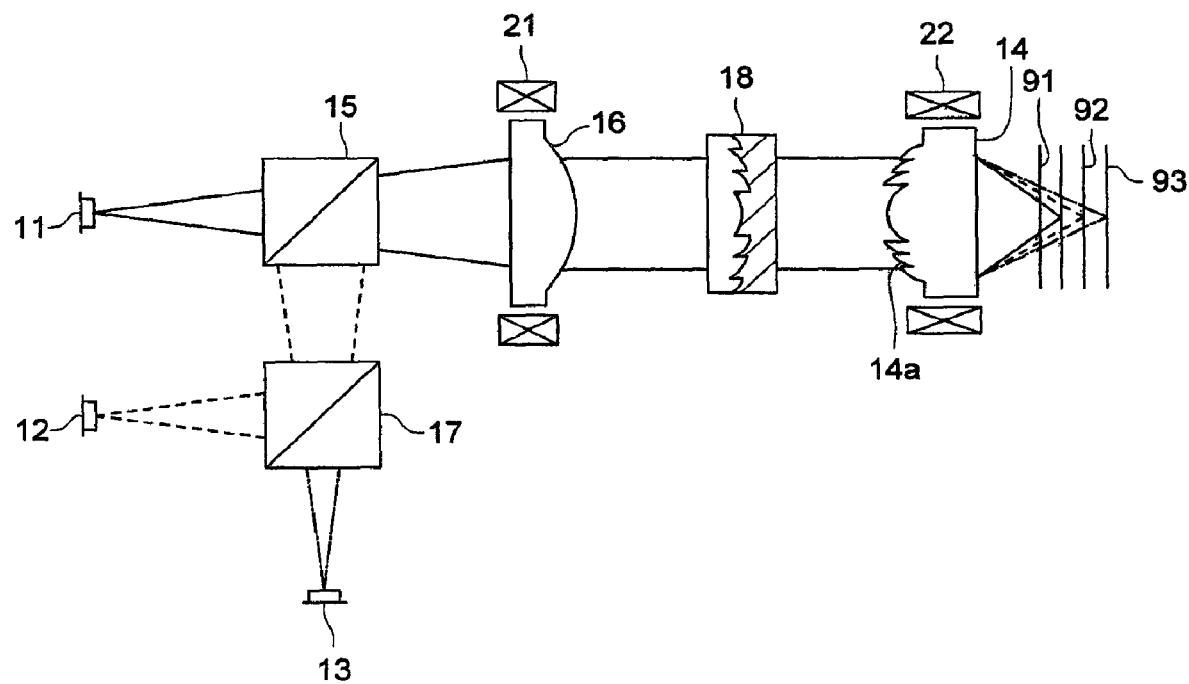

FIG. 42 is a view generally showing the first optical pick-up apparatus according to the first embodiment.

Figure 43:
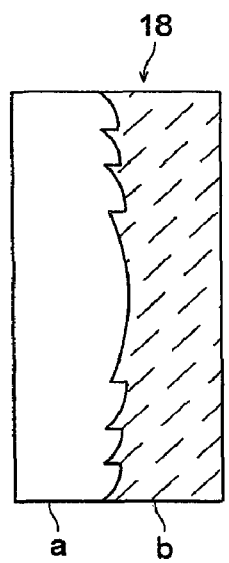
Figure 43:
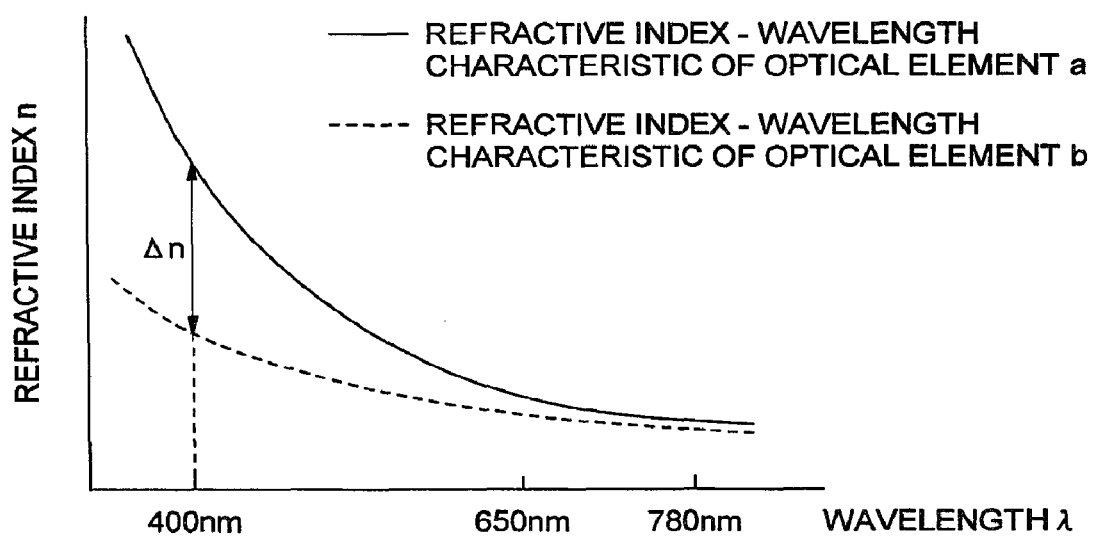

FIG. 43 is a side sectional view (a) of a multi-layer diffractive element which is a chromatic aberration correcting element used for the first optical pick-up apparatus in FIG. 42, and a view (b) showing the relationship between the wavelength and refractive index for explaining the action of the multi-layer diffractive element.

Figure 44:
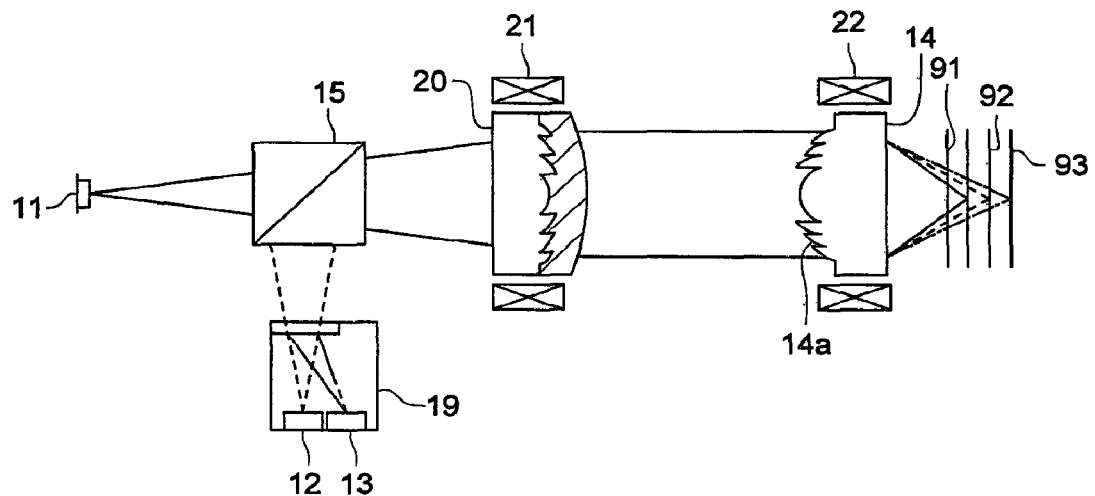

FIG. 44 is a view generally showing the second optical pick-up apparatus according to the first embodiment.

Figure 45:
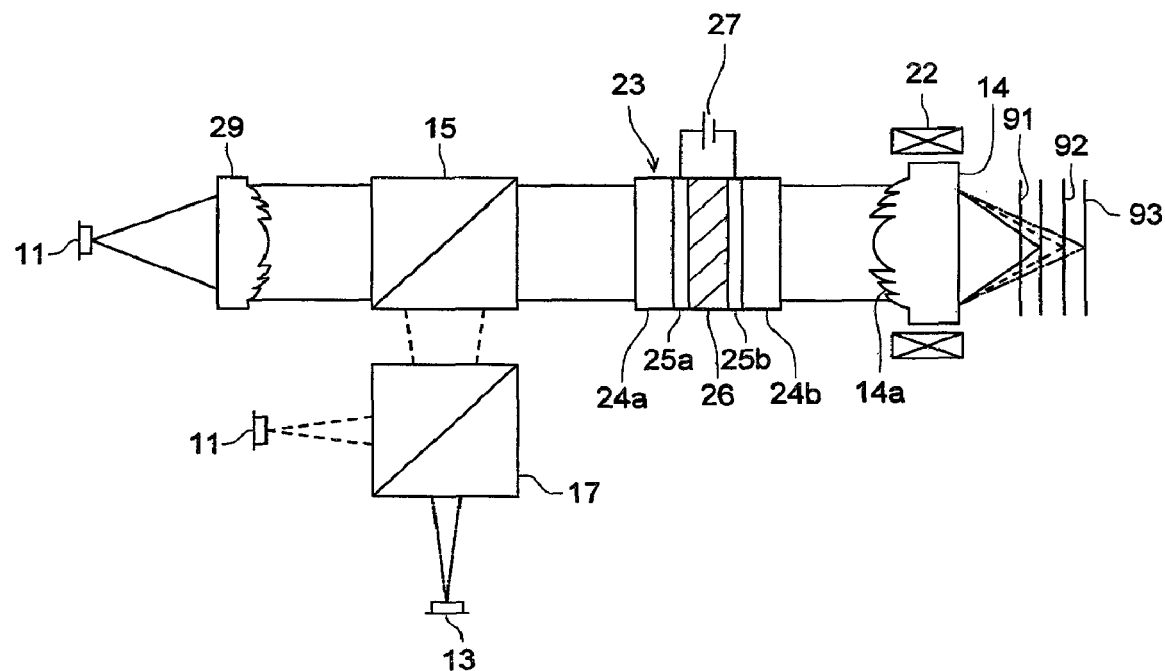

FIG. 45 is a view generally showing the third optical pick-up apparatus according to the second embodiment.

Figure 46:
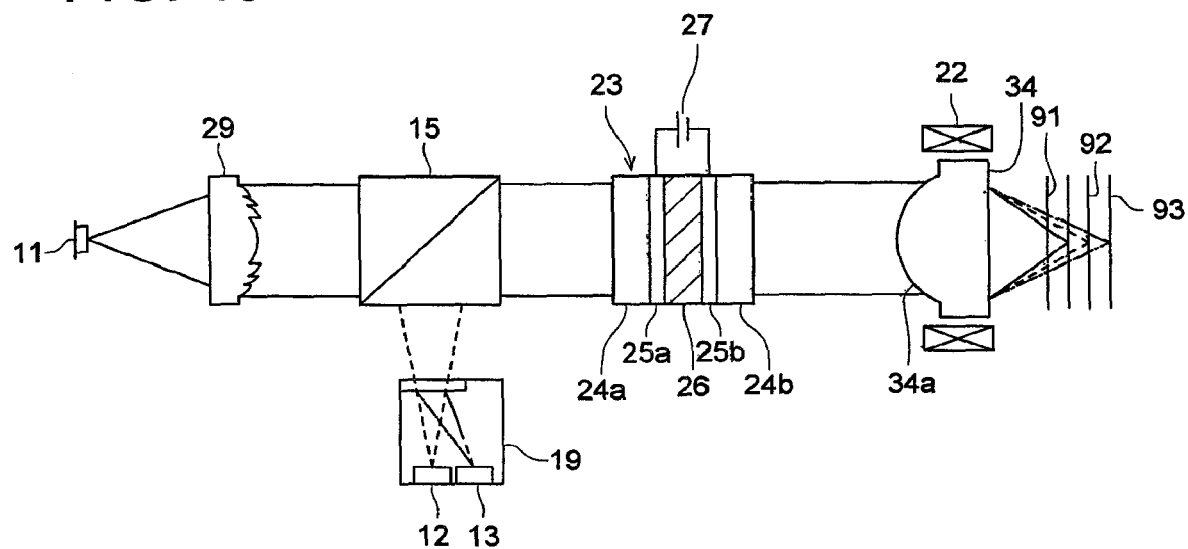

FIG. 46 is a view generally showing the fourth optical pick-up apparatus according to the second embodiment.

Figure 47:
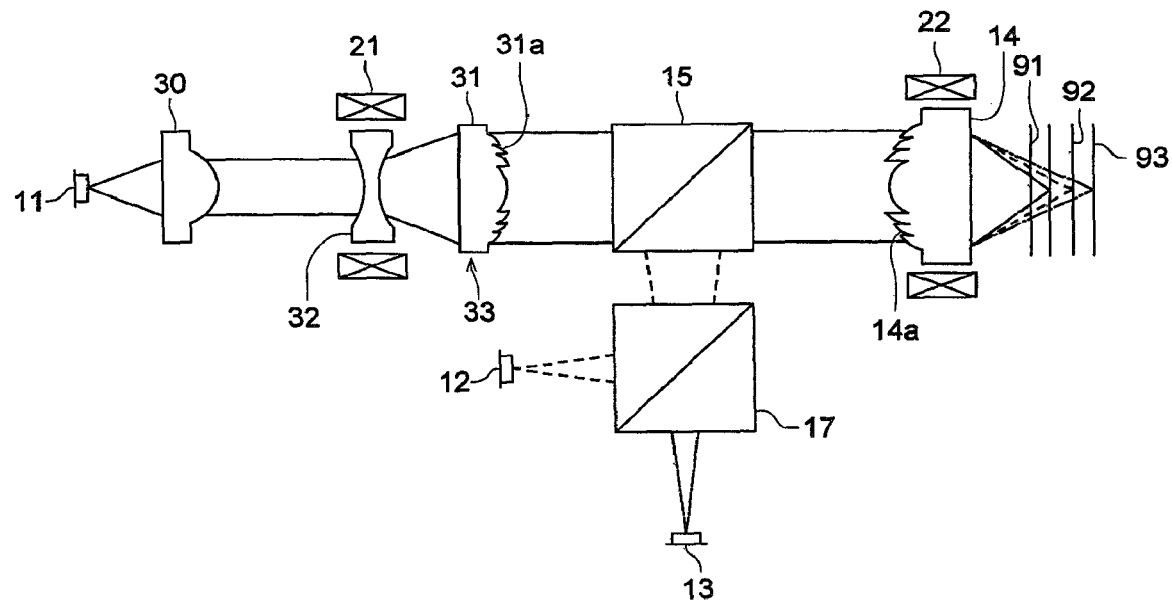

FIG. 47 is a view generally showing the fifth optical pick-up apparatus according to the third embodiment.

Figure 48:
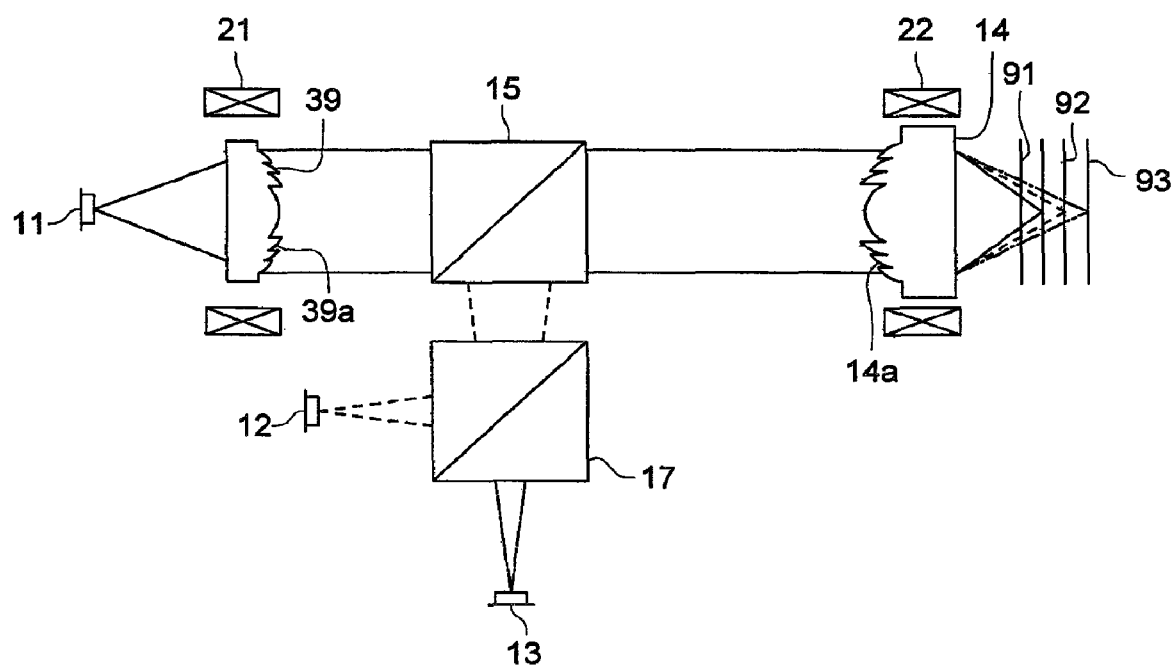

FIG. 48 is a view generally showing the sixth optical pick-up apparatus according to the third embodiment.

Figure 49:
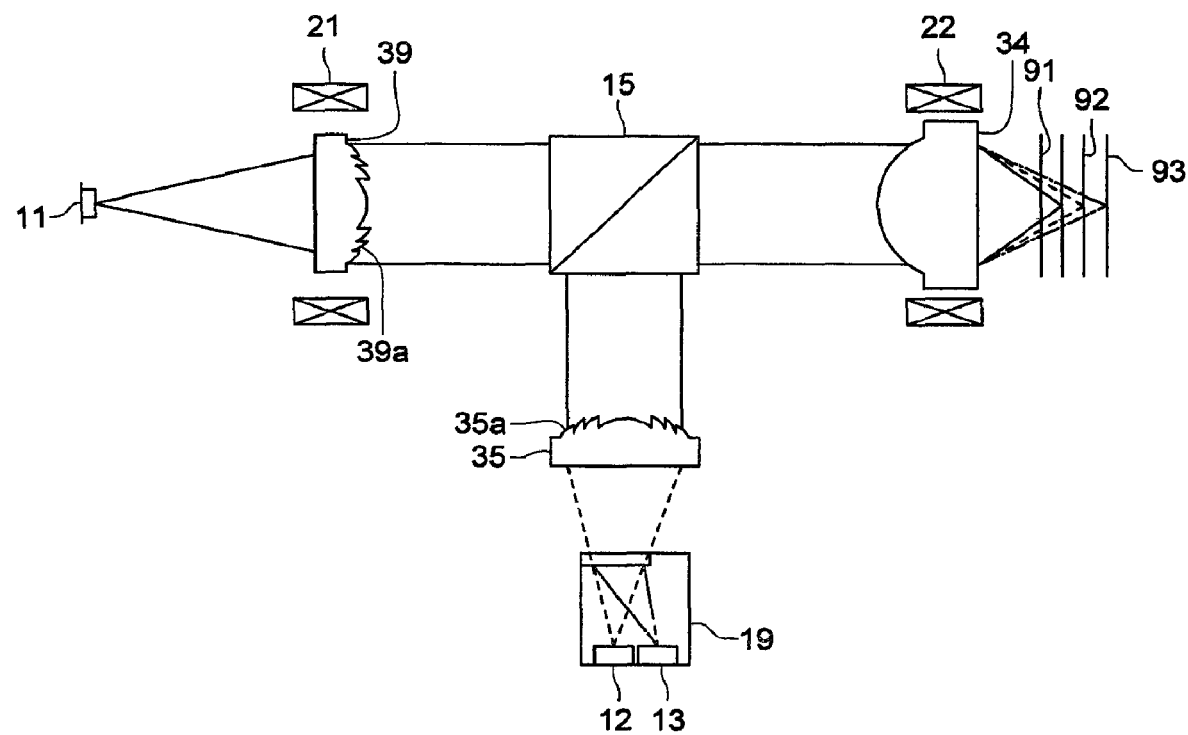

FIG. 49 is a view generally showing the seventh optical pick-up apparatus according to the fourth embodiment.

FIG. 50 is a view for explaining a ring-shaped zone filter provided on an objective lens as an aperture regulating or aperture changing means which can be used for each embodiment and each example.

Figure 51:
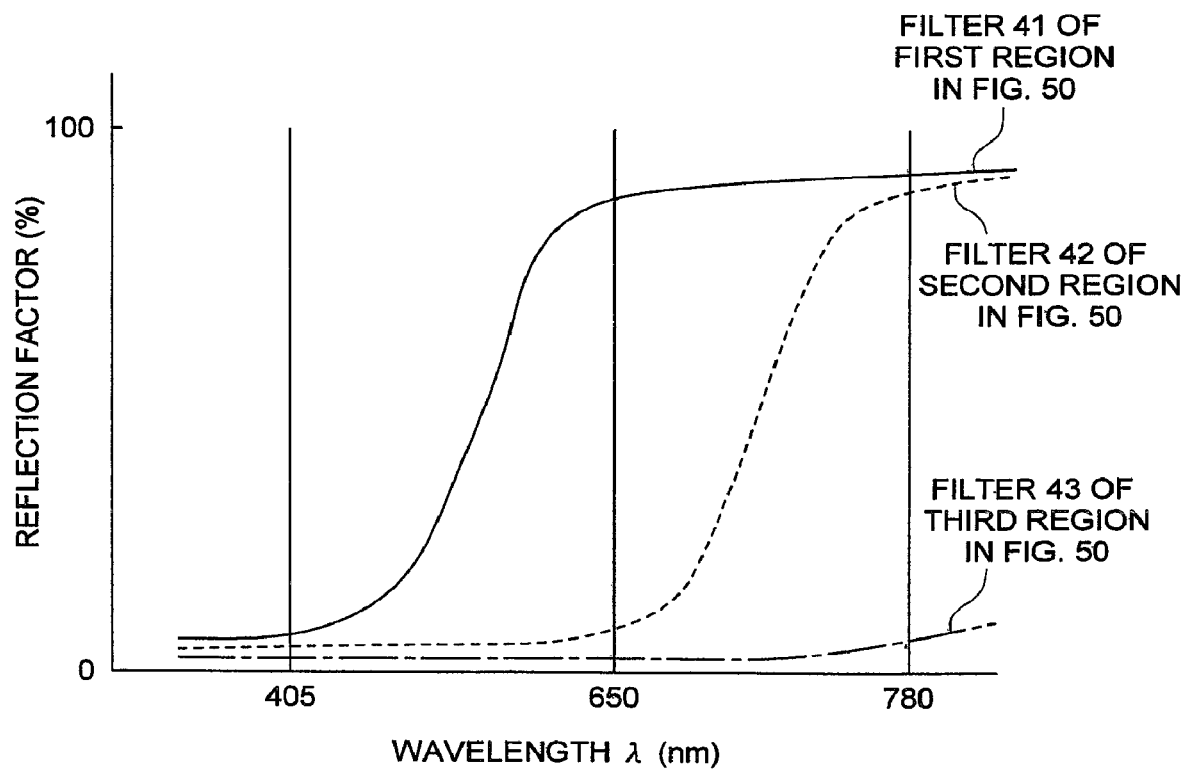

FIG. 51 is a view for explaining the action of the ring-shaped zone filter in FIG. 50.

Figure 52:
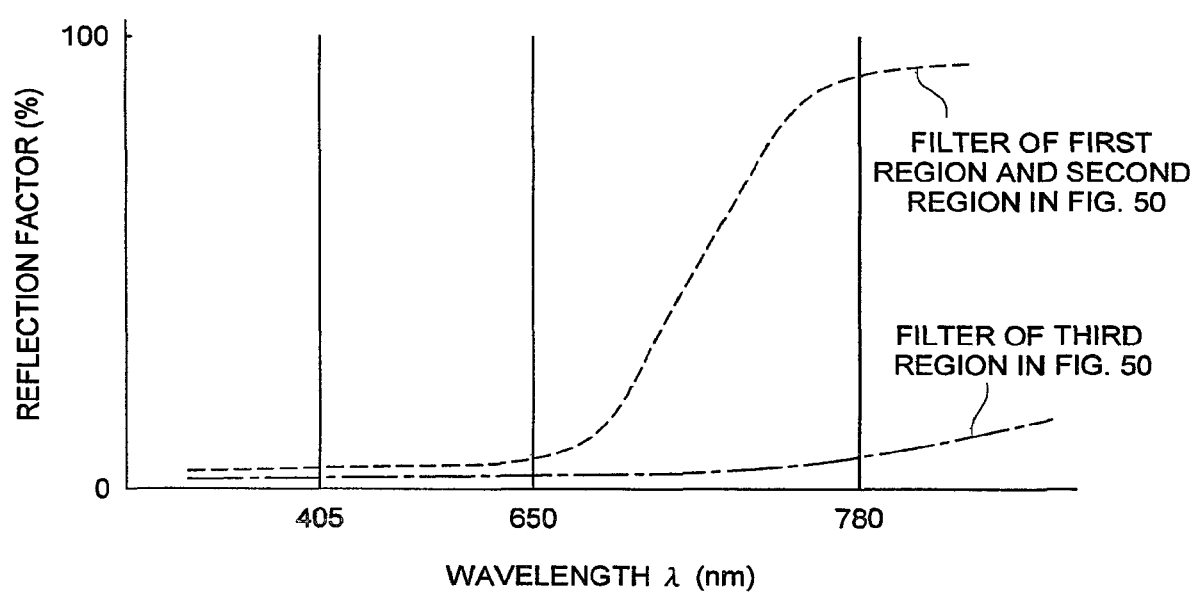

FIG. 52 is a view for explaining the action of another ring-shaped zone filter in FIG. 50.

Figure 53:
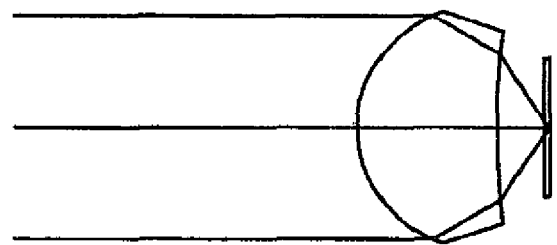

FIG. 53 is an optical path view at λ1=405 nm of the objective lens in Example 1.

Figure 54:
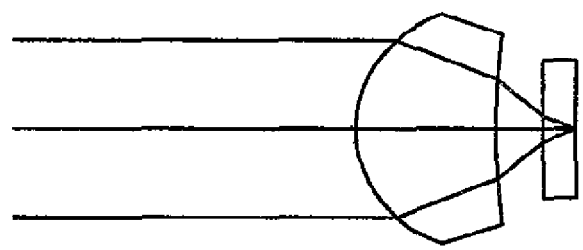

FIG. 54 is an optical path view at λ2=650 nm of the objective lens in Example 1.

Figure 55:
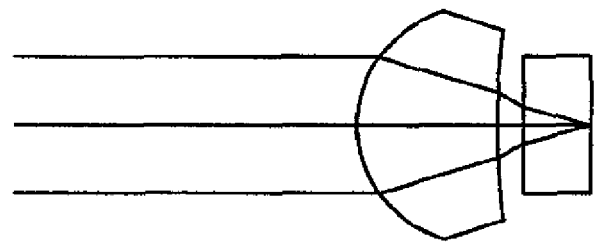

FIG. 55 is an optical path view at λ3=780 nm of the objective lens in Example 1.

Figure 56:
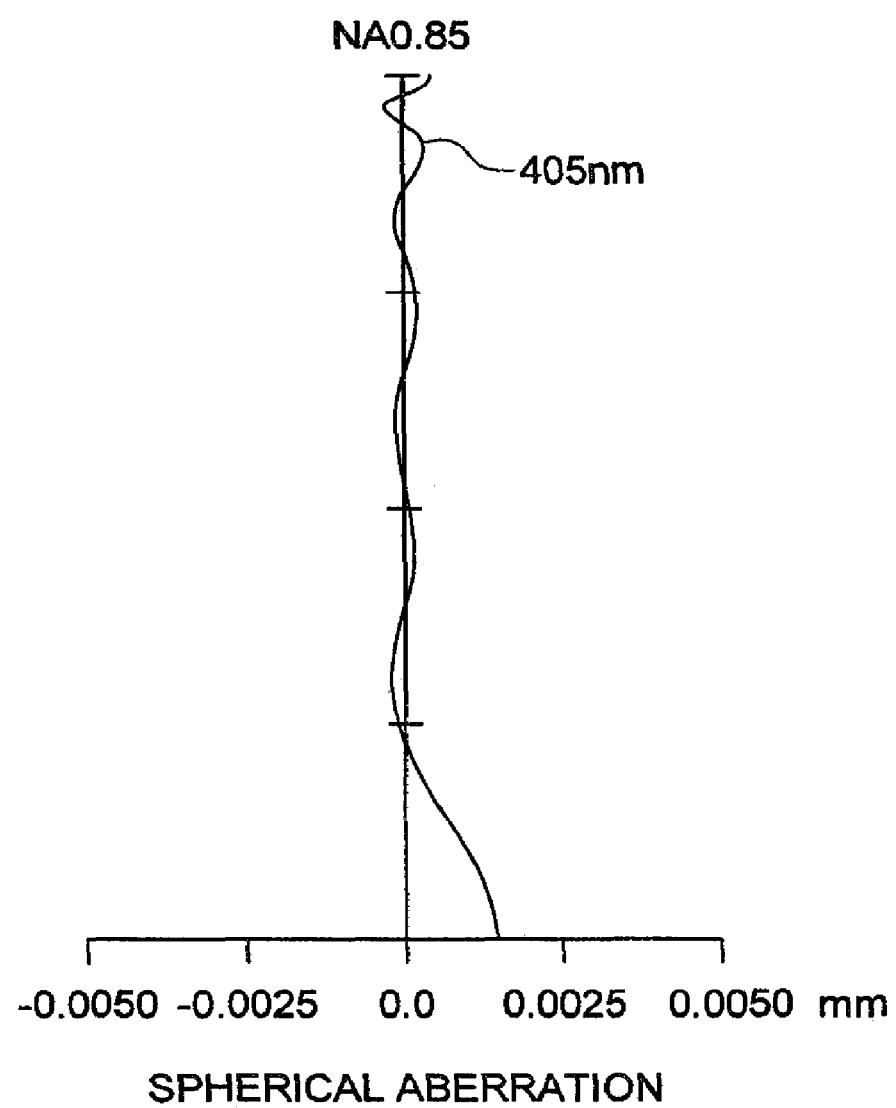

FIG. 56 is a spherical aberration view up to a numerical aperture 0.85 for λ1=405 nm of the objective lens in Example 1.

Figure 57:
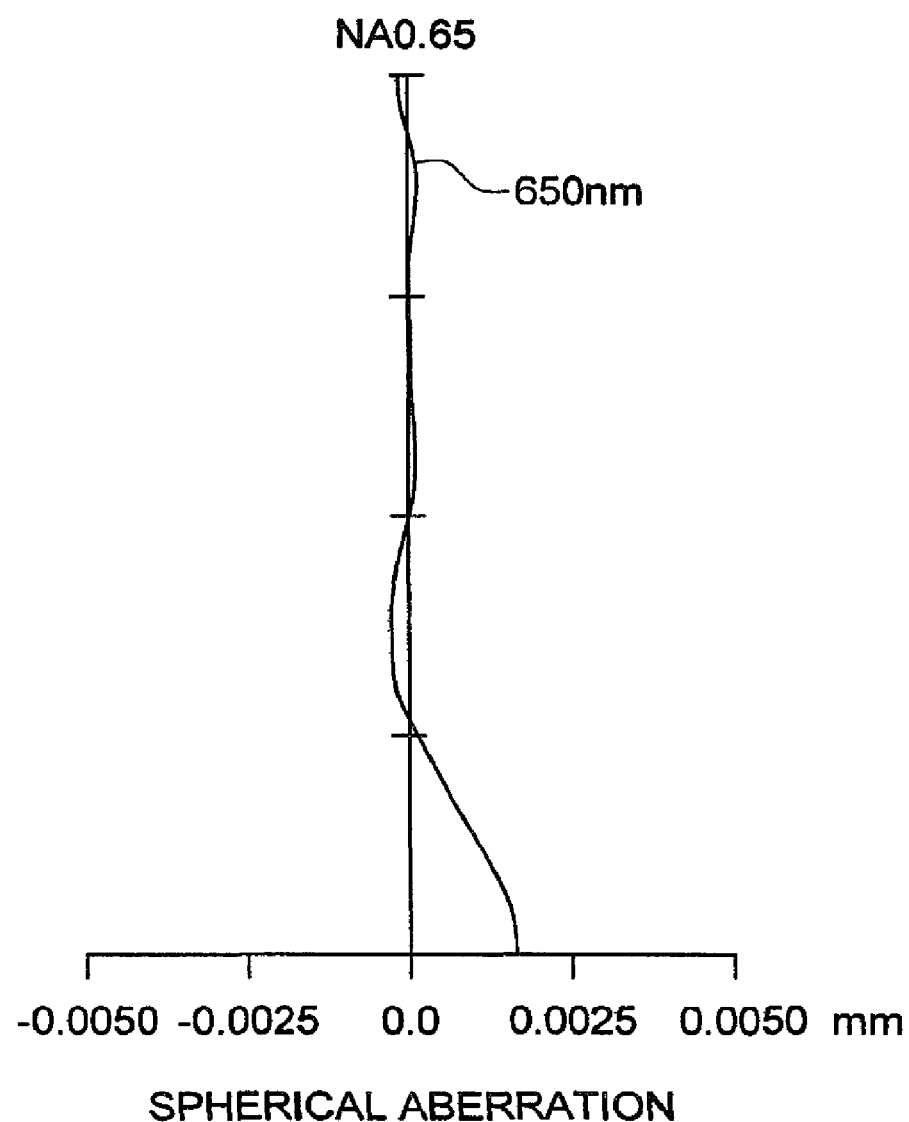

FIG. 57 is a spherical aberration view up to a numerical aperture 0.65 for λ2=650 nm of the objective lens in Example 1.

Figure 58:
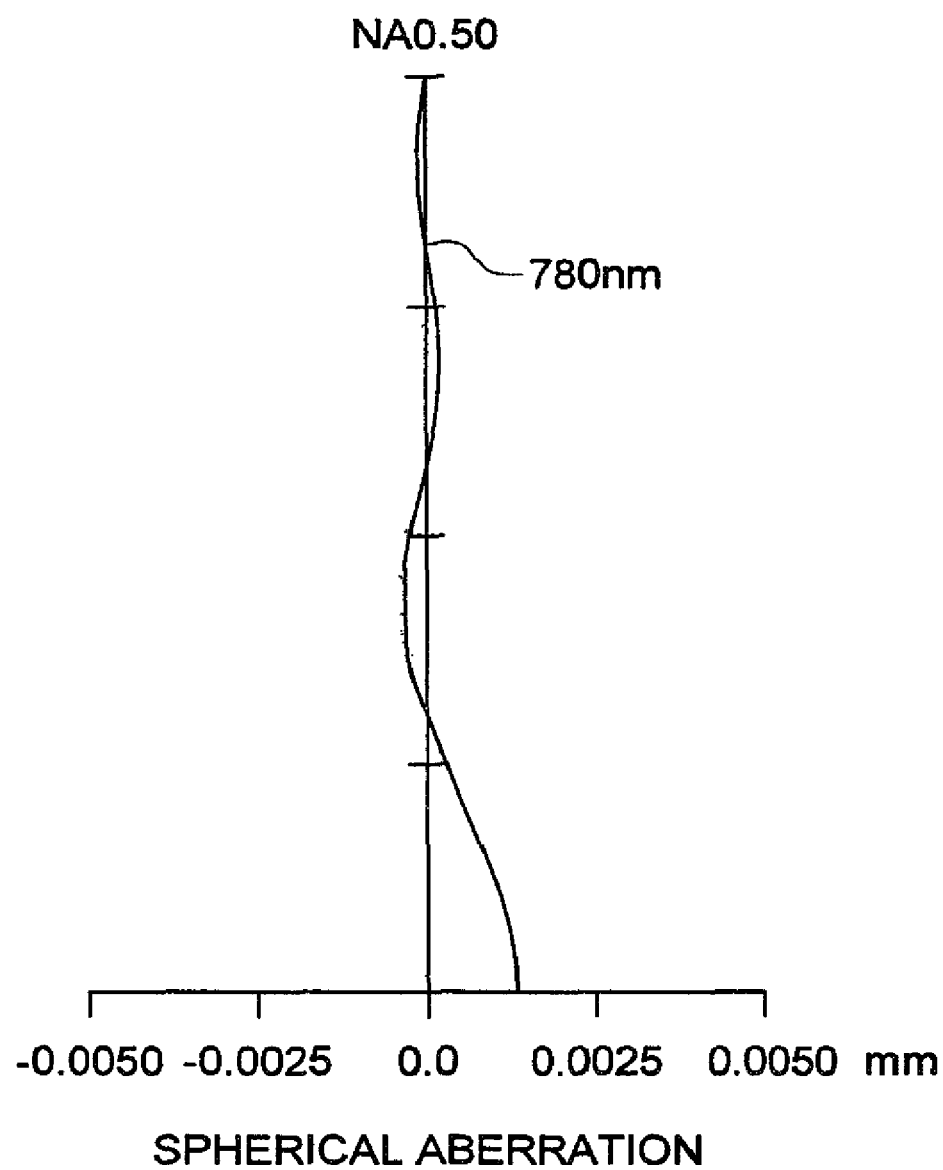

FIG. 58 is a spherical aberration view up to a numerical aperture 0.50 for λ3=780 nm of the objective lens in Example 1.

Figure 59:
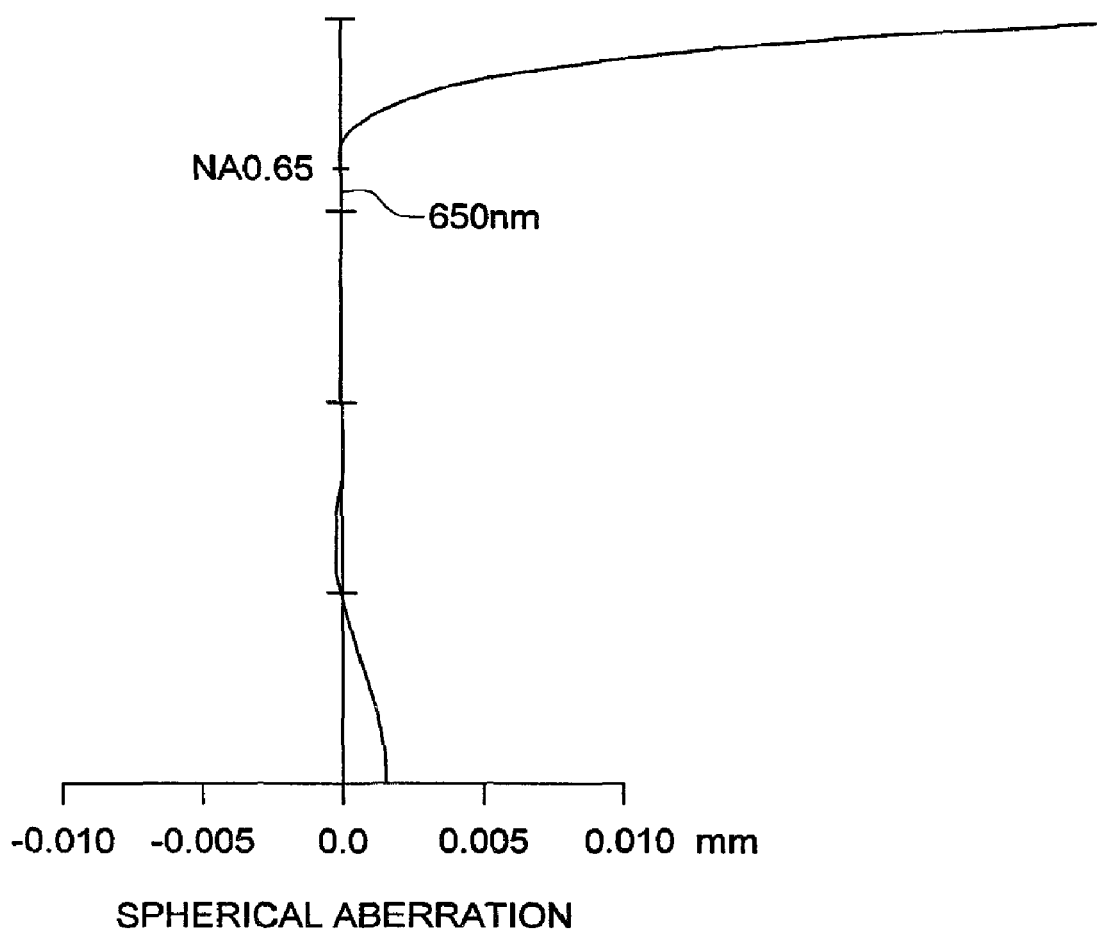

FIG. 59 is another spherical aberration view for λ2=650 nm of the objective lens in Example 1.

Figure 60:
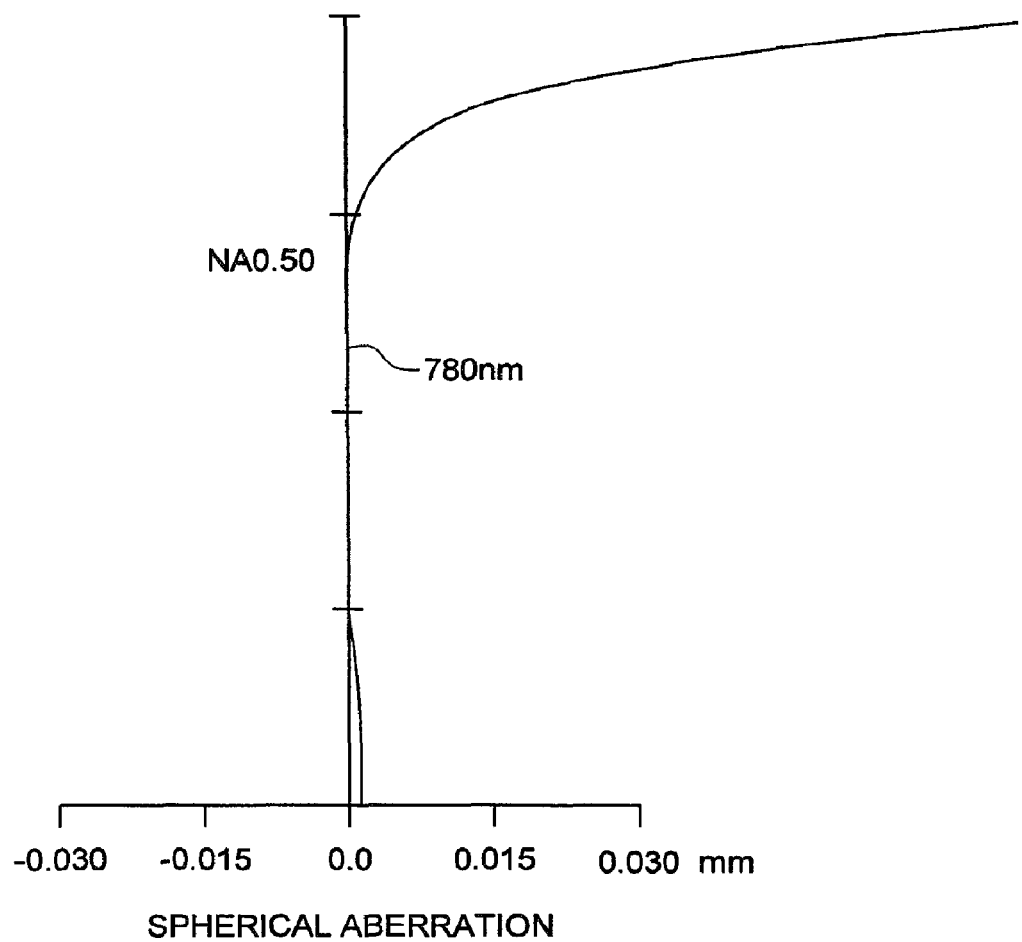

FIG. 60 is another spherical aberration view for λ3=780 nm of the objective lens in Example 1.

Figure 61:
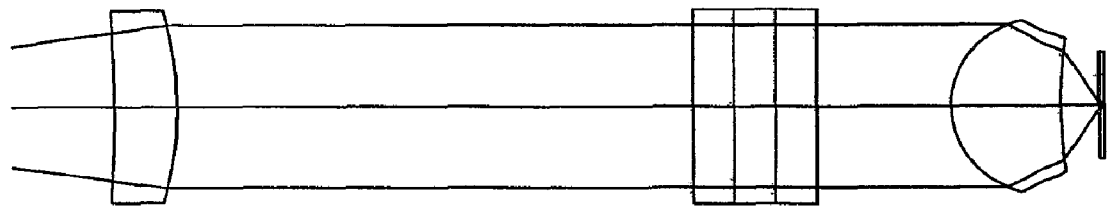

FIG. 61 is an optical path view at λ1=405 nm of a light converging optical system in Example 2.

Figure 62:
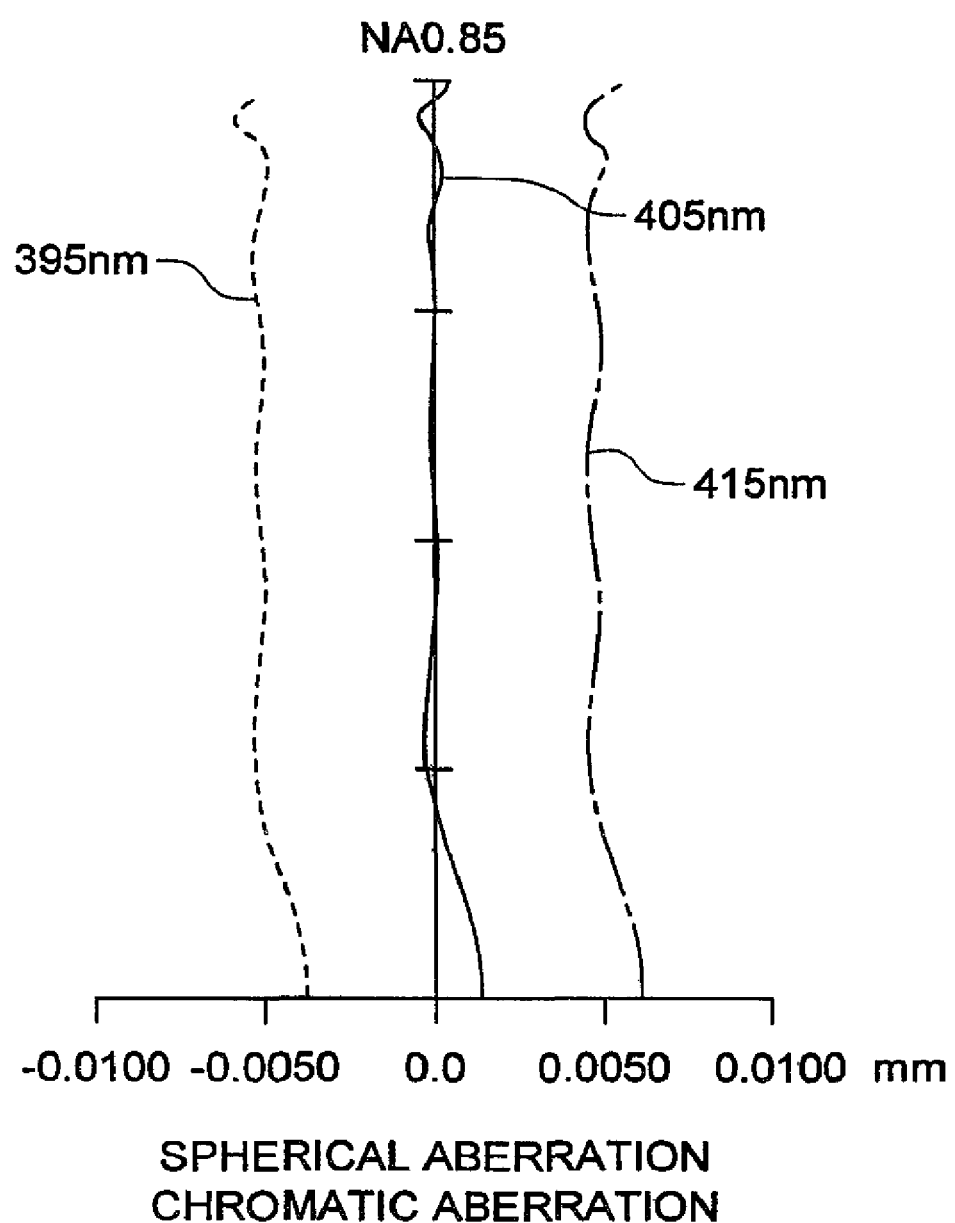

FIG. 62 is a spherical aberration view up to a numerical aperture 0.85 for λ1=405 nm±10 nm of the objective lens of the light converging optical system in Example 2.

Figure 63:
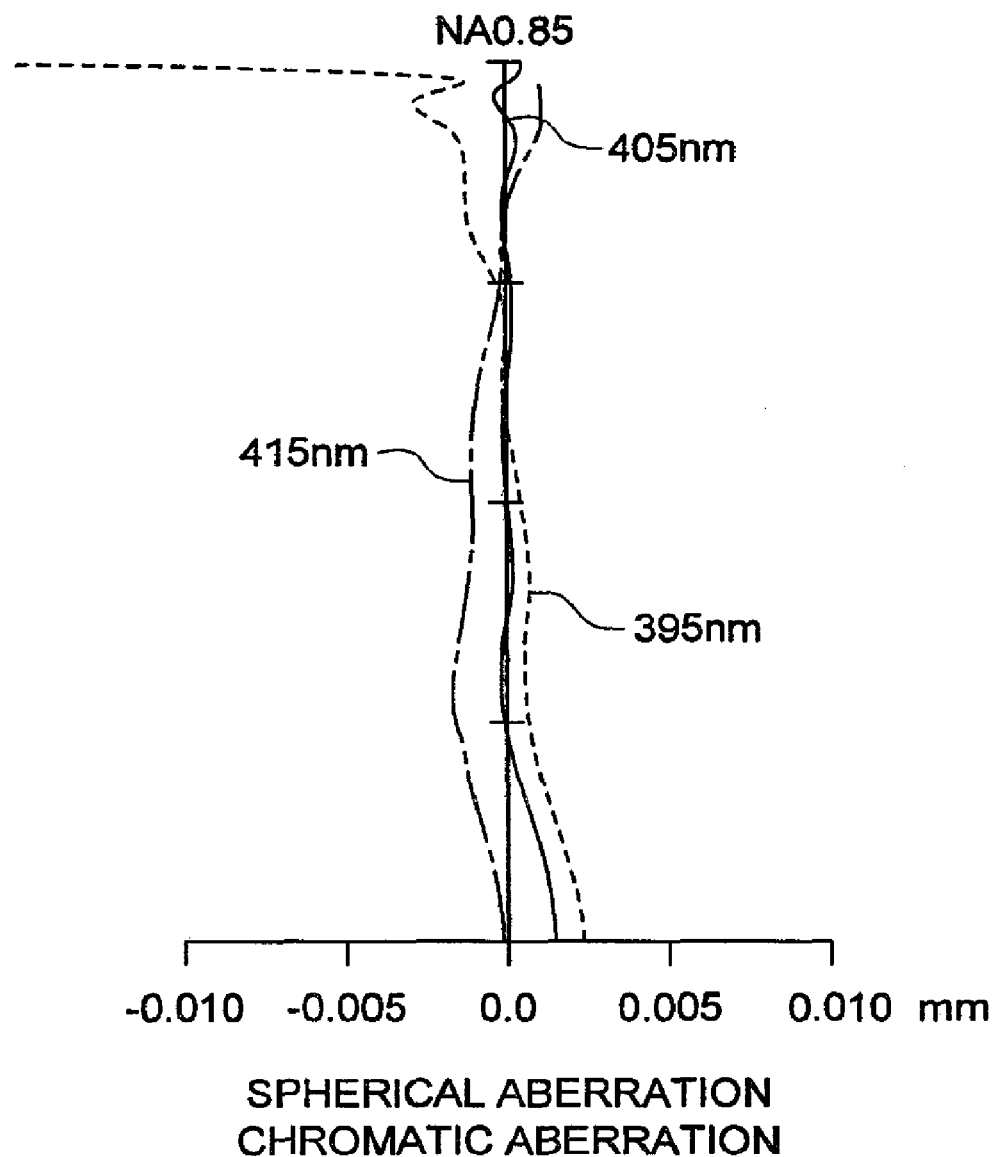

FIG. 63 is a spherical aberration view up to a numerical aperture 0.85 for λ1=405 nm±10 nm of a composite system of a collimator and the objective lens of the light converging optical system in Example 2.

Figure 64:
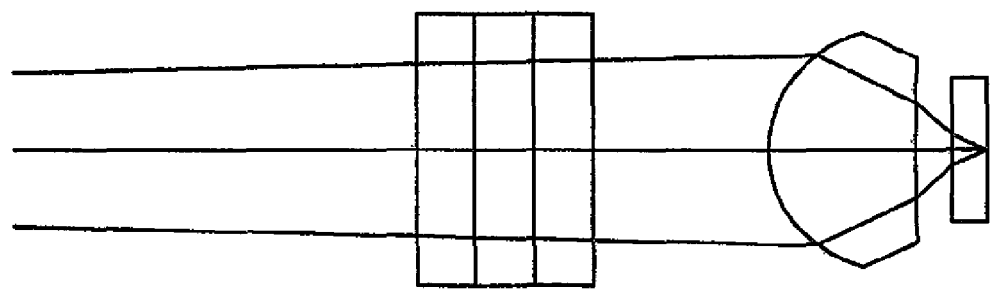

FIG. 64 is an optical path view at λ2=650 nm of the objective lens of the light converging optical system in Example 2.

Figure 65:
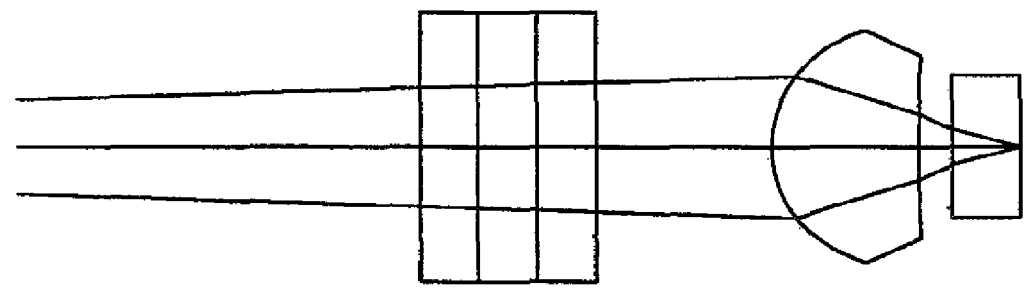

FIG. 65 is an optical path view at λ3=780 nm of the objective lens of the light converging optical system in Example 2.

Figure 66:
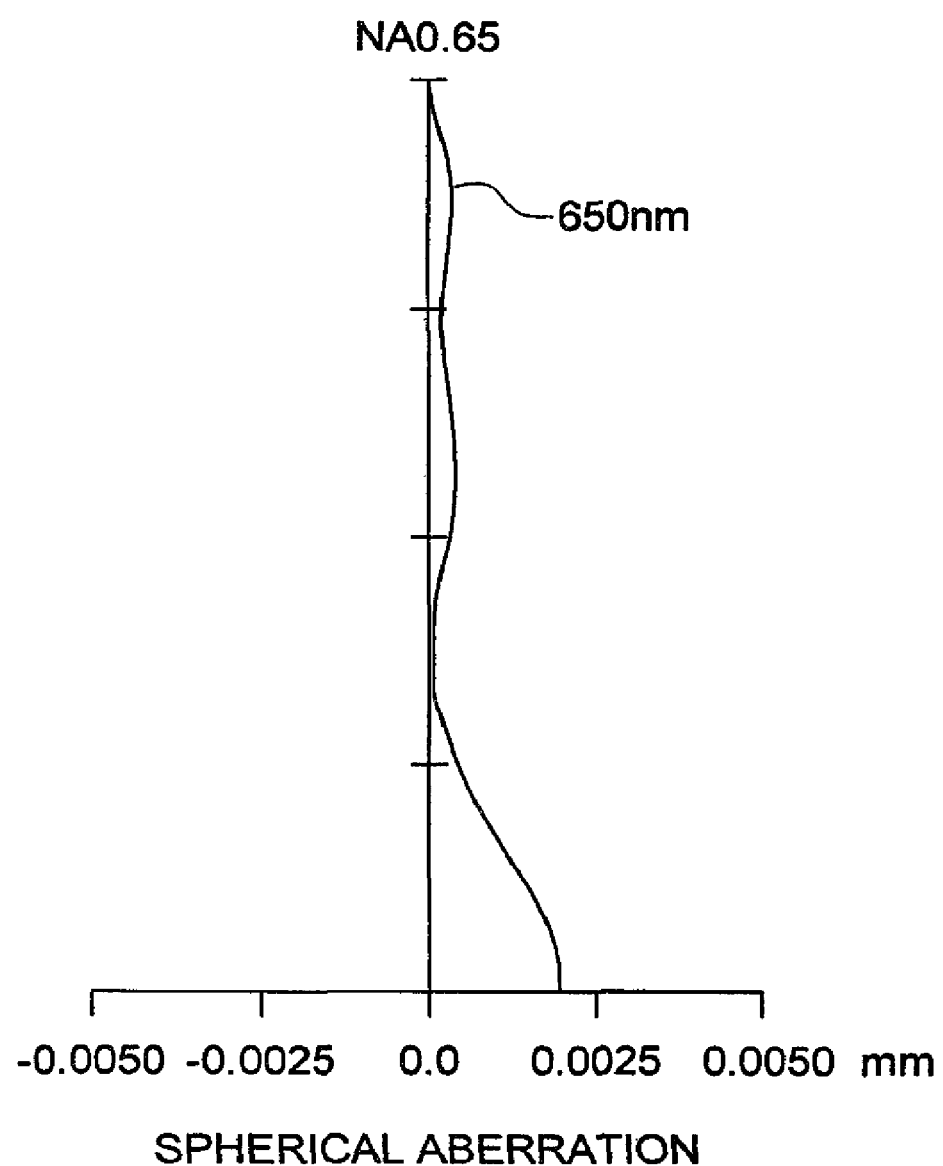

FIG. 66 is a spherical aberration view up to a numerical aperture 0.65 for α2=650 nm of the objective lens of the light converging optical system in Example 2.

Figure 67:
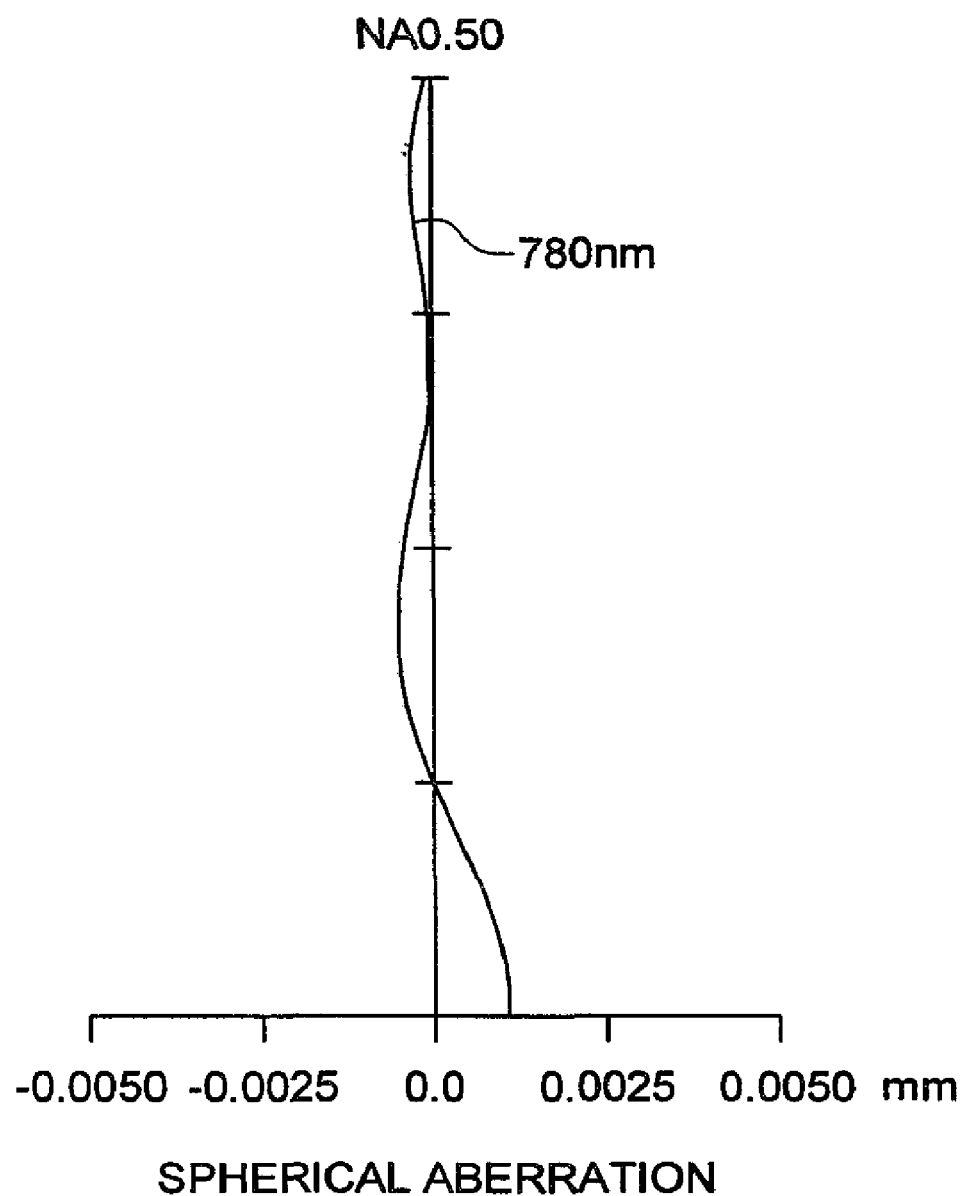

FIG. 67 is a spherical aberration view up to a numerical aperture 0.50 for λ3=780 nm of the objective lens of the light converging optical system in Example 2.

Figure 68:
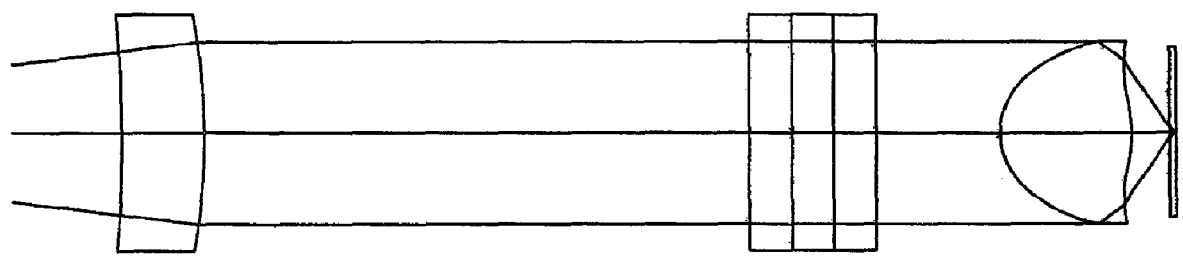

FIG. 68 is an optical path view at λ1=405 nm of a light converging optical system in Example 3.

Figure 69:
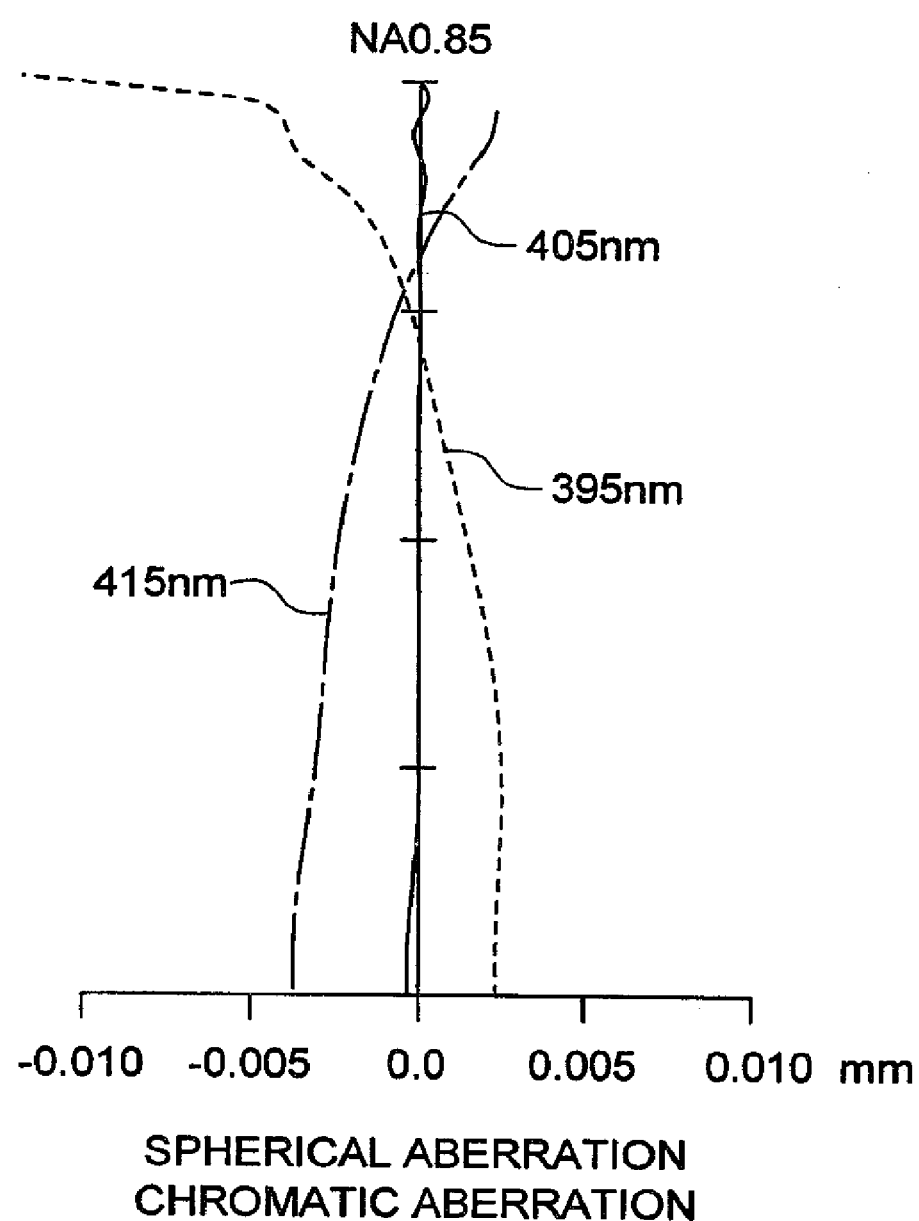

FIG. 69 is a spherical aberration view up to a numerical aperture 0.85 for λ1=405 nm±10 nm of the light converging optical system in Example 2.

Figure 70:
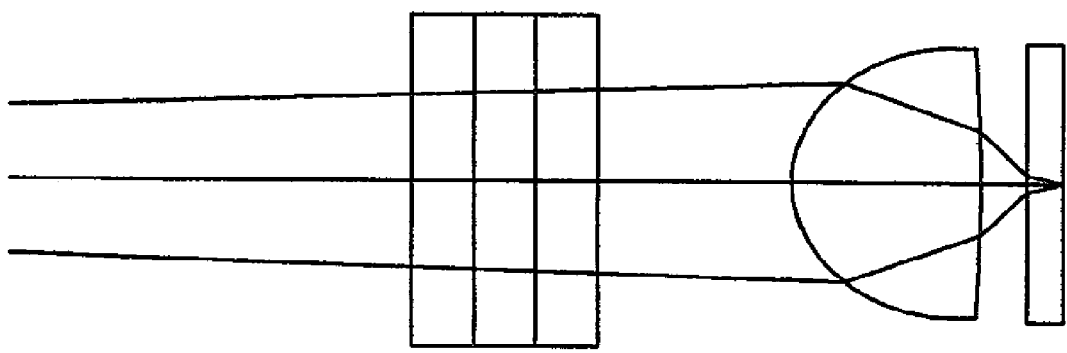

FIG. 70 is an optical path view at λ2=650 nm of the light converging optical system in Example 3.

Figure 71:
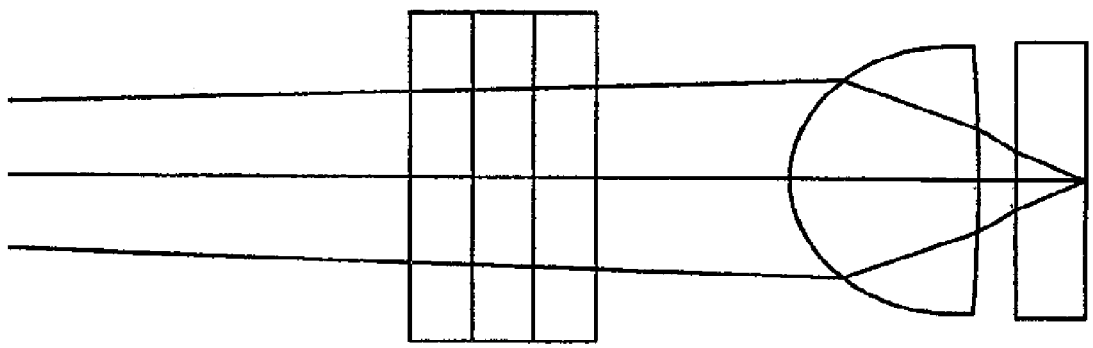

FIG. 71 is an optical path view at λ3=780 nm of the light converging optical system in Example 3.

Figure 72:
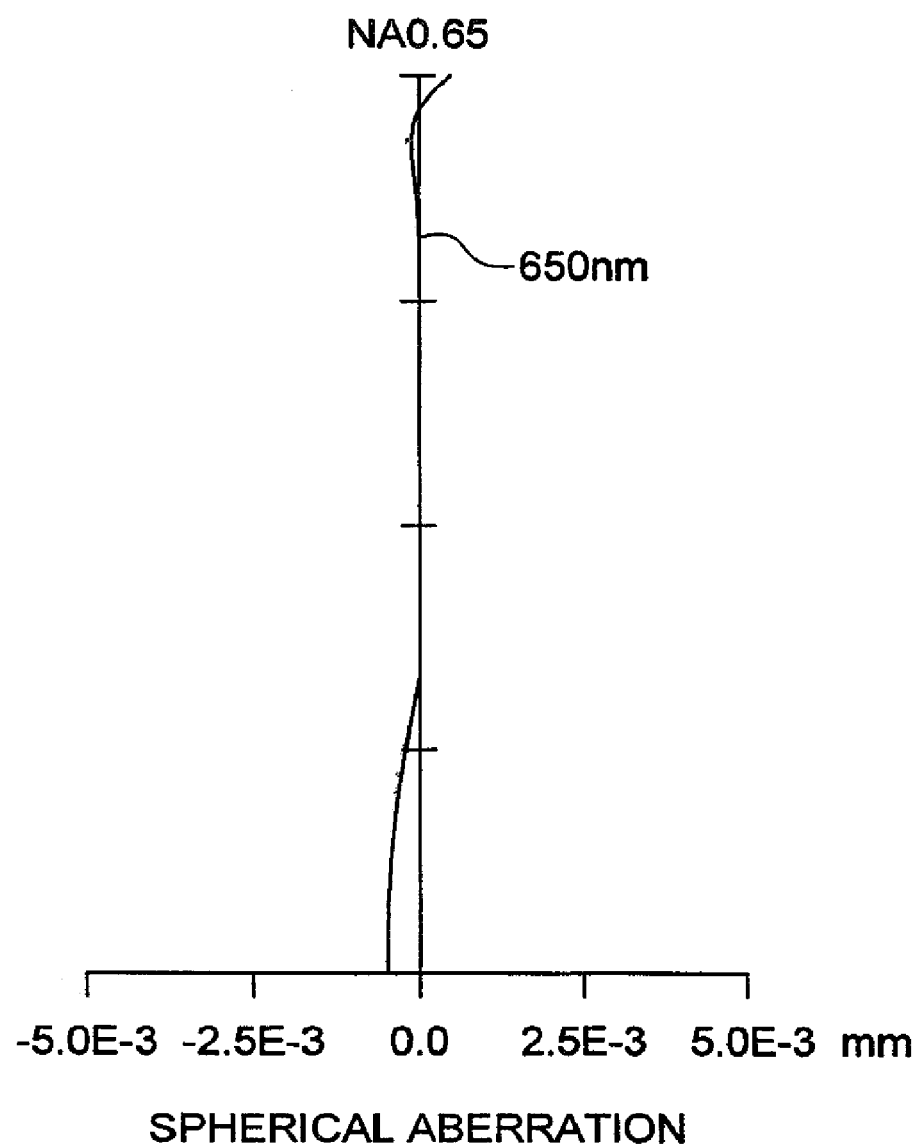

FIG. 72 is a spherical aberration view up to a numerical aperture 0.65 for λ2=650 nm of the light converging optical in Example 3.

Figure 73:
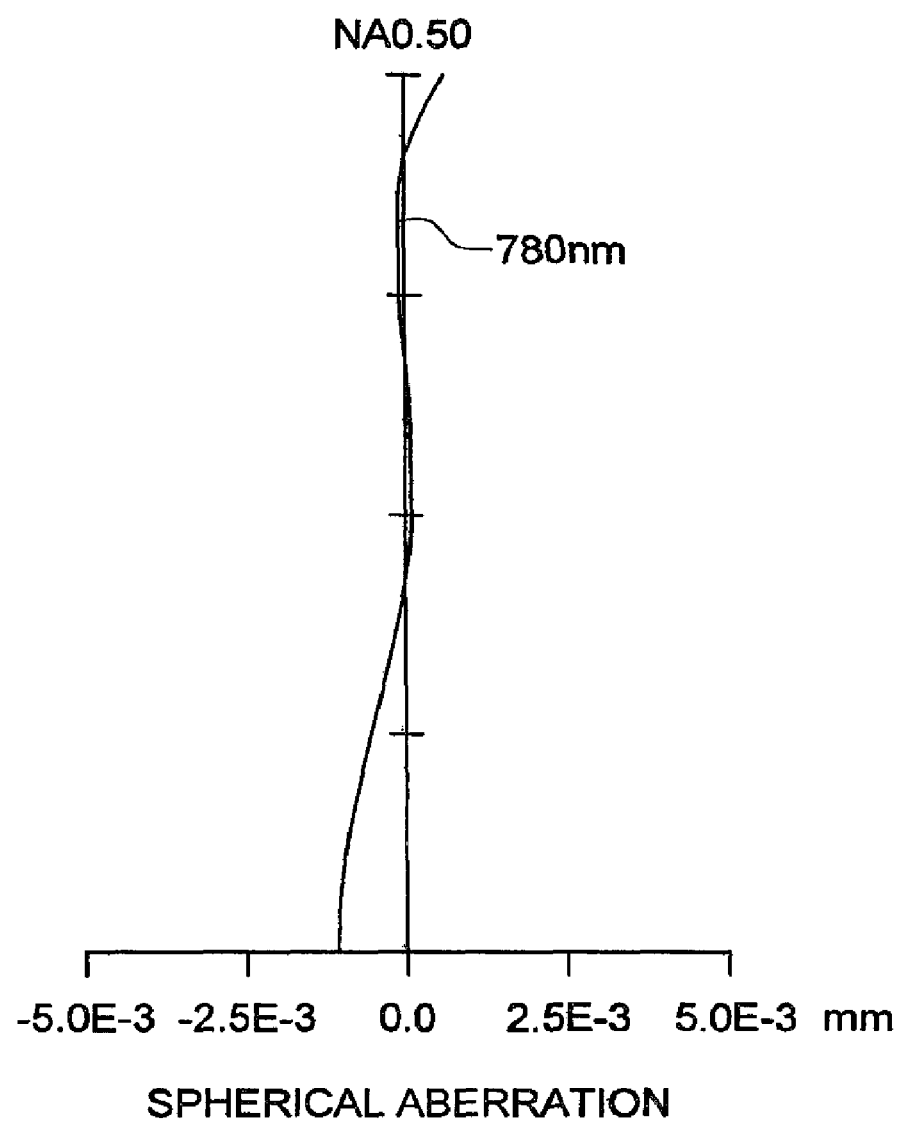

FIG. 73 is a spherical aberration view up to a numerical aperture 0.50 for λ3=780 nm of the light converging optical in Example 3.

Figure 74:
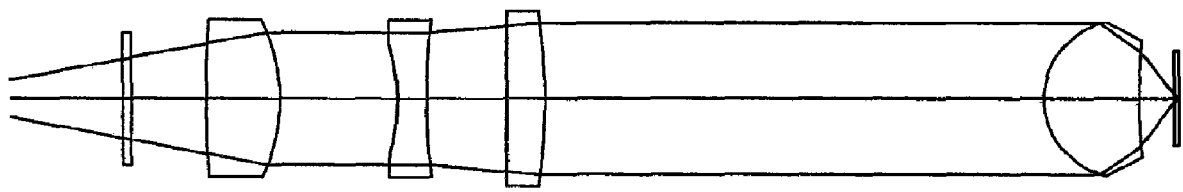

FIG. 74 is an optical path view at λ1=405 nm of a light converging optical system in Example 4.

Figure 75:
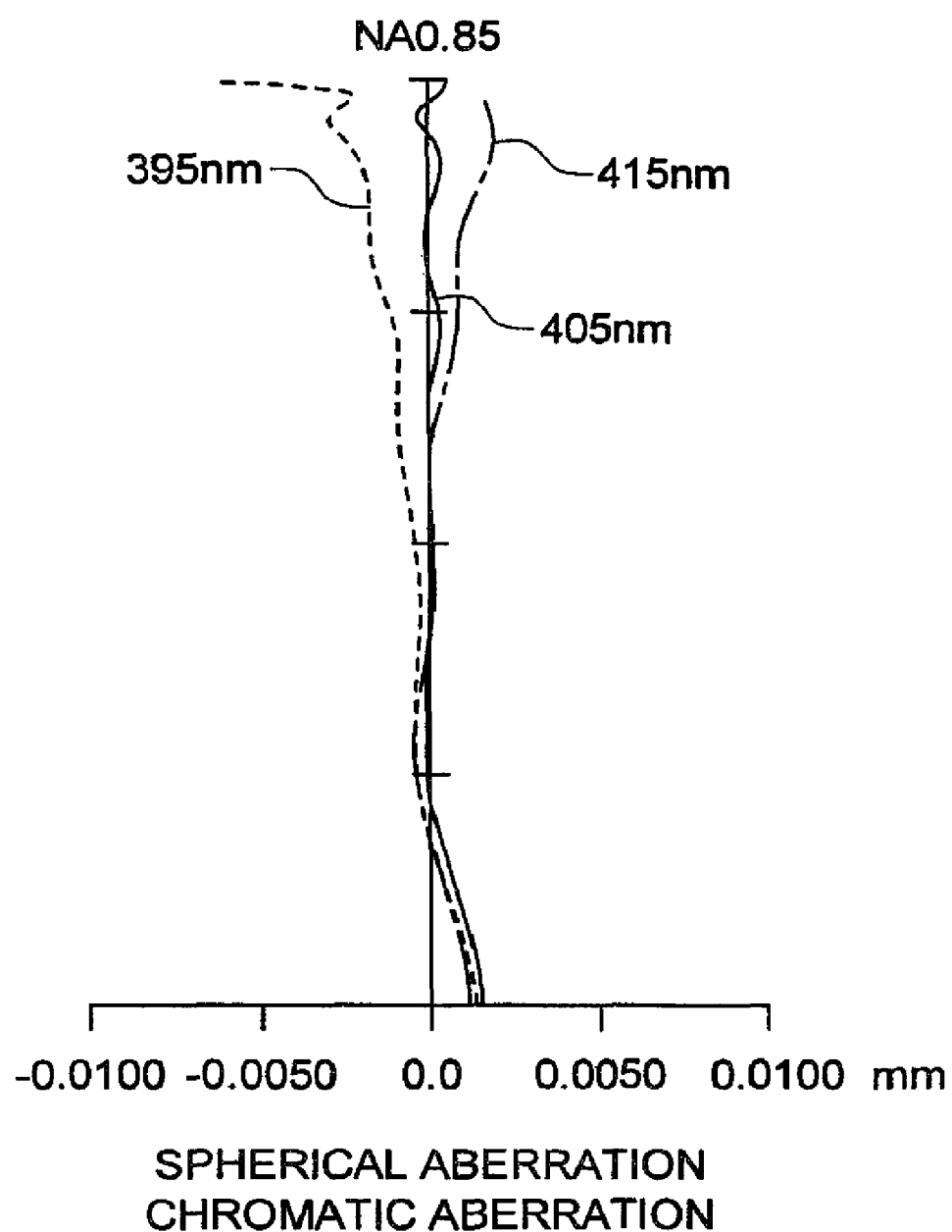

FIG. 75 is a spherical aberration view up to a numerical aperture 0.85 for λ1=405 nm±10 nm of the light converging optical system in Example 4.

Figure 76:
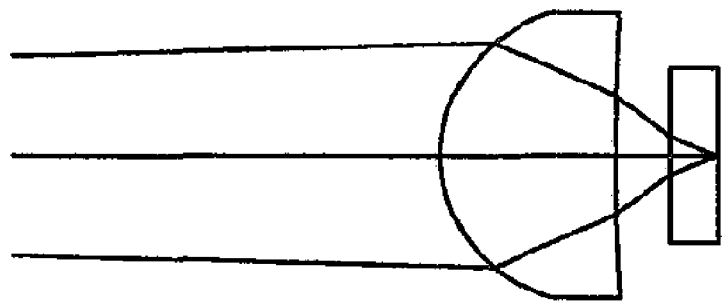

FIG. 76 is an optical path view at λ2=650 nm of the objective lens of the light converging optical system in Example 4.

Figure 77:
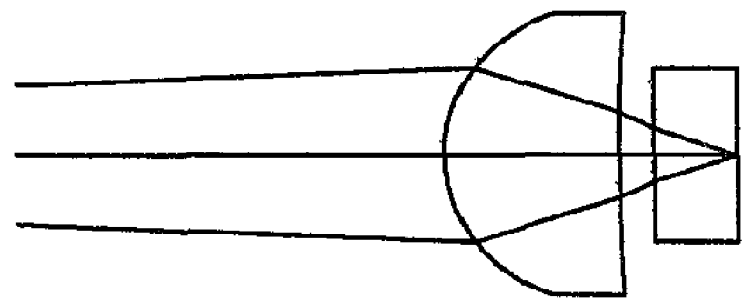

FIG. 77 is an optical path view at λ3=780 nm of the objective lens of the light converging optical system in Example 4.

Figure 78:
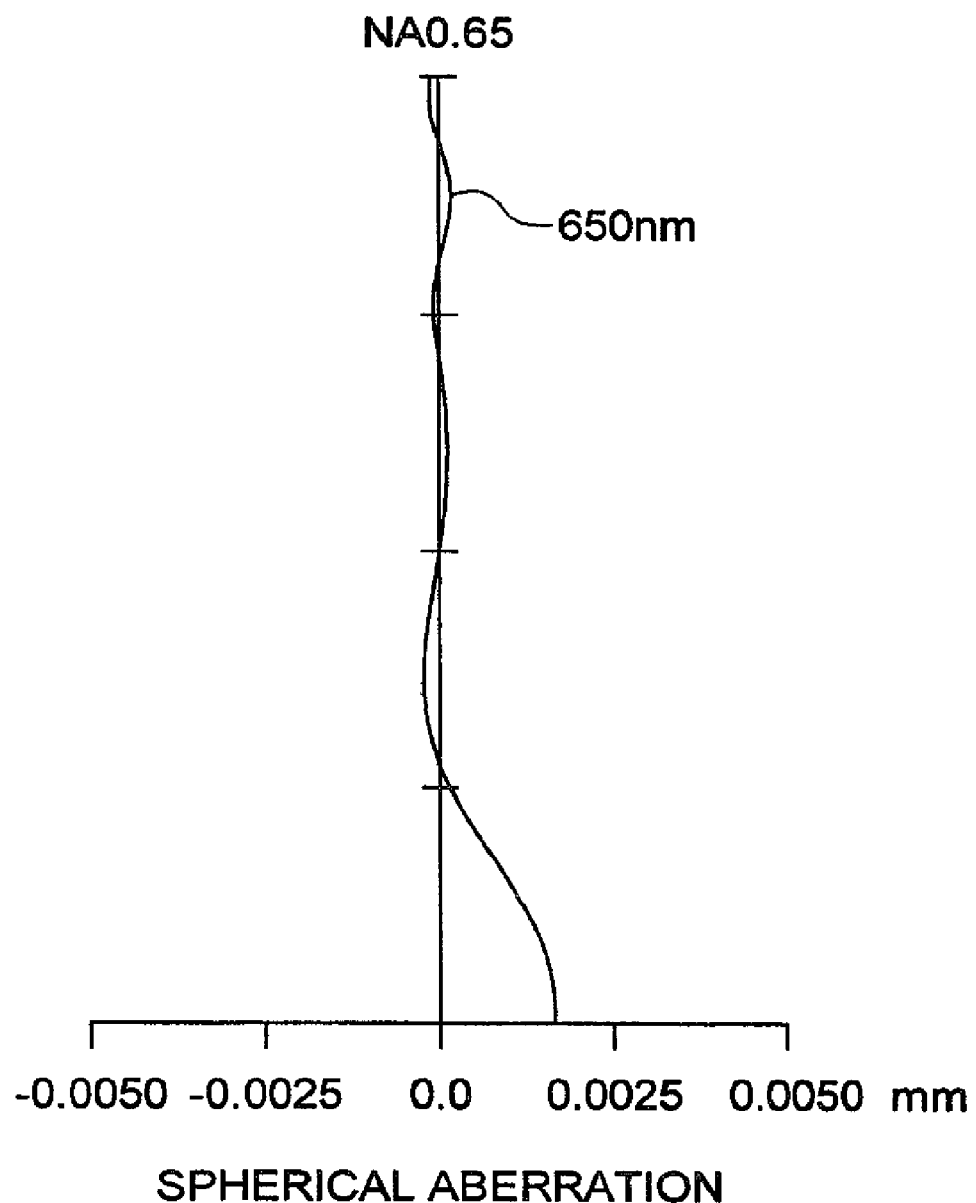

FIG. 78 is a spherical aberration view up to a numerical aperture 0.65 for λ2=650 nm of the light converging optical in Example 4.

Figure 79:
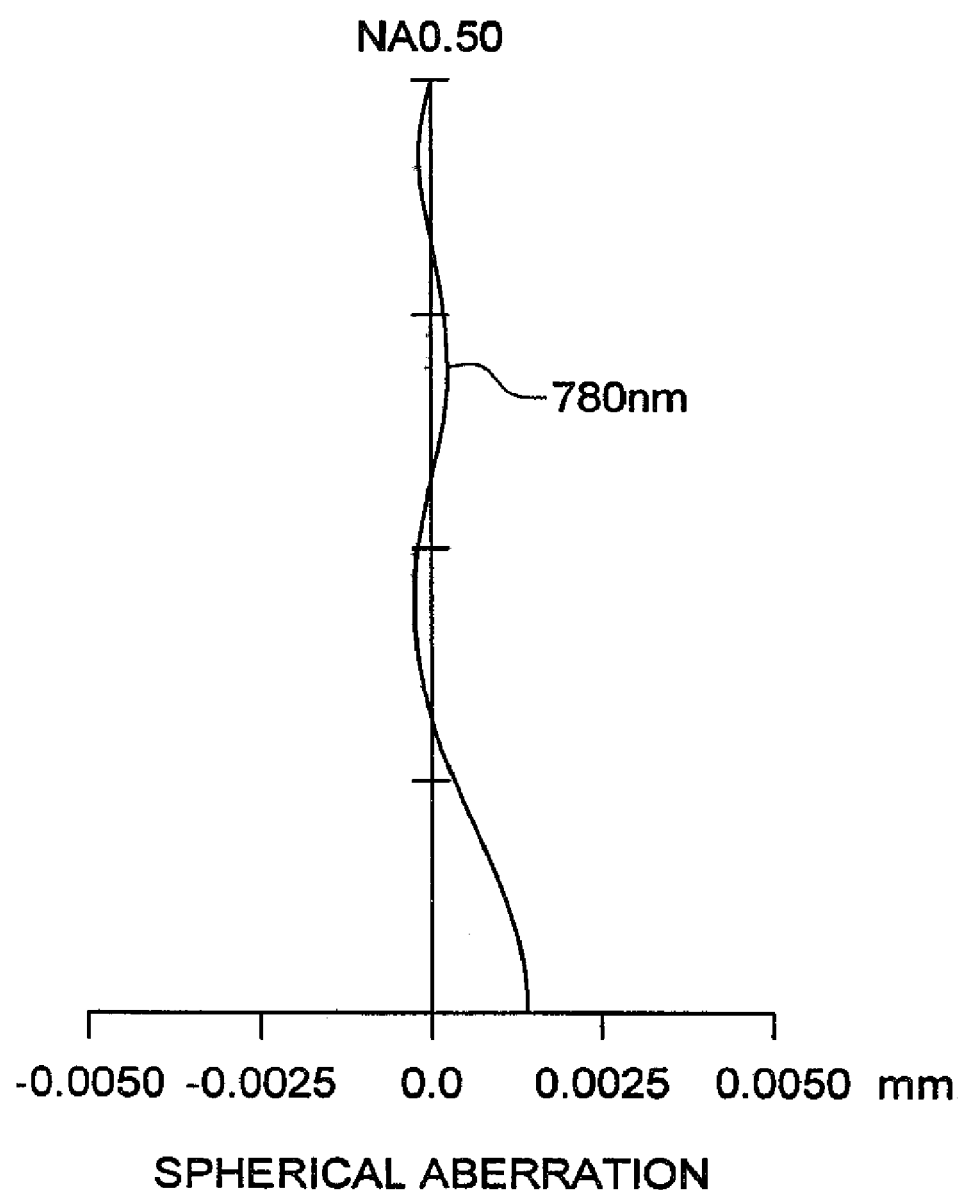

FIG. 79 is a spherical aberration view up to a numerical aperture 0.50 for λ3=780 nm of the light converging optical in Example 4.

Figure 80:
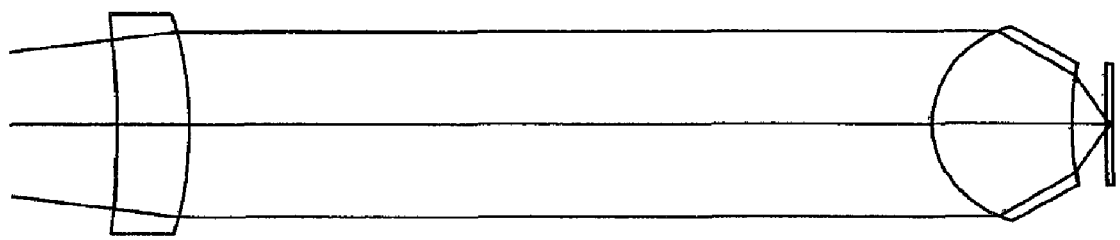

FIG. 80 is an optical path view at λ1=405 nm of the light converging optical system in Example 5.

Figure 81:
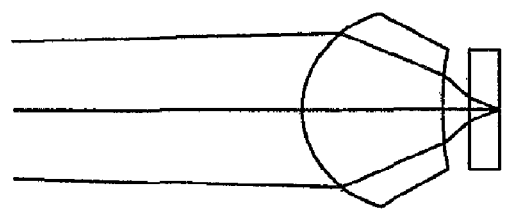

FIG. 81 is an optical path view at λ2=650 nm of the light converging optical system in Example 5.

Figure 82:
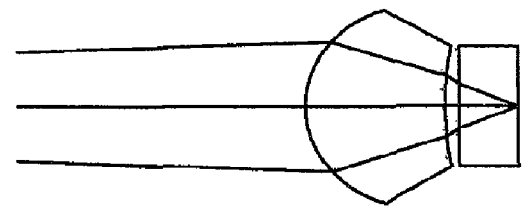

FIG. 82 is an optical path view at λ3=780 nm of the light converging optical system in Example 5.

Figure 83:
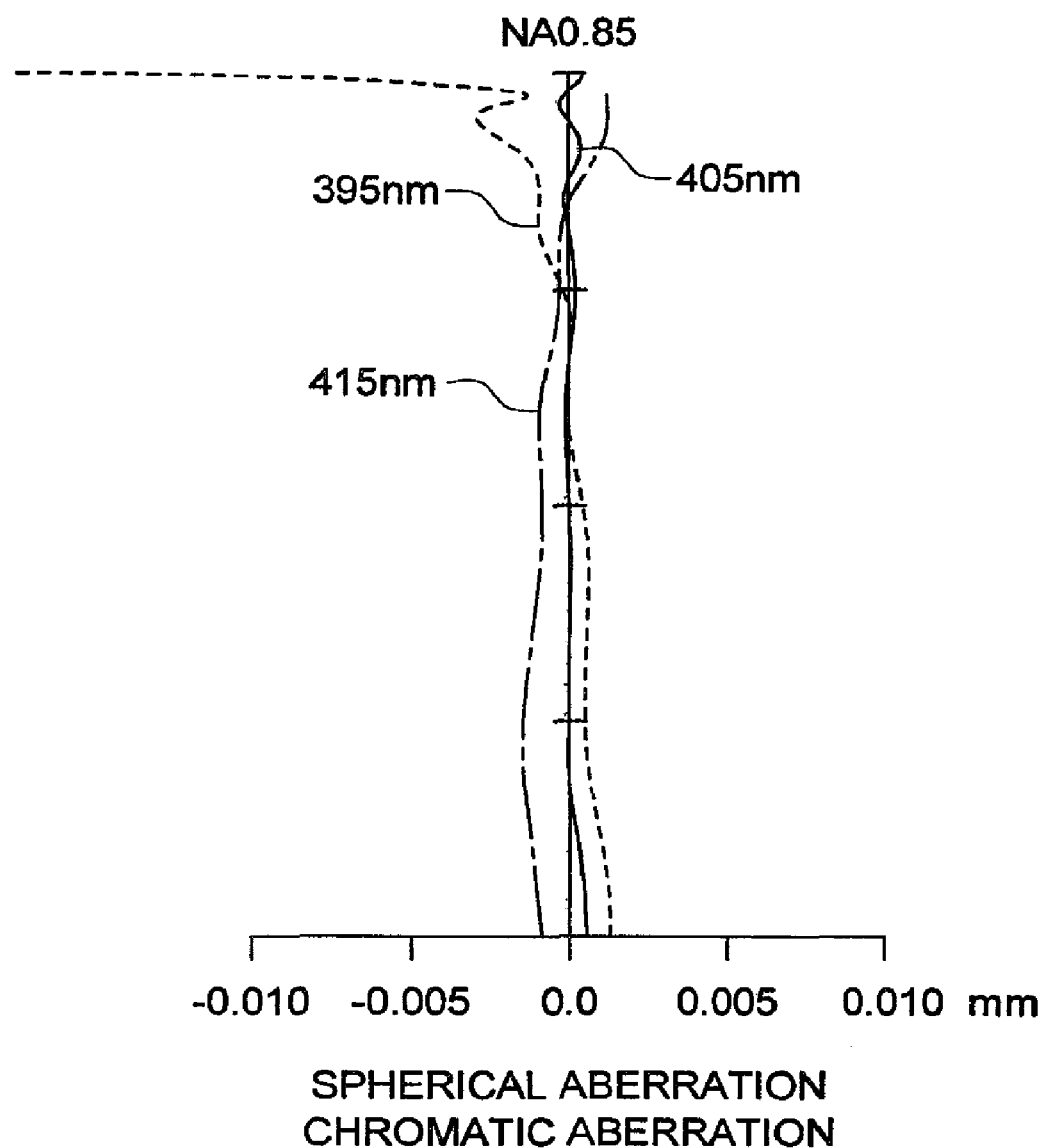

FIG. 83 is a spherical aberration view up to a numerical aperture 0.85 for λ1=405 nm±10 nm of the light converging optical system in Example 5.

Figure 84:
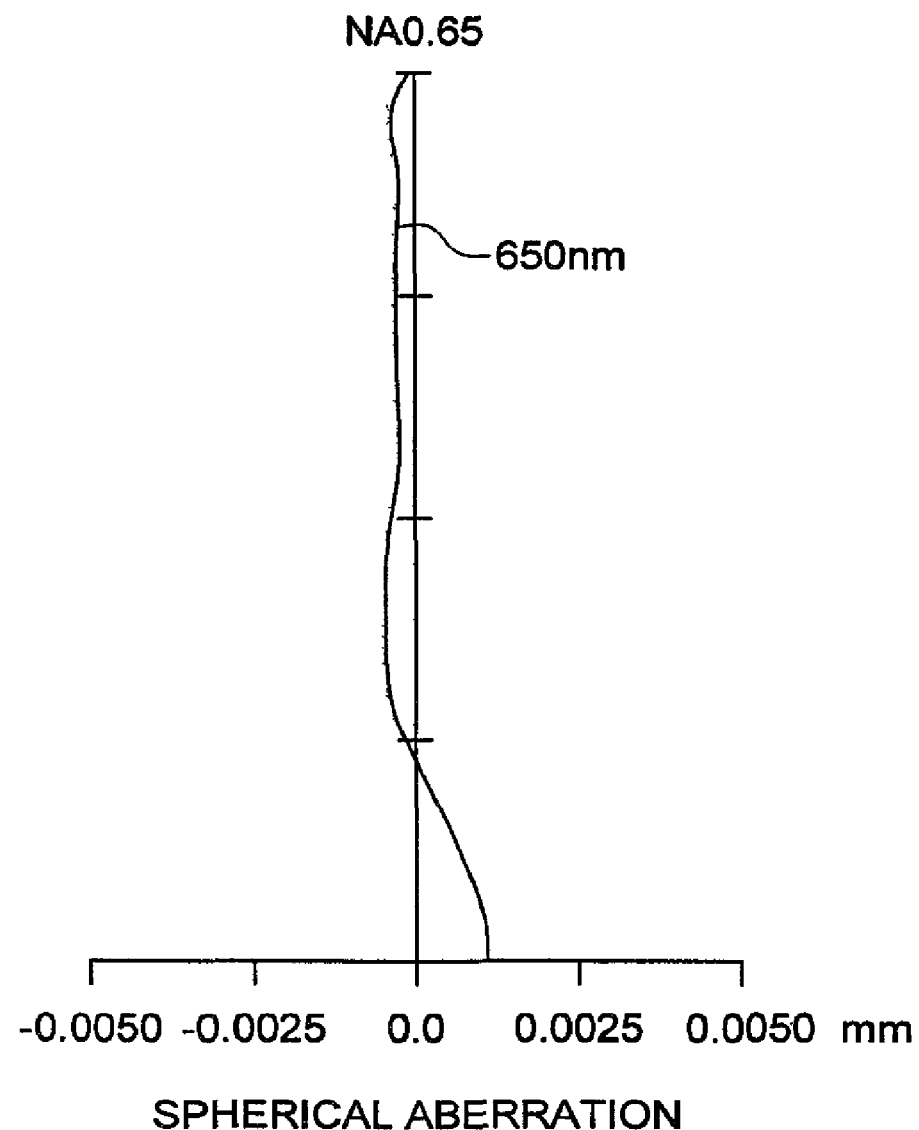

FIG. 84 is a spherical aberration view up to a numerical aperture 0.65 for λ2=650 nm of the light converging optical in Example 5.

Figure 85:
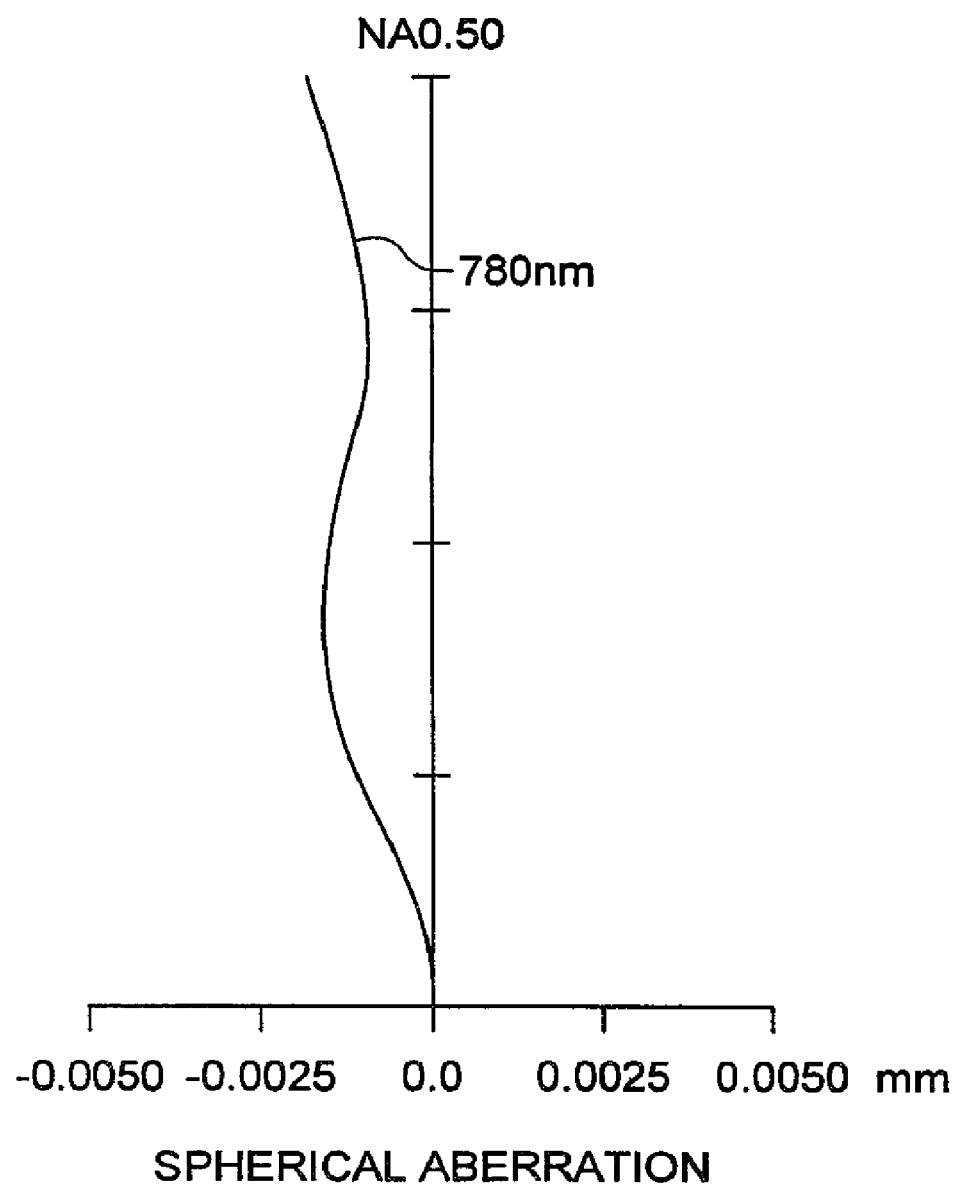

FIG. 85 is a spherical aberration view up to a numerical aperture 0.50 for λ3=780 nm of the light converging optical in Example 5.

Figure 86:
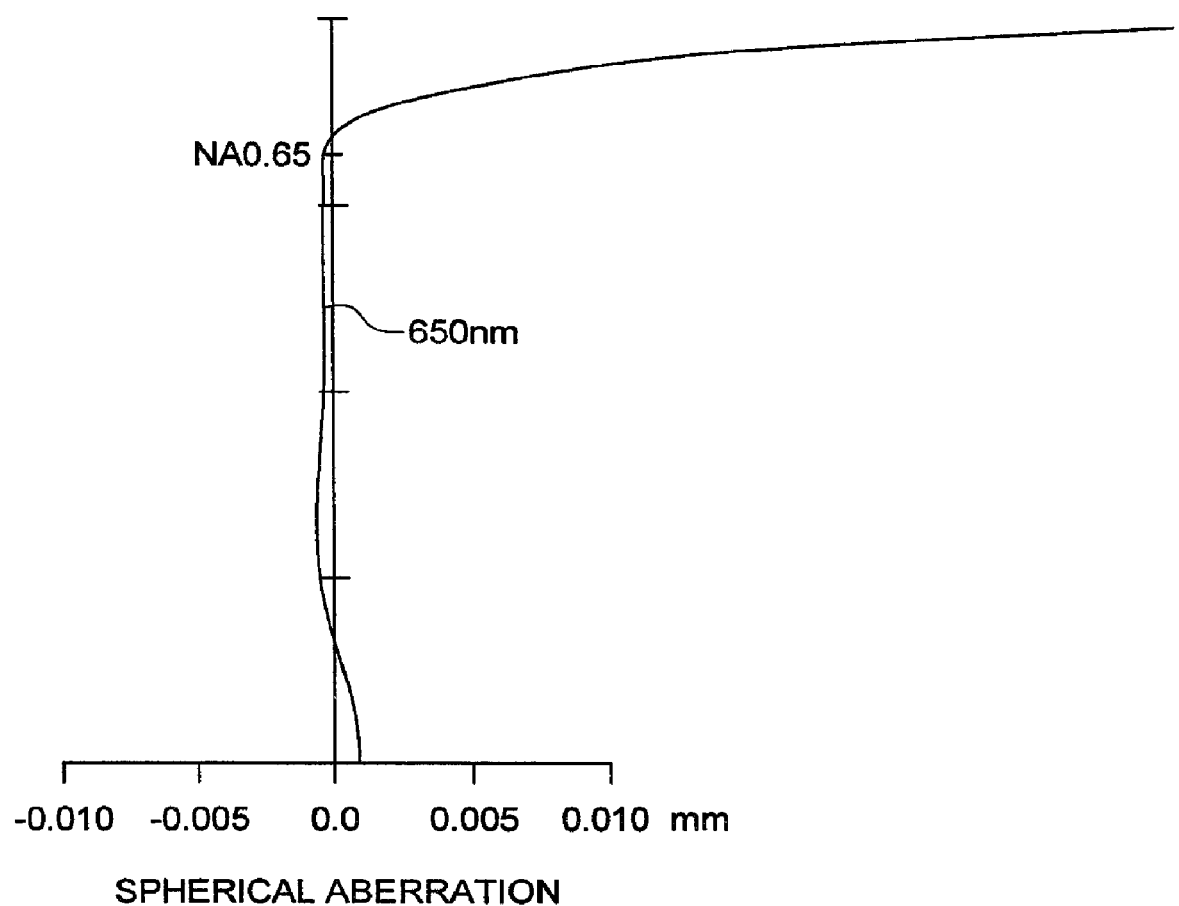

FIG. 86 is a spherical aberration view when the light of λ2=650 nm of the light flux diameter equal to the diaphragm diameter determined by a combination of λ1=405 nm and NA1 0.85 in the light converging optical system in Example 5 is incident on it.

Figure 87:
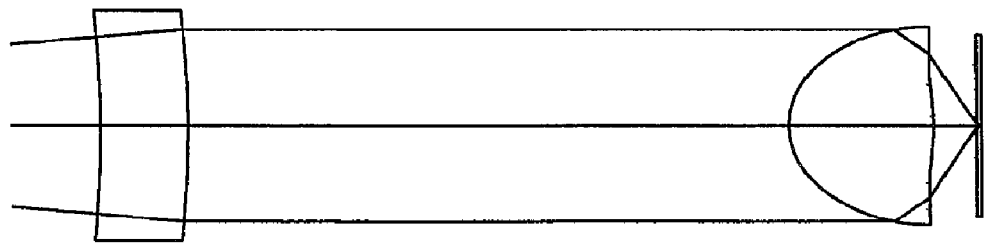

FIG. 87 is an optical path view at λ1=405 nm of the light converging optical system in Example 6.

Figure 88:
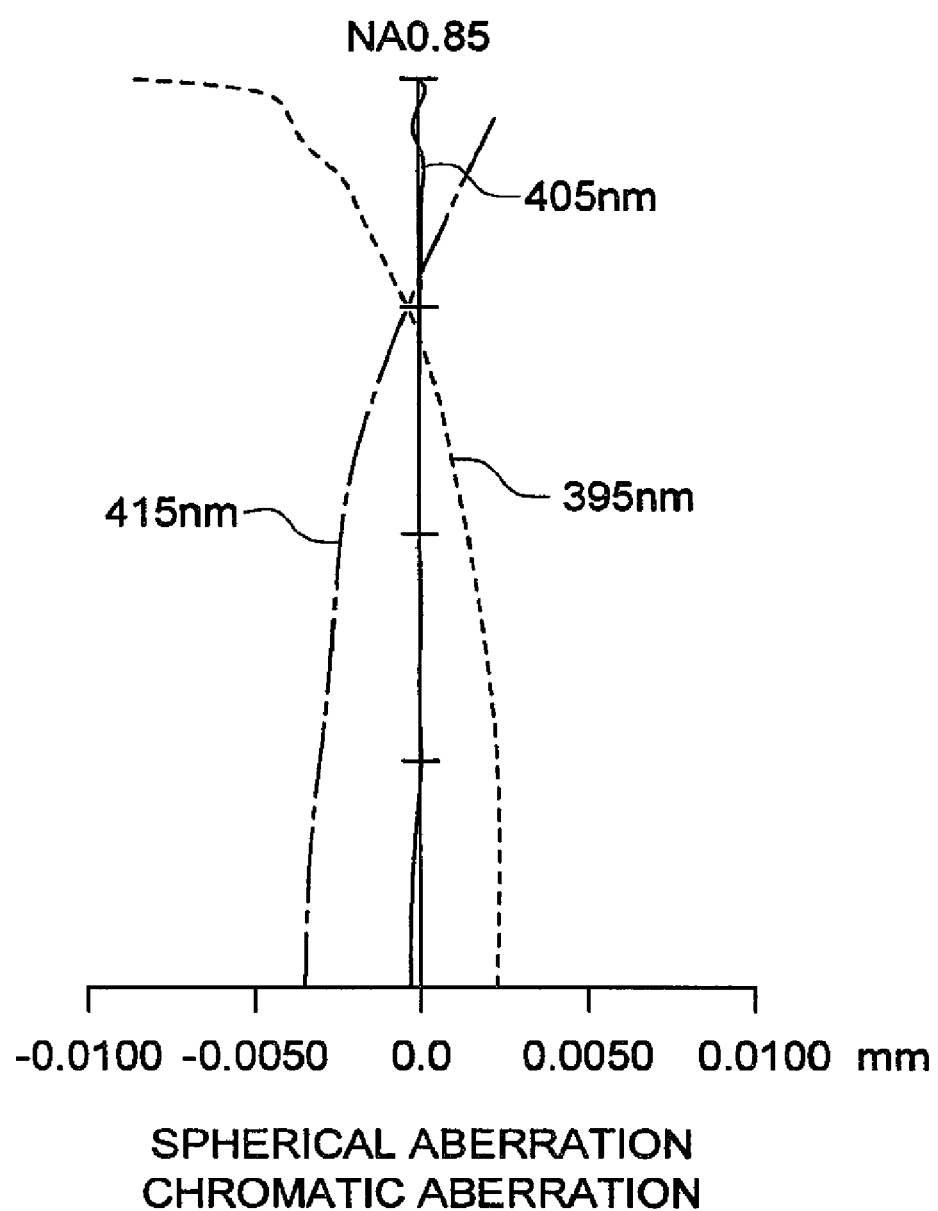

FIG. 88 is a spherical aberration view up to a numerical aperture 0.85 for λ1=405 nm±10 nm of the light converging optical system in Example 6.

Figure 89:
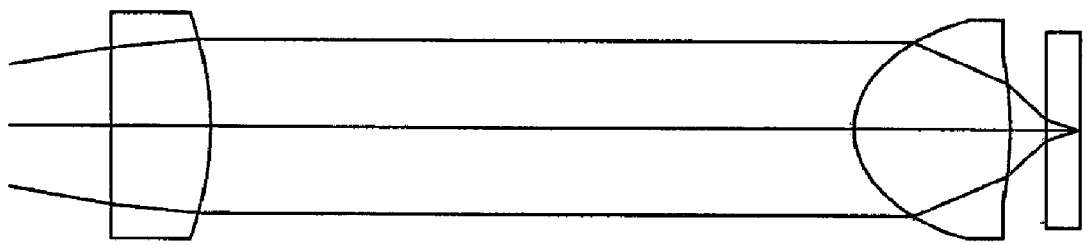

FIG. 89 is an optical path view at λ2=650 nm of the light converging optical system in Example 6.

Figure 90:
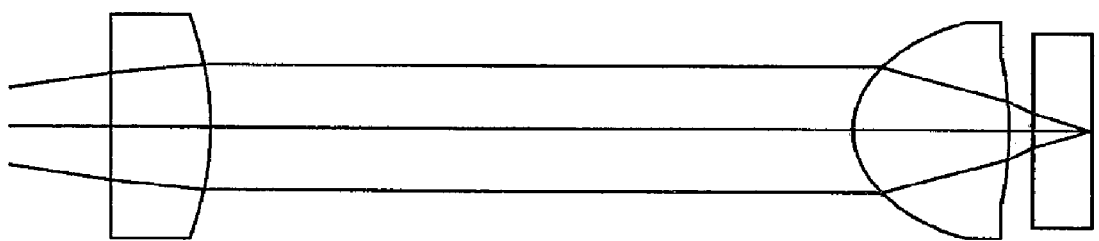

FIG. 90 is an optical path view at λ3=780 nm of the light converging optical system in Example 6.

Figure 91:
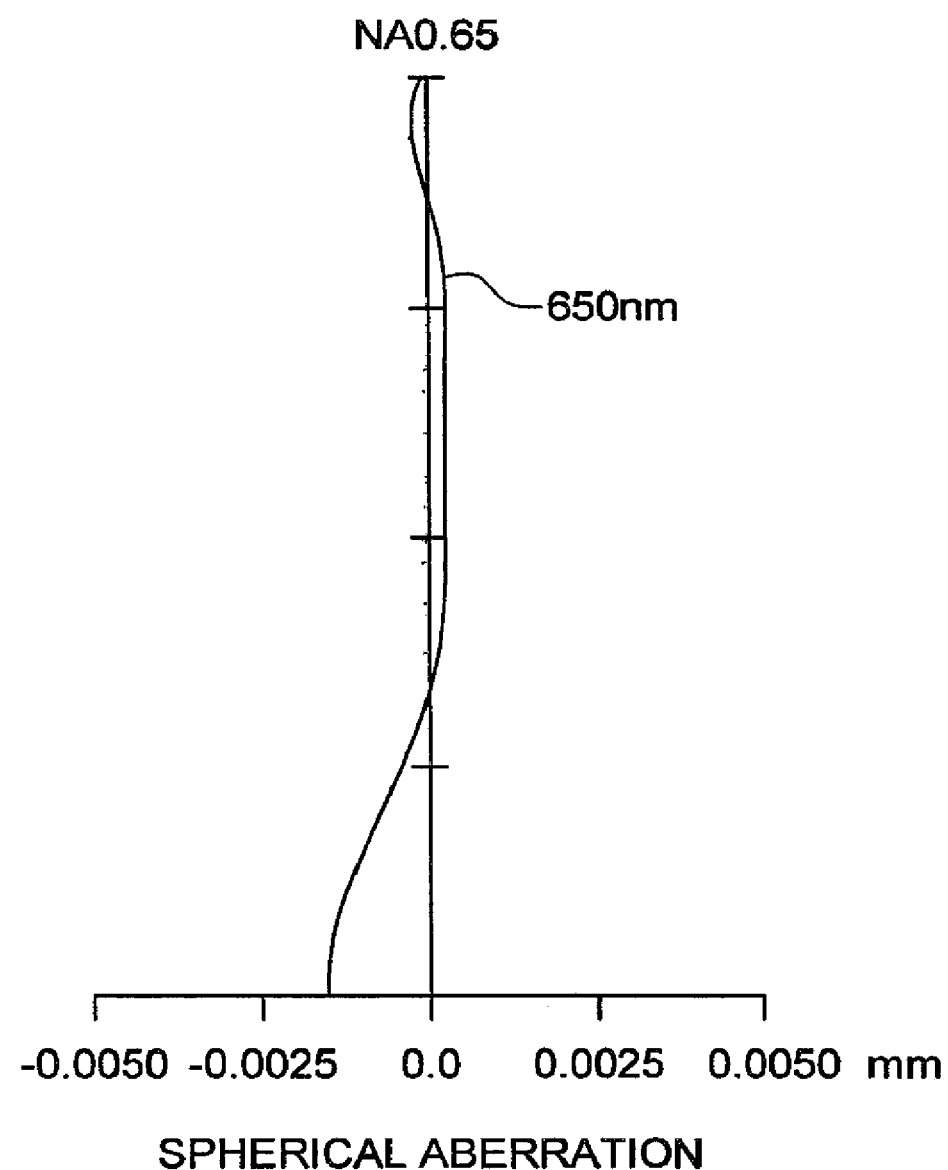

FIG. 91 is a spherical aberration view up to a numerical aperture 0.65 for λ2=650 nm of the light converging optical in Example 6.

Figure 92:
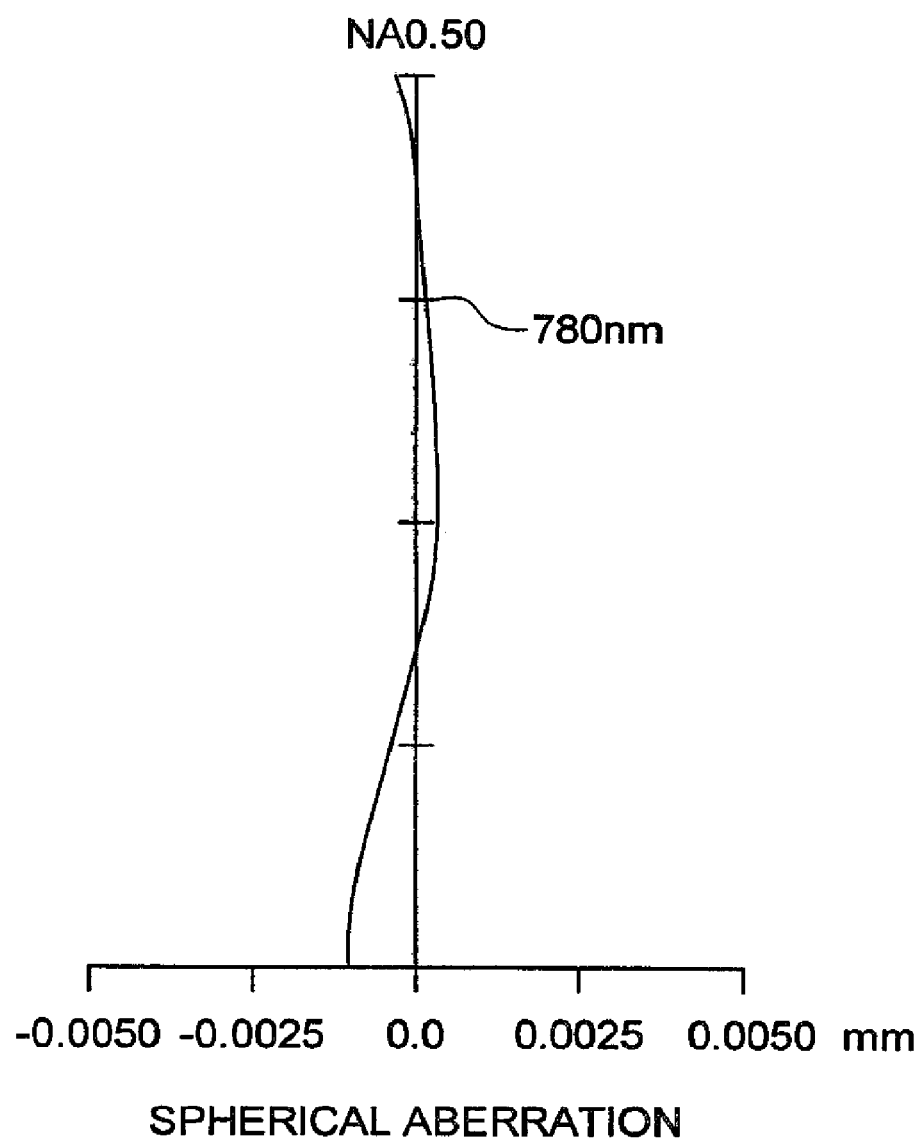

FIG. 92 is a spherical aberration view up to a numerical aperture 0.50 for λ3=780 nm of the light converging optical in Example 6.

Figure 93:
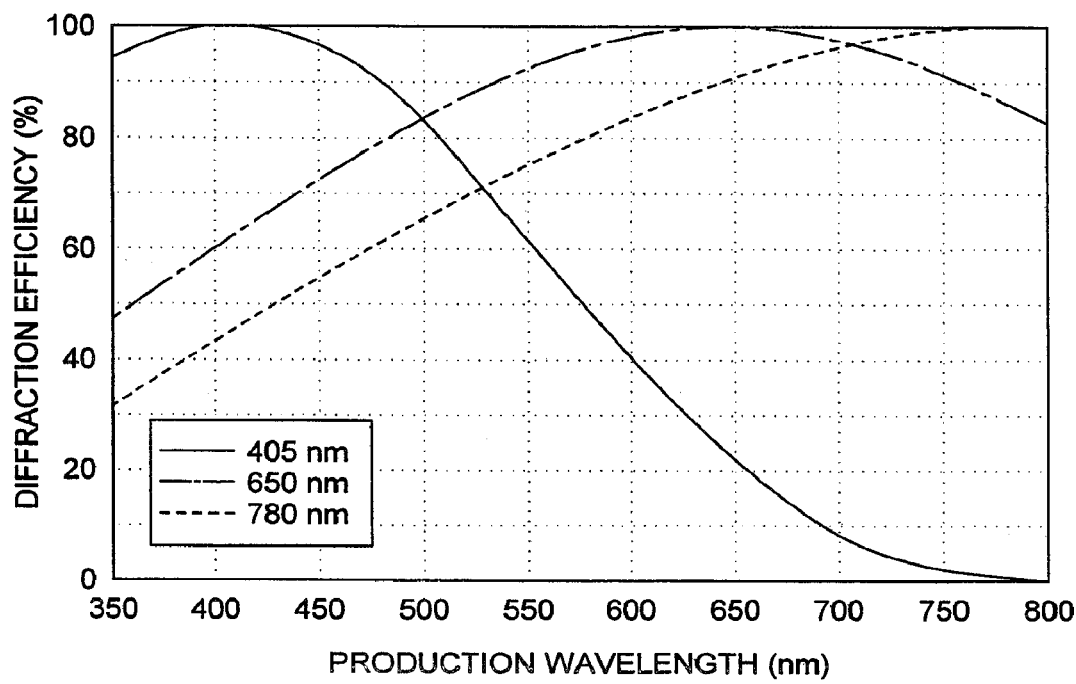

FIG. 93 is a view expressing the dependency on the production wavelength of the diffraction efficiency of the first order diffracted ray of the light of the wavelength 405 nm generated in the blazed structure optimized by the production wavelength λB and the diffraction order 1, the first order diffracted ray of the light of the wavelength 650 nm, and the first order diffracted ray of the light of the wavelength 780 nm.

Figure 94:
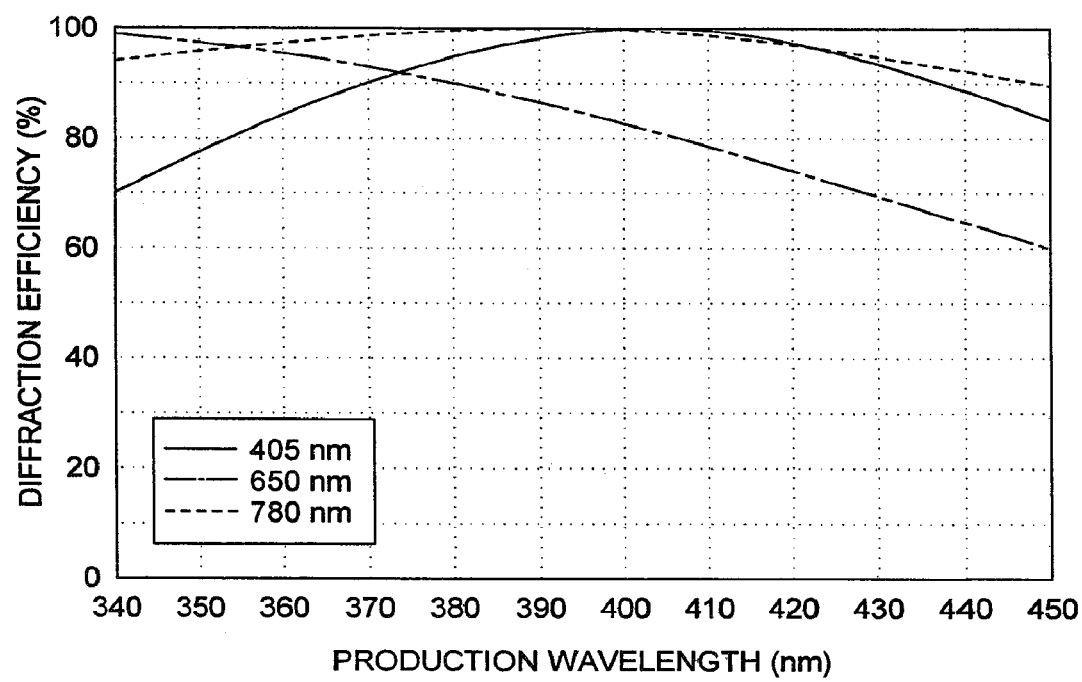

FIG. 94 is a view expressing the dependency on the production wavelength of the diffraction efficiency of the second order diffracted ray of the light of the wavelength 405 nm generated in the blazed structure optimized by the production wavelength λB satisfying 340 nm≦λB≦450 nm and the diffraction order 2, the first order diffracted ray of the light of the wavelength 650 nm, and the first order diffracted ray of the light of the wavelength 780 nm.

Figure 95:
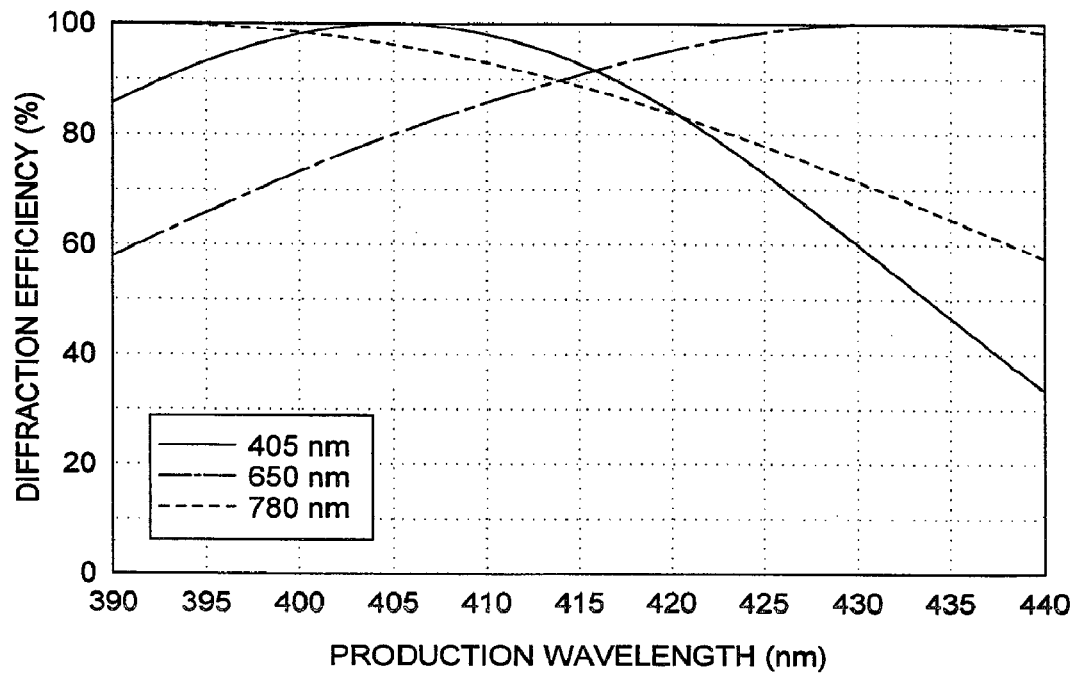

FIG. 95 is a view expressing the dependency on the production wavelength of the diffraction efficiency of the sixth order diffracted ray of the light of the wavelength 405 nm generated in the blazed structure optimized by the production wavelength λB satisfying 390 nm≦λB≦440 nm and the diffraction order 6, the fourth order diffracted ray of the light of the wavelength 650 nm, and the third order diffracted ray of the light of the wavelength 780 nm.

Figure 96:
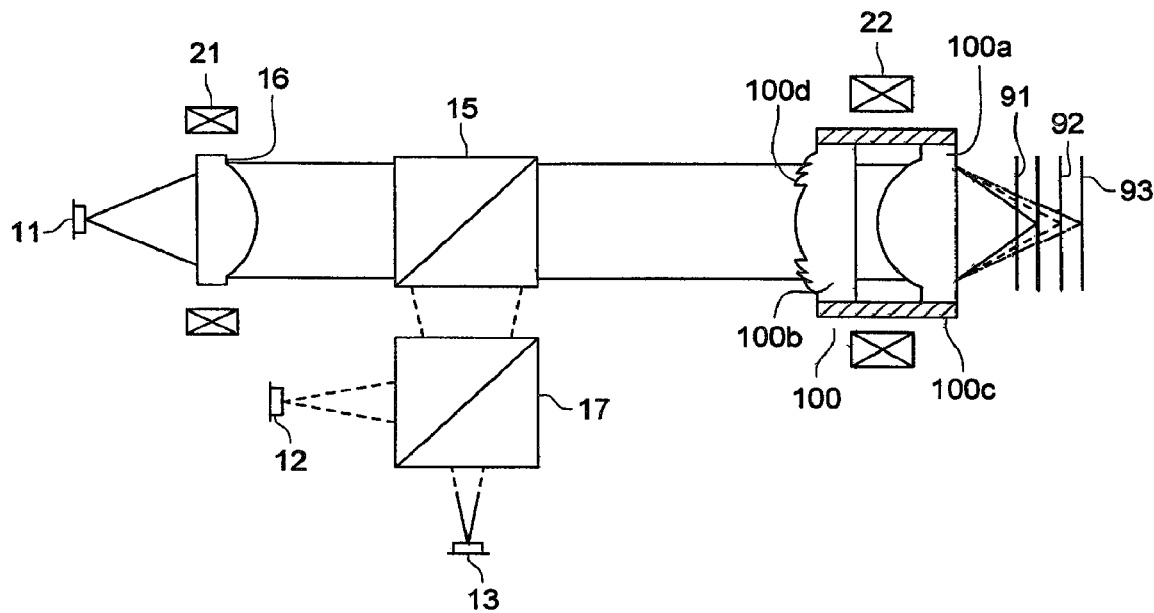

FIG. 96 is a view generally showing the eighth optical pick-up apparatus according to the third embodiment.

Figure 97:
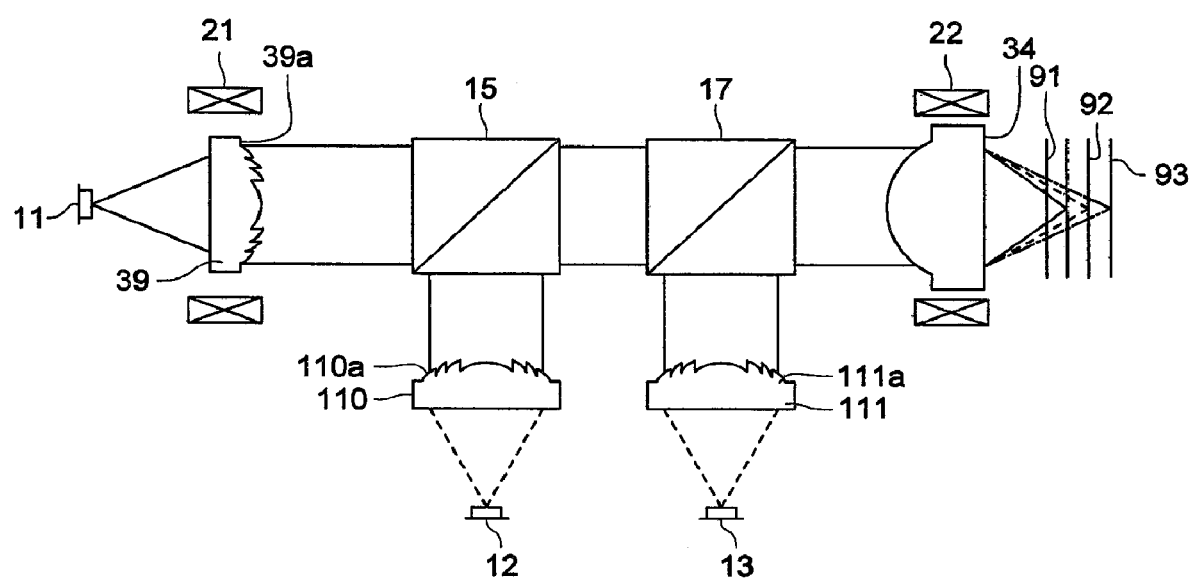

FIG. 97 is a view generally showing the ninth optical pick-up apparatus according to the fifth embodiment.

Figure 98:
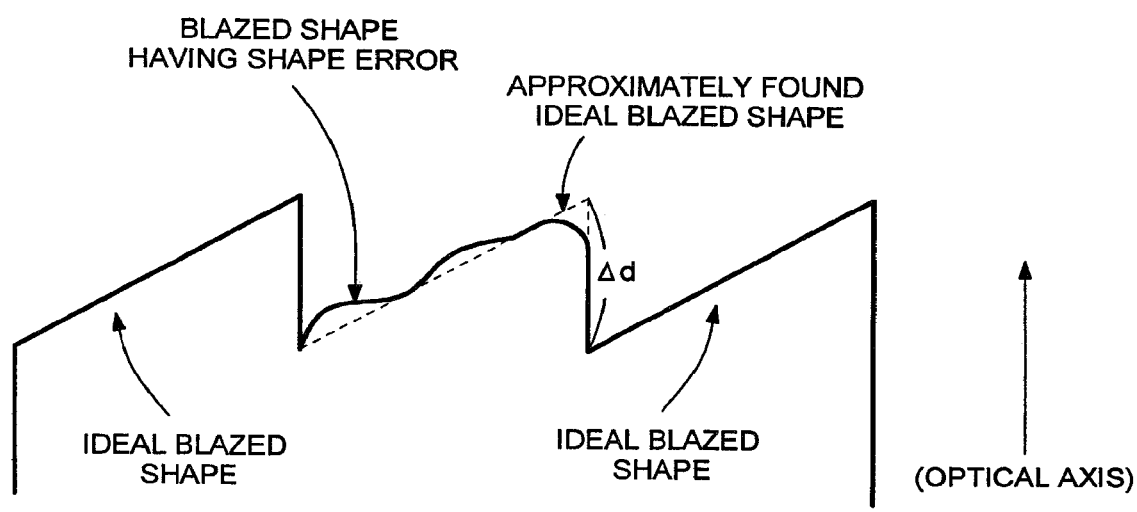

FIG. 98 is a view for explaining a step difference amount Δd in the axial direction when the ideal shape of the blaze is approximately found.

DETAILED DESCRIPTION OF THE PREFERRED EMBODIMENT

Embodiments of an objective lens in the invention will be explained as follows, referring to the drawings.

First Embodiment

Figure 1:
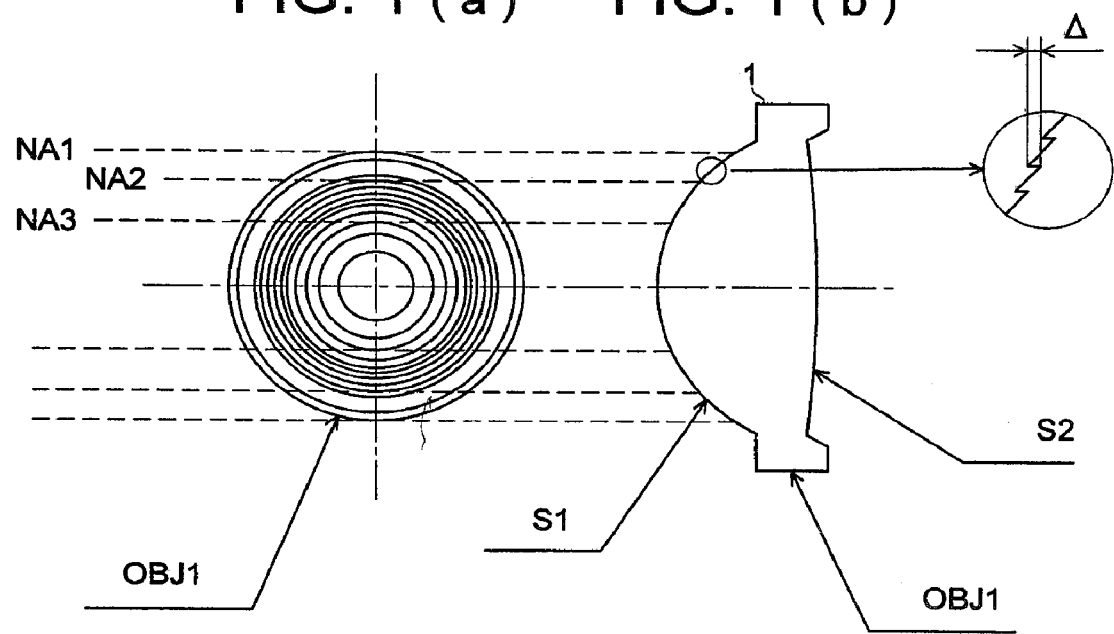
FIG. 1(a) is a front view of an objective lens of the present invention.
FIG. 1(b) is a side view of an objective lens of FIG. 1(A).
FIG. 1(c) is a enlarged partial side view of an objective lens of FIG. 1(a).

FIG. 1 is a schematic diagram showing objective lens OBJ1 of the present embodiment, and FIG. 1 (A) is a front view, FIG. 1 (B) is a side view and FIG. 1 (C) is a diagram wherein a side face is partially enlarged. This objective lens OBJ1 is an objective lens that is common to, for example, a high density optical disk such as a high density DVD using a short wavelength light source like a violet semiconductor laser, an optical disk meeting the DVD standard requirements such as DVD, DVD-ROM, DVD-RAM, DVD-R, DVD-RW, and DVD+RW which use a red semiconductor laser, and an optical disk meeting the CD standard requirements such as CD, CD-R, CD-RW, CD-Video and CD-ROM which use an infrared semiconductor laser, and it is applied to an optical pickup device for recording/reproducing compatibly, and has a function to converge a laser beam emitted from the light source on an information recording surface of the optical disk.

The objective lens OBJ1 is a single lens having two optical surfaces S1 and S2 each being an aspheric surface, and there is formed on optical surface S1 a diffractive structure in a form of ring-shaped zones whose centers are on the optical axis as shown in FIG. 1 (A). In this diffractive structure, there is provided step Δ on a boundary between ring-shaped zones in the optical axis direction as in Fresnel lens as shown in FIG. 1 (C). A laser beam entering the ring-shaped zone is diffracted in the direction determined by the width (in the present specification, the width in the direction perpendicular to the optical axis of the ring-shaped zone is called "ring-shaped zone pitch") in the direction perpendicular to the optical axis of the ring-shaped zone.

When the objective lens OBJ1 is made to be a plastic lens, a load on an actuator that drives the objective lens OBJ1 can be reduced because the objective lens OBJ1 is light in weight, and thereby, it is possible to conduct the following of the objective lens OBJ1 at high speed for focus error or for tracking error.

Further, the plastic lens can be manufactured accurately on a mass production basis through injection molding, by making the desired metal mold with high precision, thus, high effectiveness and low cost of the objective lens OBJ1 can be attained. Further, viscosity of plastic materials is low, and therefore, a diffractive structure which is of a minute construction can be transferred accurately, and it is possible to obtain an objective lens wherein a decline of diffraction efficiency caused by an error in forms is small.

On the other hand, when the objective lens OBJ1 is made to be a glass lens, it is hardly subject to the influence of changes in the refractive index caused by changes in temperatures. Therefore, even when a temperature of a pickup device is raised by radiation of heat from an actuator in the course of recording/reproducing for a high density optical disk, light-converging performance of the objective lens OBJ1 is not deteriorated. In addition, transmittance and light resistance of glass materials for the laser beam having a short wavelength of about 400 nm are usually high, which makes it possible to obtain a lens which has high reliability as an objective lens for a high density optical disk. When making the objective lens OBJ1 to be a glass lens, it is preferable to manufacture it through a molding method employing a metal mold, by using glass materials having glass transition point Tg of not more than 400° C. Due to this, it is possible to conduct molding at the temperature that is lower than that in ordinary glass materials, which is advantageous in terms of reduction of molding time and of longer life of a metal mold, resulting in realization of low cost of the objective lens 1 (OBJ1). As a glass material like this, there are available PG375 (trade name) and PG325 (trade name) made by Sumita Optical Glass Co.

Figure 2:
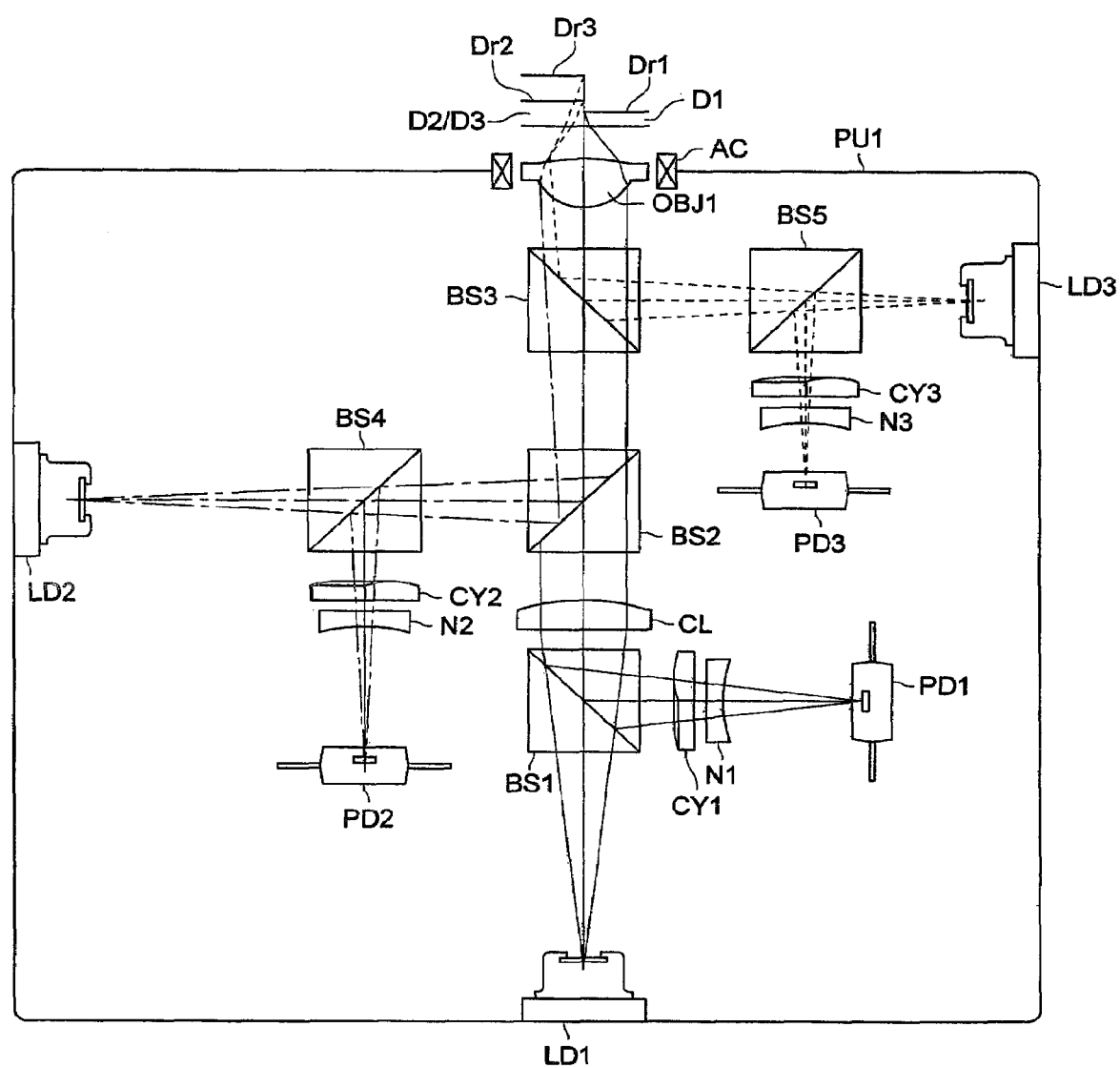
FIG. 2 is a schematic view of an optical pickup apparatus employing the objective lens of FIG. 1(a).

FIG. 2 is a schematic diagram showing optical pickup device PU1 employing the objective lens OBJ1. Optical disks in three types each having a different transparent substrate include first optical disk D1 representing high density DVD whose transparent substrate is thinnest and recording density is greatest, second optical disk D2 meeting the DVD standard requirements and has a transparent substrate with a thickness of 0.6 mm and third optical disk D3 meeting the CD standard requirements and has a transparent substrate with a thickness of 1.2 mm.

Optical pickup device PU1 is equipped with three types of semiconductors including semiconductor laser LD1 representing the first light source that emits light for recording/reproducing for the first optical disk D1, semiconductor laser LD2 representing the second light source that emits light for recording/reproducing for the second optical disk D2 and semiconductor laser LD3 representing the third light source that emits light for recording/reproducing for the third optical disk D3, and each of these semiconductor lasers is made to emit light selectively depending on an optical disk for recording/reproducing information.

The semiconductor laser LD1 is a GaN type violet laser that emits a laser beam with a wavelength of about 400 nm. As a light source for emitting a laser beam with a wavelength of about 400 nm, an SHG violet laser employing A second harmonic generation may be used in addition to the aforementioned GaN type violet laser. The semiconductor laser LD2 is a red semiconductor laser emitting a laser beam with a wavelength of about 650 nm and the semiconductor laser LD3 is an infrared semiconductor laser irradiating a laser beam with a wavelength of about 780 nm.

The objective lens OBJ1 is a lens that converges a collimated light flux that is emitted from semiconductor laser LD1 and collimated by collimator lens CL, on information recording surface Dr1 through a transparent substrate of optical disk D1, so that a diffraction limit may be kept within the first numerical aperture (NA1), then, converges a divergent light flux that is emitted from semiconductor laser LD2 on information recording surface Dr2 through a transparent substrate of optical disk D2, so that a diffraction limit may be kept within the second numerical aperture (NA2), and converges a divergent light flux that is emitted from semiconductor laser LD3 on information recording surface Dr3 through a transparent substrate of third optical disk D3, so that a diffraction limit may be kept within the third numerical aperture (NA3), and NA1 is made to be 0.80 or more, NA2 is made to be 0.60-0.70, and NA3 is made to be 0.45-0.55.

In the case of conducting recording/reproducing of information for the second optical disk D2 and third optical disk D3 as stated above, when divergent light fluxes emitted respectively from semiconductor laser LD2 and semiconductor laser LD3 are made to enter objective lens 1, it is possible to secure a sufficient working distance for the second optical disk D2 and third optical disk D3 both having a thick transparent substrate.

As shown in FIG. 1 (A), the diffractive structure formed on optical surface S1 of objective lens OBJ1 closer to the light source is divided into a common area corresponding to NA3 used for conducting recording/reproducing for all optical disks including the first optical disk D1 up to the third optical disk D3 in the direction from the optical axis toward the periphery, a first peripheral area corresponding to NA3–NA2 used for conducting recording/reproducing for the first optical disk D1 and second optical disk D2, and a second peripheral area corresponding to NA2–NA1 used for conducting recording/reproducing for the first optical disk D1.

The diffractive structure formed in the common area is made to be optimum so that a second order diffracted light may be generated at diffraction efficiency of 100% theoretically, when light with wavelength λB satisfying 350 nm<λB<420 nm enters. When a light flux emitted from semiconductor laser LD1 enters the diffractive structure determined in the aforesaid way, a second order diffracted light is generated to have the maximum amount of diffracted light, and the objective lens 1 converges this second order diffracted light on information recording surface Dr1 of the first optical disk D1 as a beam for recording/reproducing therefor. When a light flux emitted from semiconductor laser LD2 enters, a first order diffracted light is generated to have the maximum amount of diffracted light, and the objective lens 1 converges this first order diffracted light on information recording surface Dr2 of the second optical disk D2 as a beam for recording/reproducing therefor. When a light flux emitted from semiconductor laser LD3 enters, a first order diffracted light is generated to have the maximum amount of diffracted light, and the objective lens 1 converges this first order diffracted light on information recording surface Dr3 of the third optical disk D3 as a beam for recording/reproducing therefor.

By determining the order of a diffracted light which has the maximum amount of diffracted light and is generated by the diffractive structure formed in the common area as stated above, so that the following expressions are satisfied, it is possible to enhance diffraction efficiency for $n1^{th}$ order diffracted light, n2$^{th}$ order diffracted light and n3$^{th}$ order diffracted light, for the laser beams of semiconductor lasers LD1-LD3;

$$|n2|=INT(\lambda 1 \cdot |n1|/\lambda 2)$$

$$|n3|=INT(\lambda 1 \cdot |n1|/\lambda 3)$$

$$|n1|>|n2|\geq |n3|$$

$$|INT(\lambda 1 \cdot |n1|/\lambda 2)-(\lambda 1 \cdot |n1|/\lambda 2)|<0.4$$

$$|INT(\lambda 1 \cdot |n1|/\lambda 3)-(\lambda 1 \cdot |n1|/\lambda 3)|<0.4$$

(in the expressions, n1 represents integers other than 0 and ±1, INT($\lambda 1 \cdot |n1|/\lambda 2$) represents an integer obtained by rounding ($\lambda 1 \cdot |n1|/\lambda 2$) to the nearest whole number, and INT($\lambda 1 \cdot |n1|/\lambda 3$) represents an integer obtained by rounding ($\lambda 1 \cdot |n1|/\lambda 3$) to the nearest whole number.)

For example, when wavelengths of semiconductor lasers LD1, LD2 and LD3 are respectively 405 nm, 650 nm and 780 nm, if the wavelength of 375 nm is selected as λB, each diffraction efficiency of the beam for recording/reproducing for each optical disk is as follows.

Diffraction efficiency of second order diffracted light for 405 nm: 93.0%

Diffraction efficiency of first order diffracted light for 650 nm: 92.5%

Diffraction efficiency of first order diffracted light for 780 nm: 99.5%

The diffractive structure formed in the first peripheral area corresponding to NA3–NA2 is also made to be optimum so that a second order diffracted light may be generated at diffraction efficiency of 100% theoretically, when light with wavelength λB satisfying 350 nm<λB<420 nm enters, which is the same as in the diffractive structure formed in the common area.

Further, the diffracted light generated by the diffractive structure formed on the second peripheral area is used for conducting recording/reproducing for the first optical disk D1, and is not used for conducting recording/reproducing for the second optical disk D2 and the third optical disk D3. Therefore, the diffraction efficiency of the light flux emitted from semiconductor laser LD1 is important in the second peripheral area. Accordingly, the diffractive structure formed on the second peripheral area is optimized so that the second order diffracted light may be generated at diffraction efficiency that is 100% theoretically when light with the same wavelength as in semiconductor laser LD1 enters the diffractive structure formed on the second peripheral area.

The diffractive structure formed in the common area may also be optimized so that 6$^{th}$ order diffracted light may be generated at diffraction efficiency that is theoretically 100% when light with wavelength λB satisfying 405 nm<λB<425 nm enters. When a light flux emitted from semiconductor laser LD1 enters the diffractive structure determined in the aforesaid way, a 6$^{th}$ order diffracted light is generated to have the maximum amount of diffracted light, when a light flux emitted from semiconductor laser LD2 enters, 4$^{th}$ order diffracted light is generated to have the maximum amount of diffracted light, and when a light flux emitted from semiconductor laser LD3 enters, 3$^{rd}$ order diffracted light is generated to have the maximum amount of diffracted light.

For example, when wavelengths of semiconductor lasers LD1, LD2 and LD3 are respectively 405 nm, 650 nm and 780 nm, if the wavelength of 415 nm is selected as λB, each diffraction efficiency of the beam for recording/reproducing for each optical disk is as follows.

Diffraction efficiency of 6$^{th}$ order diffracted light for 405 nm: 93.0%

Diffraction efficiency of 4$^{th}$ order diffracted light for 650 nm: 90.9%

Diffraction efficiency of third order diffracted light for 780 nm: 88.4%

The diffractive structure formed in the common area may also be made to be optimum so that a 8$^{th}$ order diffracted light may be generated at diffraction efficiency of 100% theoretically, when light with wavelength λB satisfying 395 nm<λB<415 nm enters. When a light flux emitted from semiconductor laser LD1 enters the diffractive structure determined in the aforesaid way, a 8$^{th}$ order diffracted light is generated to have the maximum amount of diffracted light, when a light flux emitted from semiconductor laser LD2 enters, 5$^{th}$ order diffracted light is generated to have the maximum amount of diffracted light, and when a light flux emitted from semiconductor laser LD3 enters, 4$^{th}$ order diffracted light is generated to have the maximum amount of diffracted light.

For example, when wavelengths of semiconductor lasers LD1, LD2 and LD3 are respectively 405 nm, 650 nm and 780 nm, if the wavelength of 405 nm is selected as λB, each diffraction efficiency of the beam for recording/reproducing for each optical disk is as follows.

Diffraction efficiency of 8$^{th}$ order diffracted light for 405 nm: 100%

Diffraction efficiency of 5$^{th}$ order diffracted light for 650 nm: 99.9%

Diffraction efficiency of 4$^{th}$ order diffracted light for 780 nm: 92.5%

Diffractive structures formed on the first and second peripheral areas are determined so that great spherical aberration may be added to a light flux emitted from semiconductor laser LD3 that passes through the first and second peripheral areas and reaches information recording surface Dr3 of the third optical disk D3, and a light flux emitted from semiconductor laser LD3 passing through the first and second peripheral area becomes a flare component that does not contribute to formation of a spot used for recording/reproducing for the third optical disk D3.

In the same way, a diffractive structure formed on the second peripheral area is determined so that great spherical aberration may be added to a light flux emitted from semiconductor laser LD2 that passes through the second peripheral area and reaches an information recording surface of the second optical disk D2, and a light flux emitted from semiconductor laser LD2 passing through the second peripheral area becomes a flare component that does not contribute to formation of a spot used for recording/reproducing for the second optical disk D2.

When a light flux passing through the area that is farther than the numerical aperture used for conducting recording/reproducing for the second optical disk D2 and third optical disk D3 is given intentionally great spherical aberration and is made to be a flare component, an aperture is restricted automatically. It is therefore unnecessary to provide separately the diaphragms corresponding to NA2 and NA3, resulting in a simple structure of an optical pickup device, which is preferable.

Further, in the objective lens OBJ1, a diffracted light in the same order is used in each of the common area, the first peripheral area and the second peripheral area, as a beam for recording/reproducing for the first optical disk D1. However, a diffracted light that is in the different order may also be used in each area.

For example, in the common area and the first peripheral area, when its diffractive structure is determined so that second order diffracted light may have the maximum amount of diffracted light for the light flux emitted from semiconductor laser LD1, and in the second peripheral area, when its diffractive structure is determined so that $4^{th}$ order diffracted light may have the maximum amount of diffracted light for the light flux emitted from semiconductor laser LD1, it is possible to broaden a distance between adjoining ring-shaped zones in the diffractive structure in the second peripheral area, and thereby to prevent a decline of diffraction efficiency caused by errors in shapes of ring-shaped zones, compared with an occasion of using a second order diffracted light. In this case, an optical path difference between adjoining ring-shaped zones in the diffractive structure formed in the second peripheral area is 2.5 times the wavelength, for the light flux emitted from semiconductor laser LD2. Therefore, when the light flux emitted from semiconductor laser LD2 enters the diffractive structure formed on the second peripheral area, the second order diffracted light and the third order diffracted light which is diffracted at an angle greater than that of the second order diffracted light are generated with a similar amount of diffracted light. Therefore, the flare component by the light flux emitted from semiconductor laser LD2 passing through the second peripheral area is split into a flare component by the second order diffracted light and flare component by the third order diffracted light, and flare component intensity by diffracted light in each order can be made small, thus, it is possible to control detection errors for signals by optical detector PD2.

Further, in the common area and the first peripheral area, when its diffractive structure is determined so that second order diffracted light may have the maximum amount of diffracted light for the light flux emitted from semiconductor laser LD1, and in the second peripheral area, when its diffractive structure is determined so that $3^{rd}$ order diffracted light may have the maximum amount of diffracted light for the light flux emitted from semiconductor laser LD1, an optical path difference between adjoining ring-shaped zones in the diffractive structure formed in the second peripheral area is 1.5 times the wavelength, for the light flux emitted from semiconductor laser LD3. Therefore, when the light flux emitted from semiconductor laser LD3 enters the diffractive structure formed on the second peripheral area, the first order diffracted light and the second order diffracted light which is diffracted at an angle greater than that of the first order diffracted light are generated with a similar amount of diffracted light. Therefore, the flare component by the light flux emitted from semiconductor laser LD3 passing through the second peripheral area is split into a flare component by the first order diffracted light and flare component by the second order diffracted light, and flare component intensity by diffracted light in each order can be made small, thus, it is possible to control detection errors for signals by optical detector PD3.

When conducting recording/reproducing of information for the first optical disk D1, a divergent light flux emitted from semiconductor laser LD1 is made to be a collimated light flux by collimator lens CL after passing through polarization beam splitter BS1, and is converged on information recording surface Dr1 through a transparent substrate of the first optical disk D1 by objective lens OBJ1 to be a spot after passing through polarization beam splitter BS2, polarization beam splitter BS3 and an unillustrated diaphragm. The objective lens OBJ1 is subjected to focus control and tracking control conducted by actuator AC arranged in the circumference of the objective lens OBJ1.

Then, the reflected light flux modulated by information bits on information recording surface Dr1 passes again through objective lens OBJ1, a diaphragm, polarization beam splitter BS3 and polarization beam splitter BS2, and is made to be a converged light flux by collimator lens CL, then, is reflected by polarization beam splitter BS1, and passes through cylindrical lens CY1 and concave lens N1 to be given astigmatism, and is converged in optical detector PD1. Thus, it is possible to conduct recording/reproducing of information for the first optical disk D1 by using output signals of the optical detector PD1.

When conducting recording/reproducing of information for the second optical disk D2, a divergent light flux emitted from semiconductor laser LD2 is reflected by polarization beam splitter BS2 after passing through polarization beam splitter BS4, and passes through polarization beam splitter BS3 and an unillustrated diaphragm, to be converged to be a spot on information recording surface Dr2 through a transparent substrate of the second optical disk D2 by the objective lens OBJ1.

Then, the reflected light flux modulated by information bits on information recording surface Dr2 passes again through objective lens OBJ1, a diaphragm and polarization beam splitter BS3, then, is reflected by polarization beam splitter BS2, and then, is reflected by polarization beam splitter BS4 and passes through cylindrical lens CY2 and concave lens N2 to be given astigmatism, and is converged in optical detector PD2. Thus, it is possible to conduct recording/reproducing of information for the second optical disk D2 by using output signals of the optical detector PD2.

When conducting recording/reproducing of information for the third optical disk D3, a divergent light flux emitted from semiconductor laser LD3 is reflected by polarization beam splitter BS3 after passing through polarization beam splitter BS5, and passes through an unillustrated diaphragm, to be converged to be a spot on information recording surface Dr3 through a transparent substrate of the third optical disk D3 by the objective lens OBJ1.

Then, the reflected light flux modulated by information bits on information recording surface Dr3 passes again through objective lens OBJ1 and a diaphragm, and passes through cylindrical lens CY3 and concave lens N3 to be given astigmatism after being reflected by polarization beam splitter BS3 and polarization beam splitter BS5, and is converged in optical detector PD3. Thus, it is possible to conduct recording/reproducing of information for the third optical disk D3 by using output signals of the optical detector PD3.

Further, in the optical pickup device PU1, there is provided an unillustrated ¼-wavelength plate in each of optical paths respectively between semiconductor laser LD1 and objective lens OBJ1, between semiconductor laser LD2 and objective lens OBJ1 and between semiconductor laser LD3 and objective lens OBJ1.

Second Embodiment

Figures 3A, 3B, 3C:
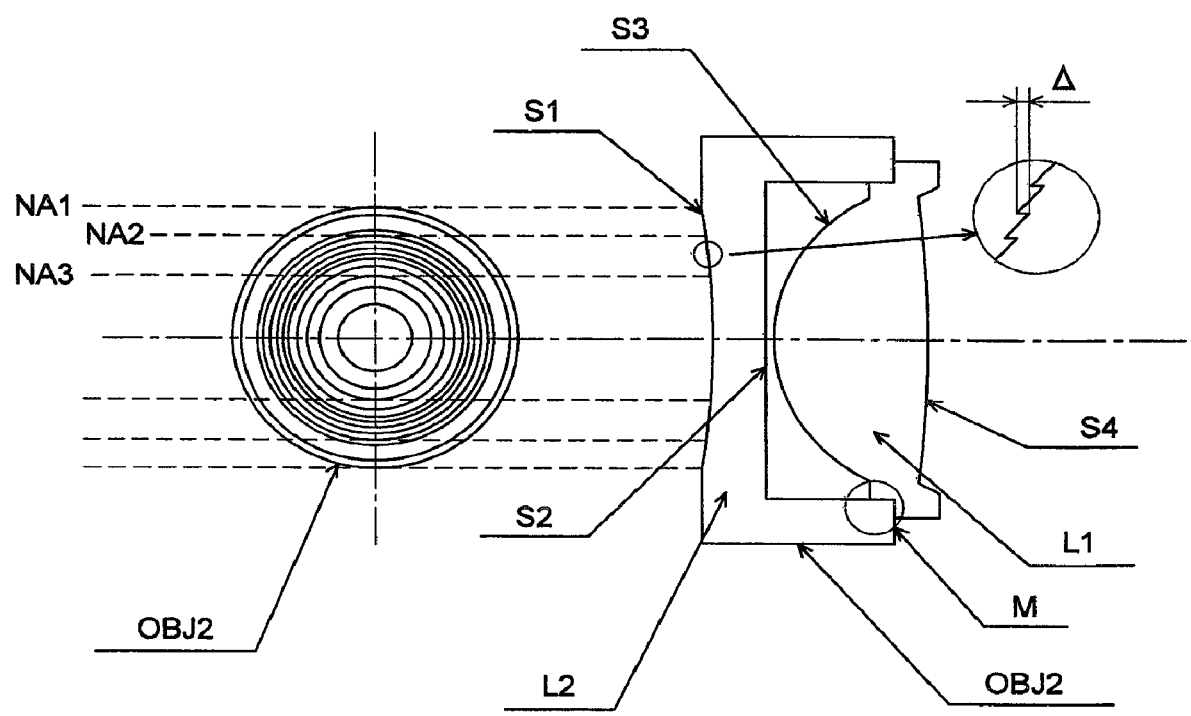
FIG. 3(a) is a front view of an objective lens of the present invention.
FIG. 3(b) is a side view of an objective lens of FIG. 3(a).
FIG. 3(c) is a enlarged partial side view of an objective lens of FIG. 1(a).

FIG. 3 is a schematic diagram showing objective lens OBJ2 of the present embodiment, and FIG. 3 (A) is a front view, FIG. 3 (B) is a side view and FIG. 3 (C) is a diagram wherein a side face is partially enlarged. This objective lens OBJ1 is an objective lens that is common to, for example, a high density optical disk such as a high density DVD using a short wavelength light source like a violet semiconductor laser, an optical disk meeting the DVD standard requirements such as DVD, DVD-ROM, DVD-RAM, DVD-R, DVD-RW, and DVD+RW which use a red semiconductor laser, and an optical disk meeting the CD standard requirements such as CD, CD-R, CD-RW, CD-Video and CD-ROM which use an infrared semiconductor laser, and it is applied to an optical pickup device for recording/reproducing compatibly, and has a function to converge a laser beam emitted from the light source on an information recording surface of the optical disk.

The objective lens OBJ2 is a hybrid objective lens (compound objective lens) composed of first optical element L1 having two optical surfaces S3 and S4 each being an aspheric surface and second optical element L2 having two optical surfaces S1 and S2, and on optical surface S1 of the optical element L2 that is an aspheric surface, there is formed a diffractive structure in a form of ring-shaped zones whose centers are on the optical axis as shown in FIG. 3 (A). In this diffractive structure, there is provided step Δ on a boundary between ring-shaped zones in the optical axis direction as in Fresnel lens as shown in FIG. 3 (C). A laser beam entering the ring-shaped zone is diffracted in the direction determined by its ring-shaped zone pitch.

The first optical element L1 and the second optical element L2 are assembled each other to be a single unit through contact portion M. The contact portion M can be manufactured to be highly accurate in terms of its shape when it is formed solidly with an optical surface through a molding method employing a metal mold, and thus, it is possible to perform accurately the positioning between the first optical element L1 and the second optical element L2 in the direction perpendicular to the optical axis and in the direction of the optical axis.

Objective lens OBJ2 converges a divergent light flux emitted from a red semiconductor laser on an information recording surface of DVD, and converges a divergent light flux emitted from an infrared semiconductor laser on an information recording surface of CD. When a divergent light flux enters the objective lens, there is a problem of coma that is caused by tracking errors. A basis for the foregoing is that a light emission point of the semiconductor laser becomes an off-axis object point for the objective lens if the objective lens is decentered for the light emission point of the semiconductor laser by the tracking errors. In the design of an objective lens that is used when a divergent light flux enters the objective lens, therefore, coma in off-axis characteristics (image height characteristics) needs to be corrected for obtaining excellent tracking characteristics. However, when the divergent light flux enters the objective lens, the occurrence of coma in off-axis characteristics tends to be greater, compared with an occasion wherein a collimated light flux enters. In the objective lens OBJ2, therefore, the degree of freedom for design (number of optical surfaces) is increased and coma in off-axis characteristics for DVD and CD is corrected properly, by making the objective lens to be a hybrid objective lens that is composed of the first optical element L1 and the second optical element L2, which makes it possible to obtain excellent tracking characteristics in the course of recording/reproducing for DVD and CD.

Incidentally, when a numerical aperture of an objective lens is set to about 0.85, as in a high density optical disk, the radius of curvature of the optical surface (especially, the optical surface closer to the light source) becomes small. When trying to provide a ring-shaped zone structure on the optical surface having such small radius of curvature, a ring-shaped zone pitch is extremely small (about several microns).

A metal mold used for forming an optical element is manufactured by a method called SPDT (Single-Point Diamond Turning) wherein a diamond cutting tool having a minute diameter is used for turning. In the processing of a metal mold by SPDT, however, when forming, on an optical surface, a minute shape like a ring-shaped zone structure with a pitch of several microns, the efficiency of utilizing a laser beam is lowered by a phase mismatching portion that is caused when a shape of the tip of the diamond cutting tool is transferred onto the metal mold, which is a problem. Further, binary optics making technologies wherein photo-lithography and etching are applied repeatedly and electronic beam drawing technologies represent a method of manufacturing optical elements which is suitable for forming a minute shape highly accurately. However, there has been reported neither an example of making an optical element having minute shapes on its optical surface having small radius of curvature like an objective lens for high density optical disks, nor an example of making a metal mold that is used for the injection molding of an optical element.

Further, even when it is technically possible to make minute shapes highly accurately by using a diamond cutting tool whose tip is small enough so that a decline of utilization efficiency of a laser beam caused by a phase mismatching portion is not problematic in a metal mold processing by SPDT, or even when it is possible to make an optical element having minute shapes on an optical surface having small radius of curvature or to make a metal mold to be used for injection molding of an optical element, owing to the binary optics making technologies and electronic beam drawing technologies, in the future, if a ring-shaped zone structure having a pitch of about several microns is provided on the optical surface having thereon small radius of curvature, utilization efficiency for a laser beam is lowered because of a great influence of a shading by a step portion of the ring-shaped zone structure, resulting in a problem.

In the objective lens OBJ2, therefore, paraxial power P1 ($mm^{-1}$) of the first optical element L1 and paraxial power P2 ($mm^{-1}$) of the second optical element L2 are established so that $|P1/P2| \leq 0.2$ may be satisfied. A decline of utilization efficiency for a laser beam caused by an influence of a shade of a step portion of the ring-shaped zone structure was made small by setting the radius of curvature of the second optical element L2 for which a diffractive structure is formed on optical surface S1 to be large, and a numerical aperture of the objective lens OBJ2 was made to be great by setting the radius of curvature on the optical surface S3 of the first optical element L1 closer to the second optical element L2 to be small.

Since the first optical element L1 was made to take charge of most light-converging action for a light flux by setting the ratio of paraxial power of the first optical element L1 to paraxial power of the second optical element L2 to be great, a height at which a marginal ray passes through optical surface S4 of the objective lens OBJ2 closer to an optical disk is great, and a working distance similar to that in the occasion where an objective lens is of a single lens is secured, as in the objective lens OBJ1.

Further, paraxial power P2 of the second optical element L2 is determined so that a marginal ray of the light flux that passes through the second optical element L2 and enters the first optical element L1 may become a converged ray. Due to this, an effective diameter of optical surface S3 is small, and thereby, an outside diameter of the first optical element L1 can be made small, and an outside diameter of the second optical element L2 can also be made small accordingly, which is advantageous for making objective lens OBJ2 to be small.

Since the diffractive structure formed on optical surface S1 is determined by the same concept as in the diffractive structure formed on optical surface S1 of the objective lens OBJ1, detailed explanation therefor will be omitted here.

Figure 4:
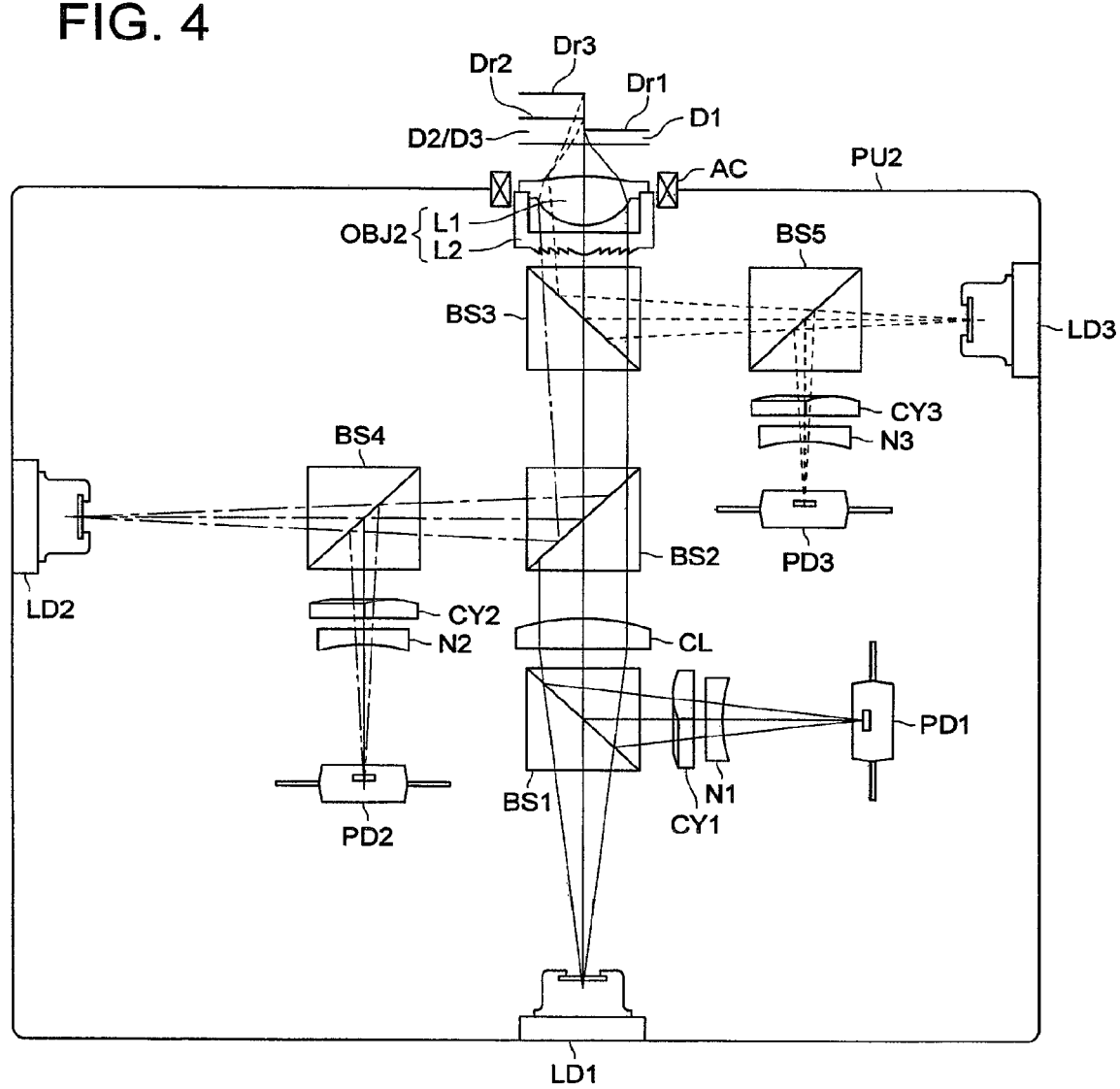
FIG. 4 is a schematic view of an optical pickup apparatus employing the objective lens of FIG. 1(a).

FIG. 4 is a schematic diagram showing optical pickup device PU2 employing this objective lens OBJ2.

Since the optical pickup device PU2 is the same as the optical pickup device PU1 except that the objective lens is objective lens OBJ2 which is a hybrid objective lens, detailed explanation for the optical pickup device PU2 will be omitted here.

The aspherical surface in each objective lens of each example is expressed by the following expression (arithmetic 2) when the optical axis direction is X-axis, the height in the perpendicular direction to the optical axis is h (mm), and the radius of curvature of the refractive surface is r (mm). Where, κ is a conical coefficient, and $A_{2i}$ is an aspherical surface coefficient.

$$X = \frac{h^2/r}{1+\sqrt{1-(1+\kappa)h^2/r^2}} + \sum_{i=2} A_{2i}h^{2i} \qquad \text{(Arithmetic 2)}$$

Further, the diffractive surface in each objective lens of each example ca be expressed as the optical path difference function $\Phi_b$ (mm) by the following expression (arithmetic 3). Herein, h (mm) is the height in the perpendicular direction to the optical axis, $b_{2i}$ is a coefficient of the optical path difference function (called also diffractive surface coefficient, and n is the order of the diffracted ray generated on the diffracted surface.

$$\Phi_b = n \cdot \sum_{j=1} b_{2j}h^{2j} \qquad \text{(Arithmetic 3)}$$

In this connection, in the following tables or views, there is a case where, for the expression of the exponent of 10, E (or e) is used, and is expressed like as, for example, $E-02(=10^{-2})$ Further, in the following each lens data table of each example, r (mm) shows the radius of curvature, d (mm) shows the surface interval, Nλ1, Nλ2, and Nλ3 respectively show the refractive indexes in the wavelength λ1, λ2, and λ3, and νd shows Abbes' number in d line.

EXAMPLES

Next, examples appropriate to the aforementioned (First Embodiment) and (Second Embodiment) will be illustrated as follows.

Example 1

Example 1 wherein lens data are shown in Table 1 is a plastic single lens that is appropriate as objective lens OBJ1 in the embodiment stated above, and a diffractive structure in a form of ring-shaped zones is formed on the first surface (S1). In the objective lens of the present example, the following is assumed as specifications for the first optical disk D1, the second optical disk D2 and the third optical disk D3.

NA1=0.85, λ1=405 nm, t1=0.1 mm, m1=0
NA2=0.65, λ2=650 nm, t2=0.6 mm, m2=−0.03
NA3=0.50, λ3=780 nm, t3=1.2 mm, m3=−0.14

Optimized wavelength λB and optimized order nB of the diffractive structure formed in the common area corresponding to the inside of NA3 and the first peripheral area corresponding to the inside of NA3−NA2 are respectively λB=415 nm and nB=6, and optimized wavelength λB and optimized order nB of the diffractive structure formed in the second peripheral area corresponding to the inside of NA2−NA1 are respectively λB=405 nm and nB=8.

Therefore, in the common area and the first peripheral area, $6^{th}$ diffracted light is generated for the laser beam of 405 nm emitted from semiconductor laser LD1, $4^{th}$ diffracted light is generated for the laser beam of 650 nm emitted from semiconductor laser LD2, and $3^{rd}$ diffracted light is generated for the laser beam of 780 nm emitted from semiconductor laser LD3, so that an amount of diffracted light may be maximum in each case, while, in the second peripheral area, $8^{th}$ diffracted light is generated for the laser beam of 405 nm emitted from semiconductor laser LD1, $5^{th}$ diffracted light is generated for the laser beam of 650 nm emitted from semiconductor laser LD2, and $4^{th}$ diffracted light is generated for the laser beam of 780 nm emitted from semiconductor laser LD3, so that an amount of diffracted light may be maximum in each case.

Figure 5:
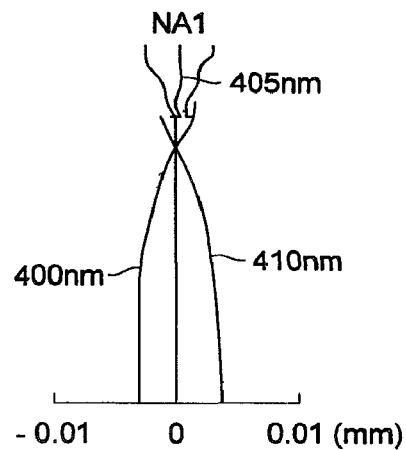
Figure 5:
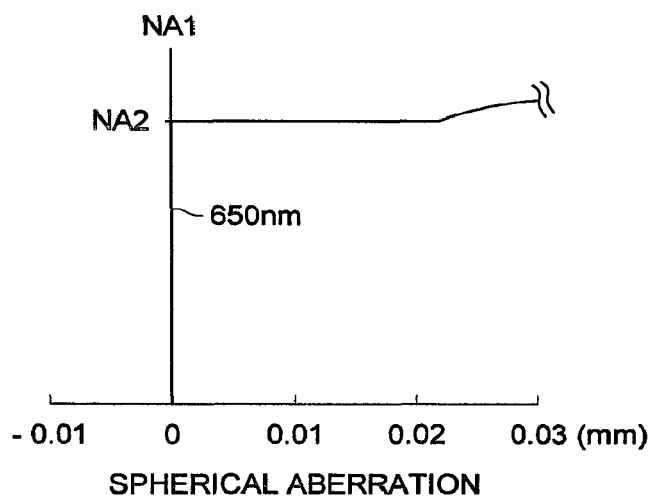
Figure 5:
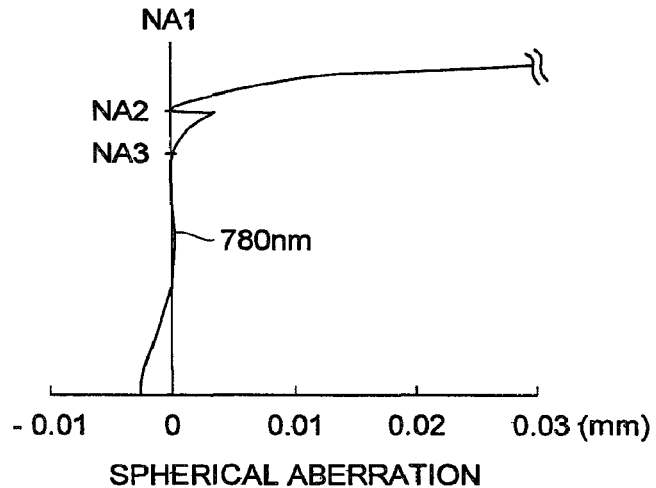

If a laser beam with wavelength 410 nm that is longer than λ1 by 5 nm enters the diffractive structure determined in the way stated above, spherical aberration of the objective lens in the present example changes in the direction of under-correction as is clear from a spherical aberration diagram shown in FIG. 5 (A). In the objective lens in the present example, therefore, it is made to have wavelength dependence of longitudinal chromatic aberration that changes in the direction in which the back focus becomes longer, and thereby, amount of change ΔCA for back focus in the case of incidence of a laser beam with a wavelength of 410 nm that is longer than λ1 by 5 nm and amount of change ΔSA of marginal ray corresponding to NA1 in the case of incidence of a laser beam with a wavelength of 410 nm that is longer than the aforesaid wavelength λ1 by 5 nm are made to satisfy the relationship of −1<ΔCA/ΔSA<0, which results in a lens wherein a change in the best position of image point can be controlled to be small even when semiconductor laser LD1 causes mode hop. The amount of change ΔCA for back focus, in this case, is indicated by a width of movement on the bottom of the graph of 405 nm and 410 nm in FIG. 5 (A), while, the amount of change ΔSA of marginal ray is indicated by the width between the top of the graph of 405 nm that is moved in parallel until its bottom is overlapped on the bottom of the graph of 410 nm and the top of the graph of 410 nm.

Incidentally, if paraxial power PD of the diffractive structure is set to be great in the objective lens OBJ1, it is possible to obtain a lens having less deterioration of light-converging performance for mode hop of semiconductor laser LD1, because longitudinal chromatic aberration in the vicinity of wavelength λ1 can be corrected satisfactorily. However, if the longitudinal chromatic aberration in the vicinity of wavelength λ1 is corrected thoroughly, longitudinal chromatic aberration in the area of wavelength from λ2 to λ3 is overcorrected, and deterioration of light-converging performance for mode hop of semiconductor laser LD2, or semiconductor laser LD3 becomes serious, resulting in concerns that recording of information for the second and third optical disks may not be conducted accurately.

In the objective lens in the present example, therefore, paraxial power PD of the diffractive structure was established so that it may satisfy $-5.0 \times 10^{-2} < PD < 2.0 \times 10^{-2}$, to prevent that deterioration of light-converging performance for mode hop of semiconductor lasers LD2 and LD3 becomes serious.

Further, as is clear from the spherical aberration diagrams in FIGS. 5 (B) and 5 (C), a laser beam with a wavelength of 650 nm that is emitted from semiconductor laser LD2 and passes through the second peripheral area becomes flare components on an information recording surface of the second optical disk D2, and a laser beam with a wavelength of 780 nm that is emitted from semiconductor laser LD3 and passes through the first and second peripheral areas becomes flare components on an information recording surface of the third optical disk D3, thus, aperture restrictions for NA2 and NA3 are conducted automatically.

TABLE 1

Example 1

For wavelength λ1 = 405 nm
Focal length f1 = 2.00 mm, Image-side numerical aperture NA1 = 0.85, Magnification m1 = 0
For wavelength λ2 = 650 nm
Focal length f2 = 2.07 mm, Image-side numerical aperture NA2 = 0.65, Magnification m2 = −0.03
For wavelength λ3 = 780 nm
Focal length f3 = 2.07 mm, Image-side numerical aperture NA3 = 0.50, Magnification m3 = −0.14

| Surface No. | r (mm) | d (mm) | Nλ1 | Nλ2 | Nλ3 | νd | note |
|---|---|---|---|---|---|---|---|
| 0 | | d0 (variable) | | | | | Light source |
| 1 (diaphragm) | See the following table | See the following table | 1.52469 | 1.50661 | 1.50500 | 56.5 | Objective lens |
| 2 | −2.7583 | d2 (variable) | | | | | |
| 3 | ∞ | d3 (variable) | 1.61950 | 1.57756 | 1.57062 | 30.0 | Transparent substrate |
| 4 | ∞ | | | | | | |

| | λ1 = 405 nm | λ2 = 650 nm | λ3 = 780 nm |
|---|---|---|---|
| d0 | ∞ | 63.0204 | 16.0073 |
| d2 | 0.1000 | 0.6000 | 1.2000 |
| d3 | 0.7055 | 0.5217 | 0.3583 |

First surface
Diffraction order · Optimized wavelength · Radius of curvature · Lens thickness · Aspheric surface coefficient · Diffractive surface coefficient

| | | |
|---|---|---|
| h | 0 ≦ h ≦ 1.35 | h > 1.35 |
| n1/n2/n3 | 6/4/3 | 8/5/4 |
| λB | 415 nm | 405 nm |
| r | 1.1551 | 1.1660 |
| d1 | 2.2000 | 2.2000 |
| κ | −6.4035E−01 | −5.8616E−01 |
| A4 | −5.9766E−04 | −5.4913E−03 |
| A6 | −4.7564E−03 | −7.0850E−03 |
| A8 | −1.2137E−03 | 4.9961E−05 |
| A10 | 5.8511E−04 | 1.0862E−03 |
| A12 | −2.7474E−04 | −2.9682E−04 |
| A14 | 3.3895E−05 | −1.2566E−05 |
| A16 | −4.6696E−05 | −6.3629E−05 |
| A18 | 2.5452E−05 | 2.4493E−05 |
| A20 | −4.8620E−06 | −2.6949E−06 |
| b2 | 2.3318E−03 | 1.0991E−03 |
| b4 | −8.9867E−04 | −5.1923E−04 |
| b6 | −5.3246E−04 | −2.8692E−04 |
| b8 | −6.2181E−05 | −2.3236E−05 |
| b10 | −4.6234E−06 | −2.8513E−06 |

Second surface
Aspheric surface coefficient

| | |
|---|---|
| κ | −4.3900E+01 |
| A4 | 1.0752E−01 |
| A6 | −5.1322E−02 |
| A8 | −1.1890E−02 |
| A10 | 1.9650E−02 |
| A12 | −2.2078E−03 |
| A14 | −2.4657E−03 |
| A16 | 6.4120E−04 |
| A18 | |
| A20 | |

Example 2

Example 2 wherein lens data are shown in Table 2 is a plastic single lens that is appropriate as objective lens OBJ1 in the embodiment stated above, and a diffractive structure in a form of ring-shaped zones is formed on the first surface (S1). In the objective lens of the present example, the following is assumed as specifications for the first optical disk D1, the second optical disk D2 and the third optical disk D3.

NA1=0.85, λ1=405 nm, t1=0.1 mm, m1=0

NA2=0.65, λ2=650 nm, t2=0.6 mm, m2=−0.02
NA3=0.50, λ3=780 nm, t3=1.2 mm, m3=−0.15

Optimized wavelength λB and optimized order nB of the diffractive structure formed in the common area corresponding to the inside of NA3 and the first peripheral area corresponding to the inside of NA3–NA2 are respectively λB=380 nm and nB=2, and optimized wavelength λB and optimized order nB of the diffractive structure formed in the second peripheral area corresponding to the inside of NA2–NA1 are respectively λB=405 nm and nB=2.

Therefore, in the common area and the first peripheral area, secondary diffracted light is generated for the laser beam of 405 nm emitted from semiconductor laser LD1, primary diffracted light is generated for the laser beam of 650 nm emitted from semiconductor laser LD2, and primary diffracted light is generated for the laser beam of 780 nm emitted from semiconductor laser LD3, so that an amount of diffracted light may be maximum in each case.

Further, in the objective lens in the present example, paraxial power PD of the diffractive structure was established so that it may satisfy $0.5 \times 10^{-2} < PD < 5.0 \times 10^{-2}$, to prevent that deterioration of light-converging performance for mode hop of semiconductor lasers LD2 and LD3 becomes serious.

Figure 6:
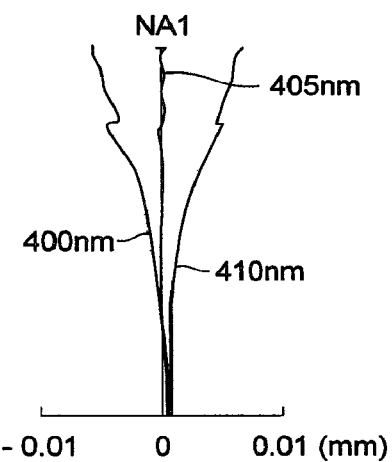
Figure 6:
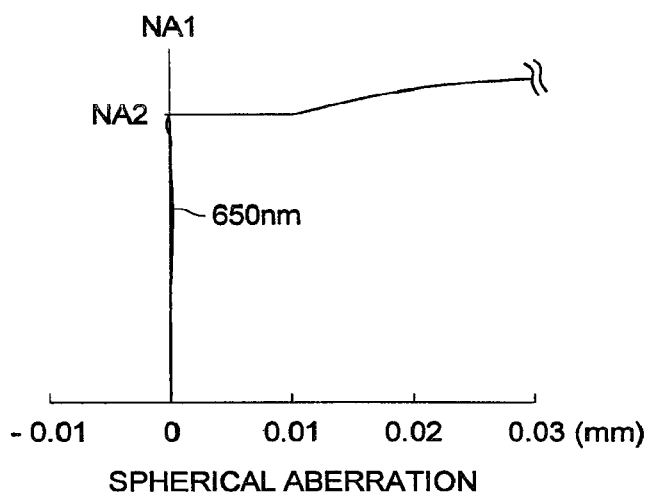
Figure 6:
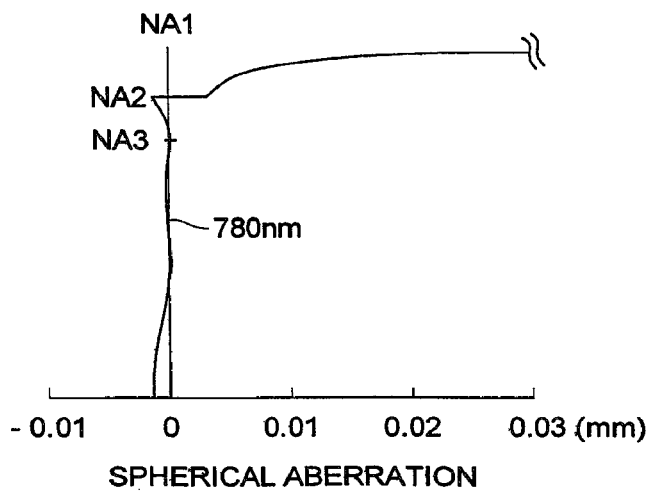

Further, as is clear from the spherical aberration diagrams in FIGS. 6 (B) and 6 (C), a laser beam with a wavelength of 650 nm that is emitted from semiconductor laser LD2 and passes through the second peripheral area becomes flare components on an information recording surface of the second optical disk D2, and a laser beam with a wavelength of 780 nm that is emitted from semiconductor laser LD3 and passes through the first and second peripheral areas becomes flare components on an information recording surface of the third optical disk D3, thus, aperture restrictions for NA2 and NA3 are conducted automatically.

TABLE 2

Example 2

For wavelength λ1 = 405 nm
Focal length f1 = 2.00 mm, Image-side numerical aperture NA1 = 0.85, Magnification m1 = 0
For wavelength λ2 = 650 nm
Focal length f2 = 2.07 mm, Image-side numerical aperture NA2 = 0.65, Magnification m2 = −0.02
For wavelength λ3 = 780 nm
Focal length f3 = 2.06 mm, Image-side numerical aperture NA3 = 0.50, Magnification m3 = −0.15

| Surface No. | r (mm) | d (mm) | Nλ1 | Nλ2 | Nλ3 | νd | note |
|---|---|---|---|---|---|---|---|
| 0 | | d0 (variable) | | | | | Light source |
| 1 (diaphragm) | See the following table | See the following table | 1.52469 | 1.50661 | 1.50500 | 56.5 | Objective lens |
| 2 | −2.3673 | d2 (variable) | | | | | |
| 3 | ∞ | d3 (variable) | 1.61950 | 1.57756 | 1.57062 | 30.0 | Transparent substrate |
| 4 | ∞ | | | | | | |

| | λ1 = 405 nm | λ2 = 650 nm | λ3 = 780 nm |
|---|---|---|---|
| d0 | ∞ | 87.3544 | 15.2800 |
| d2 | 0.1000 | 0.6000 | 1.2000 |
| d3 | 0.7030 | 0.5094 | 0.3655 |

First surface
Diffraction order · Optimized wavelength · Radius of curvature · Lens thickness · Aspheric surface coefficient · Diffractive surface coefficient

| | | |
|---|---|---|
| h | $0 \leq h \leq 1.35$ | $h > 1.35$ |
| n1/n2/n3 | 2/1/1 | 2/1/1 |
| λB | 380 nm | 405 nm |
| r | 1.3710 | 1.3766 |
| d1 | 2.2671 | 2.2634 |
| κ | −5.6443E−01 | −5.6812E−01 |
| A4 | 1.0155E−02 | 1.6385E−02 |
| A6 | 6.8473E−03 | 1.8095E−04 |
| A8 | −6.8834E−04 | 2.7706E−03 |
| A10 | 1.1420E−03 | 3.3729E−04 |
| A12 | 5.5347E−04 | −3.4111E−04 |
| A14 | −1.0087E−03 | 8.4195E−05 |
| A16 | 5.2327E−04 | −2.0012E−05 |
| A18 | −6.9277E−05 | 2.2938E−05 |
| A20 | −6.3930E−06 | −6.0839E−06 |
| b2 | −7.6135E−03 | −6.6173E−03 |
| b4 | 1.2749E−03 | 1.8707E−03 |
| b6 | 1.6024E−03 | −4.2577E−04 |

TABLE 2-continued

| Example 2 | | |
|---|---|---|
| b8 | −2.8326E−04 | 1.0036E−03 |
| b10 | 1.2298E−04 | −2.0596E−04 |

| Second surface Aspheric surface coefficient | |
|---|---|
| κ | −2.4528E+01 |
| A4 | 4.3024E−02 |
| A6 | −7.2838E−03 |
| A8 | −6.8737E−03 |
| A10 | 2.9824E−03 |
| A12 | −1.6397E−05 |
| A14 | −1.6456E−04 |
| A16 | 1.9141E−05 |
| A18 | |
| A20 | |

Example 3

Example 3 wherein lens data are shown in Table 3 is a hybrid objective lens that is appropriate as objective lens OBJ2 in the embodiment stated above, and it is composed of a glass lens representing the first optical element L1 whose both optical surfaces represent an aspheric surface and of a plastic lens representing the second optical element L2 in which a diffractive structure in a form of ring-shaped zones is formed on the optical surface that is an aspheric surface and is closer to the light source. In the objective lens of the present example, the following is assumed as specifications for the first optical disk D1, the second optical disk D2 and the third optical disk D3.

NA1=0.85, λ1=405 nm, t1=0.1 mm, m1=0
NA2=0.65, λ2=655 nm, t2=0.6 mm, m2=−0.04
NA3=0.50, λ3=785 nm, t3=1.2 mm, m3=−0.14

Optimized wavelength λB and optimized order nB of the diffractive structure formed in the common area corresponding to the inside of NA3, the first peripheral area corresponding to the inside of NA3−NA2 and the second peripheral area corresponding to the inside of NA2−NA1 are respectively λB=380 nm and nB=2.

Therefore, on the diffractive structures formed on various areas, second order diffracted light is generated for the laser beam with a wavelength of 405 nm emitted from semiconductor laser LD1, first order diffracted light is generated for the laser beam with a wavelength of 655 nm emitted from semiconductor laser LD2 and first order diffracted light is generated for the laser beam with a wavelength of 785 nm emitted from semiconductor laser LD3, so that each diffracted light generated may have the maximum amount of diffracted light.

Figure 7:
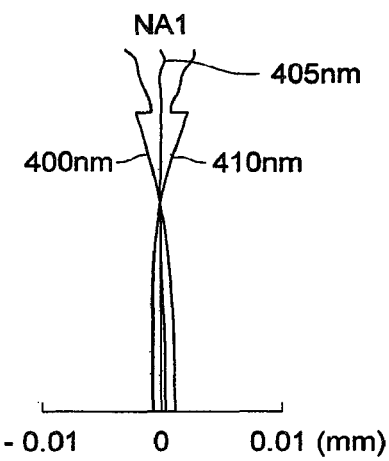
Figure 7:
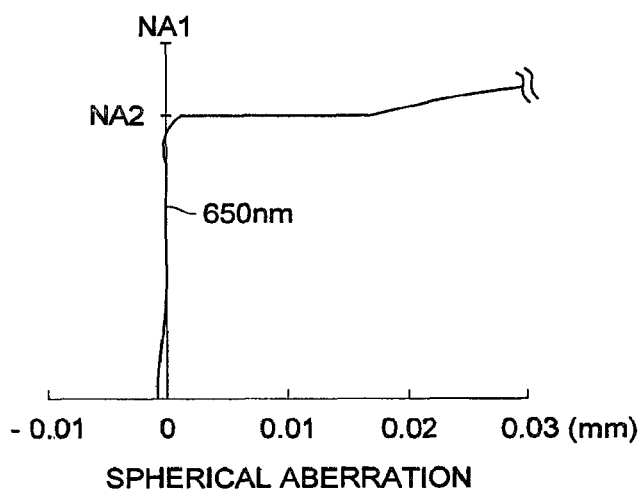
Figure 7:
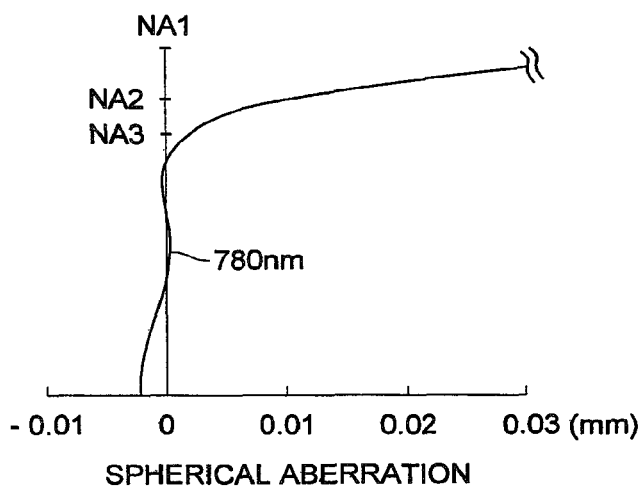

If a laser beam with wavelength 410 nm that is longer than λ1 by 5 nm enters the diffractive structure determined in the way stated above, spherical aberration of the objective lens in the present example changes in the direction of under-correction as is clear from a spherical aberration diagram shown in FIG. 7 (A). In the objective lens in the present example, therefore, it is made to have wavelength dependence of longitudinal chromatic aberration that changes in the direction in which the back focus becomes shorter, and thereby, amount of change ΔCA for back focus in the case of incidence of a laser beam with a wavelength of 410 nm that is longer than λ1 by 5 nm and amount of change ΔSA of marginal ray corresponding to NA1 in the case of incidence of a laser beam with a wavelength of 410 nm that is longer than the aforesaid wavelength λ1 by 5 nm are made to satisfy the relationship of −1<ΔCA/ΔSA<0, which results in a lens wherein a change in the best position of image point can be controlled to be small even when semiconductor laser LD1 causes mode hop.

Further, in the objective lens in the present example, therefore, paraxial power PD of the diffractive structure was established so that it may satisfy $0.5 \times 10^{-2} < PD < 5.0 \times 10^{-2}$, to prevent that deterioration of light-converging performance for mode hop of semiconductor lasers LD2 and LD3 becomes serious.

Further, as is clear from the spherical aberration diagrams in FIGS. 7 (B) and 5 (C), a laser beam with a wavelength of 655 nm that is emitted from semiconductor laser LD2 and passes through the second peripheral area becomes flare components on an information recording surface of the second optical disk D2, and a laser beam with a wavelength of 785 nm that is emitted from semiconductor laser LD3 and passes through the first and second peripheral areas becomes flare components on an information recording surface of the third optical disk D3, thus, aperture restrictions for NA2 and NA3 are conducted automatically.

TABLE 3

Example 3

For wavelength λ1 = 405 nm
Focal length f1 = 2.05 mm, Image-side numerical aperture NA1 = 0.85, Magnification m1 = 0
For wavelength λ2 = 655 nm
Focal length f2 = 2.14 mm, Image-side numerical aperture NA2 = 0.65, Magnification m2 = −0.04

TABLE 3-continued

Example 3

For wavelength λ3 = 785 nm
Focal length f3 = 2.14 mm, Image-side numerical aperture NA3 = 0.50, Magnification m3 = −0.14

| Surface No. | r (mm) | d (mm) | Nλ1 | Nλ2 | Nλ3 | νd | note |
|---|---|---|---|---|---|---|---|
| 0 | | d0 (variable) | | | | | Light source |
| 1 | See the following table | See the following table | 1.52491 | 1.50673 | 1.50345 | 56.5 | Objective lens |
| 2 | 3601075.34 | 0.1000 | | | | | |
| 3 (diaphragm) | 1.5401 | 2.5000 | 1.71558 | 1.68966 | 1.68469 | 53.2 | |
| 4 | −9.9695 | d4 (variable) | | | | | |
| 5 | ∞ | d5 (variable) | 1.61950 | 1.57721 | 1.57042 | 30.0 | Transparent substrate |
| 6 | ∞ | | | | | | |

| | λ1 = 405 nm | λ2 = 650 nm | λ3 = 780 nm |
|---|---|---|---|
| d0 | ∞ | 50.0172 | 14.9264 |
| d4 | 0.1000 | 0.6000 | 1.2000 |
| d5 | 0.5999 | 0.4641 | 0.2717 |

First surface
Diffraction order · Optimized wavelength · Radius of curvature · Lens thickness · Aspheric surface coefficient · Diffractive surface coefficient

| h | 0 ≤ h ≤ 1.153 | 1.153 < h ≤ 1.43 | h > 1.43 |
|---|---|---|---|
| n1/n2/n3 | 2/1/1 | 2/1/1 | 2/1/1 |
| λB | 380 nm | 380 nm | 380 nm |
| r | −10.4666 | −11.8021 | −20.6595 |
| d1 | 1.0000 | 1.0000 | 1.0000 |
| κ | −1.1000E+01 | −1.1000E+01 | −1.1000E+01 |
| A4 | 2.8254E−02 | 1.7590E−02 | 6.1773E−03 |
| A6 | −7.1556E−03 | −9.2533E−04 | −5.4273E−04 |
| A8 | 1.2671E−03 | 1.4113E−03 | 2.9967E−03 |
| A10 | 3.5495E−04 | −4.8688E−04 | −1.5628E−03 |
| A12 | −7.3561E−05 | 2.6450E−04 | 2.0226E−04 |
| b2 | −1.1764E−02 | −1.1036E−02 | −9.5589E−03 |
| b4 | 6.5468E−04 | −5.6496E−04 | 8.7375E−04 |
| b6 | 8.4835E−04 | 1.0458E−03 | −6.6414E−04 |
| b8 | −5.6702E−04 | −5.9605E−05 | 1.6233E−04 |
| b10 | 2.1908E−04 | 8.6727E−06 | 4.1737E−06 |

| Second surface Aspheric surface coefficient | | Third surface Aspheric surface coefficient | | Fourth surface Aspheric surface coefficient | |
|---|---|---|---|---|---|
| κ | 1.0000E+01 | κ | −6.0595E−01 | κ | 2.0000E+00 |
| A4 | 1.7777E−02 | A4 | −1.2358E−03 | A4 | 6.5322E−02 |
| A6 | −5.1797E−03 | A6 | 2.2753E−03 | A6 | −7.5864E−02 |
| A8 | 3.3246E−03 | A8 | 1.7452E−03 | A8 | 5.9002E−02 |
| A10 | −1.1994E−03 | A10 | −1.6775E−03 | A10 | −1.0020E−02 |
| A12 | −3.6860E−06 | A12 | 5.1978E−04 | A12 | −1.6829E−02 |
| A14 | 3.0819E−05 | A14 | −6.4585E−05 | A14 | 7.5707E−03 |
| A16 | | A16 | 6.1456E−07 | A16 | |
| A18 | | A18 | | A18 | |
| A20 | | A20 | | A20 | |

Example 4

Example 4 wherein lens data are shown in Table 4 is a hybrid objective lens that is appropriate as objective lens in the embodiment stated above, and it is composed of a plastic lens representing the first optical element L1 whose both optical surfaces represent an aspheric surface and of a plastic lens representing the second optical element L2 in which a diffractive structure in a form of ring-shaped zones is formed on both optical surfaces that is an aspheric surface. In the objective lens of the present example, the following is assumed as specifications for the first optical disk D1, the second optical disk D2 and the third optical disk D3.

NA1=0.85, λ1=405 nm, t1=0.1 mm, m1=0
NA2=0.65, λ2=650 nm, t2=0.6 mm, m2=−0.11
NA3=0.50, λ3=780 nm, t3=1.2 mm, m3=−0.20

Optimized wavelength λB and optimized order nB of the diffractive structure formed in the common area corresponding to the inside of NA3 and the first peripheral area corresponding to the inside of NA3–NA2 are respectively λB=380 nm and nB=2. Optimized wavelength λB and optimized order nB of the diffractive structure formed in the second peripheral area corresponding to the inside of NA2–NA1 are respectively λB=405 nm and nB=3.

Therefore, in the common area and the first peripheral area, second order diffracted light is generated for the laser beam with a wavelength of 405 nm emitted from semiconductor laser LD1, first order diffracted light is generated for the laser beam with a wavelength of 650 nm emitted from semiconductor laser LD2 and first order diffracted light is generated for the laser beam with a wavelength of 780 nm emitted from semiconductor laser LD3, so that each diffracted light generated may have the maximum amount of diffracted light, while, for the second peripheral area, third order diffracted light is generated for the laser beam with a wavelength of 405 nm emitted from semiconductor laser LD1, second order diffracted light is generated for the laser beam with a wavelength of 650 nm emitted from semiconductor laser LD2, so that each diffracted light generated may have the maximum amount of diffracted light, and for the second peripheral area, first order diffracted ray and second order diffracted ray are generated with a similar amount of diffracted ray for the laser beam with a wavelength of 780 nm emitted from semiconductor laser LD3.

Further, in the objective lens in the present example, paraxial power PD of the diffractive structure was established so that it may satisfy $0.5 \times 10^{-2} < PD < 5.0 \times 10^{-2}$, for magnification m2 in the case of recording/reproducing for the second optical disk and magnification m3 in the case of recording/reproducing for the third optical disk, to prevent that deterioration of light-converging performance for mode hop of semiconductor lasers LD2 and LD3 becomes serious.

Further, as is clear from the spherical aberration diagrams in FIGS. 8 (B) and 8 (C), a laser beam with a wavelength of 650 nm that is emitted from semiconductor laser LD2 and passes through the second peripheral area becomes flare components on an information recording surface of the second optical disk D2, and a laser beam with a wavelength of 780 nm that is emitted from semiconductor laser LD3 and passes through the first and second peripheral areas becomes flare components on an information recording surface of the third optical disk D3, thus, aperture restrictions for NA2 and NA3 are conducted automatically.

Incidentally, in the optical pickup device, the objective lens is decentered by tracking errors from the light emission point of the semiconductor laser by about 0.2 mm. This is equivalent to that the light emission point becomes an off-axis object point having an object height of 0.2 mm for the objective lens, when a divergent light enters the objective lens. Wave-front aberration of the objective lens in the present example for the object height of 0.2 mm is 0.025 λ2 rms for the second optical disk, and is 0.033 λ3 rms for the third optical disk, and excellent tracking characteristics are obtained for the second and third optical disks which are used when a divergent light flux enters the objective lens.

TABLE 4

Example 4

For wavelength λ1 = 405 nm
Focal length f1 = 2.20 mm, Image-side numerical aperture NA1 = 0.85, Magnification m1 = 0
For wavelength λ2 = 650 nm
Focal length f2 = 2.26 mm, Image-side numerical aperture NA2 = 0.65, Magnification m2 = −0.11
For wavelength λ3 = 780 nm
Focal length f3 = 2.27 mm, Image-side numerical aperture NA3 = 0.50, Magnification m3 = −0.20

| Surface No. | r (mm) | d (mm) | Nλ1 | Nλ2 | Nλ3 | νd | note |
|---|---|---|---|---|---|---|---|
| 0 | | d0 (variable) | | | | | Light source |
| 1 | See the following table | See the following table | 1.52469 | 1.50661 | 1.50500 | 56.5 | Objective lens |
| 2 | See the following table | 0.0500 | | | | | |
| 3 (diaphragm) | 1.5528 | 2.9500 | 1.56013 | 1.54090 | 1.53734 | 56.3 | |
| 4 | −2.1403 | d4 (variable) | | | | | |
| 5 | ∞ | d5 (variable) | 1.61956 | 1.57785 | 1.57088 | 30.0 | Transparent substrate |
| 6 | ∞ | | | | | | |

| | λ1 = 405 nm | λ2 = 650 nm | λ3 = 780 nm |
|---|---|---|---|
| d0 | ∞ | 20.8653 | 11.4565 |
| d4 | 0.1000 | 0.6000 | 1.2000 |
| d5 | 0.4872 | 0.4851 | 0.2979 |

TABLE 4-continued

Example 4

First surface
Diffraction order · Optimized wavelength · Radius of
curvature · Lens thickness · Aspheric surface coefficient ·
Diffractive surface coefficient

| h | 0 ≤ h ≤ 1.479 | h > 1.479 |
|---|---|---|
| n1/n2/n3 | 2/1/1 | 3/2/2 |
| λB | 380 nm | 405 nm |
| r | −75.9093 | −75.9093 |
| d1 | 2.2671 | 2.2634 |
| κ | −1.9314E+03 | −1.9314E+03 |
| A4 | 6.7348E−03 | 6.7348E−03 |
| A6 | 1.0224E−03 | 1.0224E−03 |
| A8 | 3.3638E−06 | 3.3638E−06 |
| A10 | −1.6208E−04 | −1.6208E−04 |
| A12 | −1.5907E−06 | −1.5907E−06 |
| A14 | −3.4313E−07 | −3.4313E−07 |
| b2 | −4.9508E−03 | −3.5176E−03 |
| b4 | −2.1580E−03 | −1.5333E−03 |
| b6 | 6.4135E−04 | 4.5569E−04 |
| b8 | 3.7355E−05 | 2.6541E−05 |
| b10 | −3.0158E−05 | −2.1428E−05 |

Second surface
Diffraction order · Optimized wavelength · Radius of
curvature · Lens thickness · Aspheric surface coefficient ·
Diffractive surface coefficient

| H | 0 ≤ h ≤ 1.483 | h > 1.483 |
|---|---|---|
| n1/n2/n3 | 2/1/1 | 3/2/2 |
| λB | 380 nm | 405 nm |
| r | −29.0672 | −29.0672 |
| d1 | 2.2671 | 2.2634 |
| κ | −1.3788E+03 | −1.3788E+03 |
| A4 | 1.0726E−02 | 1.0726E−02 |
| A6 | 1.6748E−04 | 1.6748E−04 |
| A8 | −4.9758E−04 | −4.9758E−04 |
| A10 | −2.1960E−05 | −2.1960E−05 |
| A12 | −1.0692E−05 | −1.0692E−05 |
| A14 | 6.4879E−06 | 6.4879E−06 |
| b2 | −4.6811E−04 | −3.3261E−04 |
| b4 | 7.6852E−06 | 5.4606E−06 |
| b6 | 2.6310E−04 | 1.8694E−04 |
| b8 | −8.4343E−05 | −5.9928E−05 |
| b10 | −9.9442E−06 | −7.0656E−06 |

| Third surface Aspheric surface coefficient | | Fourth surface Aspheric surface coefficient | |
|---|---|---|---|
| κ | −7.1373E−01 | κ | −1.0211E+01 |
| A4 | 8.2690E−03 | A4 | 9.3235E−02 |
| A6 | 9.7887E−04 | A6 | −7.9444E−02 |
| A8 | −1.1881E−03 | A8 | 1.9703E−02 |
| A10 | 7.7852E−04 | A10 | 1.1928E−03 |
| A12 | −1.6114E−04 | A12 | −9.1615E−04 |
| A14 | −4.7416E−05 | A14 | −1.7067E−06 |
| A16 | 1.6534E−05 | A16 | |
| A18 | 2.7589E−06 | A18 | |
| A20 | −1.1891E−06 | A20 | |

Example 4'

Example 4' wherein lens data are shown in Table 4' is a hybrid objective lens that is appropriate as objective lens in the embodiment stated above, and it is composed of a plastic lens representing the first optical element L1 whose both optical surfaces represent an aspheric surface and of a plastic lens representing the second optical element L2 in which a diffractive structure in a form of ring-shaped zones is formed on the optical surface that is an aspheric surface and is closer to the light source. In the objective lens of the present example, the following is assumed as specifications for the first optical disk D1, the second optical disk D2 and the third optical disk D3.

NA1=0.87, λ1=408 nm, t1=0.1 mm, m1=0
NA2=0.67, λ2=658 nm, t2=0.6 mm, m2=−0.12
NA3=0.51, λ3=785 nm, t3=1.2 mm, m3=−0.20

Optimized wavelength λB and optimized order nB of the diffractive structure formed in the common area corresponding to the inside of NA3 and the first peripheral area corresponding to the inside of NA3−NA2 are respectively λB=408 nm and nB=8, and optimized wavelength λB and optimized order nB of the diffractive structure formed in the second peripheral area corresponding to the inside of NA2−NA1 are respectively λB=408 nm and nB=6.

Therefore, in the common area and the first peripheral area, $8^{th}$ diffracted light is generated for the laser beam of 408 nm emitted from semiconductor laser LD1, $5^{th}$ diffracted light is generated for the laser beam of 658 nm emitted from semiconductor laser LD2, and $4^{th}$ diffracted light is generated for the laser beam of 785 nm emitted from semiconductor laser LD3, so that an amount of diffracted light may be maximum in each case, while, in the second peripheral area, $6^{th}$ diffracted light is generated for the laser beam of 408 nm emitted from semiconductor laser LD1, $4^{th}$ diffracted light is generated for the laser beam of 658 nm emitted from semiconductor laser LD2, and $3^{rd}$ diffracted light is generated for the laser beam of 785 nm emitted from semiconductor laser LD3, so that an amount of diffracted light may be maximum in each case.

Further, as is clear from the spherical aberration diagrams in FIGS. 8'(*b*) to 8'(*c*), a laser beam with a wavelength of 658 nm that is emitted from semiconductor laser LD2 and passes through the second peripheral area becomes flare components on an information recording surface of the second optical disk D2, and a laser beam with a wavelength of 788 nm that is emitted from semiconductor laser LD3 and passes through the first and second peripheral areas becomes flare components on an information recording surface of the third optical disk D3, thus, aperture restrictions for NA2 and NA3 are conducted automatically.

TABLE 4'

Example 4'

For wavelength λ1 = 408 nm
Focal length f1 = 2.20 mm, Image-side numerical aperture NA1 = 0.87, Magnification m1 = 0
For wavelength λ2 = 658 nm
Focal length f2 = 2.26 mm, Image-side numerical aperture NA2 = 0.67, Magnification m2 = −0.12
For wavelength λ3 = 785 nm
Focal length f3 = 2.27 mm, Image-side numerical aperture NA3 = 0.51, Magnification m3 = −0.20

| Surface No. | r (mm) | d (mm) | Nλ1 | Nλ2 | Nλ3 | vd | Remarks |
|---|---|---|---|---|---|---|---|
| 0 |  | d0 (variable) |  |  |  |  | Light source |
| 1 | See the following table | 1.9500 | 1.52424 | 1.50643 | 1.50497 | 56.5 | Objective lens |
| 2 | See the following table | 0.0500 |  |  |  |  |  |
| 3 (diaphragm) | 1.4984 | 2.7000 | 1.55965 | 1.54062 | 1.53724 | 56.3 |  |
| 4 | −2.2641 | d4 (variable) |  |  |  |  |  |
| 5 | ∞ | d5 (variable) | 1.61830 | 1.57701 | 1.57042 | 30.0 | Transparent substrate |
| 6 | ∞ |  |  |  |  |  |  |

|  | λ1 = 408 nm | λ2 = 658 nm | λ3 = 785 nm |
|---|---|---|---|
| d0 | ∞ | 18.5732 | 11.4953 |
| d4 | 0.1000 | 0.6000 | 1.2000 |
| d5 | 0.4743 | 0.4760 | 0.3000 |

First surface
Diffraction order · Optimized wavelength · Radius of curvature · Lens thickness · Aspheric surface coefficient · Diffractive surface coefficient

| h | 0 ≦ h ≦ 1.19 | 1.19 < h ≦ 1.54 | 1.54 < h |
|---|---|---|---|
| n1/n2/n3 | 8/5/4 | 8/5/4 | 6/4/3 |
| λB | 408 nm | 408 nm | 408 nm |
| r | 28.4866 | 27.3901 | 26.2080 |
| κ | 7.8485E+01 | −6.6536E+02 | −4.4129E+02 |
| A4 | 4.2859E−03 | 1.3518E−02 | 6.7817E−03 |
| A6 | 1.2630E−02 | −2.9627E−03 | 2.1701E−04 |
| A8 | −1.4130E−02 | −1.4078E−03 | −3.9874E−04 |
| A10 | 3.7955E−03 | 4.5355E−04 | −2.8647E−05 |
| A12 | 1.8142E−04 | 2.6425E−05 | −3.6462E−06 |
| A14 | 0.0000E+00 | 0.0000E+00 | −4.0715E−06 |
| b2 | −2.3267E−03 | −2.1102E−03 | −2.3177E−03 |
| b4 | 6.7507E−04 | 5.9426E−04 | −1.5985E−04 |
| b6 | 4.7375E−04 | −1.3167E−04 | 1.0469E−04 |
| b8 | −8.6694E−04 | −1.4033E−04 | 8.2120E−06 |
| b10 | 2.8693E−04 | 5.0353E−05 | −1.3041E−05 |

TABLE 4'-continued

Example 4'

Second surface
Radius of curvature · Aspheric surface coefficient

| h | $0 \leq h \leq 1.54$ | $1.54 < h$ |
|---|---|---|
| r | 65.9724 | 643.7815 |
| κ | 1.0000E+01 | 1.0000E+01 |
| A4 | 3.1093E−03 | 8.9754E−03 |
| A6 | −1.3025E−03 | −8.1022E−04 |
| A8 | 1.2188E−03 | −6.8268E−04 |
| A10 | −5.8067E−04 | 7.9746E−05 |
| A12 | 6.7139E−05 | −4.7903E−06 |
| A14 | 0.0000E+00 | 0.0000E+00 |

| Third surface Aspheric surface coefficient | | Forth surface Aspheric surface coefficient | |
|---|---|---|---|
| κ | −6.4822E−01 | κ | −4.9132E+01 |
| A4 | 2.0499E−02 | A4 | 2.7393E−02 |
| A6 | −7.1252E−03 | A6 | 5.9012E−02 |
| A8 | 2.6231E−03 | A8 | −3.0228E−02 |
| A10 | 4.9955E−04 | A10 | −6.0674E−03 |
| A12 | −3.8169E−04 | A12 | 4.8664E−05 |
| A14 | 9.5612E−05 | A14 | 2.7695E−03 |
| A16 | −1.1952E−05 | A16 | 0.0000E+00 |
| A18 | 1.8416E−06 | A18 | 0.0000E+00 |
| A20 | 2.1732E−07 | A20 | 0.0000E+00 |

Example 5

The present Example is the plastic objective lens that is appropriate as objective lens OBJ1 in the embodiment stated above. For obtaining the objective lens characteristic of the present Example, it is defined that the wavelength λ1 of the first light source for the first optical disk (the next generation high density optical disk for which the blue violet semiconductor laser is used) is 405 nm, the wavelength λ2 of the second light source for the second optical disk (DVD) is 650 nm, the wavelength λ3 of the third light source for the third optical disk (CD) is 780 nm, the transparent substrate thickness t1 of the first optical disk is 0.1 mm, the transparent substrate thickness t2 of the second optical disk is 0.6 mm, and the transparent substrate thickness t3 of the third optical disk is 1.2 mm. Further, as the image side numerical apertures NA1, NA2 and NA3 necessary for conducting the recording and reproducing of the information onto the first-the third optical disks, respectively 0.85, 0.65, and 0.50 are assumed.

In FIG. 9 to FIG. 11, the optical path views in λ1=405 nm, λ2=650 nm, and λ3=780 nm of the objective lens in the present Example are shown. Further, in FIG. 12, the spherical aberration view up to the numerical aperture 0.85 for λ1=405 nm of the objective lens of the present Example, is shown. Further, in FIG. 13, the spherical aberration view when the light of λ2=650 nm of the light flux diameter equal to the diaphragm diameter determined by the combination of λ1=405 nm and NA1 0.85 is made incident on it, is shown. Further, in FIG. 14, the spherical aberration view when the light of λ3=780 nm of the light flux diameter equal to the diaphragm diameter determined by the combination of λ1=405 nm and NA1 0.85 is made incident on it, is shown.

In the objective lens of the present Example, by the action of the diffractive structure (not shown) formed on the light flux incident surface (S1), the spherical aberration generated by the difference of the transparent substrate thickness of 3 kinds of optical disks is finely corrected in the image side numerical aperture necessary for conducting the recording and reproducing of the information onto respective optical disks. In this connection, the wave front aberrations in the predetermined image side numerical aperture of the objective lens of the present Example, are as follows.

When λ1=405 nm, NA1 0.85, and t1=0.1 mm, 0.008 λ1 rms, when λ2=650 nm, NA2 0.65, and t2=0.6 mm, 0.003 λ2 rms, and when λ3=780 nm, NA3 0.50, and t3=1.2 mm, 0.005 λ3 rms.

Further, in the objective lens of the present Example, because the light flux of the wavelength 650 nm which passes the region of the outside of NA2 0.65 is made flare so that the light flux is not converged on the information recording surface of the second optical disk, and further, the light flux which passes the region of the outside of NA3 0.50 is made flare so that the light flux is not converged on the information recording surface of the third optical disk, the spot is not focused more than necessary, and the enough margin can be secured to the disk skew of the second and the third optical disks, and further, the aperture is automatically regulated corresponding to the respective optical disks, therefore, it is not necessary to provide the aperture regulating/changing means separately, and the structure of the optical pick-up can be made simple.

In this connection, as the high density next generation first optical disk, by assuming that the transparent substrate thickness t1 is 0.1 mm, the wavelength of the light source is 405 nm, and image side numerical aperture is 0.85, the optical design is advanced, however, the present invention can also be applied onto the optical disk of the specification other than this.

Further, the optical design is advanced by assuming that the image side numerical aperture is 0.65 for the second optical disk (DVD), and the image side numerical aperture for the third optical disk (CD) is 0.50, however, the present invention can also be applied onto the optical disk of the specification other than this.

The lens data of the objective lens of the present example is shown in Table 5.

TABLE 5

Example 5

When the wavelength $\lambda 1 = 405$ nm,
the focal distance f1 = 2.35 mm, image side numerical aperture NA1 = 0.85, magnification m1 = 0, diffraction order n1 = 2
When the wavelength $\lambda 2 = 650$ nm,
the focal distance f2 = 2.44 mm, image side numerical aperture NA2 = 0.60, magnification m2 = −0.10, diffraction order n2 = 1
When the wavelength $\lambda 3 = 780$ nm,
the focal distance f3 = 2.43 mm, image side numerical aperture NA3 = 0.45, magnification m3 = −0.17, diffraction order n3 = 1

| Surface No. | r (mm) | d (mm) | N$\lambda$1 | N$\lambda$2 | N$\lambda$3 | νd | note |
|---|---|---|---|---|---|---|---|
| 0 | | d0 (*1) | | | | | light source |
| 1 | 1.561 | 2.750 | 1.52491 | 1.50690 | 1.50355 | 56.5 | objective lens |
| 2 | −2.766 | d2 (*2) | | | | | |
| 3 | ∞ | d3 (*3) | 1.61950 | 1.57756 | 1.57062 | 30.0 | transparent substrate |
| 4 | ∞ | | | | | | |

| | $\lambda 1 = 405$ nm | $\lambda 2 = 650$ nm | $\lambda 3 = 780$ nm |
|---|---|---|---|
| d0 | ∞ | 25.754 | 16.189 |
| d2 | 0.100 | 0.600 | 1.200 |
| d3 | 0.771 | 0.780 | 0.550 |

Aspherical surface coefficient

| | 1st surface | 2nd surface |
|---|---|---|
| κ | −4.7792E−01 | −3.0529E+01 |
| A4 | −1.6095E−03 | 5.4297E−02 |
| A6 | 3.8846E−04 | −5.3944E−03 |
| A8 | 2.5985E−04 | −2.8858E−03 |
| A10 | 8.0200E−06 | 4.1563E−04 |
| A12 | −4.6137E−05 | −2.6037E−05 |
| A14 | 9.3827E−06 | 4.7586E−05 |
| A16 | −1.2994E−07 | −5.4700E−06 |

Diffractive surface coefficient

| | 2nd surface |
|---|---|
| b2 | −5.0000E−03 |
| b4 | −8.3304E−04 |
| b6 | 4.0431E−04 |
| b8 | −3.9806E−05 |
| b10 | −1.3503E−05 |

(*1) (variable)
(*2) (variable)
(*3) (variable)

In the objective lens of the present Example, the ring-shaped zone-like diffractive structure, as shown in Table 6, is formed on the aspherical surface of the plane of the light flux incidence (the first surface in Table 5). In Table 6, "start point height" expresses the distance from the optical axis of the start point of the ring-shaped zone, and "last point height" expresses the distance from the optical axis of the last point of the ring-shaped zone, and the number of the ring-shaped zones in the effective diameter is 83.

TABLE 6

| Ring-shaped zone No. | Start point height (mm) | Last point height (mm) |
|---|---|---|
| 1 | 0.000 | 0.274 |
| 2 | 0.274 | 0.385 |
| 3 | 0.385 | 0.470 |
| 4 | 0.470 | 0.540 |
| 5 | 0.540 | 0.602 |
| 6 | 0.602 | 0.657 |
| 7 | 0.657 | 0.707 |
| 8 | 0.707 | 0.754 |
| 9 | 0.754 | 0.797 |
| 10 | 0.797 | 0.839 |
| 11 | 0.839 | 0.878 |
| 12 | 0.878 | 0.915 |
| 13 | 0.915 | 0.951 |
| 14 | 0.951 | 0.986 |
| 15 | 0.986 | 1.019 |

TABLE 6-continued

| Ring-shaped zone No. | Start point height (mm) | Last point height (mm) |
|---|---|---|
| 16 | 1.019 | 1.051 |
| 17 | 1.051 | 1.083 |
| 18 | 1.083 | 1.113 |
| 19 | 1.113 | 1.143 |
| 20 | 1.143 | 1.172 |
| 21 | 1.172 | 1.200 |
| 22 | 1.200 | 1.228 |
| 23 | 1.228 | 1.255 |
| 24 | 1.255 | 1.282 |
| 25 | 1.282 | 1.308 |
| 26 | 1.308 | 1.333 |
| 27 | 1.333 | 1.358 |
| 28 | 1.358 | 1.382 |
| 29 | 1.382 | 1.405 |
| 30 | 1.405 | 1.428 |
| 31 | 1.428 | 1.451 |
| 32 | 1.451 | 1.472 |
| 33 | 1.472 | 1.493 |
| 34 | 1.493 | 1.514 |
| 35 | 1.514 | 1.534 |
| 36 | 1.534 | 1.553 |
| 37 | 1.553 | 1.571 |
| 38 | 1.571 | 1.589 |
| 39 | 1.589 | 1.607 |
| 40 | 1.607 | 1.623 |
| 41 | 1.623 | 1.640 |
| 42 | 1.640 | 1.655 |
| 43 | 1.655 | 1.670 |
| 44 | 1.670 | 1.684 |
| 45 | 1.684 | 1.698 |
| 46 | 1.698 | 1.712 |
| 47 | 1.712 | 1.725 |
| 48 | 1.725 | 1.737 |
| 49 | 1.737 | 1.749 |
| 50 | 1.749 | 1.761 |
| 51 | 1.761 | 1.772 |
| 52 | 1.772 | 1.783 |
| 53 | 1.783 | 1.793 |
| 54 | 1.793 | 1.803 |
| 55 | 1.803 | 1.813 |
| 56 | 1.813 | 1.822 |
| 57 | 1.822 | 1.832 |
| 58 | 1.832 | 1.840 |
| 59 | 1.840 | 1.849 |
| 60 | 1.849 | 1.857 |
| 61 | 1.857 | 1.866 |
| 62 | 1.866 | 1.873 |
| 63 | 1.873 | 1.881 |
| 64 | 1.881 | 1.889 |
| 65 | 1.889 | 1.896 |
| 66 | 1.896 | 1.903 |
| 67 | 1.903 | 1.910 |
| 68 | 1.910 | 1.916 |
| 69 | 1.916 | 1.923 |
| 70 | 1.923 | 1.929 |
| 71 | 1.929 | 1.936 |
| 72 | 1.936 | 1.942 |
| 73 | 1.942 | 1.948 |
| 74 | 1.948 | 1.954 |
| 75 | 1.954 | 1.959 |
| 76 | 1.959 | 1.965 |
| 77 | 1.965 | 1.970 |
| 78 | 1.970 | 1.976 |
| 79 | 1.976 | 1.981 |
| 80 | 1.981 | 1.986 |
| 81 | 1.986 | 1.991 |
| 82 | 1.991 | 1.996 |
| 83 | 1.996 | 2.001 |

The diffractive ring-shaped zone structure in Table 6 is optimized so that the diffraction efficiency is theoretically 100% at the wavelength (λB) 380 nm and diffraction order 2. When the light of the wavelength 405 nm which is the using wavelength of the first optical disk (high density DVD), is incident on the diffractive structure, the second order diffracted ray is generated so as to have the maximum diffracted light amount, and when the light of the wavelength 650 nm which is the using wavelength of the second optical disk (DVD), is incident on the diffractive structure, and when the light of the wavelength 780 nm which is the using wavelength of the third optical disk (CD), is incident on the diffractive structure, the first order diffracted ray is generated so as to have the maximum diffracted light amount.

When the diffractive structure is optimized at the wavelength 380 nm and the diffraction order 2, in the using wavelength regions of the respective optical disks, the following diffraction efficiencies can be obtained.

the high density DVD (wavelength 405 nm): 95.1%,

DVD (wavelength 650 nm): 90.9%, and

CD (wavelength 780 nm): 99.8%.

Example 6

The present Example is the glass objective lens that is appropriate as objective lens OBJ1 in the embodiment stated above. For obtaining the objective lens characteristic of the present Example, it is defined that the wavelength λ1 of the first light source for the first optical disk (the next generation high density DVD for which the blue violet semiconductor laser is used) is 405 nm, the wavelength λ2 of the second light source for the second optical disk (DVD) is 650 nm, the wavelength λ3 of the third light source for the third optical disk (CD) is 780 nm, the transparent substrate thickness t1 of the first optical disk is 0.1 mm, the transparent substrate thickness t2 of the second optical disk is 0.6 mm, and the transparent substrate thickness t3 of the third optical disk is 1.2 mm. Further, as the image side numerical apertures NA1, NA2 and NA3 necessary for conducting the recording and reproducing of the information onto the first-the third optical disks, respectively 0.85, 0.65, and 0.50 are assumed.

In FIG. 15 to FIG. 17, the optical path views in λ1=405 nm, λ2=650 nm, and λ3=780 nm of the objective lens in the present Example are shown. Further, in FIG. 18, the spherical aberration view up to the numerical aperture 0.85 for λ1=405 nm of the objective lens of the present Example, is shown. Further, in FIG. 19, the spherical aberration view when the light of λ2=650 nm of the light flux diameter equal to the diaphragm diameter determined by the combination of λ1=405 nm and NA1 0.85 is made incident on it, is shown. Further, in FIG. 20, the spherical aberration view when the light of λ3=780 nm of the light flux diameter equal to the diaphragm diameter determined by the combination of λ1=405 nm and NA1 0.85 is made incident on it, is shown.

In the objective lens of the present Example, by the action of the diffractive structure (not shown) formed on the plane of the light flux incidence, the spherical aberration generated by the difference of the transparent substrate thickness of 3 kinds of optical disks is finely corrected in the image side numerical aperture necessary for conducting the recording and reproducing of the information onto respective optical disks. In this connection, the wave front aberrations in the predetermined image side numerical aperture of the objective lens of the present Example, are as follows.

When λ1=405 nm, NA1 0.85, and t1=0.1 mm, 0.008 λ1 rms, when λ2=650 nm, NA2 0.65, and t2=0.6 mm, 0.005 λ2 rms, and when λ3=780 nm, NA3 0.50, and t3=1.2 mm, 0.005 λ3 rms.

Further, in the objective lens of the present Example, because the light flux of the wavelength 650 nm which passes the region of the outside of NA2 0.65 is made flare so that the light flux is not converged on the information recording surface of the second optical disk, and further, the light flux which passes the region of the outside of NA3 0.50 is made flare so that the light flux is not converged on the information recording surface of the third optical disk, the spot is not focused more than necessary, and the enough margin can be secured to the disk skew of the second and the third optical disks, and further, the aperture is automatically regulated corresponding to the respective optical disks, therefore, it is not necessary to provide the aperture regulating/changing means separately, and the structure of the optical pick-up can be made simple.

In this connection, as the high density next generation first optical disk, by assuming that the transparent substrate thickness t1 is 0.1 mm, the wavelength of the light source is 405 nm, and image side numerical aperture is 0.85, the optical design is advanced, however, the present invention can also be applied onto the optical disk of the specification other than this.

Further, the optical design is advanced by assuming that the image side numerical aperture is 0.65 for the second optical disk (DVD), and the image side numerical aperture for the third optical disk (CD) is 0.50, however, the present invention can also be applied onto the optical disk of the specification other than this.

The lens data of the objective lens of the present Example is shown in Table 7.

TABLE 7

Example 6

When the wavelength $\lambda 1 = 405$ nm,
the focal distance f1 = 2.35 mm, image side numerical
aperture NA1 = 0.85, magnification m1 = 0, diffraction order
n1 = 6,
When the wavelength $\lambda 2 = 650$ nm,
the focal distance f2 = 2.43 mm, image side numerical
aperture NA2 = 0.65, magnification m2 = −0.07, diffraction
order n2 = 4,
When the wavelength $\lambda 3 = 780$ nm,
the focal distance f3 = 2.47 mm, image side numerical
aperture NA3 = 0.50, magnification m3 = −0.12, diffraction
order n3 = 3

| Surface No. | r (mm) | d (mm) | N$\lambda$1 | N$\lambda$2 | N$\lambda$3 | $\nu$d | note |
|---|---|---|---|---|---|---|---|
| 0 | | d0 (*1) | | | | | light source |
| 1 | 1.916 | 2.500 | 1.76904 | 1.73912 | 1.73324 | 49.3 | objective lens |
| 2 | −2364.844 | d2 (*2) | | | | | |
| 3 | ∞ | d3 (*3) | 1.61949 | 1.57756 | 1.57062 | 30.0 | transparent substrate |
| 4 | ∞ | | | | | | |

| | $\lambda 1 = 405$ nm | $\lambda 2 = 650$ nm | $\lambda 3 = 780$ nm |
|---|---|---|---|
| d0 | ∞ | 37.984 | 22.652 |
| d2 | 0.100 | 0.600 | 1.200 |
| d3 | 0.876 | 0.781 | 0.559 |

Aspherical surface coefficient

| | 1st surface | 2nd surface |
|---|---|---|
| $\kappa$ | −6.4710E−01 | 0.0000E+00 |
| A4 | 8.2429E−03 | 3.7215E−02 |
| A6 | −4.2424E−03 | −2.4887E−02 |
| A8 | 1.9819E−03 | −4.6124E−03 |
| A10 | −3.1417E−04 | 6.4199E−03 |
| A12 | −7.2817E−05 | −1.8182E−03 |
| A14 | 4.1695E−05 | 1.7603E−04 |
| A16 | −6.7073E−06 | |

Diffractive surface coefficient

| | 1st surface |
|---|---|
| b2 | −2.0000E−03 |
| b4 | 3.2212E−04 |
| b6 | −4.6124E−04 |
| b8 | 1.5716E−04 |
| b10 | −1.9533E−05 |

(*1) (variable)
(*2) (variable)
(*3) (variable)

In the objective lens of the present Example, the ring-shaped zone-like diffractive structure, as shown in Table 8, is formed on the aspherical surface of the plane of the light flux incidence (the first surface in Table 7). In Table 8, "start point height" expresses the distance from the optical axis of the start point of the ring-shaped zone, and "last point height" expresses the distance from the optical axis of the last point of the ring-shaped zone, and the number of the ring-shaped zones in the effective diameter is 30.

TABLE 8

| Ring-shaped zone No. | Start point height (mm) | Last point height (mm) |
|---|---|---|
| 1 | 0.000 | 0.461 |
| 2 | 0.461 | 0.655 |
| 3 | 0.655 | 0.800 |
| 4 | 0.800 | 0.918 |
| 5 | 0.918 | 1.016 |
| 6 | 1.016 | 1.102 |
| 7 | 1.102 | 1.178 |
| 8 | 1.178 | 1.246 |
| 9 | 1.246 | 1.309 |
| 10 | 1.309 | 1.367 |
| 11 | 1.367 | 1.421 |
| 12 | 1.421 | 1.472 |
| 13 | 1.472 | 1.520 |
| 14 | 1.520 | 1.565 |
| 15 | 1.565 | 1.608 |
| 16 | 1.608 | 1.649 |
| 17 | 1.649 | 1.687 |
| 18 | 1.687 | 1.724 |
| 19 | 1.724 | 1.758 |
| 20 | 1.758 | 1.790 |
| 21 | 1.790 | 1.819 |
| 22 | 1.819 | 1.847 |
| 23 | 1.847 | 1.873 |
| 24 | 1.873 | 1.897 |
| 25 | 1.897 | 1.920 |
| 26 | 1.920 | 1.941 |
| 27 | 1.941 | 1.961 |
| 28 | 1.961 | 1.979 |
| 29 | 1.979 | 1.996 |
| 30 | 1.996 | 2.012 |

The diffractive ring-shaped zone structure in Table 8 is optimized so that the diffraction efficiency is theoretically 100% at the wavelength ($\lambda B$) 415 nm and diffraction order 6. When the light of the wavelength 405 nm which is the using wavelength of the first optical disk (high density DVD), is incident on the diffractive structure, the sixth order diffracted ray is generated so as to have the maximum diffracted light amount, and when the light of the wavelength 650 nm which is the using wavelength of the second optical disk (DVD), is incident on the diffractive structure, the fourth order diffracted ray is generated so as to have the maximum diffracted light amount, and when the light of the wavelength 780 nm which is the using wavelength of the third optical disk (CD), is incident on the diffractive structure, the third order diffracted ray is generated so as to have the maximum diffracted light amount.

When the diffractive structure is optimized at the wavelength 415 nm and the diffraction order 6, in the using wavelength regions of the respective optical disks, the following diffraction efficiencies can be obtained.

the high density DVD (wavelength 405 nm): 93.0%,

DVD (wavelength 650 nm): 90.9%, and

CD (wavelength 780 nm): 88.4%.

Example 7

The present Example is the objective lens that is appropriate as objective lens OBJ2 in the embodiment stated above. For obtaining the objective lens characteristic of the present Example, it is defined that the wavelength $\lambda 1$ of the first light source for the first optical disk (the next generation high density DVD for which the blue violet semiconductor laser is used) is 405 nm, the wavelength $\lambda 2$ of the second light source for the second optical disk (DVD) is 650 nm, the wavelength $\lambda 3$ of the third light source for the third optical disk (CD) is 780 nm, the transparent substrate thickness t1 of the first optical disk is 0.1 mm, the transparent substrate thickness t2 of the second optical disk is 0.6 mm, and the transparent substrate thickness t3 of the third optical disk is 1.2 mm. Further, as the image side numerical apertures NA1, NA2 and NA3 necessary for conducting the recording and reproducing of the information onto the first-the third optical disks, respectively 0.85, 0.60, and 0.50 are assumed.

In FIG. 21 to FIG. 23, the optical path views in $\lambda 1$=405 nm, $\lambda 2$=650 nm, and $\lambda 3$=780 nm of the objective lens in the present Example are shown. Further, in FIG. 24, the spherical aberration view up to the numerical aperture 0.85 for $\lambda 1$=405 nm of the objective lens of the present Example, is shown. Further, in FIG. 25, the spherical aberration view when the light of $\lambda 2$=650 nm of the light flux diameter equal to the diaphragm diameter determined by the combination of $\lambda 1$=405 nm and NA1 0.85 is made incident on it, is shown. Further, in FIG. 26, the spherical aberration view when the light of $\lambda 3$=780 nm of the light flux diameter equal to the diaphragm diameter determined by the combination of $\lambda 1$=405 nm and NA1 0.85 is made incident on it, is shown.

The objective lens of the present Example, is a hybrid objective lens structured by the plastic aspherical surface lens (correspond to the first optical element L1) and the plastic diffractive optical element (correspond to the second optical element L2), arranged on the side of the plane of the light flux incidence of the aspherical lens, and by the action of the diffractive structure (not shown) formed on the optical surface of the aspherical surface lens side of the diffractive optical element, the spherical aberration generated by the difference of the transparent substrate thickness of 3 kinds of optical disks is finely corrected in the image side numerical aperture necessary for conducting the recording and reproducing of the information onto respective optical disks. In this connection, the wave front aberrations in the predetermined image side numerical aperture of the objective lens of the present Example, are as follows;

When $\lambda 1$=405 nm, NA1 0.85, and t1=0.1 mm, 0.004 $\lambda 1$ rms, when $\lambda 2$=650 nm, NA2 0.60, and t2=0.6 mm, 0.001 $\lambda 2$ rms, and when $\lambda 3$=780 nm, NA3 0.50, and t3=1.2 mm, 0.002 $\lambda 3$ rms.

Further, in the objective lens of the present Example, because the light flux of the wavelength 650 nm which passes the region of the outside of NA2 0.65 is made flare so that the light flux is not converged on the information recording surface of the second optical disk, and further, the light flux which passes the region of the outside of NA3 0.50 is made flare so that the light flux is not converged on the information recording surface of the third optical disk, the spot is not focused more than necessary, and the enough margin can be secured to the disk skew of the second and the third optical disks, and further, the aperture is automatically regulated corresponding automatically to the respective optical disks, therefore, it is not necessary to provide the aperture regulating/changing means separately, and the structure of the optical pick-up can be made simple.

In this connection, in the objective lens of the present Example, as the high density next generation first optical disk, by assuming that the transparent substrate thickness t1 is 0.1 mm, the wavelength of the light source is 405 nm, and image side numerical aperture is 0.85, the optical design is advanced, however, the present invention can also be applied onto the optical disk of the specification other than this.

Further, the optical design is advanced by assuming that the image side numerical aperture is 0.65 for the second optical disk (DVD), and the image side numerical aperture for the third optical disk (CD) is 0.50, however, the present invention can also be applied onto the optical disk of the specification other than this.

The lens data of the objective lens of the present Example is shown in Table 9.

TABLE 9

Example 7

When the wavelength $\lambda_1$ = 405 nm,
the focal distance f1 = 2.65 mm, image side numerical aperture NA1 = 0.85, magnification m1 = 0, diffraction order n1 = 2,
When the wavelength $\lambda_2$ = 650 nm,
the focal distance f2 = 2.754 mm, image side numerical aperture NA2 = 0.60, magnification m2 = −0.07, diffraction order n2 = 1,
When the wavelength $\lambda_3$ = 780 nm,
the focal distance f3 = 2.74 mm, image side numerical aperture NA3 = 0.50, magnification m3 = −0.12, diffraction order n3 = 1

| Surface No. | r (mm) | d (mm) | N$\lambda_1$ | N$\lambda_2$ | N$\lambda_3$ | νd | note |
|---|---|---|---|---|---|---|---|
| 0 |  | d0 (*1) |  |  |  |  | light source |
| 1 | −19.912 | 1.000 | 1.52491 | 1.50690 | 1.50355 | 56.5 | objective lens |
| 2 | ∞ | 0.100 |  |  |  |  |  |
| 3 | 1.596 | 3.100 | 1.52491 | 1.50690 | 1.50355 | 56.5 |  |
| 4 | −4.098 | d4 (*2) |  |  |  |  |  |
| 5 | ∞ | d5 (*3) | 1.61950 | 1.57756 | 1.57062 | 30.0 | transparent substrate |
| 6 | ∞ |  |  |  |  |  |  |

|  | $\lambda_1$ = 405 nm | $\lambda_2$ = 650 nm | $\lambda_3$ = 780 nm |
|---|---|---|---|
| d0 | ∞ | 40.379 | 23.614 |
| d2 | 0.100 | 0.600 | 1.200 |
| d3 | 0.830 | 0.807 | 0.546 |

Aspherical surface coefficient

|  | 1st surface | 3rd surface | 4th surface |
|---|---|---|---|
| κ | 0 | −6.6547E−01 | −5.1020E+01 |
| A4 | 5.34E−03 | −2.6444E−03 | 4.6682E−02 |
| A6 | −8.16E−04 | 1.7131E−03 | −2.4977E−02 |
| A8 |  | −4.7417E−05 | 7.9334E−03 |
| A10 |  | 2.1808E−05 | −1.4570E−03 |
| A12 |  | 1.4276E−07 | 1.2211E−04 |
| A14 |  | 6.8395E−07 | −7.8711E−07 |

Diffractive surface coefficient

|  | 1st surface |
|---|---|
| b2 | −6.0000E−03 |
| b4 | −7.4571E−04 |
| b6 | 2.1879E−04 |
| b8 | −5.2397E−05 |
| b10 | 3.2165E−06 |

(*1) (variable)
(*2) (variable)
(*3) (variable)

In the objective lens of the present Example, the ring-shaped zone-like diffractive structure, as shown in Table 10, is formed on the plane of the surface of the optical disk side (the second surface in Table 9) of the diffractive optical element. In Table 10, "start point height" expresses the distance from the optical axis of the start point of the ring-shaped zone, and "last point height" expresses the distance from the optical axis of the last point of the ring-shaped zone, and the number of the ring-shaped zones in the effective diameter is 130.

TABLE 10

| Ring-shaped zone No. | Start point height (mm) | Last point height (mm) |
|---|---|---|
| 1 | 0.000 | 0.249 |
| 2 | 0.249 | 0.351 |
| 3 | 0.351 | 0.428 |
| 4 | 0.428 | 0.493 |
| 5 | 0.493 | 0.550 |
| 6 | 0.550 | 0.600 |
| 7 | 0.600 | 0.647 |
| 8 | 0.647 | 0.689 |
| 9 | 0.689 | 0.729 |
| 10 | 0.729 | 0.767 |
| 11 | 0.767 | 0.803 |
| 12 | 0.803 | 0.836 |
| 13 | 0.836 | 0.869 |
| 14 | 0.869 | 0.900 |
| 15 | 0.900 | 0.929 |
| 16 | 0.929 | 0.958 |
| 17 | 0.958 | 0.986 |
| 18 | 0.986 | 1.012 |
| 19 | 1.012 | 1.038 |
| 20 | 1.038 | 1.063 |
| 21 | 1.063 | 1.088 |
| 22 | 1.088 | 1.111 |
| 23 | 1.111 | 1.135 |
| 24 | 1.135 | 1.157 |
| 25 | 1.157 | 1.179 |
| 26 | 1.179 | 1.201 |
| 27 | 1.201 | 1.222 |
| 28 | 1.222 | 1.242 |
| 29 | 1.242 | 1.262 |
| 30 | 1.262 | 1.282 |
| 31 | 1.282 | 1.301 |
| 32 | 1.301 | 1.320 |
| 33 | 1.320 | 1.329 |
| 34 | 1.329 | 1.357 |
| 35 | 1.357 | 1.375 |
| 36 | 1.375 | 1.393 |
| 37 | 1.393 | 1.410 |
| 38 | 1.410 | 1.427 |
| 39 | 1.427 | 1.444 |
| 40 | 1.444 | 1.460 |
| 41 | 1.460 | 1.476 |
| 42 | 1.476 | 1.492 |
| 43 | 1.492 | 1.508 |
| 44 | 1.508 | 1.523 |
| 45 | 1.523 | 1.538 |
| 46 | 1.538 | 1.553 |
| 47 | 1.553 | 1.568 |
| 48 | 1.568 | 1.582 |
| 49 | 1.582 | 1.596 |
| 50 | 1.596 | 1.610 |
| 51 | 1.610 | 1.624 |
| 52 | 1.624 | 1.638 |
| 53 | 1.638 | 1.651 |
| 54 | 1.651 | 1.664 |
| 55 | 1.664 | 1.677 |
| 56 | 1.677 | 1.690 |
| 57 | 1.690 | 1.703 |
| 58 | 1.703 | 1.715 |
| 59 | 1.715 | 1.728 |
| 60 | 1.728 | 1.740 |
| 61 | 1.740 | 1.752 |
| 62 | 1.752 | 1.763 |
| 63 | 1.763 | 1.775 |
| 64 | 1.775 | 1.786 |
| 65 | 1.786 | 1.798 |
| 66 | 1.798 | 1.809 |
| 67 | 1.809 | 1.820 |
| 68 | 1.820 | 1.831 |
| 69 | 1.831 | 1.842 |
| 70 | 1.842 | 1.852 |
| 71 | 1.852 | 1.863 |
| 72 | 1.863 | 1.873 |
| 73 | 1.873 | 1.883 |
| 74 | 1.883 | 1.893 |
| 75 | 1.893 | 1.903 |
| 76 | 1.903 | 1.913 |
| 77 | 1.913 | 1.923 |
| 78 | 1.923 | 1.932 |
| 79 | 1.932 | 1.942 |
| 80 | 1.942 | 1.951 |
| 81 | 1.951 | 1.960 |
| 82 | 1.960 | 1.969 |
| 83 | 1.969 | 1.978 |
| 84 | 1.978 | 1.987 |
| 85 | 1.987 | 1.996 |
| 86 | 1.996 | 2.005 |
| 87 | 2.005 | 2.013 |
| 88 | 2.013 | 2.022 |
| 89 | 2.022 | 2.030 |
| 90 | 2.030 | 2.039 |
| 91 | 2.039 | 2.047 |
| 92 | 2.047 | 2.055 |
| 93 | 2.055 | 2.063 |
| 94 | 2.063 | 2.071 |
| 95 | 2.071 | 2.079 |
| 96 | 2.079 | 2.087 |
| 97 | 2.087 | 2.095 |
| 98 | 2.095 | 2.102 |
| 99 | 2.102 | 2.110 |
| 100 | 2.110 | 2.117 |
| 101 | 2.117 | 2.125 |
| 102 | 2.125 | 2.132 |
| 103 | 2.132 | 2.139 |
| 104 | 2.139 | 2.146 |
| 105 | 2.146 | 2.154 |
| 106 | 2.154 | 2.161 |
| 107 | 2.161 | 2.168 |
| 108 | 2.168 | 2.175 |
| 109 | 2.175 | 2.181 |
| 110 | 2.181 | 2.188 |
| 111 | 2.188 | 2.915 |
| 112 | 2.915 | 2.202 |
| 113 | 2.202 | 2.208 |
| 114 | 2.208 | 2.215 |
| 115 | 2.215 | 2.221 |
| 116 | 2.221 | 2.228 |
| 117 | 2.228 | 2.234 |
| 118 | 2.234 | 2.241 |
| 119 | 2.241 | 2.247 |
| 120 | 2.247 | 2.253 |
| 121 | 2.253 | 2.259 |
| 122 | 2.259 | 2.266 |
| 123 | 2.266 | 2.272 |
| 124 | 2.272 | 2.278 |
| 125 | 2.278 | 2.284 |
| 126 | 2.284 | 2.290 |
| 127 | 2.290 | 2.295 |
| 128 | 2.295 | 2.301 |
| 129 | 2.301 | 2.307 |
| 130 | 2.307 | 2.313 |

The diffractive ring-shaped zone structure in Table 10 is optimized so that the diffraction efficiency is theoretically 100% at the wavelength ($\lambda B$) 375 nm and diffraction order 2. When the light of the wavelength 405 nm which is the using wavelength of the first optical disk (high density DVD), is incident on the diffractive structure, the second order diffracted ray is generated so as to have the maximum diffracted light amount, and when the light of the wavelength 650 nm which is the using wavelength of the second optical disk (DVD), is incident on the diffractive structure, and when the light of the wavelength 780 nm which is the using wavelength of the third optical disk (CD), is incident on the diffractive structure, the first order diffracted ray is generated so as to have the maximum diffracted light amount.

When the diffractive structure is optimized at the wavelength 375 nm and the diffraction order 2, in the using wavelength regions of the respective optical disks, the following diffraction efficiencies can be obtained;

the high density DVD (wavelength 405 nm): 93.0%,

DVD (wavelength 650 nm): 92.5%, and

CD (wavelength 780 nm): 99.5%.

Further, the diffractive structure of the diffractive optical element of the objective lens of the present Example can be produced by the electronic beam drawing method, and even when it is the diffractive structure in which the minimum value of the adjoining ring-shaped zone interval is small like as 6 μm, the diffractive structure can be high accurately produced, and the diffractive optical element in which the lowering of the diffraction efficiency due to the shape error of the diffractive structure is small, can be realized. Relating to the production method of the fine diffractive structure by the electronic beam drawing method, it is described in "OPTICS DESIGN optical design research group magazine No. 20 2000. 2.25 p 26-p 31".

Example 8

The present Example is the plastic objective lens that is appropriate as objective lens OBJ1 in the embodiment stated above. For obtaining the objective lens characteristic of the present Example, it is defined that the wavelength λ1 of the first light source for the first optical disk (the next generation high density DVD for which the blue violet semiconductor laser is used) is 405 nm, the wavelength λ2 of the second light source for the second optical disk (DVD) is 655 nm, the wavelength λ3 of the third light source for the third optical disk (CD) is 785 nm, the transparent substrate thickness t1 of the first optical disk is 0.1 mm, the transparent substrate thickness t2 of the second optical disk is 0.6 mm, and the transparent substrate thickness t3 of the third optical disk is 1.2 mm. Further, as the image side numerical apertures NA1, NA2 and NA3 of the objective lens necessary for conducting the recording and reproducing of the information onto the first-the third optical disks, respectively 0.85, 0.60, and 0.50 are assumed.

In FIG. 27 to FIG. 29, the optical path views in λ1=405 nm, λ2=655 nm, and λ3=785 nm of the objective lens in the present Example are shown. Further, in FIG. 30, the spherical aberration view up to the numerical aperture 0.85 for λ1=405 nm of the objective lens of the present Example, is shown. Further, in FIG. 31, the spherical aberration view when the light of λ2=655 nm of the light flux diameter equal to the diaphragm diameter determined by the combination of λ1=405 nm and NA1 0.85 is made incident on it, is shown. Further, in FIG. 32, the spherical aberration view up to numerical aperture 0.45 to the light of λ3=785 nm, is shown.

In the objective lens of the present Example, by the action of the diffractive structure (not shown) formed on the plane of the light flux incidence, the spherical aberration generated by the difference of the transparent substrate thickness between the first optical disk and the second optical disk is finely corrected in the image side numerical aperture necessary for conducting the recording and reproducing of the information onto respective optical disks of the first optical disk and the second optical disk. Further, for the third optical disk, by making incident the light flux of the wavelength λ3 which is the divergent light, on the objective lens, the spherical aberration generated due to the difference of the transparent substrate thickness of the first to the third optical disks, is finely corrected in the image side numerical aperture necessary for conducting the recording and reproducing of the information onto the third optical disk.

In this connection, the wave front aberrations in the predetermined image side numerical aperture of the objective lens of the present Example, are as follows;

When λ1=405 nm, NA1 0.85, and t1=0.1 mm, 0.004 λ1 rms, when λ2=655 nm, NA2 0.60, and t2=0.6 mm, 0.007 λ2 rms, and when λ3=785 nm, NA3 0.45, and t3=1.2 mm, 0.005 λ3 rms.

Further, in the objective lens of the present Example, because the light flux of the wavelength 655 nm which passes the region of the outside of NA2 0.60 is made flare so that the light flux is not converged on the information recording surface of the second optical disk, and further, the spot is not focused more than necessary, and the enough margin can be secured to the disk skew of the second optical disk, and further, the aperture is automatically regulated corresponding automatically to the second optical disk, therefore, it is not necessary to provide the aperture regulating/changing means separately, and the structure of the optical pick-up can be made simple.

Then, on the optical surface of the objective lens, a filter having the wavelength selectivity which is the aperture regulating/changing means necessary when the recording and/or reproducing of the information is conducted on the third optical disk, is formed. When the recording and reproducing of the information are conducted onto the third optical disk, the light flux more than the necessary numerical aperture is shut off by the ring-shaped zone filter having the wavelength selectivity. Thereby, a desired spot diameter can be obtained on the information recording surface of the third optical disk. As the ring-shaped zone filter having the wavelength selectivity, in the objective lens shown in FIG. 50 (mentioned later), a filter in which the reflection factor has the wavelength dependency as shown in FIG. 33, is formed on the optical surface of the objective lens ring-shaped zone-like, is listed.

In this connection, in the objective lens of the present Example, as the high density next generation first optical disk, by assuming that the transparent substrate thickness t1 is 0.1 mm, the wavelength of the light source is 405 nm, and image side numerical aperture is 0.85, the optical design is advanced, however, the present invention can also be applied onto the optical disk of the specification other than this.

Further, the optical design is advanced by assuming that the image side numerical aperture is 0.60 for the second optical disk (DVD), and the image side numerical aperture for the third optical disk (CD) is 0.45, however, the present invention can also be applied onto the optical disk of the specification other than this.

The lens data of the objective lens of the present Example, is shown in Table 11.

TABLE 11

When the wavelength $\lambda 1 = 405$ nm,
the focal distance f1 = 2.30 mm, image side numerical
aperture NA1 = 0.85, magnification m1 = 0, diffraction order
n1 = 2 ($0 \leq h \leq 1.59$), n1 = 3 (h > 1.59)
When the wavelength $\lambda 2 = 655$ nm,
the focal distance f2 = 2.40 mm, image side numerical
aperture NA2 = 0.60, magnification m2 = −0.07, diffraction
order n2 = 1 ($0 \leq h \leq 1.59$), n2 = 2 (h > 1.59)
When the wavelength $\lambda 3 = 785$ nm,
the focal distance f3 = 2.39 mm, image side numerical
aperture NA3 = 0.450, magnification m3 = −0.15, diffraction
order n3 = 1

| Surface No. | r (mm) | d (mm) | N$\lambda$1 | N$\lambda$2 | N$\lambda$3 | vd | note |
|---|---|---|---|---|---|---|---|
| 0 | | d0 (*1) | | | | | light source |
| 1 | 1.524 | 2.300 | 1.52491 | 1.50673 | 1.50345 | 56.5 | objective lens |
| 2 | −4.001 | d2 (*2) | | | | | |
| 3 | ∞ | d3 (*3) | 1.61949 | 1.57721 | 1.57042 | 30.0 | transparent substrate |
| 4 | ∞ | | | | | | |

| | $\lambda 1 = 405$ nm | $\lambda 2 = 650$ nm | $\lambda 3 = 780$ nm |
|---|---|---|---|
| d0 | ∞ | 30.150 | 18.350 |
| d2 | 0.100 | 0.600 | 1.200 |
| d3 | 0.925 | 0.904 | 0.639 |

Aspherical surface coefficient

| | 1st surface | 2nd surface |
|---|---|---|
| κ | −1.7824E+00 | −4.7933E+00 |
| A4 | 4.2566E−02 | 1.0627E−01 |
| A6 | 2.7886E−03 | −5.4671E−02 |
| A8 | −7.0274E−04 | 1.6297E−02 |
| A10 | 1.0056E−04 | −2.7028E−03 |
| A12 | 2.3868E−05 | 1.9182E−04 |

Diffractive surface coefficient

1st surface when $0 \leq h \leq 1.59$

| b2 | −8.0000E−03 |
|---|---|
| b4 | −1.2049E−03 |
| b6 | 1.3016E−03 |
| b8 | −5.8055E−04 |
| b10 | 6.6117E−05 | when h > 1.59

| b2 | −5.6842E−03 |
|---|---|
| b4 | −8.5611E−04 |
| b6 | 9.2482E−04 |
| b8 | −4.1250E−04 |
| b10 | 4.6978E−05 |

(*1) (variable)
(*2) (variable)
(*3) (variable)

In the objective lens of the present Example, the ring-shaped zone-like diffractive structure, as shown in Table 12, is formed on the aspherical surface of the plane of light flux incidence (the first surface in Table 11). In Table 12, "start point height" expresses the distance from the optical axis of the start point of the ring-shaped zone, and "last point height" expresses the distance from the optical axis of the last point of the ring-shaped zone, and the number of the ring-shaped zones in the effective diameter is 101.

TABLE 12

| Ring-shaped zone No. | Start point height (mm) | Last point height (mm) |
|---|---|---|
| 1 | 0.000 | 0.217 |
| 2 | 0.217 | 0.306 |
| 3 | 0.306 | 0.374 |
| 4 | 0.374 | 0.431 |
| 5 | 0.431 | 0.481 |

TABLE 12-continued

| Ring-shaped zone No. | Start point height (mm) | Last point height (mm) |
|---|---|---|
| 6 | 0.481 | 0.526 |
| 7 | 0.526 | 0.567 |
| 8 | 0.567 | 0.605 |
| 9 | 0.605 | 0.641 |
| 10 | 0.641 | 0.675 |
| 11 | 0.675 | 0.708 |
| 12 | 0.708 | 0.739 |
| 13 | 0.739 | 0.768 |
| 14 | 0.768 | 0.797 |
| 15 | 0.797 | 0.824 |
| 16 | 0.824 | 0.851 |
| 17 | 0.851 | 0.877 |
| 18 | 0.877 | 0.902 |
| 19 | 0.902 | 0.927 |
| 20 | 0.927 | 0.951 |
| 21 | 0.951 | 0.974 |
| 22 | 0.974 | 0.997 |
| 23 | 0.997 | 1.019 |
| 24 | 1.019 | 1.040 |
| 25 | 1.040 | 1.062 |
| 26 | 1.062 | 1.082 |
| 27 | 1.082 | 1.103 |
| 28 | 1.103 | 1.122 |
| 29 | 1.122 | 1.142 |
| 30 | 1.142 | 1.161 |
| 31 | 1.161 | 1.179 |
| 32 | 1.179 | 1.197 |
| 33 | 1.197 | 1.215 |
| 34 | 1.215 | 1.232 |
| 35 | 1.232 | 1.249 |
| 36 | 1.249 | 1.266 |
| 37 | 1.266 | 1.282 |
| 38 | 1.282 | 1.297 |
| 39 | 1.297 | 1.313 |
| 40 | 1.313 | 1.328 |
| 41 | 1.328 | 1.342 |
| 42 | 1.342 | 1.357 |
| 43 | 1.357 | 1.371 |
| 44 | 1.371 | 1.384 |
| 45 | 1.384 | 1.398 |
| 46 | 1.398 | 1.411 |
| 47 | 1.411 | 1.424 |
| 48 | 1.424 | 1.436 |
| 49 | 1.436 | 1.448 |
| 50 | 1.448 | 1.460 |
| 51 | 1.460 | 1.472 |
| 52 | 1.472 | 1.483 |
| 53 | 1.483 | 1.494 |
| 54 | 1.494 | 1.505 |
| 55 | 1.505 | 1.516 |
| 56 | 1.516 | 1.526 |
| 57 | 1.526 | 1.536 |
| 58 | 1.536 | 1.547 |
| 59 | 1.547 | 1.556 |
| 60 | 1.556 | 1.566 |
| 61 | 1.566 | 1.575 |
| 62 | 1.575 | 1.585 |
| 63 | 1.585 | 1.594 |
| 64 | 1.594 | 1.607 |
| 65 | 1.607 | 1.620 |
| 66 | 1.620 | 1.633 |
| 67 | 1.633 | 1.645 |
| 68 | 1.645 | 1.657 |
| 69 | 1.657 | 1.669 |
| 70 | 1.669 | 1.680 |
| 71 | 1.680 | 1.692 |
| 72 | 1.692 | 1.703 |
| 73 | 1.703 | 1.713 |
| 74 | 1.713 | 1.724 |
| 75 | 1.724 | 1.734 |
| 76 | 1.734 | 1.744 |
| 77 | 1.744 | 1.754 |
| 78 | 1.754 | 1.764 |
| 79 | 1.764 | 1.774 |
| 80 | 1.774 | 1.783 |
| 81 | 1.783 | 1.792 |
| 82 | 1.792 | 1.802 |
| 83 | 1.802 | 1.811 |
| 84 | 1.811 | 1.820 |
| 85 | 1.820 | 1.828 |
| 86 | 1.828 | 1.837 |
| 87 | 1.837 | 1.846 |
| 88 | 1.846 | 1.854 |
| 89 | 1.854 | 1.862 |
| 90 | 1.862 | 1.871 |
| 91 | 1.871 | 1.879 |
| 92 | 1.879 | 1.887 |
| 93 | 1.887 | 1.895 |
| 94 | 1.895 | 1.903 |
| 95 | 1.903 | 1.911 |
| 96 | 1.911 | 1.918 |
| 97 | 1.918 | 1.926 |
| 98 | 1.926 | 1.934 |
| 99 | 1.934 | 1.942 |
| 100 | 1.942 | 1.949 |
| 101 | 1.949 | 1.957 |

In the diffractive ring-shaped zone structure in Table 12, when h expresses the height from the optical axis of the position on the plane of the light flux incidence, the diffractive structure (in Table 12, the ring-shaped zones No. 1-63) in the region satisfying $0 \leq h \leq 1.59$ is optimized so that the diffraction efficiency is theoretically 100% at the wavelength ($\lambda B$) 380 nm and diffraction order 2. When the light of the wavelength 405 nm which is the using wavelength of the first optical disk (high density DVD), is incident on the diffractive structure, the second order diffracted ray is generated so as to have the maximum diffracted light amount, and when the light of the wavelength 655 nm which is the using wavelength of the second optical disk (DVD), is incident on the diffractive structure, and when the light of the wavelength 785 nm which is the using wavelength of the third optical disk (CD), is incident on the diffractive structure, the first order diffracted ray is generated so as to have the maximum diffracted light amount.

The diffractive structure (in Table 12, the ring-shaped zones No. 64-101) in the region satisfying $h > 1.59$ is optimized so that the diffraction efficiency is theoretically 100% at the wavelength ($\lambda B$) 405 nm and diffraction order 3. When the light of the wavelength 405 nm which is the using wavelength of the first optical disk (high density DVD), is incident on the diffractive structure, the third order diffracted ray is generated so as to have the maximum diffracted light amount, and when the light of the wavelength 655 nm which is the using wavelength of the second optical disk (DVD), is incident on the diffractive structure, the second order diffracted ray is generated so as to have the maximum diffracted light amount.

As described above, when the optimizing wavelength and diffractive order of the diffractive structure are set, the refraction efficiency in the using wavelength region of respective optical disks can be obtained as follows: in the region of $0 \leq h \leq 1.59$, the high density DVD (wavelength 405 nm): 95.1%,
DVD (wavelength 655 nm): 93.3% and
CD (wavelength 785 nm): 99.7%, and in the region of $h > 1.59$,
the high density DVD (wave length 405 nm): 100%, and
DVD (wavelength 655 nm): 91.8%.

Further, as described above, in the case where the diffractive structure of the region satisfying $h > 1.59$, is optimized at the wavelength 405 nm and the diffraction order 3, when the recording and/or reproducing of the information is conducted onto the second optical disk, because the outer diameter of the flare can be increased like that the maximum value of the spherical aberration of the light flux which passes the outside region from NA2 (that is, the region satisfying h>1.59 of the plane of the light flux incidence) is about 70 μm, the fine signal detection characteristic in the light receiving section of the light detector is obtained.

Referring to the drawings, the first to the fifth embodiments will be described below.

The Third Embodiment

FIG. 42 is a view generally showing the first optical pick-up apparatus according to the third embodiment. As shown in FIG. 42, the first optical pick-up apparatus has a semiconductor laser 11 which is the first light source for reproducing the first optical disk whose protective substrate thickness is small, a semiconductor laser 12 which is the second light source for reproducing the second optical disk whose protective substrate thickness is large, and a semiconductor laser 13 which is the third light source for reproducing the third optical disk whose protective substrate thickness is larger.

As the first optical disk, the high density next generation optical disk (high density DVD) having, for example, 0.1 mm protective substrate (transparent substrate) can be used, and as the second optical disk, each kind of DVD such as DVD having 0.6 mm protective substrate (transparent substrate), DVD-ROM, DVD-RAM, DVD-R, DVD-RW, or DVD+RW can be used, and as the third optical disk, each kind of CD such as CD having 1.2 mm protective substrate (transparent substrate), CD-R, CD-RW, CS-Video, or CD-ROM can be used.

Further, as the first light source 11, a GaN blue violet semiconductor laser or blue violet SHG laser can be used, as the second light source 12, a red semiconductor laser which generates the light of the wavelength of about 650 nm, can be used, and as the third light source 13, an infrared semiconductor laser which generates the light of the wavelength of about 780 nm, can be used. These first to third light sources 11-13 are selectively used depending on the kind of the optical disks on which the recording and reproducing of the information are conducted.

The first optical pick-up apparatus has an objective lens 14 which can converge the light flux from the first to the third semiconductor lasers 11 to 13 onto respective information recording surfaces 92, 92 and 93 of the first to the third optical disks, so that the light flux is within the diffraction limit in the predetermined image side numerical aperture.

On the surface 14a on the light source side of the objective lens 14, the diffractive structure composed of a plurality of concentric circular ring-shaped zones is formed, and the light flux from the semiconductor laser 11 can be converged onto the information recording surface 91 of the first optical disk through the protective substrate in the condition which is within the diffraction limit, in the image side numerical aperture NA1 necessary when the first optical disk is reproduced, the light flux from the semiconductor laser 12 can be converged onto the information recording surface 92 of the second optical disk through the protective substrate in the condition which is within the diffraction limit, in the image side numerical aperture NA2 necessary when the second optical disk is reproduced, and the light flux from the semiconductor laser 13 can be converged onto the information recording surface 93 of the third optical disk through the protective substrate in the condition which is within the diffraction limit, in the image side numerical aperture NA3 necessary when the third optical disk is reproduced. As the image side numerical aperture NA1 necessary when the first optical disk is reproduced, it can be made, for example, about 0.85, as the image side numerical aperture NA2 necessary when the second optical disk is reproduced, it can be made about 0.60, and as the image side numerical aperture NA3 necessary when the third optical disk is reproduced, it can be made about 0.45.

Further, the first optical pick-up apparatus has the chromatic aberration correcting-use element 18 for correcting the chromatic aberration generated in mainly the objective lens 14 due to the badness of the mono-chromaticity such as the mode hopping of the semiconductor laser 11 between the polarized beam splitter 15 and the objective lens 14. As the chromatic aberration correcting element of a high performance and simple structure, a diffraction element having the diffractive structure composed of a plurality of ring-shaped zones is well known, however, when the conventional diffractive element is used and the chromatic aberration generated in the objective lens 14 is corrected for the light in the vicinity of the wavelength (for example, 400 nm) of the semiconductor laser 11, for the light of the wavelength (for example, 650 nm) of the semiconductor laser 12 or of the wavelength (for example, 780 nm) of the semiconductor laser 13, there is a problem that the chromatic aberration is too over-corrected, and it is not preferable as the chromatic aberration correcting-use element arranged in the common optical path of the light flux from the semiconductor lasers 11 to 13.

Accordingly, the present inventors propose a multi-layer diffractive element as shown in FIG. 43 as the chromatic aberration correcting-use element 18, which is preferable for using it for the first optical pick-up apparatus. The multi-layer diffractive element in FIG. 43 (a) has the structure in which the optical element a and the optical b are stacked together, and on the sticking surface side of the optical element a, the diffractive structure composed of a plurality of ring-shaped zones is formed. As the optical material of the optical element a and the optical element b, as shown in FIG. 43(b), it is better to select the optical material having the refractive index—wavelength characteristic in which there is almost no refractive index difference in the wavelength region from the wavelength (for example, 650 nm) of the semiconductor laser 12 to the wavelength (for example, 780) of the semiconductor laser 13, and in the wavelength region in the vicinity of the wavelength (for example, 400 nm), which has a predetermined refractive index difference Δn. Thereby, because only the light in the vicinity of the wavelength is diffracted by the action of the diffractive structure of the sticking surface, due to the influence of the refractive index difference Δn of the optical element a and the optical element b, when the shape of the diffractive structure is appropriately designed, to the refractive index difference Δn, it is better to correct the chromatic aberration of the objective lens 14 for the light only in the vicinity of the wavelength of the semiconductor laser 11, and the light flux emitted from the semiconductor laser 11 is converged onto the information recording surface 91 of the first optical disk with almost no chromatic aberration when it is through the chromatic aberration correcting-use element 18.

Further, the first optical pick-up apparatus, when the recording and reproducing of the information are conducted onto the first optical disk, as the spherical aberration correcting element for changing the change of the wavelength due to the production error of the protective substrate thickness of the optical disk, the production error of the optical element constituting the light converging optical system such as the objective lens 14, change of the wavelength due to production error of the semiconductor laser 11, and change of the shape of the optical element constituting the light converging optical system of the objective lens due to the temperature change or humidity change, or the change of the spherical aberration due to the refractive index change, has a collimator 16 shifted in the optical axial direction by an one axis actuator 21 between a polarized light beam splitter 15 and the objective lens 14.

When the change of the spherical aberration of the light converging spot on the information recording surface 91 of the first optical disk is detected by a optical detector, the collimator 16 is shifted by a predetermined amount by the one axis actuator 21, and by changing the outgoing angle of the light flux incident on the objective lens 14, the change of the spherical aberration is corrected. When the spherical aberration of the light converging spot is changed to the under-correction direction, the collimator 16 is shifted in the direction approaching to the objective lens 14. Thereby, the light converging spot on the information recording surface 91 of the first optical disk can keep the condition in which the spherical aberration is always finely corrected.

When the first optical disk is reproduced, the beam is emitted from the semiconductor laser 11, and the emitted light flux transmits the polarized light beam splitter 15, collimator 16, and chromatic aberration correcting element 18, which are composition means of the emitted light from the semiconductor lasers 11 to 13, and is converged onto the information recording surface 91 through the protective substrate of the first optical disk by the objective lens 14. In this case, because the objective lens 14 converges the light flux from the semiconductor laser 11 so that it is within the diffraction limit in the image side numerical aperture, the first optical disk which is the high density next generation optical disk, can be reproduced by the objective lens 14.

The light flux which is modulated by the information bits on the information recording surface 91 and reflected, transmits again the objective lens 14, chromatic aberration correcting element 18, and collimator 16, and goes toward the optical detector, not shown. The optical detector detects the light amount change due to the change of the shape of the spot on the optical detector of the optical detection system and position change, and the focusing and track are detected. According to the detection, the objective lens 14 is shifted in the optical axis direction by a two axes actuator 22 so that the light flux from the semiconductor laser 11 is image-formed on the image recording surface 91 of the first optical disk, and together with this, the objective lens 14 is shifted in the direction perpendicular to the optical axis so that the light flux from the semiconductor laser 11 is image-formed on a pre-determined track.

Further, when the second optical disk is reproduced, a beam is emitted from the semiconductor laser 12, and the emitted light flux is reflected by the polarized light beam splitter 17 and polarized beam splitter 15, which are composite means of the emitted light from the semiconductor lasers 12 and 13, and in the same manner as the light flux from the semiconductor laser 11, transmits the collimator 16, and chromatic aberration correcting-use element 18, and converged onto the information recording surface 92 through the protective substrate of the second optical disk, by the objective lens 14. In this case, because the objective lens 14 converges the light flux from the semiconductor laser 12 so that it is within the diffraction limit in the image side numerical aperture NA2, the second optical disk can be reproduced.

Then, the light flux which is modulated by the information bits on the information recording surface 92 and reflected, transmits again the objective lens 14, chromatic aberration correcting element 18, and collimator 16, and goes toward the optical detector, not shown. In the same manner as the first optical disk, the optical detector detects the light amount change due to the change of the shape of the spot on the optical detector of the optical detection system and position change, and the focusing and track are detected. According to the detection, the objective lens 14 is shifted in the optical axis direction by a two axes actuator 22 so that the light flux from the semiconductor laser 12 is image-formed on the image recording surface 92 of the second optical disk, and together with this, the objective lens 14 is shifted in the direction perpendicular to the optical axis so that the light flux from the semiconductor laser 12 is image-formed on a predetermined track.

Further, when the third optical disk is reproduced, a beam is emitted from the semiconductor laser 13, and the emitted light flux transmits the polarized light beam splitter 17, and is reflected by the polarized beam splitter 15, and further, in the same manner as the light flux from the semiconductor laser 11, transmits the collimator 16, and chromatic aberration correcting-use element 18, and converged onto the information recording surface 93 through the protective substrate of the third optical disk, by the objective lens 14. In this case, because the objective lens 14 converges the light flux from the semiconductor laser 13 so that it is within the diffraction limit in the image side numerical aperture NA3, the third optical disk can be reproduced.

Then, the light flux which is modulated by the information bits on the information recording surface 93 and reflected, transmits again the objective lens 14, chromatic aberration correcting element 18, and collimator 16, and goes toward the optical detector, not shown. In the same manner as the first optical disk, the optical detector detects the light amount change due to the change of the shape of the spot on the optical detector of the optical detection system and position change, and the focusing and track are detected. According to the detection, the objective lens 14 is shifted in the optical axis direction by a two axes actuator 22 so that the light flux from the semiconductor laser 13 is image-formed on the image recording surface 93 of the third optical disk, and together with this, the objective lens 14 is shifted in the direction perpendicular to the optical axis so that the light flux from the semiconductor laser 13 is image-formed on a predetermined track.

In this connection, in the optical pick-up apparatus of the present embodiment, although ¼ wavelength plate arranged in the optical path between the light source and the objective lens is neglected, in the actual optical pick-up apparatus, there is case where ¼ wavelength plate is arranged in the optical path between the light source and the objective lens. Also in the succeeding embodiments, ¼ wavelength plate will be neglected.

In the objective lens 14 of the present embodiment, in the case where the second optical disk is reproduced, when a diffractive structure 14a, and the shape of the aspherical surface of the optical surface on which the diffractive structure 14a is formed, are determined so that the light flux from the semiconductor laser 12 passed the region from the image side numerical aperture NA3 to NA1 becomes a flare on the information recording surface 92 of the second optical disk, the aperture changing of the NA1 and NA2 can be automatically conducted, and because it is not necessary that a special aperture changing means is provided, it is advantageous in the cost.

Further, in the case where the third optical disk is reproduced, when a diffractive structure 14a, and the shape of the aspherical surface of the optical surface on which the diffractive structure 14a is formed, are determined so that the light flux from the semiconductor laser 13 passed the region from the image side numerical aperture NA3 to NA1 becomes a flare on the information recording surface 93 of the third optical disk, because the aperture changing of the NA1, NA2 and NA3 can be automatically conducted, it is more preferable.

As described above, when the light flux from the semiconductor laser 12 passed the region from the image side numerical apertures NA2 to NA1, and the light flux from the semiconductor laser 13 passed the region from the image side numerical apertures NA3 to NA1, are respectively made to become flare on the information recording surface 92 of the second optical disk, and on the information recording surface 93 of the third optical disk, the diffractive structure 14a is determined so that the light flux of the wavelength λ2 passed the region corresponding to the image side numerical apertures NA2 to NA1 is in the situation that the wave front aberration is not smaller than 0.20 λ2 on the information recording surface of the second optical disk in the image side numerical aperture NA1, and the light flux of the wavelength λ3 passed the region corresponding to the image side numerical apertures NA3 to NA1 is in the situation that the wave front aberration is not smaller than 0.20 λ3 on the information recording surface of the third optical disk in the image side numerical aperture NA1. Thereby, the spot of the light flux passed the region in the necessary image side numerical aperture and the flare of the light flux passed the outside from inside of the necessary image side aperture are enough separated, and the fine signal detection characteristic in the light receiving section of the light detector can be obtained.

Further, as described above, in the objective lens 14, when the light flux more than the image side numerical aperture necessary when the second and the third optical disks are reproduced, is not made a flare component, it is preferable that the optical pick-up apparatus of the present embodiment has the aperture changing means of NA1, NA2 and NA3. As such an aperture changing means, the ring-shaped zone filter as shown in FIG. 50 and FIG. 51 which will be described later, can be used. Further, when the first optical disk, second optical disk and the third optical disk are reproduced, the diaphragms corresponding to NA1, NA2 and NA3 may be respectively mechanically switched.

Further, the liquid crystal layer arranged between the transparent electrodes opposite to each other, and ¼ wavelength plate are provided, and at least one of the transparent electrodes is divided into a plurality of ring-shaped zone-like voltage application sections around the optical axis, and on at least one voltage application section of these voltage application sections, when the voltage is applied, the aperture changing element which can change the orientation condition of the liquid crystal molecule of the liquid crystal layer, ring-shaped zone-like may be used. When such an aperture changing element is used, because the polarized light surface of the light flux corresponding to the region from NA2 to NA1 of the objective lens 14 and the region in NA2 can be respectively independently changed, and the polarized light surface of the light flux corresponding to the region from NA3 to NA1 of the objective lens 14 and the region in NA3 can be respectively independently changed, it can be made to function as the aperture regulating means for the first to the third optical disks.

Further, in the present embodiment, by the action of the diffractive structure composed of a plurality of concentric circular ring-shaped zones formed on at least one surface 14a of the objective lens 14, it is made so that the light flux from the semiconductor lasers 11 to 13 can be converged onto respective information recording surfaces 91 to 93 of the first to the third optical disks so that it is within the diffraction limit in the predetermined image side numerical aperture, however, the above diffractive structure may be provided on the optical surface of the optical element arranged separately from the objective lens.

As described above, in the case where the diffractive structure is provided on the optical surface of the optical element arranged separately from the objective lens, when the light flux more than the image side numerical aperture necessary when the second and the third optical disks are reproduced, is made a flare component, it is preferable that the optical element onto which such a diffractive structure is provided, and the objective lens are integrated and conduct the tracking. Thereby, the fine tracking characteristic can be obtained.

Further, in the case where the diffractive structure is provided on the optical surface of the optical element arranged separately from the objective lens, only the objective lens conducts the tracking, and the optical element onto which such a diffractive structure is provided, is fixed, it is preferable that the light flux to NA1 is aberration-corrected to the light from the semiconductor laser 12 and the semiconductor laser 13. Thereby, the fine tracking characteristic can be obtained.

Further, as the objective lens by which the light flux from the semiconductor lasers 11 to 13 can be converged onto respective information recording surfaces 91 to 93 of the first to the third optical disks so that it is within the diffraction limit in the predetermined image side numerical aperture, the objective lens described in Japanese Tokkaihei No. 11-96585, or Tokkai No. 2000-299567 by the present applicant may be used.

Further, in the first optical pick-up apparatus, by the action of the diffractive structure formed on at least one surface 14a of the objective lens 14, it is made so that the light flux from the semiconductor lasers 11 to 13 can be converged onto respective information recording surfaces 91 to 93 of the first to the third optical disks so that it is within the diffraction limit in the predetermined image side numerical aperture, however, an example of another objective lens which can be used for the present embodiment, will be described below.

That is, by the diffractive action of the diffractive structure formed on at least one surface of the objective lens, it is made so that the light flux from the semiconductor lasers 11 and 12 can be converged onto respective information recording surfaces 92 of the first optical disk and the second optical disks so that it is respectively within the diffraction limit in the image side numerical apertures NA1 and NA2, and for the third optical disk, when the divergent light flux from the semiconductor laser 13 is incident on the objective lens, the change of the spherical aberration due to the difference of the protective substrate thickness is corrected so that it is within the diffraction limit in the numerical aperture NA3. In this case, it is preferable that the optical pick-up apparatus has the aperture regulating means when the recording and reproducing of the information is conducted on the third optical disk, and as the aperture regulating means, the ring-shaped zone filter as in FIG. 50 and FIG. 52 which will be described later, can be used.

Further, as the spherical aberration correcting element for correcting the change of the spherical aberration, an element which has the refractive index distribution variable material layer which will be described later, and can change the refractive index distribution of the refractive index distribution variable material layer by applying the electric field or magnetic field or temperature, or a beam expander in which at least one of the component lenses is made shiftable in the optical axis direction, may be used.

Further, the collimator 16 as the spherical aberration correcting element of the present embodiment is a one-group composition, however, it may be composed of a plurality of lenses. As the collimator as the spherical aberration correcting element composed of the plurality of lenses in this way, there is the coupling lens as described in Japanese Tokugan N0. 2000-392333 by the present applicant.

Further, in the present embodiment, the path of the light flux from the semiconductor laser 12 from the polarized light beam splitter 15 to the objective lens 14, is neglected. In the same manner, the path of the light flux from the semiconductor laser 13 from the polarized light beam splitter 15 to the objective lens 14 is neglected. In the succeeding embodiments, it is the same.

Further, in the present embodiment, the light detecting means for detecting the focusing error of the objective lens and/or tracking error, and the light detecting means for detecting the change of the spherical aberration of the light converging spot on the information recording surface 91, are neglected, however, the actual optical pick-up apparatus has such a light detecting means. Also in the succeeding embodiments, the light detecting means will be neglected in the same way.

Next, the second optical pick-up apparatus which is a modified example of the optical pick-up apparatus in FIG. 42 will be described according to FIG. 44. As shown in FIG. 44, the second optical pick-up apparatus has an integrated element 20 in which the collimator as the spherical aberration correcting element and the chromatic aberration correcting-use element are integrated, instead of the collimator 16 in FIG. 42 and the chromatic aberration correcting-use element 18, and the integrated element 20 is structured in such a manner that it is shifted in the axial direction by one axis actuator 21 in the same manner as in FIG. 42. Further, the semiconductor laser 12 and the semiconductor laser 13 are housed in the same case 19 and united as a unit. According to the structure in FIG. 44, by the integrated element 20 and the united semiconductor laser, because the number of parts of the optical pick-up apparatus can be reduced, the more cost reduction can be intended.

In this connection, in the second optical pick-up apparatus in FIG. 44, the semiconductor laser 12 and the semiconductor laser 13 are united as a unit, however, the semiconductor laser 11 and the semiconductor laser 12 may be united as a unit, and the semiconductor laser 11 and the semiconductor laser 13 may also be united as a unit. Further, when the semiconductor laser 11, the semiconductor laser 12 and the semiconductor laser 13 are united as a unit, the further cost reduction and space saving can be intended.

The Fourth Embodiment

FIG. 45 is a view generally showing the third optical pick-up apparatus according to the fourth embodiment. As shown in FIG. 45, the third optical pick-up apparatus is, in the same manner as the first optical pick-up apparatus in FIG. 42, an optical pick-up apparatus by which the recording and reproducing of the information can be conducted onto the optical disk with 3 kinds of different recording density.

The third optical pick-up apparatus has the objective lens 14 by which each light flux from the semiconductor lasers 11 to 13 can be converged onto respective information recording surfaces of the first to the third optical disks. As the objective lens, because the same objective lens as the objective lens used for the first optical pick-up apparatus can be used, the detailed description is omitted.

Further, the third optical pick-up apparatus has a collimator 29 as the chromatic aberration correcting-use element for correcting the chromatic aberration generated mainly in the objective lens 14 due to the badness of the mono-chromaticity such as the mode hopping of the semiconductor laser 11. On at least one surface of the collimator 29, the diffractive structure composed of a plurality of concentric circular ring-shaped zones is formed, and when the wavelength of the light emitted from the semiconductor laser 11 is changed in the lengthened direction, it has the wavelength characteristic which changes so that the back focus of the collimator 29 is shortened. Further, because it about coincidences with absolute value of the changed amount of the back focus standardized by the second power of the focal distance of the objective lens 14 to the wavelength change of the same amount, the light flux emitted from the semiconductor laser 11 is converged onto the information recording surface 91 of the first optical disk almost without chromatic aberration, when it is through the collimator 29 and the objective lens 14. As such a collimator having such a wavelength characteristic, a collimator described in the Japanese Tokugan No. 20001-2488195 by the present applicant, can be used.

Further, as the collimator 29 as the preferable chromatic aberration correcting-use element for using in the third optical pick-up apparatus, a collimator in which a positive lens whose Abbe's number is relatively large and a negative lens whose Abbe's number is relatively small, are stuck together, can be used. As the collimator having such a tablet structure, a collimator as described in Japanese Tokkugan No. 2000-262372 by the present applicant can be used.

Further, in the third optical pick-up apparatus, the diffractive structure is formed on the collimator, and the chromatic aberration generated in the objective lens 14 is corrected, however, a chromatic aberration correcting element on which the diffractive structure is formed on at least one surface, arranged separately from the collimator between the semiconductor laser 11 and the polarized light beam splitter 15, may also be used. As the chromatic aberration correcting element which can be arranged in the parallel light, a chromatic aberration correcting element as described in Japanese Tokugan No. 2001-210659 by the present applicant, can be used. When a beam shaping prism pair for shaping the elliptic light flux emitted from the semiconductor laser 11 is arranged in the optical path, it is preferable that such a chromatic aberration correcting element which can be arranged in the parallel light, is used.

Further, in the third optical pick-up apparatus, when the recording and reproducing of the information is conducted onto the first optical disk, as the spherical aberration correcting element for correcting the change of the spherical aberration due to the production error of the protective substrate thickness of the optical disk, the production error of the optical element constituting the light converging optical system such as the objective lens, the change of the wavelength due to the production error of the semiconductor laser 11, and the shape change or the refractive index change of the optical element constituting the light converging optical system such as the objective lens due to the temperature change or humidity change, the refractive index distribution variable element 23 is arranged between the polarized light beam splitter 15 and the objective lens 14.

The refractive index distribution variable element 23 has the liquid crystal layer 26 arranged between a pair of transparent electrodes 25a, 25b, which are opposite to each other, and held by a pair of the glass substrates 24a and 24b, and when the voltage is applied from the drive power source 27 onto the transparent electrodes 25a and 25b, it is structured in such a manner that the orientation condition of the liquid crystal molecule of the liquid crystal layer 26 is electrically controlled, and the refractive index distribution in the liquid crystal layer 26 can be changed.

At least one of transparent electrodes 25a and 25b is divided into a plurality of ring-shaped zone-like voltage application sections around the optical axis, and when the predetermined voltage is applied onto at least one of these plurality of ring-shaped zone-like voltage application sections, the refractive index distribution of the liquid crystal layer 26 can be changed ring-shaped zone-like around the optical axis. When the change of the spherical aberration of the light converging spot on the information recording surface 91 of the first optical disk is detected by the light detector, not shown, by applying the predetermined voltage onto the voltage application section by the power source 27, the refractive index distribution of the liquid crystal layer 26 is changed ring-shaped zone-like around the optical axis, and a predetermined optical difference is added to the wave length transmitting the refractive index distribution variable element 23, and such a change of the spherical aberration is corrected. Thereby, the light converging spot on the information recording surface 91 of the first optical disk can keep always the condition that the spherical aberration is finely corrected.

In the above description, the refractive index distribution variable element of the above mode is used as the refractive index distribution variable element 23, however, it is allowable when the refractive index distribution variable element which can be used for the optical pick-up apparatus of the present embodiment, is an element which can change the refractive index distribution rotation-symmetrically around the optical axis, and it is not limited to the above embodiment.

Further, as the spherical aberration correcting element which can be used for the third optical pick-up apparatus, a beam expander in which at least one of the component lenses is made shiftable in the optical axis direction, may be used.

Next, by FIG. 46, the fourth optical pick-up apparatus which is a modified example of the optical pick-up apparatus of FIG. 45, will be described below. As shown in FIG. 46, in the fourth optical pick-up apparatus, because the semiconductor laser 12 and the semiconductor laser 13 are united as a unit in the same manner as in FIG. 44, by the reduction of the number of parts of the optical pick-up apparatus, the cost reduction can be intended.

The fourth optical pick-up apparatus has the objective lens 34 by which the light flux of the semiconductor laser 11 can be converged onto the information recording surface 91 of the first optical disk so that it is within the diffraction limit in the numerical aperture NA1. By using the objective lens 34 which is the exclusive use objective lens for the first optical disk, when the second optical disk is going to be recorded•reproduced by using the light from the semiconductor laser 12, the spherical aberration is changed in the excessive correction (over) direction due to the difference of the protective substrate thickness, however, in the fourth optical pick-up apparatus, by correcting the spherical aberration changed in the excessive correction direction by the refractive index distribution variable element 23 so that it is within the diffraction limit in the numerical aperture NA2, the recording•reproducing onto the second optical disk can be conducted.

Further, in the same manner also when the third optical disk is recorded•reproduced by using the light from the semiconductor laser 13, the spherical aberration changed in the excessive correction (over) direction is corrected by the refractive index distribution variable element 23 so that it is within the diffraction limit in the numerical aperture NA3.

Further, the fourth optical pick-up apparatus has the aperture changing means of NA1, NA2 and NA3, and as such a aperture changing means, a ring-shaped zone filter as shown in FIG. 50 and FIG. 51 which will be described later, which has the wavelength selectivity is formed on the optical surface 34a of the light source side of the objective lens 34 in FIG. 46. Thereby, the aperture can be automatically changed to NA1, NA2 and NA3. By such the ring-shaped zone filter having the wavelength selectivity, in the case where the recording and reproducing of the information is conducted onto the second optical disk and the third optical disk, when the light flux more than the necessary numerical aperture is shut off, the desired spot diameter can be obtained on the information recording surface of the optical disk.

Further, as the aperture changing means, a means by which diaphragms corresponding to NA1, NA2 and NA3 are respectively mechanically changed when the second disk and the third disk are reproduced, may also be used, and further, the aperture changing means using the liquid crystal as described in the third embodiment, may also be used.

Further, it is preferable that such an aperture changing means is integrated with the objective lens 34 and conducts the tracking, thereby, the fine tracking characteristic is obtained. In FIG. 46, because it is provided on the optical surface 34a of the objective lens 34, this tracking characteristic is improved.

Further, in the optical pick-up apparatus in FIG. 46, the objective lens 34 is a single lens composed of one lens group, and when the focal distance in the wavelength λ1 is f1 (mm), the central thickness is d (mm), the diameter of the light flux of the wavelength λ1 incident on the objective lens 14 is Φ1 (mm), and the working distance when the reproducing and/or recording of the information is conducted onto the third optical disk, is fB3 (mm), the objective lens 34 is structured so as to satisfy the following expressions.

$$0.7 < d/f1 < 1.5 \tag{2}$$

$$2.8 < \Phi1 < 5.8 \tag{3}$$

$$fB3 > 0.2 \tag{4}$$

As the high NA objective lens for the high density DVD, the objective lens composed of 2 lens group as described in Japanese Tokkaihei No. 10-123410 is proposed, however, when the mutual transposition of the high density DVD and CD whose protective substrate thickness is different by 1.1 mm, is conducted by the common objective lens, it is preferable that it has the single lens composition by which the working distance can be sufficiently secured. In this case, it is particularly preferable to satisfy the above expressions (2) and (3), thereby, the working distance of the CD can be sufficiently secured so that the expression (4) is satisfied. When the working distance of the CD satisfies the expression (4), as in the DVD or high density DVD, the production allowance in the protective substrate thickness of the optical disk is not suppressed comparatively severe, and even when CD whose fluctuation by the individual difference of the protective substrate thickness is large, is recorded and/or reproduced, the possibility of the collision of the CD and objective lens can be enough reduced.

The Fifth Embodiment

FIG. 47 is a view generally showing the fifth optical pick-up apparatus according to the fifth embodiment. As shown in FIG. 47, the fifth optical pick-up apparatus is, in the same manner as in the first optical pick-up apparatus in FIG. 42, the optical pick-up apparatus by which recording and reproducing of the information can be conducted onto the optical disk with 3 kinds of different recording density.

The fifth optical pick-up apparatus has the objective lens 14 by which the light flux from the semiconductor lasers 11 to 13 can be converged onto respective information recording surfaces 91 to 93 of the first to the third optical disks so that it is within the diffraction limit in the predetermined image side numerical aperture. As the objective lens, because the same objective lens as that used for the first optical pick-up apparatus can be used, the detailed explanation will be neglected.

Further, in the fifth optical pick-up apparatus, when the recording and reproducing of the information are conducted onto the first optical disk, the beam expander 33 as the spherical aberration correcting element for correcting the change of the spherical aberration due to the production error of the protective substrate thickness of the optical disk, and the production error of the optical element constituting the light converging optical system such as the objective lens, the change of the wavelength due to the production error of the semiconductor laser 11, and the shape change or the refractive index change of the optical element constituting the light converging optical system such as the objective lens due to the temperature change or humidity change, is arranged in the optical path between the semiconductor laser 11 and the polarized light beam splitter 15 as the composite means of the emitted light from the semiconductor lasers 11 to 13.

This beam expander 33 is composed of the negative lens 32 and the positive lens 31, and the negative lens is formed to be shifted in the axial direction by the one axis actuator 21. The light flux from the semiconductor laser 11 is made parallel by the collimator 30 and is incident on the negative lens 32.

When the change of the spherical aberration of the light converging spot on the information recording surface 91 of the first optical disk is detected by the light detector, not shown, by shifting the negative lens 32 by a predetermined amount by the one axis actuator 21, and by changing the diverging angle of the light flux incident on the objective lens, such a change of the spherical aberration is corrected. When the spherical aberration of the light converging spot is changed in the excess correction (over) direction, the negative lens 32 is shifted in the direction in which it approaches the positive lens 31, and when the spherical aberration of the light converging spot is changed in the shortage correction (under) direction, the negative lens 32 is shifted in the direction in which it separates from the positive lens 33. Thereby, the light converging spot on the information recording surface 91 of the first optical disk can keep the condition in which the spherical aberration is always finely corrected.

In this connection, in the fifth optical pick-up apparatus, the negative lens 32 is shifted in the axial direction, however, the positive lens 31 may also be shifted in the axial direction, and further, both of the negative lens 32 and the positive lens 31 may also be shifted in the axial direction.

Further, in the fifth optical pick-up apparatus, as the spherical aberration correcting element, the beam expander 33 in which the negative lens 32 is shifted in the axial direction is used, however, in the same manner as in the first optical pick-up apparatus, the collimator which is shifted in the axial direction, may also be used, and in the same manner as in the third optical pick-up apparatus, the refractive index distribution variable element may also be used. In either case, the light converging spot on the information recording surface 91 of the first optical disk can keep the condition in which the spherical aberration is always finely corrected.

Further, in the fifth optical pick-up apparatus, the diffractive structure formed of the plurality of concentric circular ring-shaped zones is formed on the surface 31a on the optical disk side of the positive lens 31 of the beam expander 33, and when the wavelength of the light emitted from the semiconductor laser 11 is changed in the extending direction, because it has the wavelength characteristic by which the power of the beam expander 33 is increased, the light flux emitted from the semiconductor laser 11 is converged onto the information recording surface 91 of the first optical disk almost without the chromatic aberration, when it passes through the beam expander 33 and the objective lens 14.

As the beam expander which is preferable to use for the fifth optical pick-up apparatus, the beam expander as described in Japanese Tokugan No. 2000-330009 by the present applicant can be used.

In the fifth optical pick-up apparatus, by forming the diffractive structure on at least one surface of the positive lens 31 of the beam expander 33, the chromatic aberration generated in the objective lens 14 is corrected, however, the diffractive structure may be formed at least on one surface of the negative lens 32, or the diffractive surface may also be formed on both of the negative lens 32 and the positive lens 31.

Further, in the fifth optical pick-up apparatus, by forming the diffractive structure on at least one surface of the positive lens 31 of the beam expander 33, the chromatic aberration generated in the objective lens 14 is corrected, however, as the chromatic aberration correcting-use element 18 for correcting the chromatic aberration generated in mainly the objective lens 14 due to the badness of the mono-chromaticity such as the mode hopping of the semiconductor laser 11, the collimator as described in Japanese Tokugan No. 2001-248819, or Tokugan No. 2000-262372, can be used. Further, the chromatic aberration correcting element as described in Japanese Tokugan No. 2001-210659 can be used.

Next, the sixth optical pick-up apparatus which is a modified example of the optical pick-up apparatus in FIG. 47 will be described by FIG. 48. As shown in FIG. 48, in the sixth optical pick-up apparatus, in the optical path between the semiconductor laser 11 and the polarized light beam splitter 15 which is a composite means of the emitted light from the semiconductor lasers 11 to 13, when the recording and reproducing of the information are conducted onto the first optical disk, the collimator 39 which is shifted in the optical axis direction by the one axis actuator 21 is provided, as the spherical aberration correcting element for correcting the change of the spherical aberration due to the production error of the protective substrate thickness of the optical disk, and the production error of the optical element constituting the light converging optical system such as the objective lens, the change of the wavelength due to the production error of the semiconductor laser 11, and the shape change or the refractive index change of the optical element constituting the light converging optical system such as the objective lens due to the temperature change or humidity change. Thereby, the light converging spot on the information recording surface 91 of the first optical disk can keep the condition in which the spherical aberration is always finely corrected.

Further, in the sixth optical pick-up apparatus, for correcting the chromatic aberration generated in mainly the objective lens 14 due to the badness of the mono-chromaticity such as the mode hopping of the semiconductor laser 11, the diffractive structure formed of a plurality of concentric circular ring-shaped zones is formed on the surface 39a of the optical disk side of the collimator 39. Thereby, because the collimator 39 has the wavelength characteristic in which, when the wavelength of the light emitted from the semiconductor laser 11 is changed in the extending direction, the back focus of the collimator 39 is changed in the shortening direction, the light flux emitted from the semiconductor laser 11 transmits the collimator 39 and the objective lens 14, and thereby, it is converged onto the information recording surface 91 of the first optical disk almost without the chromatic aberration.

The Sixth Embodiment

FIG. 49 is a view generally showing the seventh optical pick-up apparatus according to the sixth embodiment. As shown in FIG. 49, the seventh optical pick-up apparatus is, in the same manner as in the first optical pick-up apparatus in FIG. 42, an optical pick-up apparatus by which recording and reproducing of the information can be conducted onto the optical disk with 3 kinds of different recording density.

The seventh optical pick-up apparatus of the present embodiment has the objective lens 34 by which the light flux of the semiconductor laser 11 can be converged onto the information recording surface 91 of the first optical disk so that it is within the diffraction limit in the numerical aperture NA1.

In the seventh optical pick-up apparatus, in the optical path between the semiconductor laser 11 and the polarized light beam splitter 15 which is a composite means of the emitted light from the semiconductor lasers 11 to 13, when the recording and reproducing of the information are conducted onto the first optical disk, the collimator 39 which is shifted in the optical axis direction by the one axis actuator 21 is provided, as the spherical aberration correcting element for correcting the change of the spherical aberration due to the production error of the protective substrate thickness of the optical disk, and the production error of the optical element constituting the light converging optical system such as the objective lens, the change of the wavelength due to the production error of the semiconductor laser 11, and the shape change or the refractive index change of the optical element constituting the light converging optical system such as the objective lens due to the temperature change or humidity change. Thereby, the light converging spot on the information recording surface 91 of the first optical disk can keep the condition in which the spherical aberration is always finely corrected.

Further, in the seventh optical pick-up apparatus, for correcting the chromatic aberration generated in mainly the objective lens 34 due to the badness of the mono-chromaticity such as the mode hopping of the semiconductor laser 11, the diffractive structure formed of a plurality of concentric circular ring-shaped zones is formed on the surface 39a of the optical disk side of the collimator 39. Thereby, because the collimator 39 has the wavelength characteristic in which, when the wavelength of the light emitted from the semiconductor laser 11 is changed in the extending direction, the back focus of the collimator 39 is changed in the shortening direction, the light flux emitted from the semiconductor laser 11 transmits the collimator 39 and the objective lens 34, and thereby, it is converged onto the information recording surface 91 of the first optical disk almost without the chromatic aberration.

In the seventh optical pick-up apparatus, in the optical path between the semiconductor laser 12 and the polarized light beam splitter 15, and in the common optical path of the light flux from the semiconductor laser 12 and the light flux from the semiconductor laser 13, the diffractive optical element 35 on which a plurality of concentric circular ring-shaped zones are formed on the surface 35a of the optical disk side, is provided.

By using the objective lens 34 which is the exclusive use objective lens for the first optical disk, when the second optical disk is going to be recorded•reproduced by using the light from the semiconductor laser 12, the spherical aberration is changed in the excessive correction (over) direction due to the difference of the protective substrate thickness. In the same manner, by using the objective lens 34, when the third optical disk is going to be recorded•reproduced by using the light from the semiconductor laser 13, the spherical aberration is changed in the excessive correction (over) direction due to the difference of the protective substrate thickness. In the seventh optical pick-up apparatus, the spherical aberration changed in the excessive correction direction is corrected by the diffractive action of the diffractive optical element 35 so that the light flux from the semiconductor laser 12 is within the diffraction limit in the image side numerical aperture NA2 necessary when the second optical disk is reproduced, and further, because the light flux from the semiconductor laser 13 is corrected so that it is within the diffraction limit in the image side numerical aperture NA3 necessary when the third optical disk is reproduced, by using the objective lens exclusive use for the first optical disk, the recording•reproducing onto the second optical disk and the third optical disk whose protective substrate thickness are different from each other, can be conducted.

In the optical pick-up apparatus in FIG. 49, the diffractive structure 35a of the diffractive optical element is optimized so that, in the diffracted ray generated when the light of the wavelength λ2 from the semiconductor laser 12 is incident on it, the order n2 of the diffracted ray having the maximum diffractive light amount and the order n3 of the diffracted ray having the maximum light amount in the diffracted ray generated when the light of the wavelength λ3 from the semiconductor laser 13 is incident on it, are equal, and the optimized wavelength is the intermediate wavelength between λ2 and λ3. Thereby, in the using wavelength region of the second optical disk and the third optical disk, respectively the high diffraction efficiency can be obtained.

For example, when the diffractive structure 35a is optimized by the wavelength λB and the diffraction order 1 satisfying the expression 680 nm<λB<740 nm, both of the diffraction efficiencies of the first order diffracted ray of respective light generated when the light of the wavelength 650 nm from the semiconductor laser 12 and the light of the wavelength 780 nm from the semiconductor laser 13 are incident on the diffractive structure 35a, can be not smaller than 95%.

Further, as in the optical pick-up apparatus in FIG. 49, the diffractive optical element 35 as the substrate thickness correcting means is arranged in the optical path through which the light flux from the semiconductor lasers 12 and 13 passes, but the light flux from the semiconductor laser 11 does not pass, and when the same order diffracted ray of the light flux from the semiconductor lasers 12 and 13 are respectively used for the recording and reproducing onto the second optical disk and the third optical disk, even when the diffractive structure 35a is optimized by the intermediate wavelength between the wavelength λ2 of the light flux from the semiconductor laser 12 and the wavelength λ3 of the light flux from the semiconductor laser 13 and the diffraction order 2, the diffraction efficiencies can be secured together by the light of the wavelength λ2 and the light of the wavelength λ3. In this way, when the diffractive structure 35a is optimized by the diffraction order 2, as compared to the case where it is optimized by the diffraction order 1, because the interval of the adjoining diffractive ring-shaped zones can be expanded to two times, the diffractive optical element 35 in which the decrease of the diffraction efficiency due to the production error of the shape of the diffractive ring-shaped zone is small, can be realized.

For example, when the diffractive structure 35a is optimized by n2=n3=1, and λB=710 nm, the diffraction efficiency at the using wavelength region of respective optical disks is, the second optical disk (DVD, wavelength 650 nm): 97.2%, the third optical disk (CD, wavelength 780 nm): 97.3%, in contrast to this, even when the diffractive structure 35a is optimized by n2=n3=2, and λB=710 nm, the second optical disk (DVD, wavelength 650 nm): 89.3%, the third optical disk (CD, wavelength 780 nm): 89.8%, and in the using wavelength region of respective optical disks, the enough diffraction efficiency can be secured.

Further, it is preferable that the seventh optical pick-up apparatus has the aperture changing means of NA1, NA2 and NA3. As such an aperture changing means, the ring-shaped zone filter as shown in FIG. 50 and FIG. 51 which will be described later, can be used. Further, diaphragms corresponding to NA1, NA2 and NA3 may be mechanically changed when the first optical disk, second optical disk and third optical disk are reproduced. Further, as described in the third embodiment, the aperture changing element using the liquid crystal can be used.

Further, in the optical pick-up apparatus in FIG. 49, the objective lens 34 is a single lens composed of one lens group, and when the focal distance in the wavelength λ1 is f1 (mm), the central thickness is d (mm), the diameter of the light flux of the wavelength λ1 incident on the objective lens 14 is Φ1 (mm), and the working distance when the reproducing and/or recording of the information is conducted onto the third optical disk, is fB3 (mm), the objective lens 34 is structured so as to satisfy the following expressions.

$$0.7 < d/f1 < 1.5 \quad (2)$$

$$2.8 < \Phi1 < 5.8 \quad (3)$$

$$fB3 > 0.2 \quad (4)$$

As the high NA objective lens for the high density DVD, the objective lens composed of 2 lens group as described in Japanese Tokkaihei No. 10-123410 is proposed, however, when the mutual transposition of the high density DVD and CD whose protective substrate thickness is different by 1.1 mm, is conducted by the common objective lens, it is preferable that the objective lens has the single lens composition by which the working distance can be easily secured. In this case, it is particularly preferable to satisfy the above expressions (2) and (3), thereby, the working distance can be sufficiently secured so that the expression (4) is satisfied. When the working distance of the CD satisfies the expression (4), as in the DVD or high density DVD, the production allowance in the protective substrate thickness of the optical disk is not suppressed comparatively severe, and even when CD whose fluctuation by the individual difference of the protective substrate thickness is large, is recorded and/or reproduced, the possibility of the collision of the CD and objective lens can be enough reduced.

In the optical pick-up apparatus in FIGS. 42, 44, 12, 45, and 48, because the diffractive structure 14a of the objective lens 14 is optimized by the wavelength by which the expression 340 nm<λB<440 nm is satisfied, (hereinafter, λB is called the optimized wavelength, or the production wavelength, or the blazed wavelength), and the diffraction order 2, when the light of the wavelength 400 nm from the semiconductor laser 11 is incident on it, the second order diffracted ray is generated so that it has the larger light amount than the diffracted ray of any other order, and the objective lens 14 converges the second order diffracted ray onto the information recording surface of the first optical disk.

At this time, when the light of the wavelength 650 nm from the semiconductor laser 12 is incident on the diffractive structure 14a of the objective lens 14, the first order diffracted ray is generated so that it has the larger light amount than the diffracted ray of any other order, and the objective lens 14 converges the first order diffracted ray onto the information recording surface of the second optical disk, and together, when the light of the wavelength 780 nm from the semiconductor laser 13 is incident on the diffractive structure 14a of the objective lens 14, the first order diffracted ray is generated so that it has the larger light amount than the diffracted ray of any other order, and the objective lens 14 converges the first order diffracted ray onto the information recording surface of the third optical disk.

In this manner, when the diffractive structure 14a is optimized by the wavelength and diffraction order 2 satisfying the expression (4), the order of the diffracted ray used for the recording and/or reproducing of the information onto the first optical disk, and the order of the diffracted ray used for the recording and/or reproducing of the information onto the second optical disk and the third optical disk, are made different, and when the order of the diffracted ray used for the recording and/or reproducing of the information onto the first optical disk, is made not smaller than the order of the diffracted ray used for the recording and/or reproducing of the information onto the second optical disk and the third optical disk, in the using wavelength region of respective optical disks, the high diffraction efficiency can be respectively obtained.

When the diffractive structure 14a of the objective lens 14 is determined, at least, in the diffracted ray of the light flux from the semiconductor laser 11 generated in the diffractive structure 14a, it is preferable to optimize the diffractive structure 14a so that the diffraction efficiency of the diffracted ray of the order having the maximum diffracted light amount is not smaller than 70%. More preferably, the diffractive surface 14a is optimized so that, in the diffracted ray of respective light flux from the semiconductor lasers 11 to 13 generated in the diffractive structure 14a, all of the diffraction efficiency of the diffracted ray of the order having the maximum diffracted light amount are not smaller than 70%.

A concrete example will be shown below. When a diffractive lens on which an ideal blazed structure optimized by a some production wavelength λB, and diffraction order n, is formed, is considered, the diffraction efficiency η(λ) in some wavelength λ of this diffractive lens is, when the refractive index of the lens material in the wavelength λB and the refractive index of the lens material in the wavelength λ, are supposed that they are scarcely changed, expressed by the following expression (Arithmetic 1).

$$\eta(\lambda) = \left( \frac{\text{SIN}\pi n\left(\left(\frac{\lambda B}{\lambda}\right) - 1\right)}{\pi n\left(\left(\frac{\lambda B}{\lambda}\right) - 1\right)} \right)^2 \quad \text{(Arithmetic 1)}$$

FIG. 93 is a view showing the dependency on the production wavelength of the diffraction efficiency of the first order diffracted ray of the light of wavelength 405 nm generated in the blazed structure optimized by a some production wavelength λB and the diffraction order 1, and the first order diffracted ray of the light of wavelength 650 nm, and the first order diffracted ray of the light of wavelength 780 nm.

From FIG. 93, as in the optical pick-up apparatus described in Japanese Tokkai No. 2001-195769, when the diffracted ray of the same order of the light from the semiconductor lasers 11 to 13 generated in the diffractive structure 14a of the objective lens 14, is used for the recording and/or reproducing of respective optical disks, it is seen that the high diffraction efficiency can not be obtained in the using wavelength region of respective optical disks.

FIG. 94 is a view showing the dependency on the production wavelength of the diffraction efficiency of the production wavelength satisfying 340 nm≦λB≦450 nm, the second order diffracted ray of the light of the wavelength 405 nm generated in the blazed structure optimized by the diffraction order 2, the first order diffracted ray of the light of the wavelength 650 nm, and the first order diffracted ray of the light of the wavelength 780 nm.

From FIG. 94, it can be seen that, in the case where the second order diffracted ray of the light from the semiconductor laser 11 is used for the recording and/or reproducing onto the first optical disk, and the first order diffracted ray of the light from the semiconductor laser 12 and the semiconductor laser 13 are respectively used for the recording and/or reproducing onto the second and the third optical disks, when the wavelength between 350 nm and 420 nm is set to the production wavelength, in the using wavelength region of respective optical disks, the high diffraction efficiency can be obtained. Particularly, when the wavelength between 360 nm and 400 nm is set to the production wavelength, because so high diffraction efficiency as more than 80% can be obtained in the using wavelength region of respective optical disks, it is preferable.

Next, as a method of the optimization of the blazed structure of the diffractive structure 14a of the objective lens, a preferred another example will be described.

FIG. 95 is a view showing the dependency on the production wavelength of the diffraction efficiency of the production wavelength satisfying the expression 390 nm≦λB≦440 nm, the sixth order diffracted ray of the light of wavelength 405 nm generated in the blazed structure optimized by the diffraction order 6, the fourth order diffracted ray of the light of wavelength 650 nm, and the third order diffracted ray of the light of wavelength 780 nm.

From FIG. 95, it can be seen that, in the case where the sixth order diffracted ray of the light from the semiconductor laser 11 is used for the recording and/or reproducing onto the first optical disk, and the fourth order diffracted ray of the light from the semiconductor laser 12 is used for the recording and/or reproducing onto the second optical disk, and the third order diffracted ray of the light from the semiconductor laser 13 is used for the recording and/or reproducing onto the third optical disk, when the wavelength between 405 nm and 425 nm is set to the production wavelength, in the using wavelength region of respective optical disks, the high diffraction efficiency can be obtained. Particularly, when the wavelength between 410 nm and 420 nm is set to the production wavelength, because so high diffraction efficiency as more than 80% can be obtained in the using wavelength region of respective optical disks, it is preferable.

In this connection, a preferable range of the production wavelength for obtaining the high diffraction efficiency in the using wavelength region of respective optical disks, can be applied when the wavelengths of the light emitted from the semiconductor lasers 11 to 13 respectively satisfy the following expressions.

$$380 \text{ nm} < \lambda 1 < 420 \text{ nm}$$

$$630 \text{ nm} < \lambda 2 < 670 \text{ nm}$$

$$760 \text{ nm} < \lambda 3 < 800 \text{ nm}$$

When the substrate thickness difference correcting means is arranged in the common optical path through which all of the light flux from the semiconductor lasers 11 to 13 pass, as in the optical pick-up apparatus in FIGS. 42, 44, 45, 47 and 48, because the objective lens and the diffractive structure as the substrate thickness difference correcting means can be integrated, the number of the optical elements of the optical pick-up optical system can be reduced, thereby, it is preferable in the view point of the cost.

Furthermore, as described above, when the diffractive structure as the substrate thickness difference correcting means formed on the optical surface of the objective lens is determined so that the light flux from the semiconductor laser 12 passing the outside region of the numerical aperture NA2 and the light flux from the semiconductor laser 13 passing the outside region of the numerical aperture NA3 form the flare, because the function as the aperture regulating means of this diffractive structure can also be provided, the number of the optical elements of the optical pick-up optical system can be further reduced, thereby, it is preferable in the view point of the cost.

Further, in the optical pick-up apparatus in FIGS. 42, 44, 45, 47 and 48, the objective lens 14 is a single lens composed of one lens group, and when the focal distance in the wavelength λ1 is f1 (mm), the central thickness is d (mm), the diameter of the light flux of the wavelength λ1 incident on the objective lens 14 is Φ1 (mm), and the working distance when the reproducing and/or recording of the information is conducted onto the third optical disk, is fB3 (mm), the objective lens 14 is structured so as to satisfy the following expressions.

$$0.7 < d/f1 < 1.5 \tag{2}$$

$$2.8 < \phi 1 < 5.8 \tag{3}$$

$$fB3 > 0.2 \tag{4}$$

As the high NA objective lens for the high density DVD, the objective lens composed of 2 lens group as described in Japanese Tokkaihei No. 10-123410 is proposed, however, when the mutual transposition of the high density DVD and CD whose protective substrate thickness is different by 1.1 mm, is conducted by the common objective lens, it is preferable that the objective lens has the single lens composition by which the working distance can be easily secured. In this case, it is particularly preferable to satisfy the above expressions (2) and (3), thereby, the working distance can be sufficiently secured so that the expression (4) is satisfied. When the working distance of the CD satisfies the expression (4), as in the DVD or high density DVD, the production allowance in the protective substrate thickness of the optical disk is not suppressed comparatively severe, and even when CD whose fluctuation by the individual difference of the protective substrate thickness is large, is recorded and/or reproduced, the possibility of the collision of the CD and objective lens can be enough reduced.

Further, in the optical pick-up apparatus in FIGS. 42, 44, 45, 47 and 48, the objective lens 14 is further structured so that it satisfies the magnification m3 m3<0 (5), when it conducts the reproducing and/or recording of the information onto the third optical disk. Thereby, the working distance of CD can be easily secured. In this case, it is particularly preferable that it satisfies −0.25<m3<−0.05 (6), thereby, while the working distance of CD is sufficiently secured, the spherical aberration can be finely corrected.

In the optical pick-up apparatus in FIGS. 42, 44, 45, 47 and 48, the objective lens 14 is further structured so that it satisfies the magnification m2 m2<0 (7), when it conducts the reproducing and/or recording of the information onto the second optical disk. Thereby, the working distance of DVD can also be easily secured. In this case, it is particularly preferable that it satisfies −0.20<m2<−0.02 (8), thereby, while the working distance of DVD is sufficiently secured, the spherical aberration can be finely corrected.

Next, the eighth optical pick-up apparatus according to the fifth embodiment will be described. FIG. 96 is a view generally showing the eighth optical pick-up apparatus according to the fifth embodiment, and the function as the diffractive lens of the objective lens 14 in the optical pick-up apparatus in FIGS. 42, 44, 45, 47 and 48, and the function as the refractive lens are separated in respective independent optical elements.

The objective lens 100 of the eighth optical pick-up apparatus is a complex type objective lens in which the refractive type lens 100a for respectively converging the light flux from the semiconductor lasers 11 to 13 onto the information recording surfaces of the first to the third optical disks, and the diffractive optical element 100b having the diffractive structure composed of a plurality of concentric circular ring-shaped zones, which is arranged on the light flux incident surface side of the refractive type lens 100a, are combined. The refractive type lens 100a and the diffractive optical element 100b are integrated coaxially with the optical axis by the flange section 100c, and by the two dimensional actuator 22, they are integrated and tracking-driven or focusing-driven.

The refractive type lens 100a is a single lens composed of one lens group, and when the focal distance of the complex type objective lens 100 in the wavelength λ1 is f1 (mm), the central thickness of the refractive type lens 100a in the wavelength λ1 is d (mm), the diameter of the light flux of the wavelength λ1 incident on the complex type objective lens 100 is Φ1 (mm), and the working distance when the reproducing and/or recording of the information is conducted onto the third optical disk, is fB3 (mm), the refractive type lens 100a is structured so as to satisfy the following expressions.

$$0.7 < d/f1 < 1.5 \quad (9)$$

$$2.8 < \Phi1 < 5.8 \quad (10)$$

$$fB3 > 0.2 \quad (11)$$

As the refractive type lens 100a, an aspheric surface lens in which the aberration is corrected in the region of at least wavelength λ1, can be used.

Further, the diffractive structure 100d of the diffractive optical element 100b is determined in such a manner that the order of the diffracted ray used for recording and/or reproducing of the information onto the first optical disk and the order of the diffracted ray used for recording and/or reproducing of the information onto the second optical disk and the third optical disk are made different from each other, and the order of the diffracted ray used for recording and/or reproducing of the information onto the first optical disk is larger than the order of the diffracted ray used for recording and/or reproducing of the information onto the second optical disk and the third optical disk.

The method of the optimization of the diffractive structure 100d of the diffractive optical element 100b is the same as the method of the optimization of the blazed structure of the diffractive structure 14a of the objective lens 14 in the optical pick-up apparatus in FIGS. 42, 44, 45, 47 and 48, therefore, the explanation will be neglected.

Further, when each position of the plurality of the ring-shaped zones optimized by the wavelength λB and the diffraction order n1 is expressed by the optical path difference function defined by $\Phi_b = n1 \cdot (b_2 \cdot h^2 + b_4 \cdot h^4 + b_6 \cdot h^6 + \ldots)$ (herein, h is the height (mm) from the optical axis, and $b_2$, $b_4$, $b_6$, ... are respectively optical path difference function coefficients of the second order, fourth order, sixth order, ..., (called also diffractive surface coefficient), n1 is the diffraction order of the diffracted ray having the maximum diffracted light amount in the diffracted ray generated when the light flux of the wavelength λ1 from the semiconductor laser 11 is incident on the diffractive structure 100d), it is preferable that the power (mm$^{-1}$) of only the diffractive structure defined by PD=Σ(−2·n1·$b_2$) has the positive power to satisfy the following expression, $$0.5 \times 10^{-2} < PD < 5.0 \times 10^{-2},$$

thereby, the movement of the image formation position of the refractive type lens 100a due to the mode hop of the semiconductor laser 11 can be suppressed small.

As the objective lens 100 of the eighth optical pick-up apparatus, when the function as the diffractive lens in the objective lens and the function as the refractive lens are separated into respective independent optical elements, as compared to the case where the diffractive structure is integrally formed on the optical surface of the refractive lens, as the objective lens 14 in the optical pick-up apparatus in FIGS. 42, 44, 45, 47 and 48, the diffractive optical element 100b can be easily produced.

Specifically, the diffractive structure 100d of the diffractive optical element 100b may be the blazed structure formed on the plane. When the diffractive structure 100d is formed on the plane, because the blazed structure 100d can be high accurately produced by the electronic beam drawing method, the diffractive optical element in which the lowering of the diffraction efficiency due to the shape error of the blaze is small, is obtained. In this case, when the optical surface which is the opposite side to the plane on which the blazed structure is formed is an aspherical surface, the diffractive optical element having the higher performance can be obtained.

Further, the eighth optical pick-up apparatus, when the recording and reproducing of the information are conducted onto the first optical disk, has the collimator 16 which is shifted in the optical axis direction by the one axis actuator 21, as the spherical aberration correcting element for correcting the change of the spherical aberration due to the production error of the protective substrate thickness of the optical disk, and the production error of the optical element constituting the light converging optical system such as the objective lens 100, the change of the wavelength due to the production error of the semiconductor laser 11, and the shape change or the refractive index change of the optical element constituting the light converging optical system such as the objective lens due to the temperature change or humidity change.

The Seventh Embodiment

FIG. 97 is a view generally showing the ninth optical pick-up apparatus according to the seventh embodiment. The objective lens 34 in the ninth optical pick-up apparatus is the aspherical surface objective lens which is exclusive use for the first optical disk which is designed so that the aberration is the minimum in the wavelength region of the semiconductor laser 11.

When the second optical disk is recorded and/or reproduced by the semiconductor laser 12 by using the objective lens 34, the spherical aberration is changed toward the over-correction direction due to the difference of the protective substrate thickness, however, in the ninth optical pick-up apparatus, in the optical path between the semiconductor laser 12 and the polarized light beam splitter 15 through which only the light from the semiconductor laser 12 passes, the coupling lens 110 which is the first substrate thickness difference correcting means for conducting in such a manner that the spherical aberration changed toward the over-correction direction is finely corrected, and by using the objective lens 34, the second optical disk can be recorded and/or reproduced by the semiconductor laser 12, is provided.

On the optical surface of the coupling lens 110, the diffractive structure 110*a* composed of a plurality of concentric circular ring-shaped zones is formed, and the diffractive structure has the wave front aberration characteristic by which, when the wavelength of the incident light is changed toward the shortening direction, the spherical aberration is changed toward the under-correction direction.

Further, because the diffractive structure 110*a* is optimized by the wavelength which coincides with the wavelength of the semiconductor laser 12, the good diffraction efficiency can be obtained.

In the same manner, by using the objective lens 34, when the third optical disk is recorded and/or reproduced by the semiconductor laser 13, the spherical aberration is changed toward the over-correction direction due to the difference of the protective substrate thickness, however, in the ninth optical pick-up apparatus, in the optical path between the semiconductor laser 13 and the polarized light beam splitter 17 through which only the light from the semiconductor laser 13 passes, the coupling lens 111 which is the second substrate thickness difference correcting means for conducting in such a manner that the spherical aberration changed toward the over-correction direction is finely corrected, and by using the objective lens 34, the third optical disk can be recorded and/or reproduced by the semiconductor laser 13, is provided.

On the optical surface of the coupling lens 111, the diffractive structure 111*a* composed of a plurality of concentric circular ring-shaped zones is formed, and the diffractive structure has the wave front aberration characteristic by which, when the wavelength of the incident light is changed toward the shortening direction, the spherical aberration is changed toward the under-correction direction.

Further, because the diffractive structure 111*a* is optimized by the wavelength coincident with the wavelength of the semiconductor laser 13, the good diffraction efficiency can be obtained.

Further, in the ninth optical pick-up apparatus, on the optical surface of the objective lens 34, as the aperture regulating means of NA1, NA2 and NA3, the ring-shaped zone filter as shown in FIG. 50 is formed, and because the ring-shaped zone filter has the wavelength characteristic as shown in FIG. 51, the aperture is automatically changed corresponding to the kind of the optical disk onto which the recording and/or reproducing of the information is conducted, therefore, the structure of the optical pick-up apparatus can be simplified, and the cost can be greatly decreased.

Further, the ninth optical pick-up apparatus, when the recording and reproducing of the information are conducted onto the first optical disk, has the collimator 39 which is shifted in the optical axis direction by the one axis actuator 21, as the spherical aberration correcting element for correcting the change of the spherical aberration due to the production error of the protective substrate thickness of the optical disk, and the production error of the optical element constituting the light converging optical system such as the objective lens 34, the change of the wavelength due to the production error of the semiconductor laser 11, and the shape change or the refractive index change of the optical element constituting the light converging optical system such as the objective lens due to the temperature change or humidity change.

Further, on the optical surface of the collimator 39, the diffractive structure 39*a* composed of a plurality of concentric circular ring-shaped zones is formed, and because the diffractive structure 39*a* has the wavelength characteristic by which, when the wavelength of the incident light is changed toward the extending direction, the back focus of the collimator 39 is changed toward the shortening direction, the light flux from the semiconductor laser 11 passed the collimator 39 and the objective lens 34 is converged onto the information recording surface 91 of the first optical disk almost without the chromatic aberration.

In this connection, as the objective lens which can be used for the embodiment of the present invention, other than the objective lens composed of one lens, the objective lens composed of a plurality of lenses more than 2 is also included.

Example

Next, the present invention will be more specifically described by the Example 9 to Example 14. The aspherical surface in the lens of each example is expressed by the following expression (arithmetic 2) when the optical axis direction is X-axis, the height in the perpendicular direction to the optical axis is h, and the radius of curvature of the refractive surface is r. Where, $\kappa$ is a conical coefficient, and $A_{2i}$ is an aspherical surface coefficient.

$$X = \frac{h^2/r}{1 + \sqrt{1 - (1+\kappa)h^2/r^2}} + \sum_{i=2} A_{2i} h^{2i} \quad \text{(Arithmetic 2)}$$

Further, the diffractive surface in each example can be expressed as the optical path difference function $\Phi b$ by the following expression (arithmetic 3). Herein, h is the height perpendicular to the optical axis, $b_{2i}$ is a coefficient of the optical path difference function, and n is the order of the diffracted ray having the maximum diffracted light amount in the diffracted ray generated on the diffracted surface.

$$\Phi_b = n \cdot \sum_{i=1} b_{2i} h^{2i} \quad \text{(Arithmetic 3)}$$

In this connection, in the following tables or views, there is a case where, for the expression of the exponent of 10, E (or e) is used, and is expressed like as, for example, E–02 (=$10^{-2}$).

Example 9

Example 9 is the objective lens which can be applied to each optical pick-up apparatus in FIG. 42, FIG. 44, FIG. 45, FIG. 47 and FIG. 48, and the recording and reproducing of the information can be conducted onto the 3 kinds of optical disks whose recording density is different. For obtaining the objective lens characteristic of Example 9, it is defined that the wavelength λ1 of the first light source for the first optical disk (the next generation high density optical disk for which the blue violet semiconductor laser is used) is 405 nm, the wavelength λ2 of the second light source for the second optical disk (DVD) is 650 nm, the wavelength λ3 of the third light source for the third optical disk (CD) is 780 nm, the protective substrate thickness t1 of the first optical disk is 0.1 mm, the protective substrate thickness t2 of the second optical disk is 0.6 mm, and the protective substrate thickness t3 of the third optical disk is 1.2 mm. Further, as the image side numerical apertures NA1, NA2 and NA3 necessary for conducting the recording and reproducing of the information onto the first-the third optical disks, respectively 0.85, 0.65, and 0.50 are assumed.

In FIG. 53 to FIG. 55, the optical path views in λ1=405 nm, λ2=650 nm, and λ3=780 nm of the objective lens in Example 9 are shown. The objective lens in Example 9 has the diffractive structure composed of a plurality of concentric circular ring-shaped zones on the aspherical surface of the light source side, however, in the optical path view in the present specification, the diffractive structure is omitted. Further, the objective lens in Example 9 is made the infinite specification in λ1=405 nm, and is made the finite specification in λ2=650 nm, and λ3=780 nm. In this way, when it is made the finite specification in λ2=650 nm, and λ3=780 nm, and the divergent light flux is made incident on the second and the third optical disks whose protective substrate thickness is larger than that of the first optical disk, the working distance (the distance between the final surface of the objective lens and the light flux incident surface of the optical disk) can be sufficiently secured, and together, the spherical aberration amount generated due to the difference of the protective substrate thickness of the different kinds of optical disks can be lightened, therefore, the interval of the adjoining ring-shaped zones can be expanded, and the lowering of the diffraction efficiency due to the production error of the shape of the ring-shaped zone can be softened.

The spherical aberration view up to the numerical aperture 0.85 to λ1=405 nm of the objective lens in Example 9 is shown in FIG. 56. The spherical aberration view up to the numerical aperture 0.65 to λ2=650 nm is shown in FIG. 57. Further, the spherical aberration view up to the numerical aperture 0.50 to λ3=780 nm is shown in FIG. 58. As can be clearly seen from the spherical aberration views in FIG. 56 to FIG. 58, by the action of the diffractive structure, the spherical aberration generated due to the difference of the protective substrate thickness of the 3 kinds of optical disks is finely corrected in the image side numerical aperture necessary for conducting the recording and reproducing of the information onto respective optical disks. In this connection, the wave front aberrations of the objective lens of one example, are as follows. When λ1=405 nm, NA1 0.85, and t1=0.1 mm, the wave front aberration is 0.007 λ1, when λ2=650 nm, NA2 0.65, and t2=0.6 mm, the wave front aberration is 0.003 λ2, and when λ3=780 nm, NA3 0.50, and t3=1.2 mm, the wave front aberration is 0.002 λ3.

Further, in FIG. 59, another spherical aberration view to λ2=650 nm is shown. FIG. 59 is the spherical aberration view of the objective lens of Example 9 when the light of λ2=650 nm of the light flux diameter equal to the diaphragm diameter determined by the combination of λ1=405 nm and NA1 0.85 is incident on the objective lens. As can be seen from the spherical aberration view in FIG. 59, the objective lens of Example 9, to the combination of λ2=650 nm, and t2=0.6 mm, the light flux up to NA2 0.65 is made to converge onto the information recording surface of the second optical disk almost without aberration, and when the light flux which passes the outside from NA2 0.65 generates the large spherical aberration (hereinafter, called "flare"), it is made so as not to converge onto the information recording surface 92 of the second optical disk.

Further, in FIG. 60, another spherical aberration view to λ3=780 nm is shown. FIG. 60 is the spherical aberration view of the objective lens of Example 9 when the light of λ3=780 nm of the light flux diameter equal to the diaphragm diameter determined by the combination of λ1=405 nm and NA1 0.85 is incident on the objective lens. As can be seen from the spherical aberration view in FIG. 60, the objective lens of Example 9, to the combination of λ3=780 nm, and t3=1.2 mm, the light flux up to NA3 0.50 is made to converge onto the information recording surface 93 of the third optical disk almost without aberration, and when the light flux which passes the outside from NA3 0.50 generates the flare, it is made so as not to converge onto the information recording surface 93 of the third optical disk.

Herein, "to converge on the information recording surface of the optical disk" means that the light flux incident on the objective lens is converged onto the information recording surface of the optical disk in the situation that the wave front aberration is in the diffraction limit (when λ is defined as the wavelength of the light source, it is not higher than 0.07 λrms). In this way, in the case where the recording and reproducing of the information are conducted on the second and the third optical disks, when the light flux which passes the region of the outside from the necessary numerical aperture is made flare, because the size of the spot on the information recording surface of the optical disk is not so smaller than necessary, the coma generated when the protective substrate of the optical disk is inclined with respect to the optical axis (hereinafter, called "disk skew") can be reduced, and the margin for the disk skew can be secured. Further, because it is unnecessary to provide the aperture changing means corresponding to the optical disk whose recording density is different, the structure becomes simple, and it is preferable.

In this connection, in the objective lens in Example 9, as the high density next generation first optical disk, it is assumed that the protective substrate thickness t1 is 0.1 mm, the wavelength of the light source is 405 nm, the image side numerical aperture is 0.85, and the optical design is conducted, however, the present invention can also be applied to the optical disk having the other specification.

Further, the image side numerical aperture for the second optical disk (DVD) is 0.65, and the image side numerical aperture for the third optical disk (CD) is 0.50 are assumed and the optical design is conducted, however, the present invention can also be applied to the optical disk having the other specification.

Further, in the present specification, "the spherical aberration is (finely) corrected", "the wave front aberration is (finely) corrected" specify that the aberration is corrected in such a manner that the light flux incident on the objective lens is converged on the information recording surface of the optical disk in a predetermined image side numerical aperture of the objective lens necessary for conducting the recording and/or reproducing of the information onto the optical disk in the situation that the wave front aberration is in the diffraction limit (when λ is the wavelength of the light source, not larger than 0.07 λrms, more preferably, not larger than 0.05 λrms).

In Table 13, the lens data of the objective lens of Example 9 is shown. In the table, f1, f2, f3 respectively show the focal distances of the objective lens in the wavelength λ1, λ2, λ3, m1, m2, m3 respectively show the magnifications of the objective lens in the wavelength $\lambda 1$, $\lambda 2$, $\lambda 3$, R shows the radius of curvature, d shows the surface interval, $N\lambda 1$, $N\lambda 2$, $N\lambda 3$ respectively show the refractive indexes in the wavelength $\lambda 1$, $\lambda 2$, $\lambda 3$, and νd shows Abbe's number in d line.

TABLE 13

When the wavelength $\lambda 1$ = 405 nm,
the focal distance f1 = 2.35 mm, image side numerical aperture NA1 = 0.85, magnification m1 = 0,
When the wavelength $\lambda 2$ = 650 nm,
the focal distance f2 = 2.43 mm, image side numerical aperture NA2 = 0.65, magnification m2 = −0.05,
When the wavelength $\lambda 3$ = 780 nm,
the focal distance f3 = 2.45 mm, image side numerical aperture NA3 = 0.50, magnification m3 = −0.10

| Surface No. | r (mm) | d (mm) | $N\lambda 1$ | $N\lambda 2$ | $N\lambda 3$ | νd | note |
|---|---|---|---|---|---|---|---|
| 0 |  | d0 (variable) |  |  |  |  | Light source |
| 1 | 1.799 | 2.500 | 1.76904 | 1.73912 | 1.73324 | 49.3 | Objective |
| 2 | 45.872 | d2 (variable) |  |  |  |  | lens |
| 3 | ∞ | d3 (variable) | 1.61949 | 1.57756 | 1.57062 | 30.0 | Transparent substrate |
| 4 | ∞ |  |  |  |  |  |  |

|  | $\lambda 1$ = 405 nm | $\lambda 2$ = 650 nm | $\lambda 3$ = 780 nm |
|---|---|---|---|
| d0 | ∞ | 48.589 | 27.964 |
| d2 | 0.100 | 0.800 | 1.200 |
| d3 | 0.855 | 0.720 | 0.450 |

Aspherical surface coefficient

|  | First surface | Second surface |
|---|---|---|
| κ | −6.1317E−01 | 0.0000E+00 |
| A4 | 5.2524E−03 | 7.1812E−02 |
| A6 | −5.6632E−04 | −3.8260E−02 |
| A8 | 1.1555E−03 | −1.7437E−03 |
| A10 | −3.1854E−04 | 4.7910E−03 |
| A12 | −2.2350E−06 | −5.7767E−04 |
| A14 | 2.6449E−05 | −1.1890E−04 |
| A18 | −4.7779E−06 |  |

Diffractive surface coefficient

|  | First surface |
|---|---|
| b2 | −2.0000E−03 |
| b4 | −5.6811E−04 |
| b6 | −1.3194E−04 |
| b8 | 4.9466E−05 |
| b10 | −8.0188E−06 |

Further, in the lens data in Table 13, because the reference wavelength (blazed wavelength) of the diffractive surface coefficient coincides with the wavelength $\lambda 1$, the diffracted light amount of the light of the wavelength $\lambda 1$ is the maximum, however, it may also be allowable that the wavelength $\lambda 2$ is made the reference wavelength of the diffractive surface coefficient and it is made so that the diffracted light amount of the light of the wavelength $\lambda 2$ is the maximum, or the wavelength $\lambda 3$ is made the reference wavelength of the diffractive surface coefficient and it is made so that the diffracted light amount of the light of the wavelength $\lambda 3$ is the maximum. Alternatively, the wavelength by which the diffracted light amount of the light of the wavelength $\lambda 1$, the diffracted light amount of the light of the wavelength $\lambda 2$, and the diffracted light amount of the light of the wavelength $\lambda 3$, are balanced, may be made the reference wavelength of the diffractive surface coefficient. In either case, it can be made the objective lens applicable to the optical pick-up apparatus of the present invention with a little change of the design.

Further, in the lens data in Table 13, the diffractive surface coefficient is determined so that the first order diffracted ray has the larger diffracted light amount than any other order diffracted ray, however, it may also be allowable that the high order diffracted ray not smaller than the second order has the larger diffracted light amount than any other order diffracted ray.

Example 10

Example 10 is the light converging optical system which can applied to the optical pick-up apparatus in FIG. 45, and by which the recording and reproducing of the information can be conducted onto three kinds of optical disks whose recording density are different. It is assumed that, as the high density next generation first optical disk, the protective substrate thickness t1 is 0.1 mm, the wavelength $\lambda 1$ of the light source is 405 nm, the image side numerical aperture NA1 is 0.85, and as the second optical disk (DVD), the protective substrate thickness t2 is 0.6 mm, the wavelength λ2 of the light source is 650 nm, the image side numerical aperture NA2 is 0.65, and as the third optical disk (CD), the protective substrate thickness t3 is 1.2 mm, the wavelength λ3 of the light source is 780 nm, and the image side numerical aperture NA3 is 0.50.

In FIG. 61, the optical path view in the λ1=405 nm of the light converging optical system of Example 10 is shown. The collimator (corresponds to the collimator 29 in FIG. 45) of the light converging optical system of Example 10 has the wavelength characteristic so that, by the action of the diffractive structure composed of a plurality of concentric circular ring-shaped zones formed on the aspherical surface of the optical disk side, when the wavelength of the light emitted form the first light source is changed from 405 nm toward the long wavelength side, the back focus of the collimator is shortened. The sign of the changed amount of the back focus of the collimator, when the wavelength of the light emitted form the first light source is changed from 405 nm toward the long wavelength side, is made the inverse sign to the sign of the changed amount of the back focus of the objective lens to the wavelength change of the same amount, and further, the absolute value of the changed amount of the back focus which is standardized by the second power of the focal distance of the collimator is made almost equal to the absolute value of the changed amount of the back focus which is standardized by the second power of the focal distance of the objective lens to the wavelength change of the same amount, therefore, the change of the focal position of the objective lens when the wavelength of the light emitted from the first light source is changed, can be corrected.

In FIG. 62, the spherical aberration view up to the numerical aperture 0.85 corresponding to the λ1=405 nm±10 nm of the objective lens of the light converging optical system of Example 10 is shown. Further, in FIG. 63, the spherical aberration view up to the numerical aperture 0.85 corresponding to the λ1=405 nm±10 nm of the composite system of the collimator and the objective lens of the light converging optical system of Example 10 is shown. As shown in the spherical aberration view in FIG. 62, in the objective lens of Example 10, when the wavelength is changed from the reference wavelength 405 nm by +10 nm, the paraxial focal position is changed by 0.005 mm, and when it is combined with a collimator having the wavelength characteristic as described above, as in the spherical aberration view in FIG. 63, the changed amount of the paraxial focal position when the wavelength is changed from the reference wavelength 405 nm by +10 nm, can be reduced to 0.002 mm.

In this connection, when it is assumed that the wavelength changed amount by the mode hopping of the blue violet semiconductor laser is +1 nm, the defocus component of the spherical aberration at the time of the mode hopping in the system of only objective lens of Example 10 is 0.160 λrms which is over the diffraction limit, however, it can be seen that the defocus component of the spherical aberration at the time of the mode hopping in the composite system of the collimator and the objective lens of the light converging optical system of Example 10 is lower than 0.001 λrms, and the change of the best image surface position of the objective lens by the wavelength change is finely corrected.

Further, the light converging optical system of Example 10, when the recording and reproducing of the information are conducted onto the first optical disk, has the spherical aberration correcting element (corresponds to the refractive index distribution variable element 23 in FIG. 45) for correcting the change of the spherical aberration due to the production error of the protective substrate thickness of the optical disk, and the production error of the optical element constituting the light converging optical system such as the objective lens or collimator, the change of the wavelength due to the production error of the light source, and the shape change or the refractive index change of the optical element constituting the light converging optical system such as the objective lens or collimator due to the temperature change or humidity change.

As such a spherical aberration correcting element, an element which has the refractive index distribution variable material layer, and by which the refractive index distribution of the refractive index distribution variable material layer can be changed by applying the electric field, magnetic field or temperature, is listed. Specifically, there is the element in which the refractive index distribution variable material layer is a liquid crystal layer, and the liquid crystal layer is arranged between the transparent electrodes which are opposite to each other, and by applying the voltage onto the transparent electrodes, the orientation condition of the liquid crystal molecule of the liquid crystal layer is electrically controlled, thereby, the refractive index distribution in the liquid crystal layer can be changed, or the element in which the refractive index distribution variable material layer is the electro-optical material layer and it is arranged between the transparent electrodes which are opposite to each other, and by applying the voltage onto the transparent electrodes, the refractive index of the electro-optical material layer is electrically controlled, thereby, the refractive index distribution in the electro-optical material layer can be changed.

In Example 10, the refractive index distribution N (λ, h) along the direction perpendicular to the optical axis of such a refractive index distribution variable material layer is expressed by the refractive index distribution function expressed by $N(\lambda, h)=N_0(\lambda)+\Sigma A_{2i} \cdot h^{2i}$ (B), where h is the height (mm) from the optical axis, $N_0 (\lambda)$ is the refractive index in the wavelength λ on the optical axis of the refractive index distribution variable material layer, and A2i is the refractive index distribution function coefficient.

In Table 14, a result in which the change of the spherical aberration generated in the light converging optical system due to the wavelength error of ±10 nm to the reference wavelength of 405 nm due to the production error of the light source, refractive index change of the plastic lens due to the temperature change of ±30° C. to the reference temperature of 25° C., and the production error of ±0.02 mm to the reference protective substrate thickness of 0.1 mm of the first optical disk, is corrected by changing the refractive index distribution of the refractive index distribution variable material layer, is shown. In the plastic lens, because the refractive index change due to the temperature change is larger than that of the glass lens, at the time of the temperature change, only the refractive index change of the plastic lens is considered, and the changed amount is $-10 \times 10^{-5}/°$ C.

TABLE 14

|  |  | wave front aberration before correction | wave front aberration after correction | $N_0(\lambda)$ | $A_2$ |
|---|---|---|---|---|---|
| Wavelength error | +10 nm | $0.142\lambda$ rms | $0.007\lambda$ rms | 1.52897 | 5.6830E−04 |
|  | −10 nm | $0.147\lambda$ rms | $0.010\lambda$ rms | 1.53153 | −5.7980E−04 |
| Temperature change | +30° C. | $0.011\lambda$ rms | $0.008\lambda$ rms | 1.53001 | −4.5330E−05 |
|  | −30° C. | $0.013\lambda$ rms | $0.008\lambda$ rms | 1.53039 | 2.9830E−05 |
| error of the transparent substrate thickness | +0.02 mm | $0.195\lambda$ rms | $0.010\lambda$ rms | 1.53020 | 7.5570E−04 |
|  | −0.02 mm | $0.190\lambda$ rms | $0.012\lambda$ rms | 1.53020 | −7.7790E−04 |

In this connection, in the light converging optical system of Example 10, the plastic lens is the collimator lens. Further, the wavelength changed amount of the light source at the time of temperature change is +0.05 nm/° C. From Table 14, in either case, the wave front aberration is finely corrected, and even when the information is recorded and reproduced onto the first optical disk for which the high numerical aperture of 0.85 is necessary, the spot of the good light converging condition can be always obtained.

Further, in Table 14, the wave front aberration before correction means that, when the wavelength error or the wavelength change and refractive index change due to the temperature change, or the error of the protective substrate thickness is given, before the refractive index distribution of the refractive index distribution variable material layer is changed, that is, the wave front aberration of the total system of the light converging optical system when the refractive index distribution of the refractive index distribution variable material layer is uniformly $N_0(\lambda)$, and the wave front aberration after the correction means the wave front aberration of the total system of the light converging optical system in the case where the wavelength error or the wavelength change and refractive index change due to the temperature change, or the error of the protective substrate thickness is given, when the refractive index distribution expressed by the expression (B) is given to the refractive index distribution variable material layer by using the second order refractive index distribution function coefficient $A_2$ and $N_0(\lambda)$.

The optical path views in the $\lambda 2=650$ nm, and $\lambda 3=780$ nm of the objective lens of the light converging optical system of Example 10 are shown in FIG. 64 and FIG. 65. Further, in FIG. 66, the spherical aberration view up to the numerical aperture 0.65 for $\lambda 2=650$ nm, is shown. Further, in FIG. 67, the spherical aberration view up to the numerical aperture 0.50 for $\lambda 3=780$ nm, is shown. The objective lens of the light converging optical system of Example 10 has the concentric circular ring-shaped zone diffractive structure, and by the action of the diffractive structure, the spherical aberration generated due to the difference of the protective substrate thickness of 3 kinds of optical disks is finely corrected in the image side numerical aperture necessary for conducting the recording and reproducing of the information onto respective optical disks. Because the objective lens of the light converging optical system of Example 10 is the same objective lens as the objective lens of Example 9, the detailed description will be omitted.

Further, in the light converging optical system of Example 10, only when the recording and reproducing of the information are conducted onto the first optical disk, the change of the spherical aberration is corrected by changing the refractive index distribution along the direction perpendicular to the optical axis of the refractive index distribution variable material layer, however, also when the recording and reproducing of the information are conducted onto the second optical disk or the third optical disk, the change of the spherical aberration may also be corrected by changing the refractive index distribution of the refractive index distribution variable material layer.

Further, in the optical path view of Example 10, in the actual optical pick-up apparatus, the polarized light beam splitter arranged in the optical path between the light source and the objective lens is neglected. In the light converging optical system of Example 10, when the polarized light beam splitter is arranged in the non-parallel light flux between the light source and the objective lens, the spherical aberration is generated, however, when the position of the light source is moved in the optical axis direction by a predetermined amount, the generated spherical aberration can be corrected. In the same manner also in the succeeding Examples, the polarized light beam splitter arranged in the optical path between the light source and the objective lens is neglected.

In Table 15, the lens data to $\lambda 1=405$ nm of the light converging optical system of Example 10, is shown. In the lens data of Table 15, the reference wavelength (blazed wavelength) of the diffractive surface coefficient of the second surface coincides with the wavelength $\lambda 1$.

TABLE 15

When the wavelength $\lambda 1 = 405$ nm, the focal distance f1 = 2.35 mm, image side numerical aperture NA1 = 0.85, magnification m1 = 0.

| Surface No. | r (mm) | d (mm) | N$\lambda$1 | N$\lambda$2 | N$\lambda$3 | vd | note |
|---|---|---|---|---|---|---|---|
| 0 |  | 9.851 |  |  |  |  | light source |
| 1 | −30.532 | 1.500 | 1.52491 | 1.50690 | 1.50355 | 56.5 | collimator |
| 2 | −9.309 | 12.000 |  |  |  |  |  |
| 3 | ∞ | 1.000 | 1.53020 | 1.51452 | 1.51118 | 64.1 | glass |
| 4 | ∞ | 1.000 | 1.53020 | 1.51452 | 1.51118 | 64.1 | sub-strate** |
| 5 | ∞ | 1.000 | 1.53020 | 1.51452 | 1.51118 | 64.1 | glass |
| 6 | ∞ | 3.000 |  |  |  |  | substrate |
| 7 | 1.799 | 2.500 | 1.76904 | 1.73912 | 1.73324 | 49.3 | objective lens |
| 8 | 45.872 | 0.855 |  |  |  |  |  |
| 9 | ∞ | 0.100 | 1.61949 | 1.57756 | 1.57062 | 30.0 | transparent substrate |
| 10 | ∞ |  |  |  |  |  |  |

TABLE 15-continued

| | Aspherical surface coefficient | | |
|---|---|---|---|
| | 2nd surface | 7-th surface | 8-th surface |
| κ | −4.0087E−01 | −6.1317E+00 | 0.0000E+00 |
| A4 | −1.2239E−04 | 5.2524E−03 | 7.1812E−02 |
| A6 | −1.8594E−06 | −5.6632E−04 | −3.8260E−02 |
| A8 | | 1.1555E−03 | −1.7437E−03 |
| A10 | | −3.1854E−04 | 4.7910E−03 |
| A12 | | −2.2350E−06 | −5.7767E−04 |
| A14 | | 2.6449E−05 | −1.1890E−04 |
| A18 | | −4.7779E−06 | |

| | Diffractive surface coefficient | |
|---|---|---|
| | 2nd surface | 7-th surface |
| b2 | −2.4956E−02 | −2.0000E−03 |
| b4 | | −5.6811E−04 |
| b6 | | −1.3194E−04 |
| b8 | | 4.9466E−05 |
| b10 | | −8.0188E−06 |

**refractive index distribution variable material layer

Further, in the lens data in Table 15, the diffractive surface coefficient of the second surface is determined so that the first order diffracted ray has the diffracted light amount larger than any other order diffracted ray, however, it may also be allowable to determine so that the diffracted ray of higher order than the second order has the diffracted light amount larger than any other order diffracted ray.

In Table 16, the lens data for $\lambda 2=650$ nm and $\lambda 3=780$ nm of the light converging optical element of Example 10 is shown.

TABLE 16

When the wavelength λ2 = 650 nm,
the focal distance f2 = 2.43 mm, image side numerical
aperture NA2 = 0.65, magnification m2 = −0.05,
When the wavelength λ3 = 780 nm,
the focal distance f3 = 2.45 mm, image side numerical
aperture NA3 = 0.50, magnification m3 = −0.10

| Surface No. | r (mm) | d (mm) | Nλ1 | Nλ2 | Nλ3 | vd | note |
|---|---|---|---|---|---|---|---|
| 0 | | d0 (variable) | | | | | light source |
| 1 | ∞ | 1.000 | 1.53020 | 1.51452 | 1.51118 | 64.1 | glass |
| 2 | ∞ | 1.000 | 1.53020 | 1.51452 | 1.51118 | 64.1 | substrate** |
| 3 | ∞ | 1.000 | 1.53020 | 1.51452 | 1.51118 | 64.1 | glass |
| 4 | ∞ | 3.000 | | | | | substrate |
| 5 | 1.799 | 2.500 | 1.76904 | 1.73912 | 1.73324 | 49.3 | objective |
| 6 | 45.872 | 0.855 | | | | | lens |
| 7 | ∞ | 0.100 | 1.61949 | 1.57756 | 1.57062 | 30.0 | transparent |
| 8 | ∞ | | | | | | substrate |

| | λ2 = 650 nm | λ3 = 780 nm |
|---|---|---|
| d0 | 43.500 | 23.000 |
| d5 | 0.600 | 1.200 |
| d6 | 0.720 | 0.450 |

| | Aspherical surface coefficient | |
|---|---|---|
| | 5-th surface | 6-th surface |
| κ | −6.1317E−01 | 0.0000E+00 |
| A4 | 5.2524E−03 | 7.1812E−02 |
| A6 | −5.6632E−04 | −3.8260E−02 |
| A8 | 1.1555E−03 | −1.7437E−03 |
| A10 | −3.1854E−04 | 4.7910E−03 |
| A12 | −2.2350E−06 | −5.7767E−04 |
| A14 | 2.6449E−05 | −1.1890E−04 |
| A18 | −4.7779E−06 | |

| | Diffractive surface coefficient |
|---|---|
| | 5-th surface |
| b2 | −2.0000E−03 |
| b4 | −5.6811E−04 |
| b6 | −1.3194E−04 |
| b8 | 4.9466E−05 |
| b10 | −8.0188E−06 |

**refractive index distribution variable material layer

In the lens data in Table 15 and Table 16, because the reference wavelength (blazed wavelength) of the diffractive surface coefficient of the surface on the light source side of the objective lens (that is, the seventh surface in Table 15, and the fifth surface in Table 16) coincides with the wavelength $\lambda 1$, the diffracted light amount of the light of the wavelength $\lambda 1$ is the maximum, however, the wavelength $\lambda 2$ is made the reference wavelength of the diffractive surface coefficient, and it may also be made so that diffracted light amount of the light of the wavelength $\lambda 2$ is the maximum, and the wavelength $\lambda 3$ is made the reference wavelength of the diffractive surface coefficient, and it may also be made so that the diffracted light amount of the light of the wavelength $\lambda 3$ is the maximum. Alternatively, the wavelength in which the diffracted light amount of the light of wavelength $\lambda 1$, the diffracted light amount of the light of wavelength $\lambda 2$, and the diffracted light amount of the light of wavelength $\lambda 13$ are balanced, may be made the reference wavelength of the diffractive surface coefficient. In either case, by a little change of design, the light converging optical system applicable to the optical pick-up apparatus of the present invention, can be structured.

Further, in the lens data in Table 15 and Table 16, the diffractive surface coefficient of the surface of the light source side of the objective lens is determined so that the first order diffracted ray has the larger diffracted light amount than any other order diffracted ray, however, it may also be determined so that the diffracted ray which is higher order than the second order has the larger diffracted light amount than any other order diffracted ray.

Further, in Table 15 and Table 16, f1, f2, and f3 respectively show the focal distances of the objective lens of the light converging optical system in the wavelength $\lambda 1$, $\lambda 2$, and $\lambda 3$, m1, m2, and m3 respectively show the magnifications of the objective lens of the light converging optical system in the wavelength $\lambda 1$, $\lambda 2$, and $\lambda 3$, R shows the radius of curvature, d shows the surface interval, N$\lambda 1$, N$\lambda 2$, and N$\lambda 3$ respectively show the refractive indexes in the wavelength $\lambda 1$, $\lambda 2$, and $\lambda 3$, and vd shows Abbe's number in d line. Also in Tables of the lens data of succeeding Examples, it is the same.

Example 11

Example 11 is the light converging optical system applicable to the optical pick-up apparatus in FIG. 46, and the recording and reproducing of the information can be conducted onto 3 kinds of optical disks having different recording density. It is defined that, as the high density next generation first optical disk, the protective substrate thickness t1 is 0.1 mm, the wavelength $\lambda 1$ of the light source is 405 nm, the image side numerical aperture NA1 is 0.85, and as the second optical disk (DVD), the protective substrate thickness t2 is 0.6 mm, the wavelength λ2 of the light source is 650 nm, the image side numerical aperture NA2 is 0.65, and as the third optical disk (CD), the protective substrate thickness t3 is 1.2 mm, the wavelength λ3 of the light source is 780 nm, and the image side numerical aperture is 0.50.

In FIG. 68, the optical path view in the λ1=405 nm of the light converging optical system of Example 11 is shown.

Further, in FIG. 69, the spherical aberration view up to the numerical aperture 0.85 for λ1=405 nm±10 nm of the light converging optical system of Example 11 is shown. The collimator of Example 11, in the same as the collimator of the light converging optical system of Example 10, has the wavelength characteristic so that, by the action of the diffractive structure composed of a plurality of concentric circular ring-shaped zones formed on the aspherical surface of the optical disk side, when the wavelength of the light emitted form the first light source is changed from 405 nm toward the long wavelength side, the back focus of the collimator is shortened, and the change of the focal position of the objective lens when the wavelength of the light emitted form the first light source is changed is corrected. In contrast to that the defocus component of the wave front aberration at the time of the mode hopping in the system of only objective lens of Example 11 is 0.201 λrms, the defocus component of the wave front aberration at the time of the mode hopping in the composite system of the collimator and the objective lens of the light converging optical system of Example 11 is 0.003 λrms, and it can be seen that the change of the best image surface position of the objective lens by the wavelength change is finely corrected.

Further, the light converging optical system of Example 11, in the same as the light converging optical system of Example 10, when the recording and reproducing of the information are conducted onto the first optical disk, has the spherical aberration correcting element for correcting the change of the spherical aberration due to the production error of the protective substrate thickness of the optical disk, and the production error of the optical element constituting the light converging optical system such as the objective lens or collimator, the change of the wavelength due to the production error of the light source, and the shape change or the refractive index change of the optical element constituting the light converging optical system such as the objective lens or collimator due to the temperature change or humidity change.

In Table 17, the result in which the change of the spherical aberration generated in the light converging optical system due to the change of the wavelength of ±10 nm to the reference wavelength of 405 nm due to the production error of the light source, the refractive index change of the plastic lens due to the temperature change of ±30° C. to the reference temperature of 25° C., and the production error of ±0.02 mm to the reference protective substrate thickness of 0.1 mm of the first optical disk, is corrected by changing the refractive index distribution of the refractive index distribution variable material layer of the spherical aberration correcting element, is shown.

TABLE 17

|  |  | wave front aberration before correction | wave front aberration after correction | $N_0(\lambda)$ | $A_2$ |
|---|---|---|---|---|---|
| Wavelength error | +10 nm | 0.289λ rms | 0.011λ rms | 1.52897 | 9.3500E−04 |
|  | −10 nm | 0.315λ rms | 0.015λ rms | 1.53153 | −9.5204E−04 |
| Temperature change | +30° C. | 0.299λ rms | 0.031λ rms | 1.53001 | 9.3590E−04 |
|  | −30° C. | 0.314λ rms | 0.052λ rms | 1.53039 | −9.2810E−04 |
| error of the transparent substrate thickness | +0.02 mm | 0.194λ rms | 0.009λ rms | 1.53020 | 5.9700E−04 |
|  | −0.02 mm | 0.203λ rms | 0.013λ rms | 1.53020 | −6.0360E−04 |

In the same manner as in Example 10, at the time of temperature change, only the refractive index change of the plastic lens is considered, and its changed amount is −10× $10^{-5}$/° C. In this connection, in the light converging optical system of Example 11, the plastic lens is the collimator and the objective lens. Further, the wavelength changed amount of the light source at the time of temperature change is +0.05 nm/° C.

In this connection, the refractive index distribution along the direction perpendicular to the optical axis of the refractive index distribution variable material layer is expressed by the expression (1) in the same manner as in Example 10. From Table 17, in either case, the wave front aberration is finely corrected, and even when the information is recorded and reproduced onto the first optical disk for which the high numerical aperture of 0.85 is necessary, the spot of the good light converging condition can be always obtained.

In FIG. 70, the optical path view in the λ2=650 nm of the light converging optical system of Example 11 is shown. Further, in FIG. 71, the optical path view in the λ3=780 nm of the light converging optical system of Example 11 is shown. Further, in FIG. 72, the spherical aberration view up to the numerical aperture 0.65 for λ2=650 nm is shown. Further, in FIG. 73, the spherical aberration view up to the numerical aperture 0.50 for λ3=780 nm is shown. The objective lens of the light converging optical system of Example 11 is the objective lens exclusive use for the first optical disk, and the refractive lens which is aberration-corrected so that it becomes no-aberration by the combination of λ1=405 nm, NA1 0.85, t1=0.1 mm, and magnification m1=0.

Accordingly, when the recording and reproducing of the information is conducted onto the second optical disk and the third optical disk whose protective substrate thickness is lager than that of the first optical disk, by the objective lens of the light converging optical system of Example 11, the spherical aberration changes toward the over-correction direction. Therefore, it is made so that, by correcting the spherical aberration changed toward the over-correction direction by using the spherical aberration correcting element, the recording and reproducing of the information can be conducted onto the second optical disk and the third optical disk by using the objective lens exclusive use for the first optical disk.

Further, when the recording and reproducing of the information are conducted onto the second optical disk and the third optical disk, by making the divergent light flux be incident on the objective lens, the enough working distance is secured. In Table 18, the result in which the spherical aberration changed by the difference of the protective substrate thickness is corrected, is shown. The refractive index distribution along the direction perpendicular to the optical axis of the refractive index distribution variable material layer is expressed by the expression (1) in the same manner as Example 10. Further, for finely correcting the high order spherical aberration more than the fifth order, other than the second order refractive index distribution coefficient, the fourth order refractive index distribution coefficient is used.

TABLE 18

| | wave front aberration before correction | wave front aberration after correction | $N_0(\lambda)$ | $A_2$ | $A_4$ |
|---|---|---|---|---|---|
| Second optical disk *1 | 0.357λ rms | 0.001λ rms | 1.51452 | −1.0260E−02 | −5.4230E−04 |
| Third optical disk **2 | 0.214λ rms | 0.002λ rms | 1.51118 | −6.1780E−03 | −1.2010E−03 |

Note:
*1 (NA2 = 0.65, λ2 = 850 nm, t2 = 0.6 mm)
**2 (NA3 = 0.50, λ3 = 780 nm, t3 = 1.2 mm)

From Table 18, it can be seen that the spherical aberration changed due to the difference of the protective substrate thickness is finely corrected, and by using the objective lens exclusive use for the first optical disk, the recording and reproducing of the information can be conducted onto the second optical disk and the third optical disk.

Further, on the optical surface of the objective lens, a filter having the wavelength selectivity as the aperture regulating means or aperture changing means is formed. That is, as shown FIG. 50, on the optical surface 34a of the objective lens 34, respectively, the ring-shaped zone filter 41 is formed in the first ring-shaped zone region corresponding to NA1 and NA2, the ring-shaped zone filter 42 is formed in the second ring-shaped zone region corresponding to NA2 and NA3, and the circular filter 43 is formed in the third circular region not larger than NA3. Each of filters 41 to 43 is formed so that each reflection factor has the wavelength dependency as shown in FIG. 51. Thereby, when the light flux not smaller than the necessary numerical aperture for each light flux of the different wavelength as, for example, about 650 nm or about 780 nm, is shut off, and the light flux of the wavelength of about 405 nm is made pass, the aperture can be automatically changed to NA1, NA2 and NA3. By the ring-shaped zone filter having such the wavelength selectivity, when the recording and reproducing of the information is conducted onto the second optical disk and the third optical disk, by shutting off the light flux larger than the necessary numerical aperture, the desired spot diameter can be obtained on the information recording surface of the optical disk.

In Table 19, the lens data of the objective lens of Example 11 is shown. In the lens data in Table 19, the reference wavelength (blazed wavelength) of the diffractive surface coefficient of the second surface coincides with the wavelength λ1.

TABLE 19

When the wavelength λ1 = 405 nm,
the focal distance f1 = 2.65 mm, image side numerical
aperture NA1 = 0.85, magnification m1 = 0.

| Surface No. | r (mm) | d (mm) | Nλ1 | Nλ2 | Nλ3 | νd | note |
|---|---|---|---|---|---|---|---|
| 0 | | 16.185 | | | | | light source |
| 1 | −23.167 | 2.000 | 1.52491 | 1.50690 | 1.50355 | 56.5 | collimator |
| 2 | −19.157 | 13.000 | | | | | |
| 3 | ∞ | 1.000 | 1.53020 | 1.51452 | 1.51118 | 64.1 | glass |
| 4 | ∞ | 1.000 | 1.53020 | 1.51452 | 1.51118 | 64.1 | substrate **1 |
| 5 | ∞ | 1.000 | 1.53020 | 1.51452 | 1.51118 | 64.1 | glass |
| 6 | ∞ | 3.000 | | | | | substrate |

TABLE 19-continued

| 7 | 1.694 | 3.100 | 1.52491 | 1.50690 | 1.50355 | 56.5 | objective lens |
|---|---|---|---|---|---|---|---|
| 8 | −2.856 | 0.918 | | | | | |
| 9 | ∞ | 0.100 | 1.61949 | 1.57756 | 1.57062 | 30.0 | transparent substrate |
| 10 | ∞ | | | | | | |

Aspherical surface coefficient

| | 2nd surface | 7-th surface | 8-th surface |
|---|---|---|---|
| κ | 2.2006E+01 | −6.6664E−01 | 2.4860E+01 |
| A4 | 3.3389E−04 | 4.3203E−03 | 6.5486E−02 |
| A6 | 2.0267E−05 | 7.2364E−04 | −3.4626E−02 |
| A8 | | 1.0865E−04 | 9.6814E−03 |
| A10 | | 1.1601E−05 | −1.4277E−03 |
| A12 | | 9.6720E−07 | 7.9143E−05 |
| A14 | | 3.2018E−07 | 2.9499E−06 |
| A16 | | 1.7930E−07 | −3.1761E−07 |
| A18 | | −2.1404E−08 | |
| A20 | | −3.4886E−09 | |

Diffractive surface coefficient

| 2nd-surface | |
|---|---|
| b2 | −2.4285E−02 |

**1 refractive index distribution variable material layer

Further, in the lens data in Table 19, the diffractive surface coefficient of the second surface is determined so that the first order diffracted ray has the larger diffracted light amount than any other order diffracted ray, however, it may also be determined so that the diffracted ray which is higher order than the second order has the larger diffracted light amount than any other order diffracted ray.

In Table 20, the lens data for λ2=650 nm and λ3=780 nm, is shown.

TABLE 20

When the wavelength $\lambda 2 = 650$ nm,
the focal distance f2 = 2.43 mm, image side numerical
aperture NA2 = 0.65, magnification m2 = −0.05,
When the wavelength $\lambda 3 = 780$ nm,
the focal distance f3 = 2.45 mm, image side numerical
aperture NA3 = 0.50, magnification m3 = −0.10

| Surface No. | r (mm) | d (mm) | N$\lambda$1 | N$\lambda$2 | N$\lambda$3 | vd | note |
|---|---|---|---|---|---|---|---|
| 0 | | d0 (variable) | | | | | light source |
| 1 | ∞ | 1.000 | 1.53020 | 1.51452 | 1.51118 | 64.1 | glass substrate **1 |
| 2 | ∞ | 1.000 | 1.53020 | 1.51452 | 1.51118 | 64.1 | |
| 3 | ∞ | 1.000 | 1.53020 | 1.51452 | 1.51118 | 64.1 | glass substrate |
| 4 | ∞ | 3.000 | | | | | |
| 5 | 1.694 | 3.100 | 1.52491 | 1.50690 | 1.50355 | 56.5 | objective lens |
| 6 | −2.856 | **2 | | | | | |
| 7 | ∞ | **3 | 1.61949 | 1.57756 | 1.57062 | 30.0 | transparent substrate |
| 8 | ∞ | | | | | | |

| | $\lambda 2 = 650$ nm | $\lambda 3 = 780$ nm |
|---|---|---|
| d5 | 0.600 | 1.200 |
| d6 | 0.795 | 0.481 |

Aspherical surface coefficient

| | 5-th surface | 6-th surface |
|---|---|---|
| κ | −6.6664E−01 | −2.4860E+01 |
| A4 | 4.3203E−03 | 6.5486E−02 |
| A6 | 7.2364E−04 | −3.4626E−02 |
| A8 | 1.0865E−04 | 9.6824E−03 |
| A10 | 1.1601E−05 | −1.4277E−03 |
| A12 | 9.6720E−07 | 7.9143E−05 |
| A14 | 3.2018E−07 | 2.9499E−06 |
| A16 | 1.7930E−07 | −3.1761E−07 |
| A18 | −2.1404E−08 | |
| A20 | −3.4886E−07 | |

**1 refractive index distribution variable material layer
**2 d5 (variable)
**3 d6 (variable)

Example 12

Example 12 is the light converging optical system applicable to the optical pick-up apparatus in FIG. 47, and the recording and reproducing of the information can be conducted onto 3 kinds of optical disks having different recording density. It is defined that, as the high density next generation first optical disk, the protective substrate thickness t1 is 0.1 mm, the wavelength $\lambda 1$ of the light source is 405 nm, the image side numerical aperture NA1 is 0.85, and as the second optical disk (DVD), the protective substrate thickness t2 is 0.6 mm, the wavelength $\lambda 2$ of the light source is 650 nm, the image side numerical aperture NA2 is 0.65, and as the third optical disk (CD), the protective substrate thickness t3 is 1.2 mm, the wavelength $\lambda 3$ of the light source is 780 nm, and the image side numerical aperture NA3 is 0.50.

In FIG. 74, the optical path view in the $\lambda 1=405$ nm of the light converging optical system of Example 12 is shown. Further, in FIG. 75, the spherical aberration view up to the numerical aperture 0.85 for $\lambda 1=405$ nm±10 nm of the light converging optical system of Example 11 is shown. The light converging optical system of Example 12, has the wavelength characteristic so that, by the action of the diffractive structure composed of a plurality of concentric circular ring-shaped zones formed on the aspherical surface of the optical disk side, when the wavelength of the light emitted form the first light source is changed from 405 nm toward the long wavelength side, the power of the beam expander is increased, therefore, the change of the focal position of the objective lens when the wavelength of the light emitted form the first light source is changed is corrected. In contrast to that the defocus component of the wave front aberration at the time of the mode hopping in the system of only objective lens of Example 12 is 0.160 $\lambda$rms, the defocus component of the wave front aberration at the time of the mode hopping in the composite system of the beam expander and the objective lens of the light converging optical system of Example 12 is 0.007 $\lambda$rms, and it can be seen that the change of the best image surface position of the objective lens by the wavelength change is finely corrected.

Further, in the light converging optical system of Example 12, when the recording and reproducing of the information are conducted onto the first optical disk, as the spherical aberration correcting element for correcting the change of the spherical aberration due to the production error of the protective substrate thickness of the optical disk, and the production error of the optical element constituting the light converging optical system such as the objective lens or collimator, the change of the wavelength due to the production error of the light source, and the shape change or the refractive index change of the optical element constituting the light converging optical system such as the objective lens or collimator due to the temperature change or humidity change, the negative lens (corresponds to the negative lens 32 in FIG. 47) constituting the beam expander is made to be movable in the optical axis direction. As an actuator to move the negative lens, a voice coil type actuator, or piezoelectric actuator can be used. Further, in Example 12, the negative lens of the beam expander can be moved, however, a lens which can be moved, may be the positive lens, or both of the negative lens and positive lens. Further, the collimator may be made moveable.

In Table 21, the result in which the change of the wavelength of ±10 nm to the reference wavelength of 405 nm due to the production error of the light source, the refractive index change of the plastic lens due to the temperature change of ±30° C. to the reference temperature of 25° C., and the change of the spherical aberration generated in the light converging optical system due to the production error of ±0.02 mm to the reference protective substrate thickness of 0.1 mm of the first optical disk, are corrected when the negative lens of the beam expander is moved in the optical axis direction, is shown.

TABLE 21

| | | wave front aberration before correction | wave front aberration after correction | d5 | d7 |
|---|---|---|---|---|---|
| wavelength error | +10 nm | 0.115$\lambda$ rms | 0.007$\lambda$ rms | 3.183 | 1.817 |
| | −10 nm | 0.119$\lambda$ rms | 0.010$\lambda$ rms | 2.802 | 2.198 |
| temperature change | +30° C. | 0.039$\lambda$ rms | 0.008$\lambda$ rms | 3.057 | 1.943 |
| | −30° C. | 0.036$\lambda$ rms | 0.009$\lambda$ rms | 2.937 | 2.063 |
| error of the transparent substrate thickness | +0.02 mm | 0.193$\lambda$ rms | 0.010$\lambda$ rms | 3.306 | 1.694 |
| | −0.02 mm | 0.193$\lambda$ rms | 0.012$\lambda$ rms | 2.677 | 2.323 |

At the time of temperature change, only the refractive index change of the resin layer formed on the surface of the optical disk side of the plastic lens and collimator is considered, and its changed amount is $-10 \times 10^{-5}/°$ C. In this connection, in the light converging optical system of Example 12, the plastic lens is the negative lens and the positive lens of the beam expander. Further, the wavelength changed amount of the light source at the time of temperature change is +0.05 nm/° C. From Table 21, in either case, the wave front aberration is finely corrected, and even when the information is recorded and reproduced onto the first optical disk for which the high numerical aperture of 0.85 is necessary, the spot of the good light converging condition can be always obtained.

In this connection, in Table 21, d5 and d7 correspond to the variable intervals d5 and d7 in Table 22 which will be described later. The initial values of d5 and d7 are respectively 3.000 mm, and 2.000 mm.

The optical path views in the $\lambda 2=650$ nm, and $\lambda 3=780$ nm of the objective lens of the light converging optical system of Example 12 are shown in FIG. 76 and FIG. 77. Further, in FIG. 78, the spherical aberration view up to the numerical aperture 0.65 for $\lambda 2=650$ nm, is shown. Further, in FIG. 79, the spherical aberration view up to the numerical aperture 0.50 for $\lambda 3=780$ nm, is shown. The objective lens of the light converging optical system of Example 12 has the concentric circular ring-shaped zone diffractive structure on the aspherical surface of the light source side, and by the action of the diffractive structure, the spherical aberration generated due to the difference of the protective substrate thickness of 3 kinds of optical disks is finely corrected in the image side numerical aperture necessary for conducting the recording and reproducing of the information onto respective optical disks. Because the objective lens of the light converging optical system of Example 12 is the same objective lens as the objective lens of Example 9, the detailed description will be omitted.

In Table 22, the lens data of the light converging optical system of Example 12 is shown. In the lens data in Table 22, the reference wavelength (blazed wavelength) of the diffractive surface coefficients of the eighth surface and the ninth surface coincides with $\lambda 1$.

TABLE 22

When the wavelength $\lambda 1 = 405$ nm, the focal distance f1 = 2.65 mm, image side numerical aperture NA1 = 0.85, magnification m1 = 0.

| Surface No. | r (mm) | d (mm) | N$\lambda$1 | N$\lambda$2 | N$\lambda$3 | vd | note |
|---|---|---|---|---|---|---|---|
| 0 | | 4.641 | | | | | light source |
| 1 | ∞ | 0.250 | 1.53020 | 1.51424 | 1.51118 | 64.1 | transparent substrate |
| 2 | ∞ | 2.000 | | | | | |
| 3 | 27.353 | 2.000 | 1.52491 | 1.50690 | 1.50355 | 56.5 | collimator |
| 4 | −4.800 | 0.050 | 1.50686 | 1.48962 | 1.48581 | 57.0 | |
| 5 | −4.561 | d5 (*1) | | | | | |
| 6 | −8.173 | 0.800 | 1.52491 | 1.50690 | 1.50355 | 56.5 | beam expander |
| 7 | 23.535 | d7 (*2) | | | | | |
| 8 | ∞ | 1.000 | 1.52491 | 1.50690 | 1.50355 | 56.5 | |
| 9 | −18.017 | 14.000 | | | | | |
| 10 | 1.799 | 25.000 | 1.76904 | 1.73912 | 1.73324 | 49.3 | objective lens |
| 11 | 45.872 | 0.855 | | | | | |
| 12 | ∞ | 0.100 | 1.61949 | 1.57756 | 1.57062 | 30.0 | transparent substrate |
| 13 | ∞ | | | | | | |

Aspherical surface coefficient

| | 5-th surface | 6-th surface | 7-th surface | 10-th surface | 11-th surface |
|---|---|---|---|---|---|
| κ | −1.0011E+00 | −2.9258E−01 | −1.1221E+01 | −6.1317E−01 | 0.0000E+00 |
| A4 | −3.3788E−04 | 6.4793E−05 | −2.0771E−05 | 5.2524E−03 | 7.1812E−02 |
| A6 | | 8.7198E−06 | 7.7561E−06 | −5.6632E−04 | −3.8260E−02 |
| A8 | | | | 1.1555E−03 | −1.7437E−03 |
| A10 | | | | −3.1854E−04 | 4.7910E−03 |
| A12 | | | | −2.2350E−06 | −5.7767E−04 |
| A14 | | | | 2.6440E−05 | −1.1890E−04 |
| A16 | | | | −4.7779E−06 | |

Diffractive surface coefficient

| | 3rd surface | 9-th surface | 10-th surface |
|---|---|---|---|
| b2 | −9.73990E−03 | −1.09260E−02 | −2.0000E−03 |
| b4 | −9.04658E−05 | 9.27150E−05 | −5.6811E−04 |
| b6 | | | −1.3194E−04 |
| b8 | | | 4.9466E−05 |
| b10 | | | −8.0188E−06 |

(*1) variable
(*2) variable

Further, in the lens data in Table 22, the diffractive surface coefficient of the 8-th surface and the 9-th surface is determined so that the first order diffracted ray has the larger diffracted light amount than any other order diffracted ray, however, it may also be determined so that the diffracted ray which is higher order than the second order has the larger diffracted light amount than any other order diffracted ray.

TABLE 23

When the wavelength $\lambda 2 = 650$ nm,
the focal distance f2 = 2.43 mm, image side numerical aperture NA2 = 0.65, magnification m2 = −0.05,
When the wavelength $\lambda 3 = 780$ nm,
the focal distance f3 = 2.45 mm, image side numerical aperture NA3 = 0.50, magnification m3 = −0.10

| Surface No. | r (mm) | d (mm) | N$\lambda$1 | N$\lambda$2 | N$\lambda$3 | vd | note |
|---|---|---|---|---|---|---|---|
| 0 | | d0 (*1) | | | | | light source |
| 1 | 1.799 | 2.500 | 1.76904 | 1.73912 | 1.73324 | 49.3 | objective lens |
| 2 | 45.872 | d2 (*2) | | | | | |
| 3 | ∞ | d3 (*3) | 1.61949 | 1.57756 | 1.57062 | 30.0 | transparent substrate |
| 4 | ∞ | | | | | | |

| | $\lambda 2 = 650$ nm | $\lambda 3 = 780$ nm |
|---|---|---|
| d0 | 48.589 | 27.964 |
| d2 | 0.600 | 1.200 |
| d3 | 0.720 | 0.450 |

Aspherical surface coefficient

| | 1st surface | 2nd surface |
|---|---|---|
| κ | −6.1317E−01 | 0.0000E+00 |
| A4 | 5.2424E−03 | 7.1812E−02 |
| A6 | −5.6632E−04 | −3.8260E−02 |
| A8 | 1.1555E−03 | −1.7437E−03 |
| A10 | −3.1854E−04 | 4.7910E−03 |
| A12 | −2.2350E−06 | −5.7767E−04 |
| A14 | 2.6449E−05 | −1.1890E−04 |
| A16 | 4.7779E−06 | |

Diffractive surface coefficient

| | 1st surface |
|---|---|
| b2 | −2.0000E−03 |
| b4 | −5.6811E−04 |
| b6 | 1.3194E−04 |
| b8 | 4.9466E−05 |
| b10 | −8.0188E−06 |

(*1) (variable)
(*2) (variable)
(*3) (variable)

In the lens data in Table 22 and Table 23, because the reference wavelength (blazed wavelength) of the diffractive surface coefficient of the surface on the light source side of the objective lens (that is, the tenth surface in Table 22, and the first surface in Table 23) coincides with the wavelength $\lambda 1$, the diffracted light amount of the light of the wavelength $\lambda 1$ is the maximum, however, the wavelength $\lambda 2$ is made the reference wavelength of the diffractive surface coefficient, and it may also be made so that diffracted light amount of the light of the wavelength $\lambda 2$ is the maximum, and the wavelength $\lambda 3$ is made the reference wavelength of the diffractive surface coefficient, and it may also be made so that the diffracted light amount of the light of the wavelength $\lambda 3$ is the maximum. Alternatively, the wavelength in which the diffracted light amount of the light of wavelength $\lambda 1$, the diffracted light amount of the light of wavelength $\lambda 2$, and the diffracted light amount of the light of wavelength $\lambda 13$ are balanced, may be made the reference wavelength of the diffractive surface coefficient. In either case, by a little change of design, the light converging optical system applicable to the optical pick-up apparatus of the present invention, can be structured.

Further, in the lens data in Table 22 and Table 23, the diffractive surface coefficient of the surface of the light source side of the objective lens is determined so that the first order diffracted ray has the larger diffracted light amount than any other order diffracted ray, however, it may also be determined so that the diffracted ray which is higher order than the second order has the larger diffracted light amount than any other order diffracted ray.

Example 13

Example 13 is the light converging optical system applicable to the optical pick-up apparatus in FIG. 48, and the recording and reproducing of the information can be conducted onto 3 kinds of optical disks having different recording density. It is defined that, as the high density next generation first optical disk, the protective substrate thickness t1 is 0.1 mm, the wavelength $\lambda 1$ of the light source is 405 nm, the image side numerical aperture NA1 is 0.85, and as the second optical disk (DVD), the protective substrate thickness t2 is 0.6 mm, the wavelength $\lambda 2$ of the light source is 650 nm, the image side numerical aperture NA2 is 0.65, and as the third optical disk (CD), the protective substrate thickness t3 is 1.2 mm, the wavelength $\lambda 3$ of the light source is 780 nm, and the image side numerical aperture NA3 is 0.50.

The optical path views in the $\lambda 1 = 405$ nm, $\lambda 2 = 650$ nm, and $\lambda 3 = 780$ nm of the objective lens of the light converging optical system of Example 13 are shown in FIG. 80 and FIG. 82. Further, in FIG. 83, the spherical aberration view up to the numerical aperture 0.85 for $\lambda 1 = 405$ nm±10 nm, is shown. Further, in FIG. 84, the spherical aberration view up to the numerical aperture 0.65 for $\lambda 2 = 650$ nm, is shown. Further, in FIG. 85, the spherical aberration view up to the numerical aperture 0.50 for $\lambda 3 = 780$ nm, is shown. Further, in FIG. 86, the spherical aberration view when the light of $\lambda 2 = 650$ nm of the light flux diameter equal to the diaphragm diameter determined by the combination of $\lambda 1 = 405$ nm and NA1 0.85 is incident on it, is shown.

The objective lens of the light converging optical system of Example 13 has the concentric circular ring-shaped zone diffractive structure, and by the action of the diffractive structure, the spherical aberration generated due to the difference of the protective substrate thickness between the first optical disk and the second optical disk is finely corrected in the image side numerical aperture necessary for conducting the recording and reproducing of the information onto respective optical disks.

Further, as can be seen from the spherical aberration view of FIG. 86, when the recording and reproducing of the information are conducted onto the second optical disk, because the light flux passes the region of the outside from the necessary numerical aperture is made flare, the aperture changing means, when the recording and reproducing of the information are conducted onto the second optical disk, is not necessary.

Further, in the light converging optical system of Example 13, the diverging light flux of $\lambda 3 = 780$ nm is made incident on the objective lens, and by correcting the spherical aberration in the region not larger than the image side numerical aperture 0.50, the recording and reproducing of the information are conducted onto the third optical disk.

Further, on the optical surface of the objective lens of the light converging optical system of Example 13, a filter having the wavelength selectivity as the aperture regulating means when the recording and reproducing of the information are conducted onto the third optical disk, is formed. When the recording and reproducing of the information are conducted onto the third optical disk, the light flux more than the necessary numerical aperture is shut off by the ring-shaped zone filter having the wavelength selectivity. Thereby, the desired spot diameter can be obtained on the information recording surface of the optical disk. As the ring-shaped zone filter having the wavelength selectivity, in the objective lens as in FIG. 50, an optical filter in which the reflection factor has the wavelength dependency as shown in FIG. 52, is formed on the optical surface of the objective lens ring-shaped zone like, can be listed.

In this connection, the wave front aberration of the objective lens of the light converging optical system of Example 13 is as follows.

When $\lambda 1 = 405$ nm, NA1 0.85, and $t1 = 0.1$ mm, $0.007 \lambda 1$ rms, when $\lambda 2 = 650$ nm, NA2 0.65, and $t2 = 0.6$ mm, $0.002 \lambda 2$ rms, and when $\lambda 3 = 780$ nm, NA3 0.50, and $t3 = 1.2$ mm, $0.005 \lambda 3$ rms.

The collimator of the light converging optical system of Example 13, in the same as the collimator of the light converging optical system of Example 10, has the wavelength characteristic so that, by the action of the diffractive structure composed of a plurality of concentric circular ring-shaped zones formed on the aspherical surface of the optical disk side, when the wavelength of the light emitted form the first light source is changed from 405 nm toward the long wavelength side, the back focus of the collimator is shortened, and the change of the focal position of the objective lens when the wavelength of the light emitted form the first light source is changed is corrected. In contrast to that the defocus component of the wave front aberration at the time of the mode hopping in the system of only objective lens of Example 13 is $0.163\lambda$rms, the defocus component of the wave front aberration at the time of the mode hopping in the composite system of the collimator and the objective lens of the light converging optical system of Example 13 is $0.001 \lambda$rms, and it can be seen that the change of the best image surface position of the objective lens by the wavelength change is finely corrected.

Further, in the light converging optical system of Example 13, when the recording and reproducing of the information are conducted onto the first optical disk, as the spherical aberration correcting element, for correcting the change of the spherical aberration due to the production error of the protective substrate thickness of the optical disk, and the production error of the optical element constituting the light converging optical system such as the objective lens or collimator, the change of the wavelength due to the production error of the light source, and the shape change or the refractive index change of the optical element constituting the light converging optical system such as the objective lens or collimator due to the temperature change or humidity change, the collimator (corresponds to the collimator 39 in FIG. 48) is made movable in the optical axis direction. As an actuator to move the collimator, a voice coil type actuator or piezoelectric actuator can be used.

In Table 24, the result in which the change of the spherical aberration generated in the light converging optical system due to the change of the wavelength of $\pm 10$ nm to the reference wavelength of 405 nm due to the production error of the light source, the refractive index change of the plastic lens due to the temperature change of $\pm 30°$ C. to the reference temperature of $25°$ C., the production error of $\pm$mm to the reference protective substrate thickness of 0.1 mm of the first optical disk, is corrected by moving the collimator along the optical axis direction, is shown.

TABLE 24

|  |  | wave front aberration before correction | wave front aberration after correction | d0 | d2 |
|---|---|---|---|---|---|
| wavelength error | +10 nm | $0.143\lambda$ rms | $0.010\lambda$ rms | 9.712 | 15.135 |
|  | −10 nm | $0.145\lambda$ rms | $0.013\lambda$ rms | 9.990 | 14.857 |
| temperature change | +30° C. | $0.010\lambda$ rms | $0.008\lambda$ rms | 9.858 | 14.990 |
|  | −30° C. | $0.013\lambda$ rms | $0.008\lambda$ rms | 9.840 | 15.007 |
| error of the transparent substrate thickness | +0.02 mm | $0.204\lambda$ rms | $0.013\lambda$ rms | 9.656 | 15.191 |
|  | −0.02 mm | $0.207\lambda$ rms | $0.016\lambda$ rms | 10.048 | 14.799 |

At the time of temperature change, only the refractive index change of the plastic lens is considered, and its changed amount is $-10 \times 10^{-5}/°$ C. In this connection, in the light converging optical system of Example 13, the plastic lens is the collimator. Further, the wavelength changed amount of the light source at the time of temperature change is $+0.05$ nm/° C. From Table 24, in either case, the wave front aberration is finely corrected, and even when the information is recorded and reproduced onto the first optical disk for which the high numerical aperture of 0.85 is necessary, the spot of the good light converging condition can be always obtained.

In this connection, in Table 24, d0 and d2 correspond to the variable intervals d0 and d2 in Table 25 which will be respectively described later. The initial values of do and are respectively 9.847 mm, and 15.000 mm.

In Table 25, the lens data of the objective lens of Example 13 is shown. In the lens data in Table 25, the reference wavelength (blazed wavelength) of the diffractive surface coefficient of the second surface coincides with the wavelength $\lambda 1$.

TABLE 25

When the wavelength $\lambda 1 = 405$ nm, the focal distance $f1 = 2.35$ mm, image side numerical aperture NA1 = 0.85, magnification m1 = 0.

| Surface No. | r (mm) | d (mm) | N$\lambda$1 | N$\lambda$2 | N$\lambda$3 | vd | note |
|---|---|---|---|---|---|---|---|
| 0 |  | d0 (*1) |  |  |  |  | light source |
| 1 | −29.607 | 1.500 | 1.52491 | 1.50690 | 1.50355 | 56.5 | collimator |
| 2 | −9.413 | d2 (*2) |  |  |  |  |  |
| 3 | 1.820 | 2.850 | 1.76904 | 1.73912 | 1.73324 | 49.3 | objective lens |
| 4 | −102.819 | 0.689 |  |  |  |  |  |
| 5 | ∞ | 0.100 | 1.61949 | 1.57756 | 1.57062 | 30.0 | Transparent |
| 6 | ∞ |  |  |  |  |  | substrate |

TABLE 25-continued

| Aspherical surface coefficient | | | |
|---|---|---|---|
| | 2nd surface | 3rd surface | 4-th surface |
| κ | 3.8825E−01 | −6.3649E−01 | 0.0000E+00 |
| A4 | −9.4855E−06 | 4.6682E−03 | 1.0443E−01 |
| A6 | | −1.1935E−05 | −5.3585E−02 |
| A8 | | 7.5113E−04 | −2.3630E−02 |
| A10 | | −2.6398E−04 | 1.5026E−02 |
| A12 | | 2.8458E−05 | 7.8677E−03 |
| A14 | | 1.2402E−05 | −4.5941E−03 |
| A16 | | −2.7120E−06 | 1.0400E−05 |

| Diffractive surface coefficient | | |
|---|---|---|
| | 2nd surface | 3rd surface |
| b2 | −2.5497E−02 | 0.0000E+00 |
| b4 | | −6.4108E−04 |
| b6 | | 5.8925E−05 |
| b8 | | −7.3391E−05 |
| b10 | | 1.3055E−05 |

(*1) variable
(*2) variable

Further, in the lens data in Table 25, the diffractive surface coefficient of the second surface is determined so that the first order diffracted ray has the larger diffracted light amount than any other order diffracted ray, however, it may also be determined so that the diffracted ray which is higher order than the second order has the larger diffracted light amount than any other order diffracted ray.

In Table 26, the lens data to $\lambda 2 = 650$ nm and $\lambda 3 = 780$ nm of the light converging optical system of Example 13 is shown.

TABLE 26

When the wavelength $\lambda 2 = 650$ nm,
the focal distance f2 = 2.45 mm, image side numerical
aperture NA2 = 0.65, magnification m2 = −0.05,
When the wavelength $\lambda 3 = 780$ nm,
the focal distance f3 = 2.47 mm, image side numerical
aperture NA3 = 0.50, magnification m3 = −0.09

| Surface No. | r (mm) | d (mm) | Nλ1 | Nλ2 | Nλ3 | νd | note |
|---|---|---|---|---|---|---|---|
| 0 | | d0 (*1) | | | | | light source |
| 1 | 1.820 | 2.850 | 1.76904 | 1.73912 | 1.73324 | 49.3 | objective lens |
| 2 | −102.819 | d2 (*2) | | | | | |
| 3 | ∞ | d3 (*3) | 1.61949 | 1.57756 | 1.57062 | 30.0 | Transparent substrate |
| 4 | ∞ | | | | | | |

| | $\lambda 2 = 650$ nm | $\lambda 3 = 780$ nm |
|---|---|---|
| d0 | 54.500 | 29.900 |
| d2 | 0.600 | 1.200 |
| d3 | 0.552 | 0.288 |

| Aspherical surface coefficient | | |
|---|---|---|
| | 1st surface | 2nd surface |
| κ | −6.3649E−01 | 0.0000E+00 |
| A4 | 4.6682E−03 | 1.0443E−01 |
| A6 | −1.1935E−05 | −5.3585E−02 |
| A8 | 7.5113E−04 | −2.3630E−02 |
| A10 | −2.6398E−04 | 1.5026E−02 |
| A12 | 2.8658E−05 | 7.8677E−03 |
| A14 | 1.2402E−05 | −4.5941E−03 |
| A16 | −2.7120E−06 | 1.0400E−05 |

TABLE 26-continued

| | Diffractive surface coefficient |
| --- | --- |
| | 1st surface |
| b2 | 0.0000E+00 |
| b4 | −6.4108E−04 |
| b6 | 5.8925E−05 |
| b8 | −7.3391E−05 |
| b10 | 1.3055E−05 |

(*1) (variable)
(*2) (variable)
(*3) (variable)

In the lens data in Table 25 and Table 26, because the reference wavelength (blazed wavelength) of the diffractive surface coefficient of the surface on the light source side of the objective lens (that is, the third surface in Table 25, and the first surface in Table 26) coincides with the wavelength $\lambda 1$, the diffracted light amount of the light of the wavelength $\lambda 1$ is the maximum, however, the wavelength $\lambda 2$ is made the reference wavelength of the diffractive surface coefficient, and it may also be made so that diffracted light amount of the light of the wavelength $\lambda 2$ is the maximum, and the wavelength $\lambda 3$ is made the reference wavelength of the diffractive surface coefficient, and it may also be made so that the diffracted light amount of the light of the wavelength $\lambda 3$ is the maximum. Alternatively, the wavelength in which the diffracted light amount of the light of wavelength $\lambda 1$, the diffracted light amount of the light of wavelength $\lambda 2$, and the diffracted light amount of the light of wavelength $\lambda 3$ are balanced, may also be made the reference wavelength of the diffractive surface coefficient. In either case, by a little change of design, the light converging optical system applicable to the optical pick-up apparatus of the present invention, can be structured.

Further, in the lens data in Table 25 and Table 26, the diffractive surface coefficient of the surface of the light source side of the objective lens is determined so that the first order diffracted ray has the larger diffracted light amount than any other order diffracted ray, however, it may also be determined so that the diffracted ray which is higher order than the second order has the larger diffracted light amount than any other order diffracted ray.

Example 14

Example 14 is the light converging optical system applicable to the optical pick-up apparatus in FIG. 49, and the recording and reproducing of the information can be conducted onto 3 kinds of optical disks having different recording density. It is defined that, as the high density next generation first optical disk, the protective substrate thickness t1 is 0.1 mm, the wavelength $\lambda 1$ of the light source is 405 nm, the image side numerical aperture NA1 is 0.85, and as the second optical disk (DVD), the protective substrate thickness t2 is 0.6 mm, the wavelength $\lambda 2$ of the light source is 650 nm, the image side numerical aperture NA2 is 0.65, and as the third optical disk (CD), the protective substrate thickness t3 is 1.2 mm, the wavelength $\lambda 3$ of the light source is 780 nm, and the image side numerical aperture NA3 is 0.50.

The optical path view in the $\lambda 1$=405 nm of the light converging optical system of Example 14 is shown in FIG. 87. Further, in FIG. 88, the spherical aberration view up to the numerical aperture 0.85 for $\lambda 1$=405 nm±10 nm of the objective lens of the light converging optical system of example 14, is shown.

The collimator of Example 14, in the same manner as the collimator in the light converging optical system of Example 10, has the wavelength characteristic so that, by the action of the diffractive structure composed of a plurality of concentric circular ring-shaped zones formed on the aspherical surface of the optical disk side, when the wavelength of the light emitted form the first light source is changed from 405 nm toward the long wavelength side, the back focus of the collimator is shortened, therefore, the change of the focal position of the objective lens when the wavelength of the light emitted form the first light source is changed is corrected.

In contrast to that the defocus component of the wave front aberration at the time of the mode hopping in the system of only objective lens of Example 14 is 0.201$\lambda$rms, the defocus component of the wave front aberration at the time of the mode hopping in the composite system of the collimator and the objective lens of the light converging optical system of Example 14 is 0.003 $\lambda$rms, and it can be seen that the change of the best image surface position of the objective lens by the wavelength change is finely corrected.

Further, in the light converging optical system of Example 14, when the recording and reproducing of the information are conducted onto the first optical disk, as the spherical aberration correcting element, for correcting the change of the spherical aberration due to the production error of the protective substrate thickness of the optical disk, and the production error of the optical element constituting the light converging optical system such as the objective lens or collimator, the change of the wavelength due to the production error of the light source, and the shape change or the refractive index change of the optical element constituting the light converging optical system such as the objective lens or collimator due to the temperature change or humidity change, the collimator is made movable in the optical axis direction. As an actuator to move the collimator, a voice coil type actuator or piezoelectric actuator can be used.

In Table 27, the result in which the change of the spherical aberration generated in the light converging optical system due to the change of the wavelength of ±10 nm to the reference wavelength of 405 nm due to the production error of the light source, the refractive index change of the plastic lens due to the temperature change of ±30° C. to the reference temperature of 25° C., the production error of ±0.02 mm to the reference protective substrate thickness of 0.1 mm of the first optical disk, is corrected by moving the collimator along the optical axis direction, is shown.

TABLE 27

|  |  | wave front aberration before correction | wave front aberration after correction | d0 | d2 |
|---|---|---|---|---|---|
| wavelength error | +10 nm | 0.294λ rms | 0.013λ rms | 15.591 | 13.594 |
|  | −10 nm | 0.300λ rms | 0.017λ rms | 16.843 | 12.342 |
| temperature change | +30° C. | 0.300λ rms | 0.043λ rms | 15.556 | 13.629 |
|  | −30° C. | 0.322λ rms | 0.033λ rms | 16.863 | 12.322 |
| error of the transparent substrate thickness | +0.02 mm | 0.195λ rms | 0.011λ rms | 15.796 | 13.389 |
|  | −0.02 mm | 0.197λ rms | 0.013λ rms | 16.591 | 12.594 |

At the time of temperature change, only the refractive index change of the plastic lens is considered, and its changed amount is $-10 \times 10^{-5}/°$ C. In this connection, in the light converging optical system of Example 14, the plastic lens is the collimator and the objective lens. Further, the wavelength changed amount of the light source at the time of temperature change is +0.05 nm/° C. From Table 27, it can be seen that, in either case, the wave front aberration is finely corrected, and even when the information is recorded and reproduced onto the first optical disk for which the high numerical aperture of 0.85 is necessary, the spot of the good light converging condition can be always obtained.

In this connection, in Table 27, d0 and d2 correspond to the variable intervals d0 and d2 in Table 28 which will be respectively described later. The initial values of d0 and d2 are respectively 16.185 mm, and 13.000 mm.

The optical path views in the λ2=650 nm of the light converging optical system of Example 14 is shown in FIG. 89. Further, in FIG. 90, optical path views in the λ3=780 nm of the light converging optical system of Example 14 is shown. Further, in FIG. 91, the spherical aberration view up to the numerical aperture 0.65 for λ2=650 nm is shown. Further, in FIG. 92, the spherical aberration view up to the numerical aperture 0.50 for λ3=780 nm is shown.

The objective lens of the light converging optical system of Example 14 is the objective lens exclusive use for the first optical disk, and the refractive lens which is aberration-corrected so that it becomes no-aberration by the combination of λ1=405 nm, NA1 0.85, t1=0.1 mm, and magnification m1=0. Accordingly, when the recording and reproducing of the information is conducted onto the second optical disk and the third optical disk whose protective substrate thickness is lager than that of the first optical disk, by the objective lens of the light converging optical system of Example 14, the spherical aberration changes toward the over-correction direction. Therefore, the concentric circular ring-shaped zone diffractive structure is formed on the aspherical surface of the optical disk side of the coupling lens, and it is made so that, by the action of the diffractive structure, when the spherical aberration changed toward the over-correction direction is finely corrected in the image side numerical aperture necessary for conducting the recording and reproducing of the information onto the second optical disk and the third optical disk, the recording and reproducing of the information can be conducted onto the second optical disk and the third optical disk by using the objective lens exclusive use for the first optical disk.

Further, on the optical surface of the objective lens, a filter having the wavelength selectivity which is the aperture regulating means, is formed. When the recording and reproducing of the information are conducted onto the second and the third optical disks, the light flux more than the necessary numerical aperture is shut off by the ring-shaped zone filter having the wavelength selectivity. Thereby, a desired spot diameter can be obtained on the information recording surface of the optical disk. As the ring-shaped zone filter having the wavelength selectivity, the same ring-shaped zone filter as in Example 11 can be used.

In Table 28, the lens data of the objective lens of Example 14 is shown. In the lens data in Table 28, the reference wavelength (blazed wavelength) of the diffractive surface coefficient of the second surface coincides with the wavelength λ1.

TABLE 28

When the wavelength λ1 = 405 nm,
the focal distance f1 = 2.65 mm, image side numerical
aperture NA1 = 0.85, magnification m1 = 0.

| Surface No. | r (mm) | d (mm) | Nλ1 | Nλ2 | Nλ3 | νd | note |
|---|---|---|---|---|---|---|---|
| 0 |  | d0 (*1) |  |  |  |  | light source |
| 1 | −23.167 | 2.000 | 1.52491 | 1.50690 | 1.50355 | 56.5 | collimator |
| 2 | −19.157 | d2 (*2) |  |  |  |  |  |
| 3 | 1.684 | 3.100 | 1.52491 | 1.50690 | 1.50355 | 56.5 | objective lens |
| 4 | −2.856 | 0.918 |  |  |  |  |  |
| 5 | ∞ | 0.100 | 1.61949 | 1.57756 | 1.57062 | 30.0 | transparent substrate |
| 6 | ∞ |  |  |  |  |  |  |

| Aspherical surface coefficient | | | |
|---|---|---|---|
|  | 2nd surface | 3rd surface | 4-th surface |
| κ | 2.2006E+01 | −6.6664E−01 | −2.4860E+01 |
| A4 | 3.3389E−04 | 4.3203E−03 | 6.5486E−02 |
| A6 | 2.0267E−05 | 7.2364E−04 | −3.4626E−02 |
| A8 |  | 1.0865E−04 | 9.6814E−03 |
| A10 |  | 1.1601E−05 | −1.4277E−03 |
| A12 |  | 9.6720E−07 | 7.9143E−05 |
| A14 |  | 3.2018E−07 | 2.9499E−06 |
| A16 |  | 1.7930E−07 | −3.1761E−07 |
| A18 |  | −2.1404E−08 |  |
| A20 |  | −3.4886E−09 |  |

| Diffractive surface coefficient | |
|---|---|
| 2nd surface | |
| b2 | −2.4285E−02 |

(*1) variable
(*2) variable

Further, in the lens data in Table 28, the diffractive surface coefficient of the second surface is determined so that the first order diffracted ray has the larger diffracted light amount than any other order diffracted ray, however, it may also be determined so that the diffracted ray which is higher order than the second order has the larger diffracted light amount than any other order diffracted ray.

In Table 29, the lens data to λ2=650 nm and λ3=780 nm of the light converging optical system of Example 14 is shown.

TABLE 29

When the wavelength $\lambda_2 = 650$ nm,
the focal distance f2 = 2.72 mm, image side numerical
aperture NA2 = 0.65, magnification m2 = 0,
When the wavelength $\lambda_3 = 780$ nm,
the focal distance f3 = 2.74 mm, image side numerical
aperture NA3 = 0.50, magnification m3 = 0.

| Surface No. | r (mm) | d (mm) | N$\lambda$1 | N$\lambda$2 | N$\lambda$3 | vd | note |
|---|---|---|---|---|---|---|---|
| 0 |  | d0 (*1) |  |  |  |  | light source |
| 1 | ∞ | 2.000 | 1.52491 | 1.50690 | 1.50355 | 56.5 | coupling lens |
| 2 | −6.392 | 13.000 |  |  |  |  |  |
| 3 | 1.694 | 3.100 | 1.52491 | 1.50690 | 1.50355 | 56.5 | objective lens |
| 4 | −2.856 | d4 (*2) |  |  |  |  |  |
| 5 | ∞ | d5 (*3) | 1.61949 | 1.57756 | 1.57062 | 30.0 | transparent substrate |
| 6 | ∞ |  |  |  |  |  |  |

|  | $\lambda_2 = 650$ nm | $\lambda_3 = 780$ nm |
|---|---|---|
| d0 | 9.666 | 9.427 |
| d2 | 0.600 | 1.200 |
| d3 | 0.744 | 0.388 |

Aspherical surface coefficient

|  | 2nd surface | 3rd surface | 4-th surface |
|---|---|---|---|
| κ | −1.9871E+01 | −6.6664E−01 | −2.4860E+01 |
| A4 |  | 4.3203E−03 | 6.5486E−02 |
| A6 |  | 7.2364E−04 | −3.4626E−02 |
| A8 |  | 1.0865E−04 | 9.6814E−03 |
| A10 |  | 1.1601E−05 | −1.4277E−03 |
| A12 |  | 9.6720E−07 | 7.9143E−05 |
| A14 |  | 3.2018E−07 | 2.9499E−06 |
| A16 |  | 1.7930E−07 | −3.1761E−07 |
| A18 |  | −2.1404E−08 |  |
| A20 |  | −3.4886E−09 |  |

Diffractive surface coefficient

|  | 2nd surface |
|---|---|
| b2 | 0.0000E+00 |
| b4 | −5.9163E−03 |
| b6 | 8.9910E−04 |
| b8 | −1.3278E−04 |
| b10 | 9.6884E−06 |

(*1) (variable)
(*2) (variable)
(*3) (variable)

In the lens data in Table 29, because the reference wavelength (blazed wavelength) of the diffractive surface coefficient of the second surface is determined as 730 nm which is an intermediate wavelength between the wavelength $\lambda_2$ and the wavelength $\lambda_3$, so that the diffracted light amount of the light of the wavelength $\lambda_2$ and the diffracted light amount of the light of the wavelength $\lambda_3$ are balanced, however, the wavelength $\lambda_2$ is made the reference wavelength of the diffractive surface coefficient, and it may also be made so that diffracted light amount of the light of the wavelength $\lambda_2$ is the maximum, and the wavelength $\lambda_3$ is made the reference wavelength of the diffractive surface coefficient, and it may also be made so that the diffracted light amount of the light of the wavelength $\lambda_3$ is the maximum. In either case, by a little change of design, the light converging optical system applicable to the optical pick-up apparatus of the present invention, can be structured.

Further, in the lens data in Table 29, the diffractive surface coefficient of the second surface is determined so that the first order diffracted ray has the larger diffracted light amount than any other order diffracted ray, however, it may also be determined so that the diffracted ray which is higher order than the second order has the larger diffracted light amount than any other order diffracted ray.

Further, in the light converging optical system of the present Example, on the aspherical surface of the surface (the second surface in Table 29) on the optical disk side of the coupling lens, as shown in Table 30, the ring-shaped zone-like diffractive structure is formed. In Table 30, "the start point height" expresses the distance from the optical axis of the start point of the ring-shaped zone, and "the last point height" expresses the distance from the optical axis of the last point of the ring-shaped zone, and the number of ring-shaped zones in the effective diameter is 36.

TABLE 30

| Ring-shaped zone No. | Start point height (mm) | Last point height (mm) |
|---|---|---|
| 1 | 0.000 | 0.610 |
| 2 | 0.601 | 0.718 |
| 3 | 0.718 | 0.798 |
| 4 | 0.798 | 0.861 |
| 5 | 0.861 | 0.913 |
| 6 | 0.913 | 0.958 |
| 7 | 0.958 | 0.998 |
| 8 | 0.998 | 1.035 |
| 9 | 1.035 | 1.068 |
| 10 | 1.068 | 1.099 |
| 11 | 1.099 | 1.128 |
| 12 | 1.128 | 1.155 |
| 13 | 1.155 | 1.180 |
| 14 | 1.180 | 1.204 |
| 15 | 1.204 | 1.227 |
| 16 | 1.227 | 1.249 |
| 17 | 1.249 | 1.270 |
| 18 | 1.270 | 1.290 |
| 19 | 1.290 | 1.310 |
| 20 | 1.310 | 1.328 |
| 21 | 1.328 | 1.346 |
| 22 | 1.346 | 1.364 |
| 23 | 1.364 | 1.381 |
| 24 | 1.381 | 1.397 |
| 25 | 1.397 | 1.413 |
| 26 | 1.413 | 1.429 |
| 27 | 1.429 | 1.444 |
| 28 | 1.444 | 1.459 |
| 29 | 1.459 | 1.473 |
| 30 | 1.473 | 1.488 |
| 31 | 1.488 | 1.501 |
| 32 | 1.501 | 1.515 |
| 33 | 1.515 | 1.528 |
| 34 | 1.528 | 1.541 |
| 35 | 1.541 | 1.554 |
| 36 | 1.554 | 1.566 |

The diffractive ring-shaped zone structure in Table 30 is optimized so that the diffraction efficiency is theoretically 100% at the wavelength ($\lambda$B) 730 nm and diffraction order 1. When the light of the wavelength 650 nm which is the using wavelength of the second optical disk (DVD), is incident on the diffractive structure, and when the light of the wavelength 780 nm which is the using wavelength of the third optical disk (CD), is incident on the diffractive structure, the first order diffracted ray is generated so as to have the maximum diffracted light amount.

When the diffractive structure is optimized at the wavelength 730 nm and the diffraction order 1, in the using wavelength regions of the respective optical disks, the following diffraction efficiencies can be obtained.

DVD (wavelength 650 nm): 95.1%,

CD (wavelength 780 nm): 96.7%.

In this connection, in the present specification, "the surface (diffractive surface) on which the diffractive structure is formed" means the surface of the optical element, for example, the surface in which a relief is provided on the surface of the lens, and on which the action to diffract the incident light flux is provided, and when, on the same optical surface, there is a region in which the diffraction is generated, and a region in which the diffraction is not generated, it means the region in which the diffraction is generated. And the diffractive structure and the diffractive pattern mean the region in which the diffraction is generated. As the shape of the relief, for example, on the surface of the optical element, it is formed as the almost concentric circular ring-shaped zone around the optical axis, and it is well known that, when its cross section is viewed from the plane including the optical axis, each ring-shaped zone has the saw-toothed (in this case, the relief is called "a blaze") or step-like shape, and it includes such a shape.

Generally, from the diffractive surface, an infinity number of order of diffracted rays such as the 0 order diffracted ray, ±first order diffracted ray, ±second order diffracted ray, ..., are generated, however, as described above, the shape of this blaze can be set so that, in the case of diffractive surface having the blaze in which the tangential sectional surface is saw-toothed, the diffraction efficiency of the specific order is made higher than the diffraction efficiency of other order, or depending on the cases, the diffraction efficiency of the specific one order (for example, +1 order diffracted ray) is made almost 100%. In the present invention, "the diffractive structure is optimized at the wavelength $\lambda B$ and diffraction order n" means that, when the light of the wavelength $\lambda B$ is incident on it, the shape of the diffractive structure (blaze) is set so that the diffraction efficiency of the diffracted ray of the diffraction order n is theoretically 100%. In another description way, it can be described as follows. "the diffractive structure is optimized at the wavelength $\lambda B$ and diffraction order n" means that, actually, in the saw-toothed diffractive structure (blaze) formed on the optical element (lens), when the step difference amount in the optical axis direction of the blaze is $\Delta d$ ($\mu m$), and the refractive index of the blaze in the shortest wavelength in the wavelength of the light incident on the blaze (that is, in the present specification, the wavelength of the light of $\lambda 1$ generated in the first light source) is $N\lambda min$, the following relationship is realized among $\Delta d$, $N\lambda min$, optimizing wavelength $\lambda B$ (nm), and diffraction order n.

$\lambda B$ (nm)=$\Delta d \times (N\lambda min - 1)/n \times 10^{-3}$. In the above equation, n is calculated by the following expression.

$n = INT(Y)$ $Y = \Delta d \times (N\lambda min - 1)/(\lambda min \times 10^{-3})$ Where, INT (Y) is an integer obtained by rounding to the nearest whole number. Herein, when the actual blaze has the shape error due to the production error, as shown in FIG. 98, the step difference amount in the optical axis direction when the ideal shape of the blaze is approximately obtained is $\Delta d$.

Further, in the present specification, "the objective lens" means the optical element which, in the optical elements included in the optical system for conducting the recording of the information onto the information recording surface of the optical information recording medium (optical disk) and/or reproducing the information on the information recording surface, is arranged in the position opposite to the optical information recording medium, and converges the light flux from the light source onto the information recording surface of the optical information recording medium (optical disk).

Then, "the objective lens constructed by one lens group" means the optical element for converging the light flux from the light source onto the information recording surface of the optical information recording medium (optical disk), which is arranged in the position opposite to the optical information recording medium, and constructed by one group (also the case where it is constructed by one optical element, and where a plurality of optical elements are combined, are included).

Further, in the present specification, the "optical element" and the "lens" are the same meaning.

Further, when the objective is constructed by a plurality of optical elements (or lens group), a set in which the optical element arranged in the position opposite to the optical information recording medium and a plurality of optical elements integrated with that by a mirror frame or flange, is called the objective lens by the definition in the present specification.

Further, in the present specification, the "common objective lens is used" which is constructed by one lens group, for the reproducing and/or recording of the information onto 3 kinds of optical information recording medium whose transparent substrate thickness is different, means that, when the reproducing and/or recording of the information onto respective optical information recording medium, the optical element which is arranged in the position opposite to the optical information recording medium, and which converges the light flux from the light source onto the information recording surface of the optical information recording medium, is the same optical element, and this same optical element is defined as the "common objective lens".

Then, the optical element which is inserted in the optical path between the light source and the optical information recording medium, or in which the function as the optical element is actuated, only when the reproducing and/or recording of the information is conducted onto the optical information recording medium having a specific transparent substrate thickness, is defined that it is not included in the common objective lens.

Further, in the present specification, the "protective substrate", "transparent substrate" and "protective layer" means the optically transparent parallel plane formed on the plane of the light flux incidence side of the information recording surface for protecting the information recording surface of the optical information recording medium, and the light flux emitted from the light source is converged onto the information recording surface of the optical information recording medium through the above parallel plane. Then, in the present specification, the "protective substrate thickness" means the thickness of the above parallel plane, and in the optical information recording medium of the DVD standard, the protective substrate thickness is 0.6 mm, and in the optical information recording medium of the CD standard, the protective substrate thickness is 1.2 mm, however, in the present specification, in the high density DVD (the first optical information recording medium, or the first optical disk), other than the optical information recording medium having the protective substrate thickness 0.1 mm described as one example in the specification, the optical information recording medium whose protective substrate thickness is zero, that is, which has no parallel plane, and the optical information recording medium whose protective substrate thickness is 0.6 mm, are also included.

Further, in the present specification, when the optical information recording medium is so-called multi-layer disk having the plurality of information recording layers on the same the light flux incidence side, in the "protective substrate", other than the parallel plane formed on the light flux incidence side of the information recording layer nearest to the light source, an intermediate layer formed among the above plurality of information recording layers is also included.

Further, in the present specification, the "substrate thickness difference correcting device (means)" means an optical element by which the spherical aberration component can be corrected in such a manner that, when the optical information recording medium onto which the recording and/or reproducing of the information is conducted, is changed to the optical information recording medium having the different transparent substrate thickness, (for example, the change from CD to DVD, or from the high density DVD to CD), due to the difference of the protective substrate thickness of the optical information recording medium having the different standard, the spherical aberration component in which that of the wave front aberration of the spot on the information recording surface is changed and is higher than 0.07 $\lambda$rms (where, $\lambda$ is the wavelength), is corrected so that the information can be recorded and/or reproduced, and in the predetermined image side numerical aperture of the objective lens necessary for conducting the recording and/or reproducing of the information onto the optical information recording medium, so that it becomes below 0.07 $\lambda$rms, and more preferably, below 0.05 $\lambda$rms.

Further, in the present specification, the "substrate thickness error correcting device (means)" means an optical element by which the spherical aberration component can be corrected in such a manner that, in the optical information recording medium of a specific standard, due to the non-uniformity of the protective substrate thickness in the optical information recording medium and/or due to the individual difference of protective substrate thickness between the plurality of optical information recording medium, the spherical aberration is generated, and the spherical aberration component in which the wave front aberration of the spot on the information recording surface is larger than 0.07 $\lambda$rms (where, $\lambda$ is the wavelength), is corrected so that the information can be recorded and/or reproduced, and in the predetermined image side numerical aperture of the objective lens necessary for conducting the recording and/or reproducing of the information onto the optical information recording medium, so that the wave front aberration becomes below 0.07 $\lambda$rms, and more preferably, below 0.05 $\lambda$rms.

Further, in the present specification, the "chromatic aberration correcting device (means)" means an optical element by which, in the light source used for conducting the recording and/or reproducing of the information onto the optical information recording medium of a specific standard, when the mono-chromaticity of the wavelength of the emitted light is poor, due to the production error, the environmental change such as temperature change or humidity change, or the change of the output, the chromatic aberration generated in the objective lens can be corrected, and specifically, in the case where the optical element is not arranged in the optical path between the light source and the objective lens, when the pint movement amount of the objective lens respective to the +1 nm wavelength change of the light source is A, and in the case where the optical element is arranged in the optical path between the light source and the objective lens, when the pint movement amount of the objective lens respective to the +1 nm wavelength change of the light source is B, it means the optical element which can satisfy |A|>|B|.

Further, in the present specification, "an appropriate (a good) wave front is formed" on the information recording surface of the optical information recording medium means that, when the wavelength is $\lambda$, the wave front aberration is converged in the condition of not higher than 0.07$\lambda$, and more preferably, not higher than 0.05$\lambda$.

Further, the "flare" in the present specification is defined as follows. When the recording and/or reproducing of the information is conducted onto the i information recording medium (i=1, 2 or 3), the wavelength is $\lambda$i, and the image side numerical aperture of the objective lens is NAi. In the case where the recording and/or reproducing of the information is conducted onto the j information recording medium (j=2 or 3), when either one of the following 2 conditions (more preferably, both of them) is satisfied, the light flux which passes the outside region of NAj and reaches the information recording surface of the j optical information recording medium, is defined as the "flare".

The first condition is a case where the maximum value of the spherical aberration on the information recording surface of the light flux passing the outside region from NAj in the light flux of the wavelength $\lambda$j which passes all of the diaphragms determined by NA1 and $\lambda$1, is not smaller than 10 μm, and the spherical aberration within NAj is not larger than 5 μm.

The second condition is a case where the wave front aberration on the information recording surface of the light flux of the wavelength $\lambda$j which passes all of the diaphragms determined by NA1 and $\lambda$1, is not smaller than 0.07 $\lambda$j, and within NAj, the wave front aberration on the information recording surface is not larger than 0.07 $\lambda$j.

In the above first condition and/or the second condition, the spherical aberration may be continuous at NAj, or discontinuous at NAj.

Further, in the present specification, the "recording and reproducing of the information" means to record the information on the information recording surface of the optical information recording medium, and to reproduce the information recorded on the information recording surface. The objective lens and the optical pickup apparatus of the present invention may be used for only the recording or reproducing, or may also be used for conducting both of the recording and reproducing. Alternatively, it may also be the system used for recording onto a certain optical information recording medium, and for reproducing onto another optical information recording medium, or used when the recording or reproducing is conducted onto a certain optical information recording medium, and onto another optical information recording medium, the recording and reproducing are conducted. In this connection, the reproduction used herein includes to read the information merely.

Further, in the present specification, when all of the first protective substrate thickness to the third protective substrate thickness are the same value, that is, when all of the first optical information recording medium to the third optical information recording medium have the protective substrate of the same thickness, it does not have the problem of the present invention, and it is defined that it does not belong to the technical range of the present invention.

Effect of the Invention

According to the optical pick-up apparatus of the present invention, the optical pick-up apparatus by which the mutual compatibility of 3 kinds of optical disks such as, for example, the high density DVD, DVD and CD whose standards (recording density) are different form each other, can be attained by using the common objective lens, can be provided. Further, the optical pick-up apparatus by which the working distance for the optical disk whose protective substrate is thick such as CD, can be secured enough, can be provided.

Further, the optical pick-up apparatus by which the mutual compatibility of 3 kinds of optical disks such as, for example, the high density DVD, DVD and CD whose standards (recording density) are different form each other, is attained by using the objective lens common to the diffractive optical element, and the efficiency of use of the enough light amount in the using wavelength regions of respective optical disks is obtained, can be provided.

Further, the optical pick-up apparatus by which the mutual compatibility of 3 kinds of optical disks such as, for example, the high density DVD, DVD and CD whose standards (recording density) are different form each other, is attained by using the common objective lens, and the chromatic aberration due to the badness of the mono-chromaticity of the light source which is a problem when the high recording density optical disk such as the high density DVD is recorded and/or reproduced, the spherical aberration generated in the plastic lens due to the environmental change such as the temperature change or humidity change, and the spherical aberration due to the production error of the protective substrate thickness, can be finely corrected, and the optical disk with the high recording density such as the high density DVD can be stably recorded and/or reproduced, can be provided.

Further, the objective lens, substrate thickness difference correcting means, chromatic aberration correcting means, substrate thickness error correcting means, aperture regulating/changing means, diffractive optical element, and optical element, which can be used for the above optical pick-up apparatus, can be provided.

Further, the recording•reproducing apparatus by which the recording and/or reproducing can be conducted onto 3 kinds of optical information recording media whose standards (recording density) are different by using the above optical pick-up apparatus, can be provided.

What is claimed is:

1. An optical pickup apparatus, comprising:
   a first light source to emit a first light flux having a wavelength $\lambda 1$ to conduct reproducing and/or recording information for a first optical information recording medium having a first protective substrate with a first thickness t1,
   a second light source to emit a second light flux having a wavelength $\lambda 2$ to ($\lambda 1 < \lambda 2$) conduct reproducing and/or recording information for a second optical information recording medium having a second protective substrate with a second thickness t2 (t1 $\leq$ t2),
   a third light source to emit a third light flux having a wavelength $\lambda 3$ ($\lambda 2 < \lambda 3$) to conduct reproducing and/or recording information for a third optical information recording medium having a third protective substrate with a third thickness t3 (t2 $\leq$ t3), and
   an objective lens for converging the first light flux onto an information recording plane of the first optical information recording medium, the second light flux onto an information recording plane of the second optical information recording medium, and the third light flux onto an information recording plane of the third optical information recording medium,
   wherein the objective lens is a single lens,
   wherein the second light source and the third light source are united as a unit, and
   wherein the following formulas are satisfied:

$m1=0,$ $m2<0,$ $m3<0,$ where m1 represents a magnification of the objective lens for the first light flux when the reproducing and/or recording of the information is conducted onto the first optical information recording medium,
   m2 represents a magnification of the objective lens for the second light flux when the reproducing and/or recording of the information is conducted onto the second optical information recording medium, and
   m3 represents a magnification of the objective lens for the third light flux when the reproducing and/or recording of the information is conducted onto the third optical information recording medium.

2. The optical pickup apparatus of claim 1, wherein the second light source and the third light source are housed in a same case.

3. The optical pickup apparatus of claim 1, wherein the objective lens is a plastic lens.

4. The optical pickup apparatus of claim 1, wherein the objective lens is a glass lens.

5. The optical pickup apparatus of claim 1, wherein the following formula is satisfied:

$-0.20 < m2 < -0.02.$

6. The optical pickup apparatus of claim 1, wherein the following formula is satisfied:

$-0.25 < m3 < -0.05.$

7. The optical pickup apparatus of claim 1, wherein the following formulas are satisfied:

$380 \text{ nm} < \lambda 1 < 420 \text{ nm},$ $630 \text{ nm} < \lambda 2 < 670 \text{ nm},$ $780 \text{ nm} < \lambda 3 < 800 \text{ nm}.$ 8. The optical pickup apparatus of claim 1, wherein an optical surface of the objective lens is divided into three ring-shaped light flux regions of a first light flux region, a second light flux region and a third light flux region arranged in this order from an inner side near to an optical axis to an outer side,
   wherein the first, second and third light fluxes incident into the first optical region are converged so as to form an appropriate wavefront on each information recording plane of the first, second and third optical information recording media, the first and second light fluxes incident into the second optical region are converged so as to form an appropriate wavefront on each information recording plane of the first and second optical information recording media and the third light flux incident into the second optical region does not form an appropriate wavefront on an information recording plane of the third optical information recording medium, and the first light flux incident into the third optical region is converged so as to form an appropriate wavefront on an information recording plane of the first optical information recording medium and the second and third light fluxes incident into the third optical region do not form an appropriate wavefront on each information recording plane of the second and third optical information recording media.

9. The optical pickup apparatus of claim 1, wherein the following formula is satisfied:

$$0.7 < d/f1 < 1.5,$$

where f1 represents a focal length of the objective lens for the first light flux, and d represents a central thickness of the objective lens.

10. The optical pickup apparatus of claim 1, wherein the following formula is satisfied:

$$2.8 < \phi1(mm) < 5.8,$$

where $\phi1$ represents a diameter of the first light flux incident on the objective lens.

11. The optical pickup apparatus of claim 1, wherein the following formula is satisfied:

$$fB3(mm) > 0.2,$$

where fB3 represents a working distance of the objective lens when the reproducing and/or recording of the information is conducted onto the third optical information recording medium.

12. The optical pickup apparatus of claim 1, wherein the diffractive structure is formed on at least one of the first light flux region, the second light flux region and the third light flux region.

13. An audio and/or image recording apparatus and/or an audio and/or image reproducing apparatus, comprising:

the optical pickup apparatus described in claim 1.

* * * * *